(12) United States Patent
Tijerina-Ramos et al.

(10) Patent No.: US 7,024,887 B2
(45) Date of Patent: Apr. 11, 2006

(54) METHOD AND A MACHINE FOR THE PRODUCTION OF HOLLOW GLASSWARE ARTICLES

(75) Inventors: Victor Tijerina-Ramos, Nuevo León (MX); Adrian Sada-Treviño, Nuevo León (MX)

(73) Assignee: Vitro Global, S.A., Givisiez (CH)

( * ) Notice: Subject to any disclaimer, the term of this patent is extended or adjusted under 35 U.S.C. 154(b) by 0 days.

(21) Appl. No.: 11/159,792

(22) Filed: Jun. 22, 2005

(65) Prior Publication Data

US 2005/0235697 A1  Oct. 27, 2005

Related U.S. Application Data

(62) Division of application No. 10/093,431, filed on Mar. 7, 2002.

(51) Int. Cl.
*C03B 9/41* (2006.01)
*C03B 9/323* (2006.01)

(52) U.S. Cl. ............... 65/29.11; 65/68; 65/72; 65/79; 65/82; 65/158; 65/159; 65/224; 65/230; 65/235; 65/241; 65/260; 65/261; 65/304; 65/307

(58) Field of Classification Search ........... 65/29.1, 65/29.11, 68, 72, 79, 82, 158, 159, 224, 230, 65/235, 240, 241, 260, 261, 304, 307, 323
See application file for complete search history.

(56) References Cited

U.S. PATENT DOCUMENTS

| | | | | |
|---|---|---|---|---|
| 2,151,876 A | * | 3/1939 | Wadman | 65/230 |
| 3,434,820 A | * | 3/1969 | Bough, Jr. et al. | 65/223 |
| 3,573,027 A | * | 3/1971 | Nuzum | 65/235 |
| 3,914,120 A | * | 10/1975 | Foster | 65/229 |
| 4,009,016 A | * | 2/1977 | Foster | 65/76 |
| 4,010,021 A | * | 3/1977 | Foster | 65/229 |
| 4,058,388 A | * | 11/1977 | Zappia | 65/229 |
| 4,094,656 A | * | 6/1978 | Colchagoff et al. | 65/81 |
| 4,137,061 A | * | 1/1979 | Mallory et al. | 65/232 |
| 4,162,911 A | * | 7/1979 | Mallory | 65/229 |

(Continued)

*Primary Examiner*—Sean Vincent
(74) *Attorney, Agent, or Firm*—Abelman, Frayne & Schwab

(57) ABSTRACT

A method and a machine for the production of hollow glassware articles, by the blow-and-blow, press-and-blow, press-and-blow paste mold and direct-press processes in a glassware forming machine including single or multiple machine sections each having single or multiple-cavity, comprising: forming a parison in an inverted orientation, into a blank mold and a first transferable and open-able neck ring mold held by an inverting apparatus having a first and a second diametrically opposed arms, each arm holding a transferable and open-able neck ring mold; inverting the parison held by the first transferable and open-able neck ring mold, by rotating the first arm 180° to an upright orientation at an intermediate station, while the second arm with a second transferable and open-able neck ring mold is simultaneously placed at the parison forming station; transferring the first transferable and open-able neck ring mold holding the parison in an upright orientation, from the intermediate station, to a blow mold station, by a transference apparatus; releasing the first parison into a blow mold, and turning back the first transferable and open-able neck ring mold empty to the first arm of the inverting apparatus, at the intermediate station to be placed again at the parison forming station by rotating the first arm additional 180°, completing a 360° turn, while the second arm reaches to the intermediate station; blowing the parison into a blow mold to form a finished article; and transferring the finished article in an upright orientation, once the blow mold is opened, by a take out apparatus, to place it at a dead plate or at a carrying conveyor.

164 Claims, 66 Drawing Sheets

U.S. PATENT DOCUMENTS

| | | | |
|---|---|---|---|
| 4,244,756 A * | 1/1981 | Tanabe et al. | 428/544 |
| 4,255,178 A * | 3/1981 | Braithwaite | 65/79 |
| 4,276,076 A * | 6/1981 | Fenton | 65/241 |
| 4,293,327 A * | 10/1981 | Northup | 65/64 |
| 4,325,725 A * | 4/1982 | Fujimoto | 65/230 |
| 4,461,637 A * | 7/1984 | Jones et al. | 65/158 |
| 4,507,136 A * | 3/1985 | Northup | 65/79 |
| 5,547,485 A * | 8/1996 | Jones | 65/260 |
| 5,588,981 A * | 12/1996 | Eilers | 65/241 |
| 5,814,119 A * | 9/1998 | Jones et al. | 65/235 |

* cited by examiner

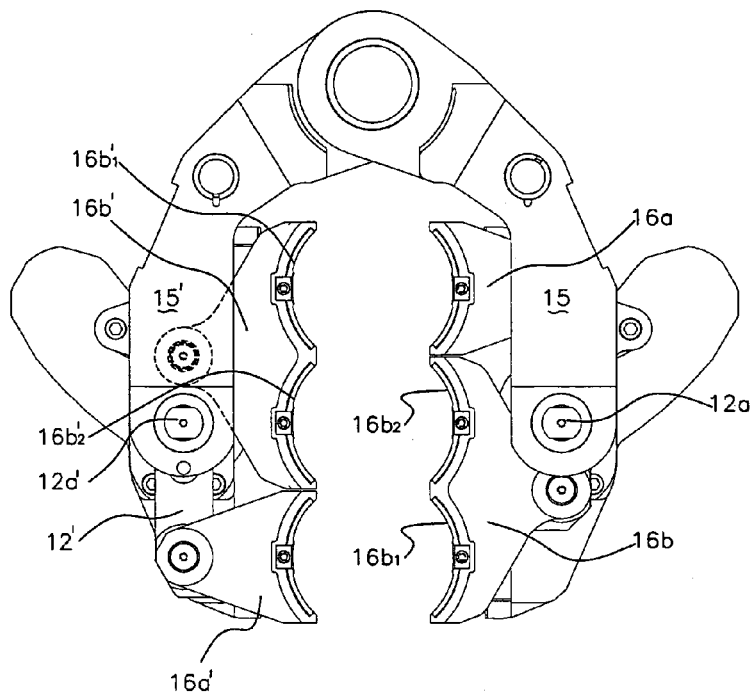
FIGURE 3D_A
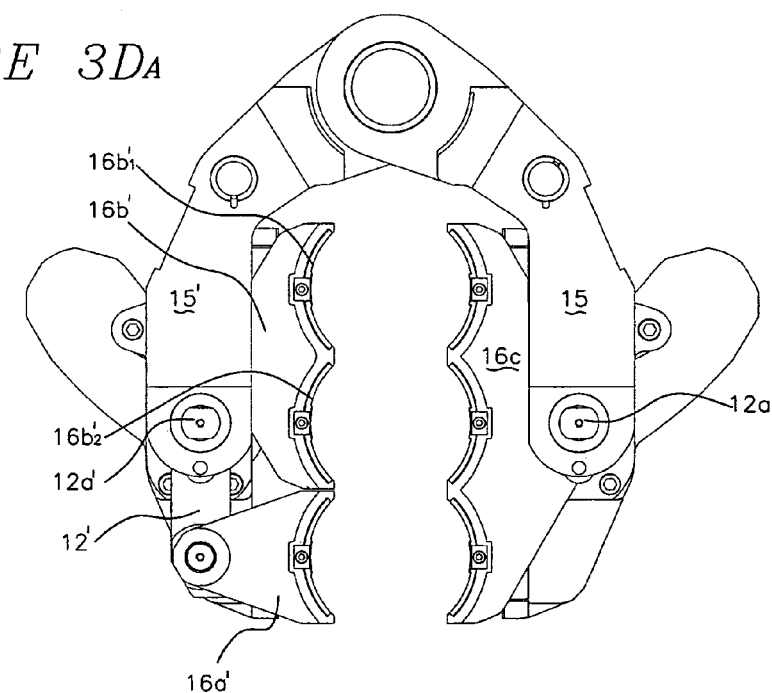
FIGURE 3D_B

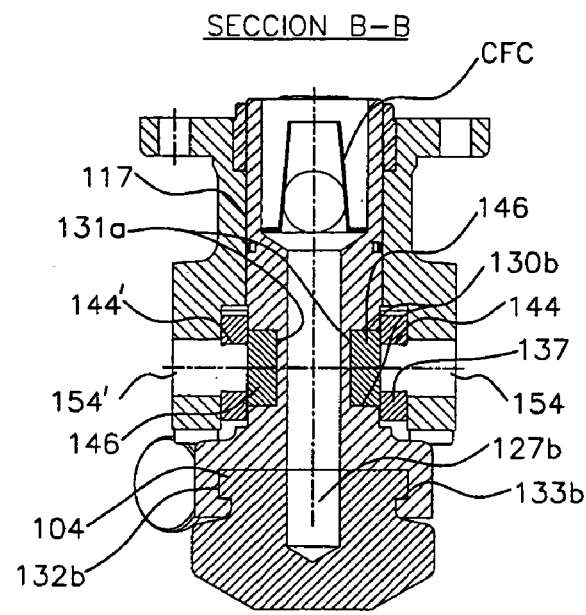
*FIGURE 5H*
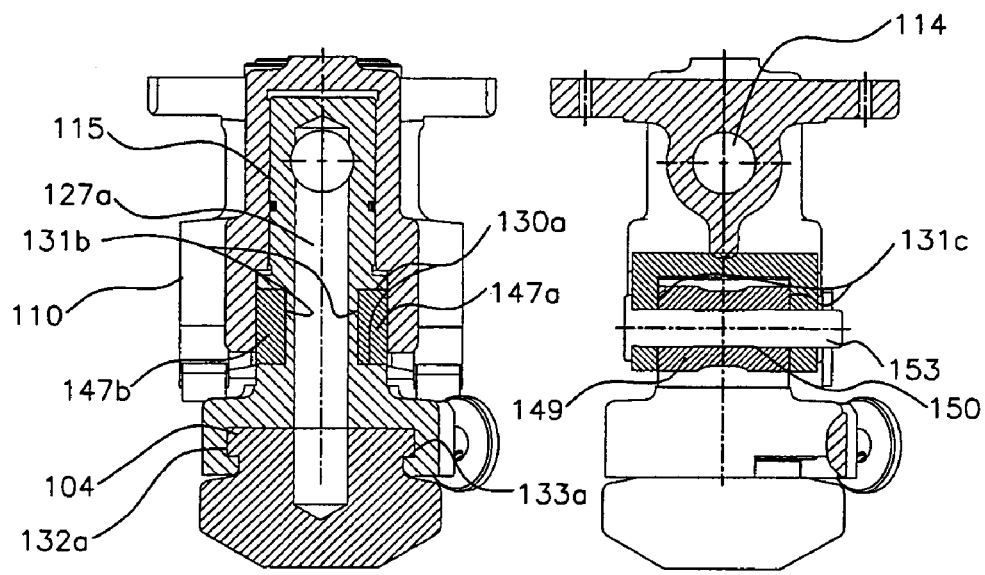
*FIGURE 5G*  *FIGURE 5I*

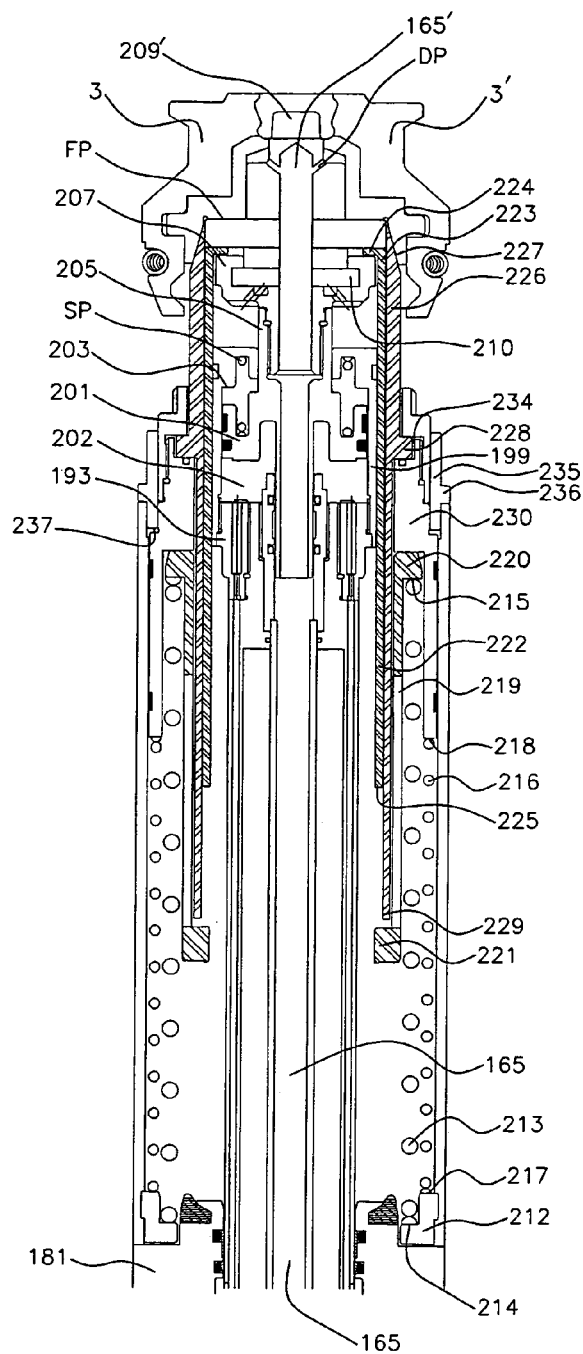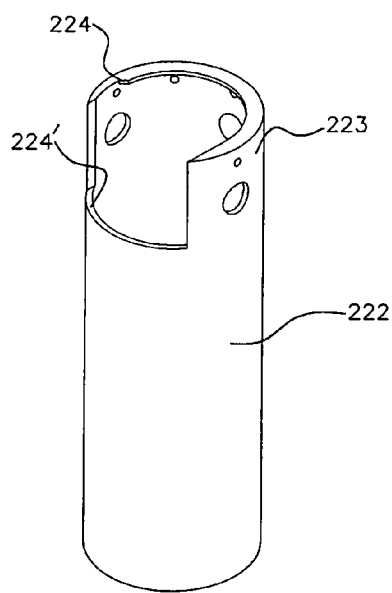
FIGURE 6K  FIGURE 6Ka

METHOD AND A MACHINE FOR THE PRODUCTION OF HOLLOW GLASSWARE ARTICLES

This application is a Divisional of application Ser. No. 10/093,431 filed Mar. 7, 2002.

BACKGROUND OF THE INVENTION.

A. Field of the Invention

This invention is related to a method an a machine for the production of glassware articles and more specifically to a method and a machine, as an individual forming section including single or multiple cavities, which can be grouped to constitute a glassware forming machine of the type including multiple individual forming sections, normally including from six to eight individual forming sections, for the production of glass bottles, jars, tumblers and other glassware articles by the blow-and-blow, press-and-blow, press-and-blow paste mold or direct-press processes.

B. Description of the Related Art

Glassware articles such as narrow neck glass bottles are normally produced in glassware forming machines of the type which may include multiple similar forming sections, by the blow-and-blow process, while wide neck glass jars, tumblers and other glassware articles are produced in the so named "E" and "F" Series forming machines by the press-and-blow process, in both, the so named hot molds and paste mold.

Glass bottles known as narrow neck glass containers, can also be produced by the well-known press-and-blow process, in the above mentioned E and F machines.

Nowadays the production velocity or forming cycles of the machines including multiple-sections and E and F machines, have reached to an optimum status and the maximum number of glassware articles has been achieved by providing multiple cavities (usually two to four) in each individual forming section of the machine.

Looking for an increasing in the number of glassware articles per forming cycle on each section of the machine, attempts have been made to introduce additional forming stations in each section, for example an additional article forming apparatus (blow mold, blow head) which could carry out a forming task (receiving a just formed parison from a single parison forming apparatus and beginning the forming blown), while another similar equipment is carrying out a following forming task on the forming cycle (opening the blow mold for transferring a just formed article to a cooling dead plate and being prepared to receive another following parison from the parison forming apparatus).

Representative of such forming machines, are the so named "one-two station machines", disclosed in U.S. Pat. Nos. 4,094,656; 4,137,061 and 4,162,911 of Mallory, including a single stationary parison forming station and two article finishing stations, one finishing station at each side of the parison forming station in the same line known as the "cold-side" of the machine, eliminating the so named hot-side, and in U.S. Pat. Nos. 4,244,756 and 4,293,327 of Northup, disclosing a single parison forming station placed in the hot-side of the machine, and two article finishing stations, mounted one above the other on a lifting and lowering mechanism, alternatively rising and lowering each forming station for forming the articles.

However, by increasing the number of forming stations, the number of forming molds and surrounding equipment (either for single or multiple cavities) are consequently increased, increasing in turn the operation cost of the machine.

Other attempts to increase the velocity of production and the quality of the glassware articles in the multiple-section machines and E and F machines, has been focused on providing three consecutive forming stations, comprising a first parison forming station, an intermediate station for re-heating and/or stretching of the parison, and a third station for finishing the glassware article.

Representative of these "three station" forming machines are the U.S. Pat. Nos. 3,914,120; 4.009,016; 4,010,021 of Foster; U.S. Pat. No. 4,255,177 of Fenton; U.S. Pat. No. 4,255,178 of Braithwite; U.S. Pat. No. 4,255,179 of Foster; U.S. Pat. No. 4,276,076 of Fenton; U.S. Pat. No. 4,325,725 of Fujimoto and U.S. Pat. No. 4,507,136 of Northup.

The differences between each of these tree step forming processes disclosed by the above U.S. patents, can be firstly determined by the parison forming orientation in an upright orientation, as disclosed in U.S. Pat. Nos. 3,914,1.20; 4,009, 016; 4,010,021, all of them of Foster, and U.S. Pat. No. 4,255,178 of Braithwait, and in an inverted orientation, as disclosed in U.S. Pat. No. 2,555,177 of Fenton, U.S. Pat. No. 4,255,179 of Foster, U.S. Pat. No. 4,325,725 of Fujimoto, and U.S. Pat. No. 4,507,136 of Northrup.

Further differences between the above disclosed three step forming processes, are determined by the apparatuses to transfer the parison and finished article through the parison forming step, the intermediate step and the finishing and take out steps.

For example, U.S. Pat. Nos. 3,914,120; 4,009,016; 4,010, 021, and 4,255,178 disclose a linear transference of the parison in an upright position from the parison forming station, to the intermediate station, then a linearly transference of the parison from the intermediate station to a blow molding station, and finally, a linearly transference of the finished article, to a cooling dead plate.

Unlikely to the above disclosed glassware forming machines and apparatuses, U.S. Pat. Nos. 4,255,177; 4,255, 179; 4,325,725, and 4,507,136, disclose a first transference step including inverting of the parison from an inverted position at the parison forming station, to an upright position at the intermediate station; a second linear transference step from the intermediate station to a final forming (blowing) station; and a third linear transference step from the final forming station to the cooling dead plate. The second and third linear transference steps being carried out by a generally similar transference apparatus.

Other differences between the apparatuses disclosed in the above-referred patents can be found in connection with the very specific apparatuses to carry out the transference of the parison and the final glassware article.

The main objective sought by the introduction of the intermediate station in these glassware forming machines, has been to release the task of a previous mechanism to be in an conditions to repeat a new forming cycle, without having to wait that a following mechanism performs its respective task, to turn back at its original position to begin a new forming cycle.

However, the above objectives have been difficult to be achieved because of the configuration of the mechanisms constituting the machine, which have been the same as the conventional and well-known ones.

Applicants, looking for a win-to-win machine, i.e. seeking to obtain the objectives of increasing the velocity of the machine and a reduction of the forming cycle time, the efficiency of its performance and an increasing in the quality of the articles to be produced, as well as seeking to make standard some mechanisms which perform similar tasks, and equipping them only with their specific instruments to perform their specific function, reducing as much as possible the cost of equipping a machine, the number of mechanisms in storage, and simplicity of mounting the specific instruments on common mechanisms and apparatuses, applicants reached to the following concept of a new glassware forming machine comprising a combination of some new apparatuses, and a new method for the production of hollow glassware articles.

In the first place, applicants visualized that an intermediate station is conveniently necessary so that the re-heating of the glass surface of a just formed parison be continued outside the blank mold in order to immediately release the task of the blank mold, enabling it to carry out another forming cycle, and permitting to carry out a stretching of the parison, all of which also results in an increase in the velocity of production and in a better quality of the article.

Additionally, applicants recognized that the inverting arm including a neck ring mold, of a typical inverting mechanism, had to be in a standing position during a parison forming cycle and to wait for the opening of the blank mold, to initiate the inverting cycle, release the parison at the intermediate station and turn back at the parison forming position, to begin another forming cycle.

To overcome the former disadvantage, applicants introduced a new inventive concept for the inverting apparatus, consisting in providing two diametrically opposed and stepped inverting arms, each holding a transferable and open-able neck ring mold (either single or multiple-cavity), so that a first one of said arms, after a parison has been formed at a first parison forming cycle, can firstly rotate 180° clockwise (moving the parison upwardly constricting it) or counterclockwise (moving the parison downwardly stretching it) to release the parison held by a first transferable and open-able neck ring mold, at the intermediate station, while the second arm with a second transferable and open-able neck ring mold is simultaneously placed under the blank mold to perform a second parison forming cycle, and then the first arm with an empty transferable and open-able neck ring mold which has been turned back to said first arm, rotates additional 180° completing a 360° turn, to be placed under the blank mold for a third parison forming cycle, while the second arm is releasing the parison held by the corresponding transferable and open-able neck ring mold, at the intermediate station. In this way, the blank mold do not have to wait that the first arm release the parison at the intermediate station and turn back, to initiate a new parison forming cycle.

New first and second transferable and open-able neck ring molds (either single or multiple-cavity) are provided to be held and handled with absolute independence by each of the arms of the inverting apparatus, by the longitudinal transference apparatus and by the take out apparatus, have also been provided in order to improve the quality of the final product by handling the parison by the neck ring at a uniform temperature, thus avoiding that the formed parison had to be handled by other components at different temperatures which may cause checks, efforts or deformations in the parison, which result in a poor quality of the finished articles.

The independence and transference ability of these transferable and open-able neck ring molds of the present invention, is possible in the machine of the present invention because of the existence of the unidirectional indexing-rotary inverting apparatus including the first and second stepped and diametrically opposed arms, which are able to hold a transferable and open-able neck ring mold, so that, while a first transferable and open-able neck ring mold is transferred from the first arm at the intermediate station to the blown molding station for forming a finished article, the second arm with a second transferable and open-able neck ring mold is placed at the parison forming station, in a parison forming cycle and once the parison is formed and able to be inverted at the intermediate station, the first arm has received back the first transferable and open-able neck ring mold and rotated other 180° completing a 360° turn, to be placed again at the parison forming station.

Also, although a typical baffle apparatus could be included in the machine, mainly for the blow-and-blow forming process, this apparatus can be configured in accordance with the machine of the present invention, by including a new oscillating apparatus named "rotolinear apparatus", which may also be useful for operating a glass gob guide channel, the blank mold apparatus, the final blow apparatus and any other apparatus, for firstly rotate, then place an actuating mechanism to their respective active positions, and then retire them to an initial inactive position, which includes a new configuration of cams and cam followers to impart reliable oscillation and lowering and lifting movements, overcoming any backlash which could cause misalignment of the baffle apparatus or any other apparatuses, with the following apparatuses of the forming sequence.

A new equalizing apparatus has also been provided at the baffle apparatus and at the final blow apparatus, for multiple-cavity, for mounting bottom blank mold heads and uniformly place them on the blank molds or the blow molds, effectively adjusting whatever misarrange which may exist both, in the baffle or blow heads, or in the blank mold or blow molds.

In this way, this new glassware forming machine overcomes a number of difficulties of the known glassware forming machines, affording a win in the forming cycle time, which is estimated at a 32.6%, and allows an increase in the production and an improvement in the quality of the hollow glassware articles, as will be specifically disclosed in the following detailed description of the invention.

SUMMARY OF THE INVENTION

It is therefore a main object of the present invention, to provide a new machine for the production of hollow glassware articles, which allows a reduction in the forming cycle time of the machine, and an improvement in the quality of the glassware articles produced.

It is another main object of present invention, to provide a new machine for the production of hollow glassware articles, of the above disclosed nature, which can be easily equipped to operate as a blow-and-blow forming process or a press-and-blow forming process, in its embodiments of two-halve blank molds, solid blank mold, and pasted mold for producing seamless glassware articles.

It is an additional main object of present invention, to provide a new machine for the production of hollow glassware articles, of the above disclosed nature, which includes an intermediate station which, in combination with a new indexed rotary inverting apparatus rotating 180° clockwise or counterclockwise, and new forming and handling apparatuses, allows to increase the velocity of the machine (i.e. a reduction in the forming cycle time) and the improvement on the quality of the produced glassware articles.

It is a further main object of present invention, to provide a new machine for the production of hollow glassware articles, of the above disclosed nature, which includes new apparatuses and mechanisms which are standard for other apparatuses of the forming machine, performing similar tasks, which are just specifically equipped to perform their specific tasks.

It is still a further main object of present invention, to provide a new machine for the production of hollow glassware articles, of the above disclosed nature, in which the transferable and open-able neck ring molds, parison molds and blow molds, are mounted to be placed at a so named blank mold "zero-line" in the machine, which is a unique position standard for any size of parisons and glassware articles to be produced.

A summary of the advantages of the machine for the production of hollow glassware articles, in accordance with the present invention, are as follows.

It is suitable for the production of hollow glassware articles, such as bottles, jars, tumblers and other glassware articles, by the blow-and-blow or press-and-blow, press-and-blow paste mold and direct press processes in a glassware forming machine including multiple machine sections and multiple cavities.

A single machine section can be quickly interchanged at a multiple-section machine, by another ready-for-operation one, without retiring said multiple-section machine from the working area, for maintenance, repairing and/or actualizing.

The transferable and open-able neck ring molds are placed at a constant "zero-line" height for the different height of articles to be produced, so that height adjustments are unnecessary.

The unidirectional inverting apparatus are placed at a constant "zero-line" height for the different height of articles to be produced and/or processes, so that height adjustments are unnecessary.

The pressing plunger apparatus is placed at a constant "zero-line" height for the different height of articles to be produced and/or processes, so that height adjustments are unnecessary.

The pressing plunger apparatus is placed at a constant "zero-line" height for the different height of articles to be produced, requiring only a rapid change of the pressing plunger or neck ring plunger, so that height adjustments are unnecessary.

The variable compensator of the pressing plunger apparatus, allows to change the height of the parison The servo-controlled bi-directional curvilinear transference apparatus is placed at a constant "zero-line" height for the different height of articles to be produced, so that height adjustments are unnecessary.

The blow head apparatus is placed at a constant "zero-line" height, for the different height of articles to be produced, so that height adjustments are unnecessary.

The bi-directional curvilinear translation take out apparatus is placed at a constant "zero-line" height, for the different height of articles to be produced, so that height adjustments are unnecessary.

The neck ring holding arms of servo-controlled unidirectional inverting apparatus, are mounted in a reduced inversion radius which allows a reduction of inertial forces for the inversion servo-controlled path of the parison.

The oscillating mechanism is the same for guide-funnel apparatus, the baffle apparatus and the blow head apparatus, but arranged in a left or right arrangement only for the guide-funnel apparatus.

The opening and closing mechanism, is the same for the blank mold apparatus and the blow mold apparatus.

The driving mechanism is the same for the servo-controlled unidirectional inverting apparatus, the servo-controlled bi-directional curvilinear transference apparatus, and the, servo-controlled bi-directional curvilinear take out apparatus, but arranged in a left or right arrangement only for the servo-controlled bi-directional curvilinear transference apparatus.

The equalizing mechanism is the same for the baffle apparatus and the blow head apparatus.

The machine is able to change from a blow-and-blow process to a press-and-blow process or direct press, and vice versa, changing only the mold tooling, without changing any mechanism, kits or position adjustments It is also a main objective of the present invention, to provide a new method for the production of hollow glassware articles, which allows an increasing in the velocity of production and a reduction of the forming cycle time of the machine, and an improvement in the quality of the glassware articles produced.

It is another main objective of the present invention, to provide a new method for the production of hollow glassware articles, in which a first parison, held by a first transferable and open-able neck ring mold mounted on a first arm of an inverting apparatus, is inverted, by an indexed rotation at 180°, clockwise or counterclockwise, from an inverted orientation to an upright orientation at an intermediate station, while a second transferable and open-able neck ring mold mounted on a second arm of the inverting apparatus is simultaneously placed at the parison forming station, to carry out a parison forming cycle.

It is jet another main objective of the present invention, to provide a new method for the production of hollow glassware articles, in which the first formed parison held by the first transferable and open-able neck ring mold is transferred, through a semicircular path, from the intermediate station, to a blow molding station, in which the first parison is released into a blow mold, turning back the first transferable and open-able neck ring mold empty to the first arm of the inverting apparatus, at the intermediate station to be placed again at the parison forming station, by rotating the first arm additional 180°, completing a 360° turn, while the second arm reaches to the intermediate station to carry out a transferring cycle.

These and other objects and advantages of the present invention will be apparent to those having ordinary skill in the field, from the following description of the specific and preferred embodiments of the invention, provided in combination with the enclosed drawings

BRIEF DESCRIPTION OF THE DRAWINGS

FIGS. 3Dᴀ and 3Dʙ are top plant views of two embodiments of arrangements of the blank mold holding mechanism, of the blank mold apparatus of FIG. 3C;

FIG. 5G is a cross-section lateral elevation view of the equalizer taken along lines A—A of FIG. 5F;

FIG. 5H is a cross-section lateral elevation view of the equalizer taken along lines B—B of FIG. 5F; and FIG. 5I is a cross-section lateral elevation view of the equalizer taken along lines D—D of FIG. 5F

FIG. 6I is an enlarged and detailed cross-sectional perspective three-dimensional elevation view of the upper part of all of the positions of the pressing plunger apparatus of FIG. 6C, for a press-and-blow process;

FIG. 6K is an enlarged and detailed cross-section lateral elevation view of the upper part of the pressing plunger apparatus of FIG. 6J, in a charging and settle blow position into a transferable and open-able neck ring, mold for a blow-and-blow process;

FIG. 6Ka is a perspective elevation view of the variable adapting segment of the third cylinder and piston assembly of the pressing plunger of FIG. 6B.

Figure 1:
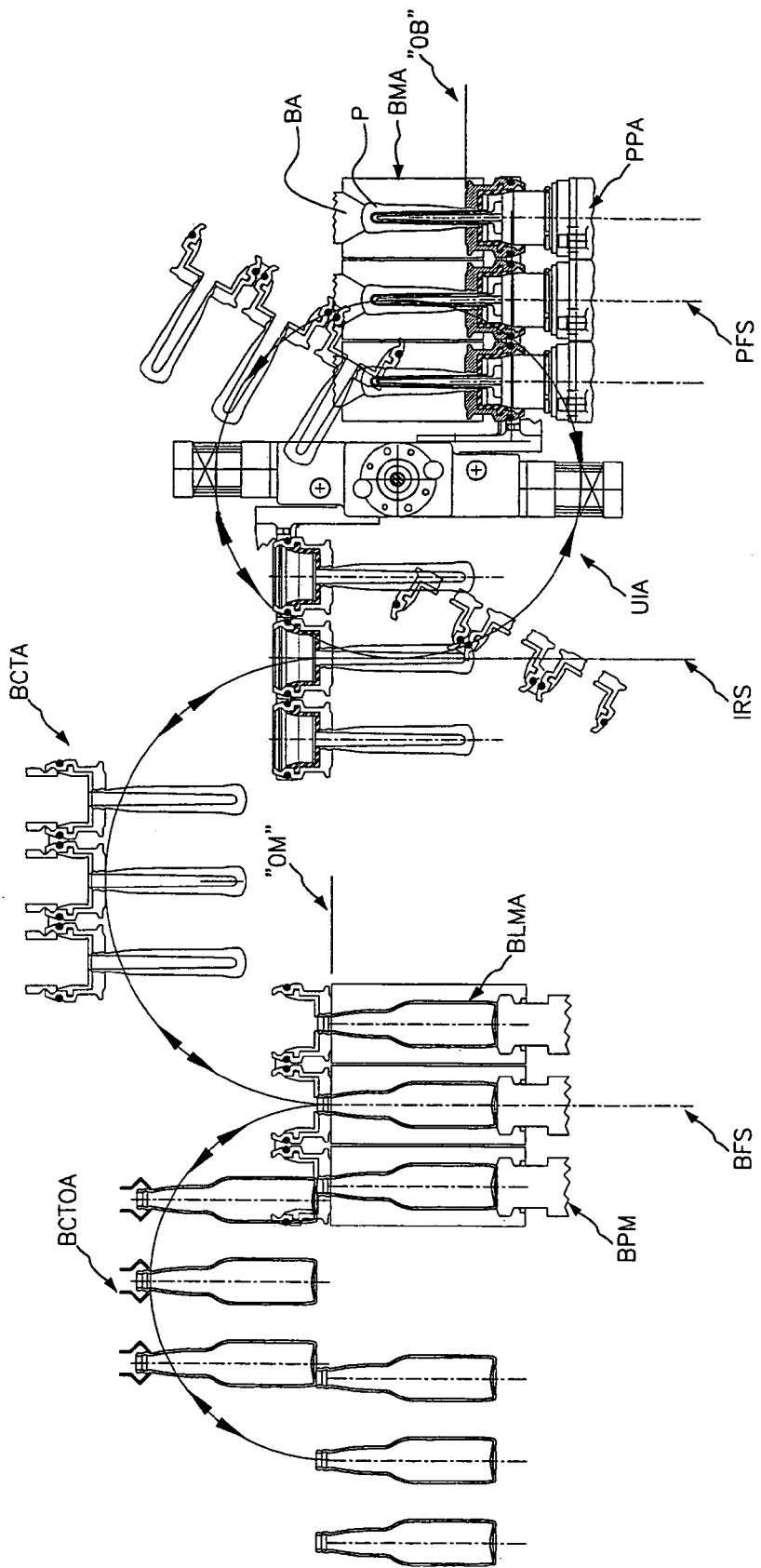
FIG. 1, is a schematic lay out view, showing all the sequential steps of the method and machine for the production of hollow glassware articles.

DETAILED DESCRIPTION OF THE INVENTION.

For a best comprehension of the invention, the machine of the present invention, which usually is comprised by several (usually six to eight) similar machine sections, will be firstly described by referring to a single machine section including only the components and apparatuses which impart the new concepts of the machine and of the process, in a very general way, comprised by the new components and components which can be selected from the known ones in the field, and then describing all them in a full detail including their new characteristics and advantages thereof, and afterwards, the new method will be described by referring only to the steps which also impart the new concept of the forming process, in a very general way and then by describing all the steps which advantageously can be performed by the component apparatuses of this machine.

Additionally, for the sake of simplicity of description, the machine will be described referring to a single cavity, under the prevision that, as illustrated in the shown drawings, the preferred embodiment of the machine is referred to a so named "multiple (triple) cavity" machine.

And last but not least, some of apparatuses include components which are repeated in the same apparatus or in another one and, therefore, only one of them will be described and numbered in the drawings. Similarly, when components are constituted by two similar opposed halves, only one will de described but both will be numbered with the same reference number but including an apostrophe or accompanied with a letter in alphabetical order.

Figure 1A:
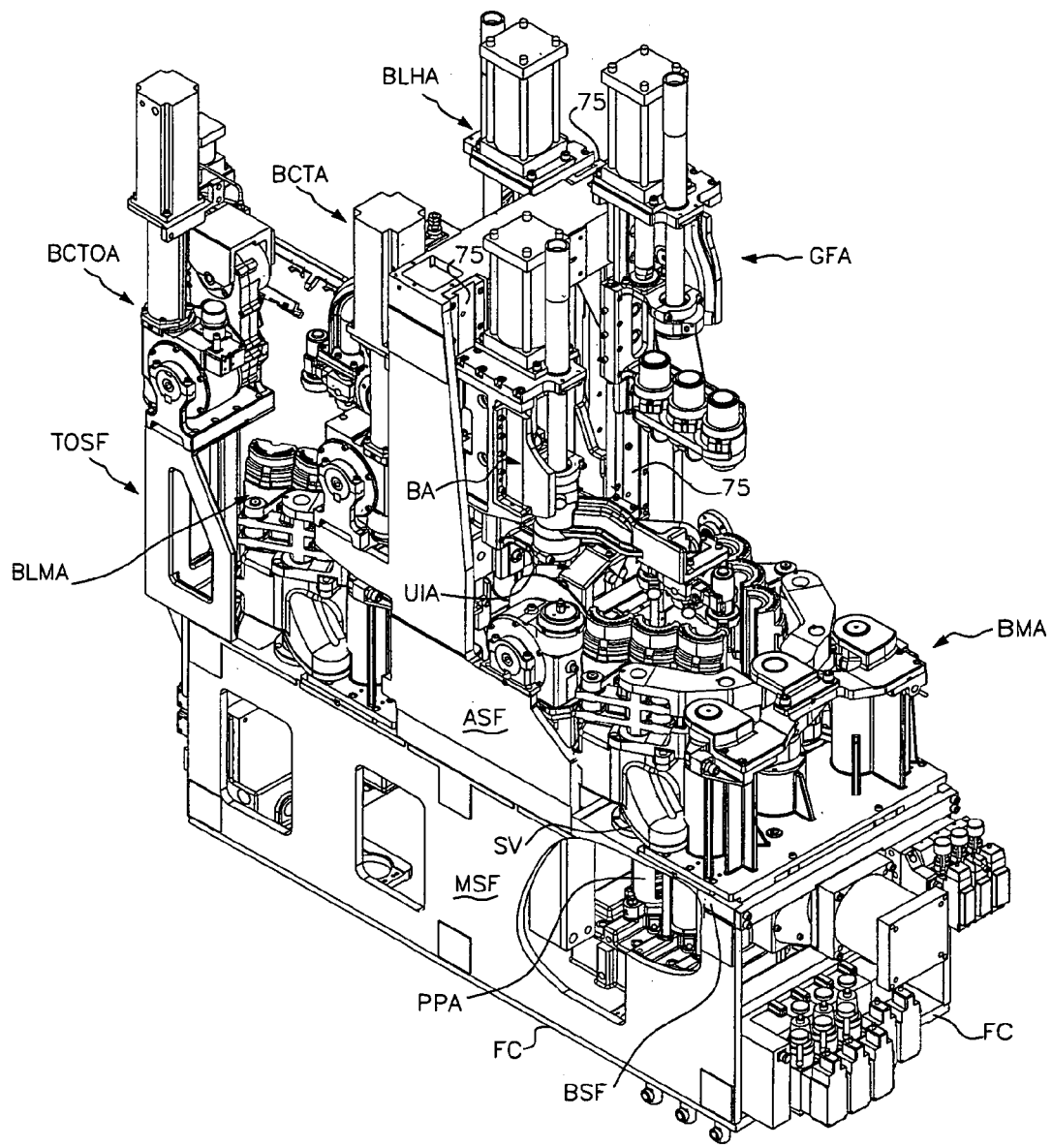
FIG. 1A, is a perspective view of the entire machine section for the production of hollow glassware articles, configured in accordance with the present invention, showing the specific apparatuses of the so named "hot side" of the machine.
Figure 1B:
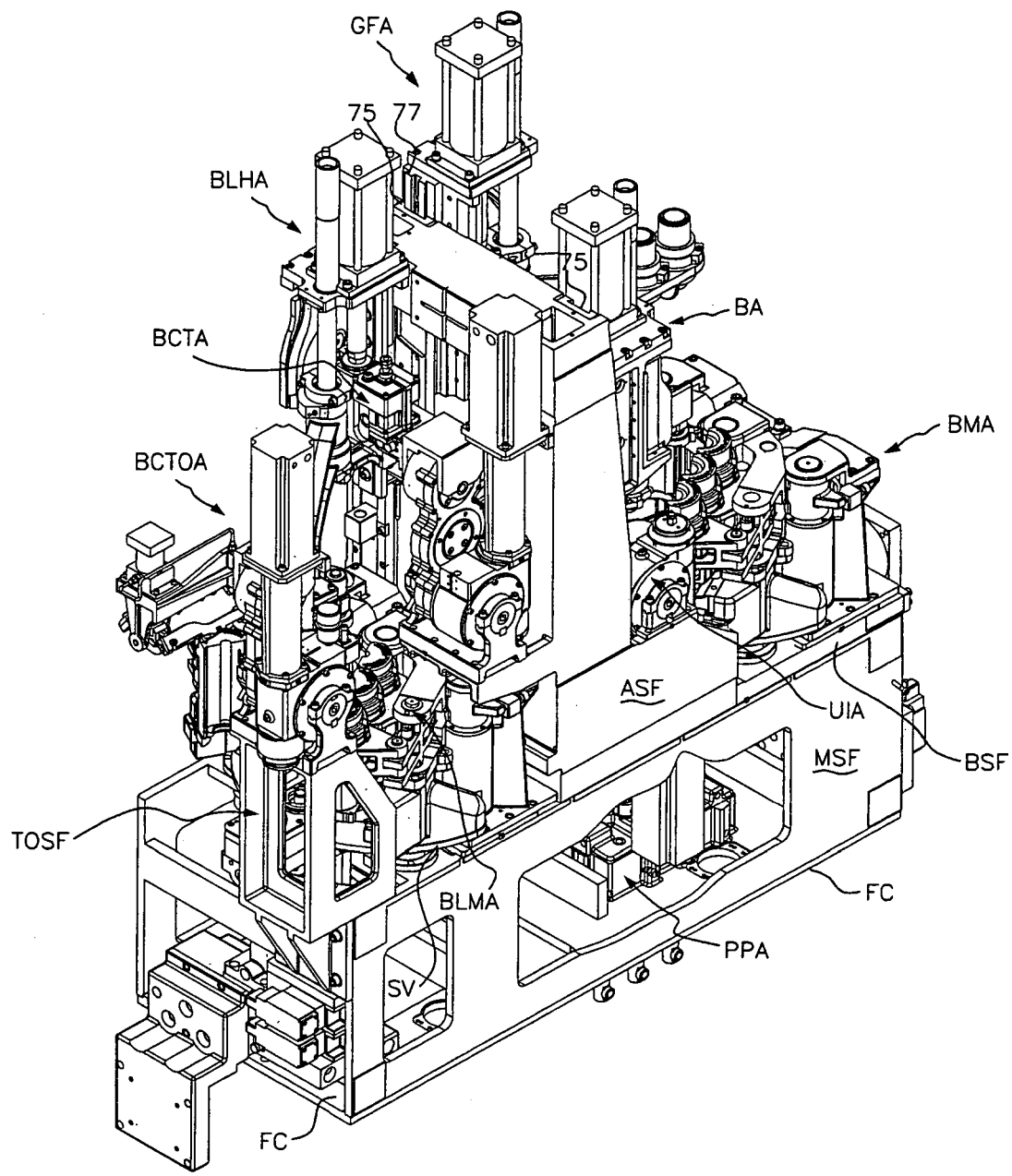
FIG. 1B, is a perspective view of the entire machine shown in FIG. 1A, showing the specific apparatuses of the so named "cold side" of the machine.

Considering the former clarifications, a single machine section of the machine for the production of hollow glassware articles, such as bottles, jars, tumblers and other glassware articles, by the press-and-blow process, both hot mold and paste mold, blow-and-blow process, and direct press, as generally illustrated in FIGS. 1, 1A and 1B, which, because of its configuration herein described, can be taken out from the whole machine comprised by several machine sections, and changed by another similar machine section, for maintenance or repairing said machine section comprising, in combination:

a) a parison forming station PFS including a blank mold apparatus BMA, an inverting apparatus UIA (generally illustrated in FIG. 7A) including at least one open-able horizontal holding arm 260, and at least one transferable and open-able neck ring mold 1 (generally illustrated in FIGS. 2A to 2D), per cavity, removable held by the horizontal holding arm 260 of the inverting apparatus UIA, to be initially placed under the blank mold apparatus BMA to form a parison P which is held by said transferable and open-able neck ring mold 1 once formed and transferred by the inverting apparatus UIA from this parison forming station PFS to an intermediate station IRS at an upright orientation;

b) an intermediate station IRS including a transference apparatus BCTA (generally illustrated in FIGS. 8A to 8F) to transfer the parison P held by the transferable and open-able neck ring mold 1 from the inverting apparatus UIA at the intermediate station IRS to a blow forming station BFS, said transference apparatus BCTA comprising holding finger arms 331, 331' normally closed, gripping fingers 331a, 331b coupled to the holding finger arms 331, 331' for internally gripping the transferable and open-able neck ring mold 1 at said intermediate station IRS, and a two-positions opening mechanism TFC (more specifically illustrated in FIG. 8E) which, at a first position, partially opens the gripping fingers 331a, 331b to grip the transferable and open-able neck ring mold 1 gripping the parison P, while simultaneously the inverting apparatus UIA release them to be retained by the gripping fingers 331a, 331b of this transference apparatus BCTA at said intermediate station IRS and, at the blow forming station BFS, the gripping fingers 331a, 331b are additionally opened, opening the transferable and open-able neck ring mold 1 releasing the parison P at said blow forming station BFS, but still keeping the transferable and open-able neck ring mold 1 held by the gripping fingers 331a, 331b of the transference apparatus BCTA; and in an inverse way, said gripping fingers 331a, 331b of the transference apparatus BCTA turn the empty transferable and open-able neck ring mold 1 closed from said blow forming station BFS, back to the intermediate station IRS, and are further closed, releasing the empty transferable and open-able neck ring mold 1 at the open-able horizontal holding arm 260 of the inverting apparatus UIA to be held thereby for a following forming cycle; and c) a blow forming station BFS comprising a blow mold apparatus BLMA (FIGS. 9A to 9F), to receive the parison P from the transference apparatus BCTA, and form a finished article, and a take out apparatus BCTOA, to transfer the finished article from the blow mold apparatus BLMA to a dead plate or to a carrier conveyor.

In a most advanced embodiment of the machine of the present invention allowing an increase in the velocity of production and a reduction in the forming cycle time, the inverting apparatus UIA comprises a first open-able horizontal holding arm 260 initially placed under the blank mold BM and a second open-able horizontal holding arm 261 initially placed stepped, inverted and diametrically opposed to the first open-able horizontal holding arm 260, at an intermediate station IRS, and a first transferable and open-able neck ring mold 1, per cavity, removable held by the first open-able horizontal holding arm 260 and a second opposed transferable and open-able neck ring mold 2 held by the second open-able horizontal holding arm 261 of the inverting apparatus UIA, to indexed unidirectional and simultaneously rotate said first open-able horizontal holding arm 260 holding the first transferable and open-able neck ring mold 1 holding in turn a just formed parison P, 180° clockwise moving the parison P upwardly constricting it, or counterclockwise moving the parison P downwardly stretching it, around an horizontal rotary axis, to invert the parison P held by the first transferable and open-able neck ring mold 1, from the parison forming station PFS to the intermediate station. IRS, at an upright orientation, simultaneously placing the second open-able horizontal holding arm 261 holding the second transferable and open-able neck ring mold 2 under the blank mold BM for another parison forming cycle.

Figure 9A:
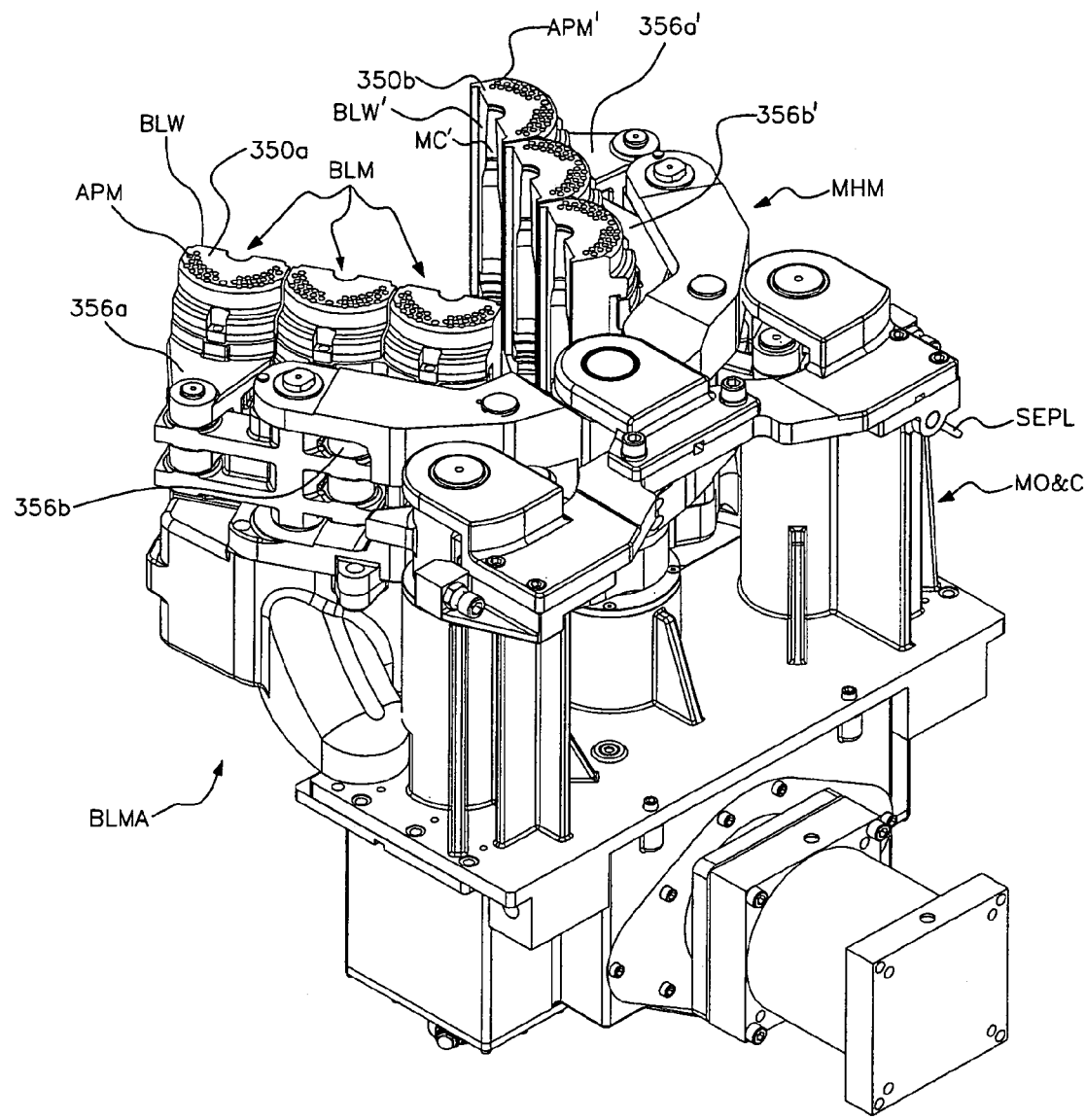
FIG. 9A is a perspective three-dimensional elevation view of a specific and preferred embodiment of the blow mold apparatus, for the glassware forming machine of the present invention shown from the so named "hot side"
Figure 9B:
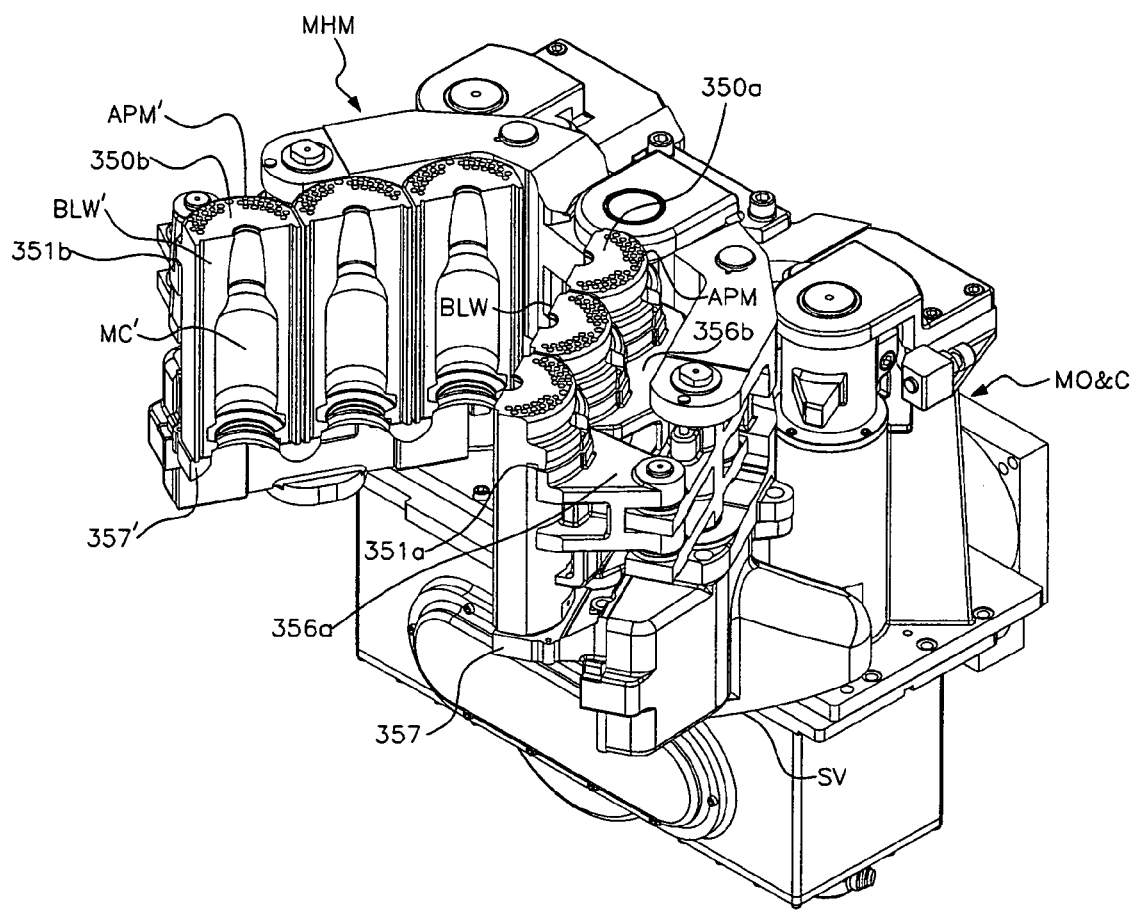
FIG. 9B is a perspective three-dimensional elevation view of the blow mold apparatus of FIG. 9A, shown from the so named "cold side"
Figure 9C:
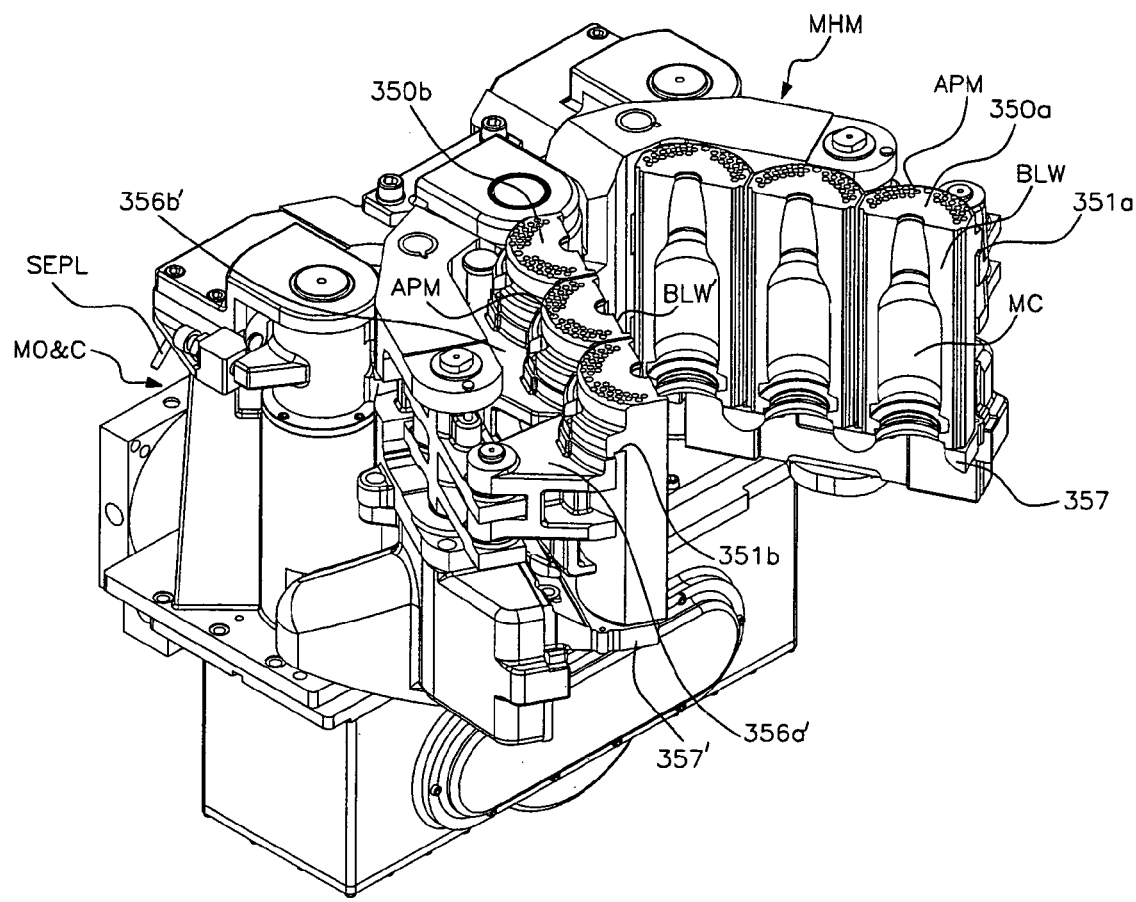
FIG. 9C is a perspective three-dimensional elevation view of the blow mold apparatus, similar to FIG. 9B, shown from another position of the so named "cold side"
Figure 9D:
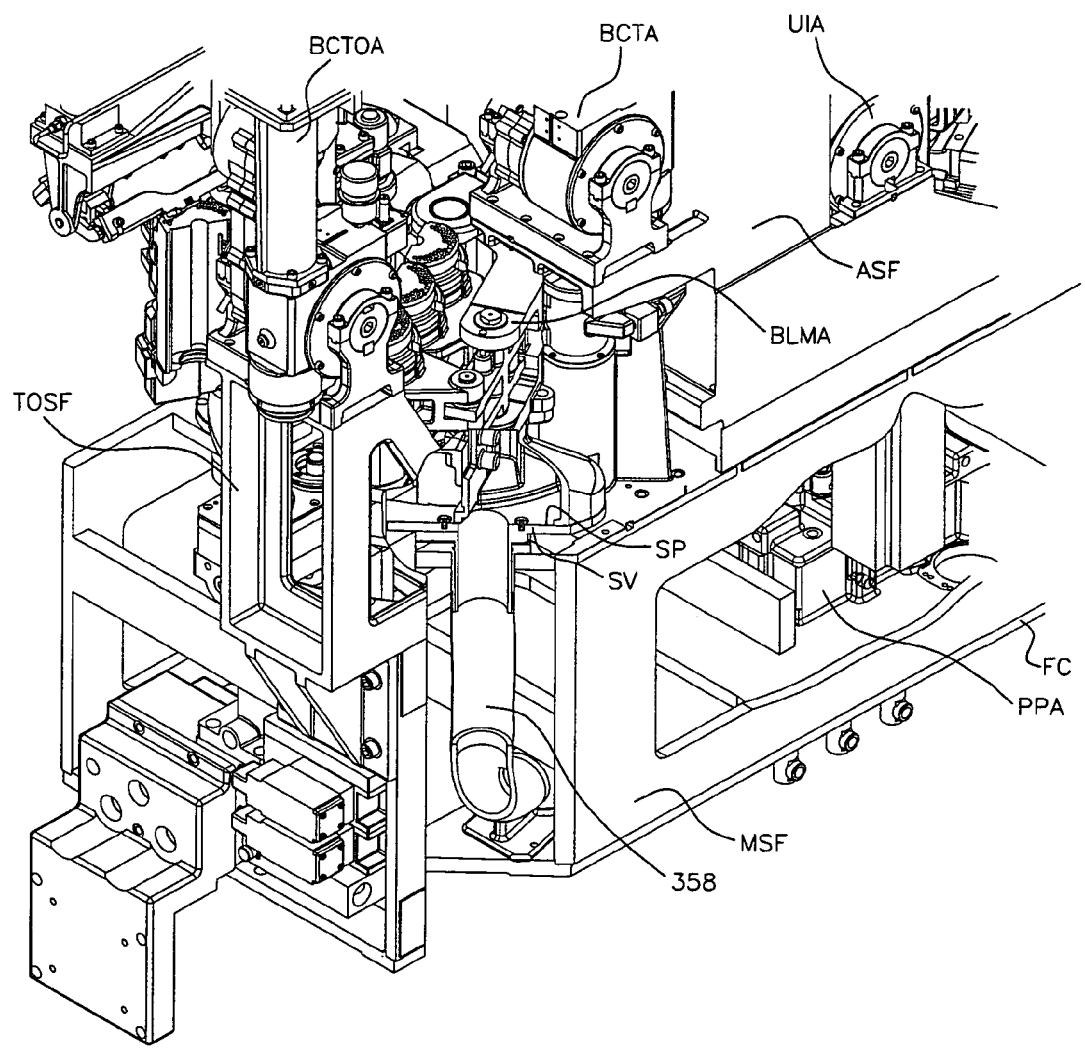
FIG. 9D is an enlarged and detailed partial view of FIG. 1B, partially showing the cooling fluid feeding system for the blow mold apparatus of FIG. 9B.
Figure 9E:
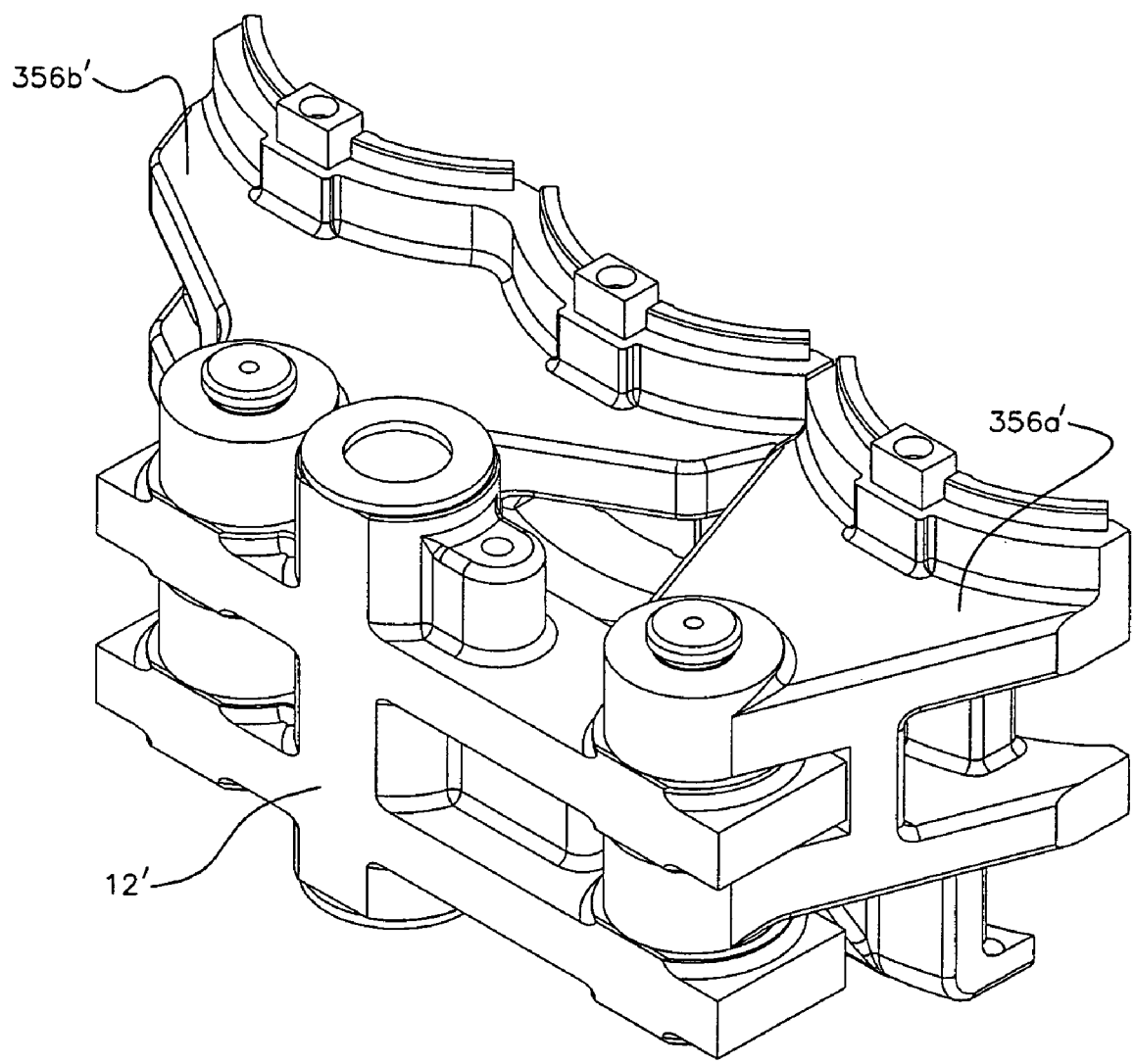
FIG. 9E is a rear perspective three-dimensional elevation view of the blow mold holding mechanism of the blow mold apparatus of FIG. 9C.
Figure 9F:
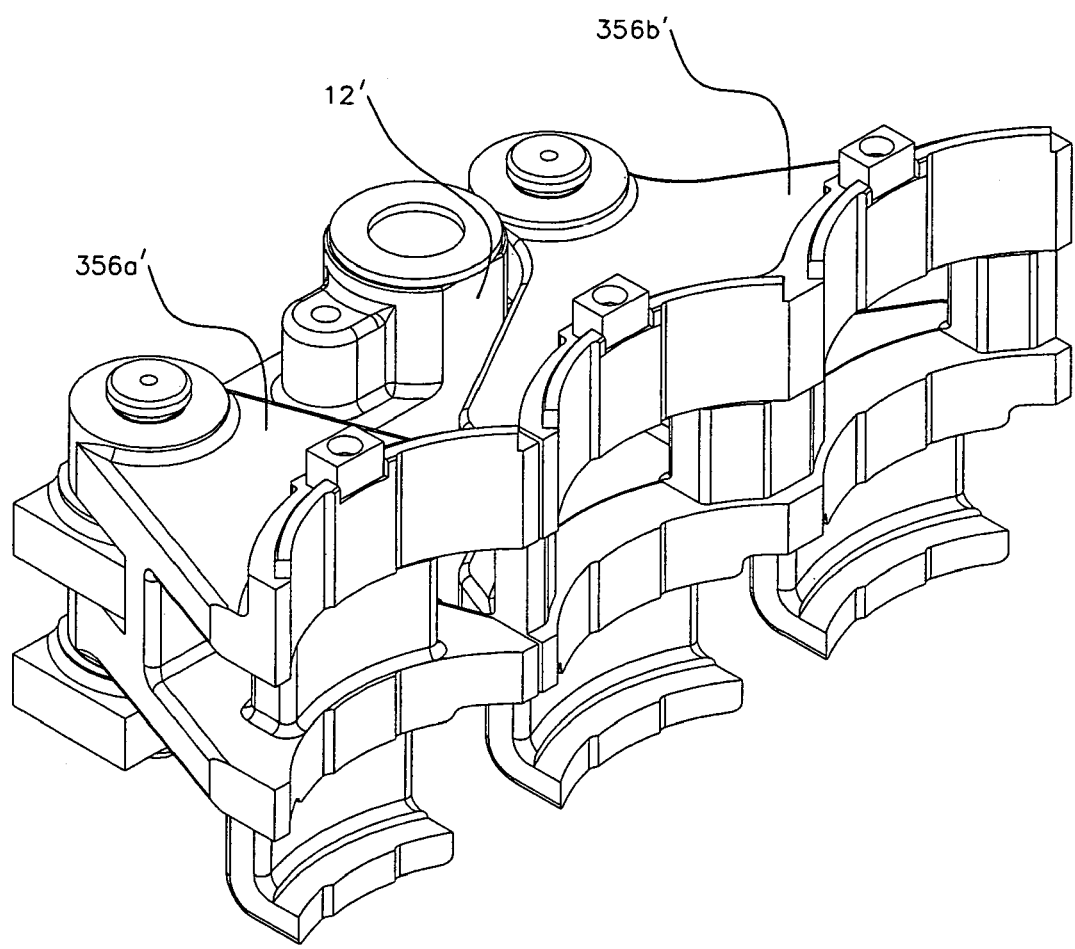
FIG. 9F is a front perspective three-dimensional elevation view of the blow mold holding mechanism of FIG. 9E, of the blow mold apparatus of FIG. 9C.
Figure 10A:
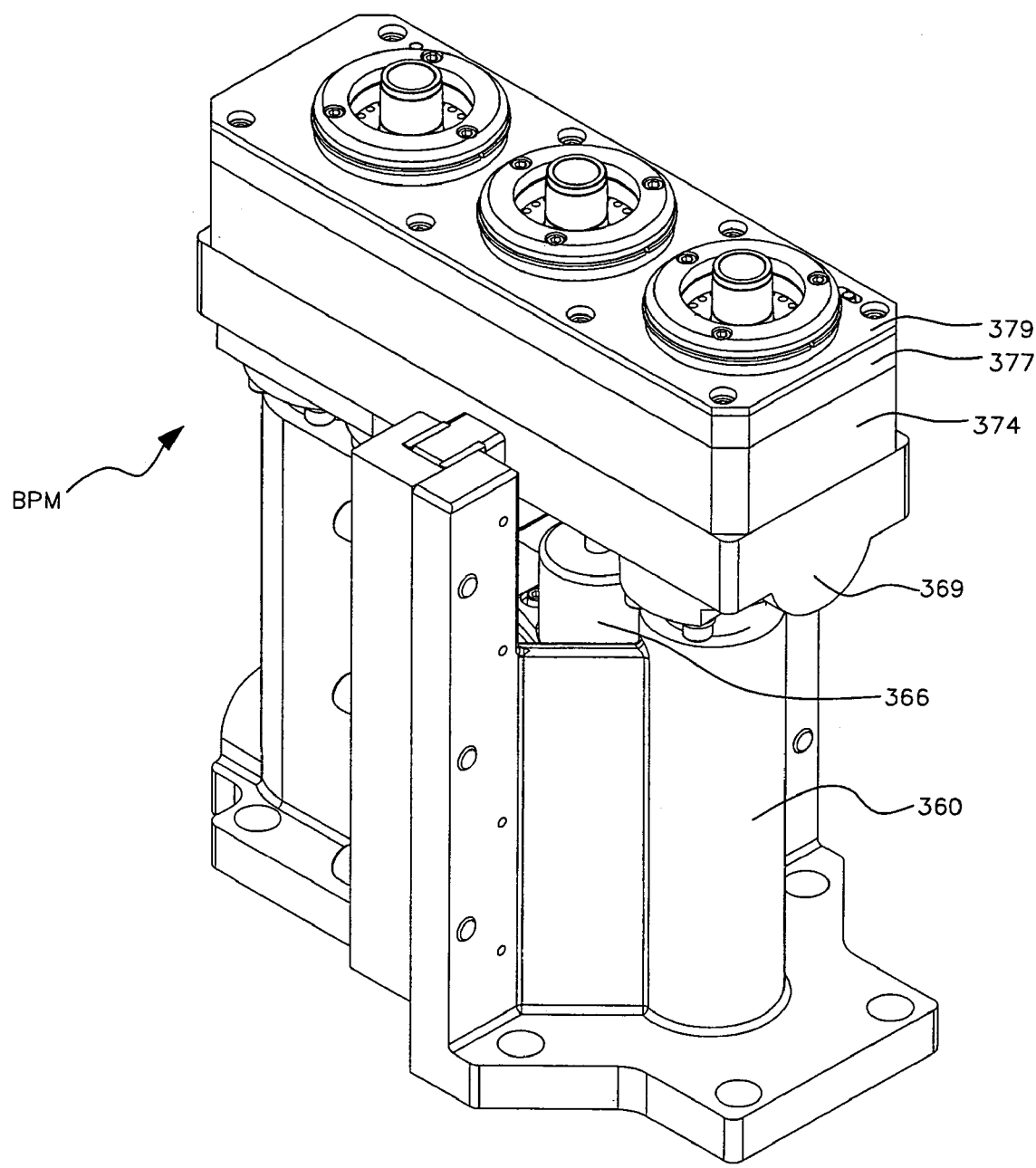
FIG. 10A is a perspective three-dimensional elevation view of a specific and preferred embodiment of the bottom mold plate mechanism for the blow mold apparatus of the glassware forming machine of the present invention, shown from the "hot side" position.
Figure 10B:
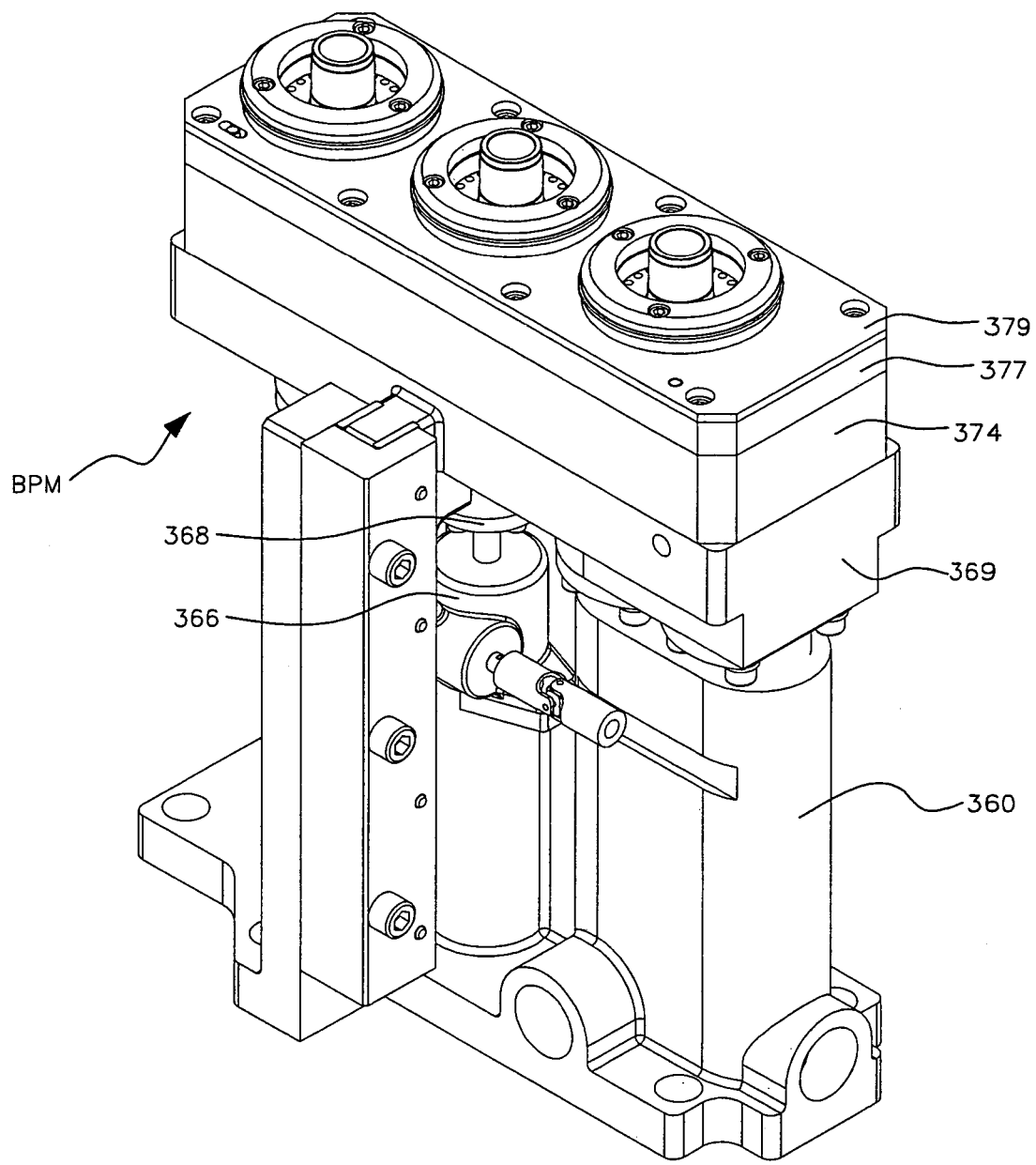
FIG. 10B is the bottom mold plate mechanism of FIG. 10A shown from the "cold side" position.
Figure 10C:
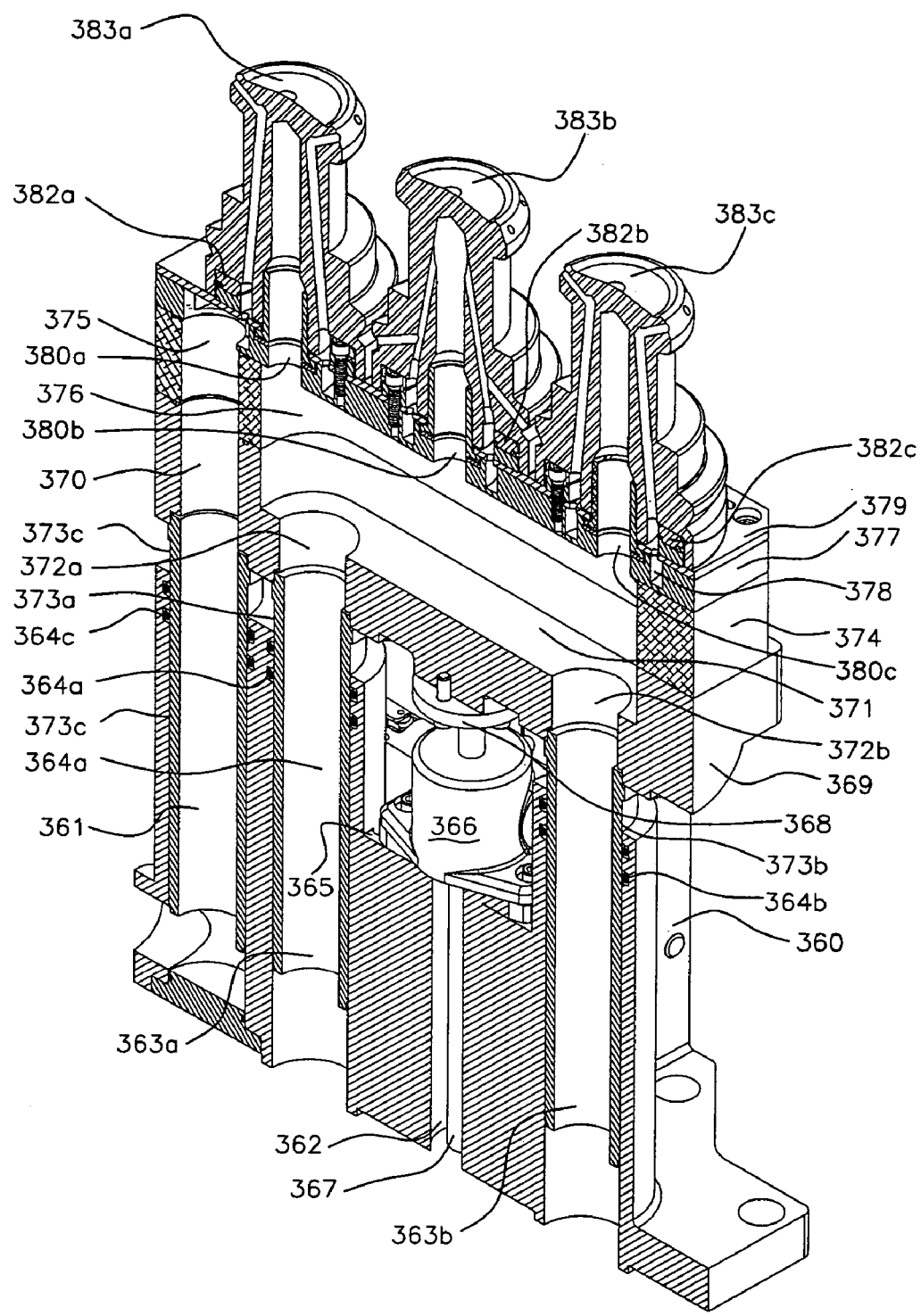
FIG. 10C is a cross-section perspective three-dimensional elevation view of the bottom mold plate mechanism of FIG. 10A.
Figure 10E:
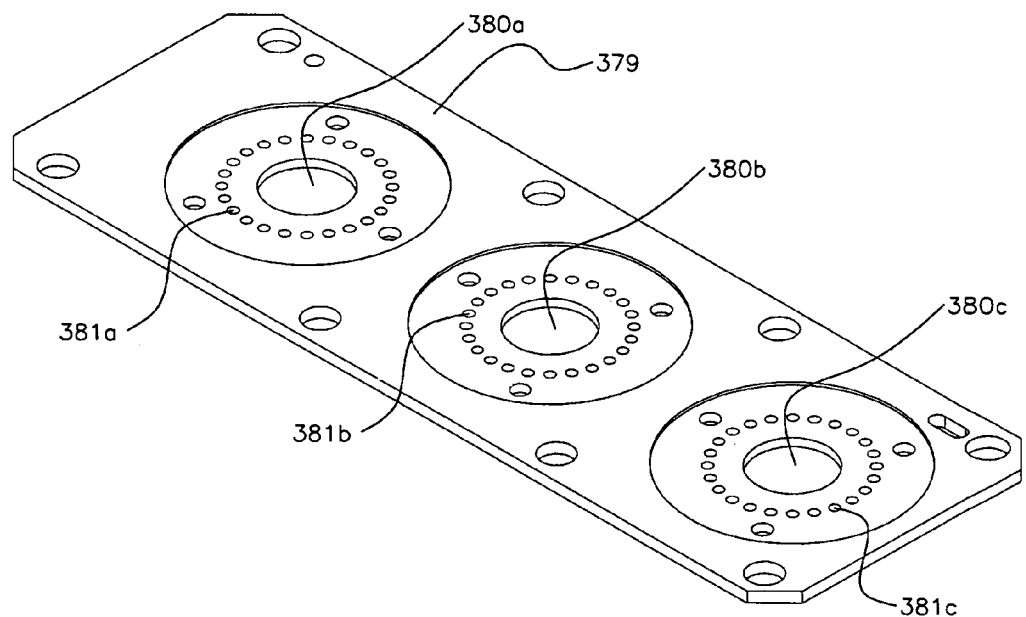
FIG. 10E is a detailed three-dimensional perspective view of a bottom mold carrier plate for the convertible bottom mold carrier plate of FIG. 10D for the bottom mold plate of FIG. 10B.
Figure 10D:
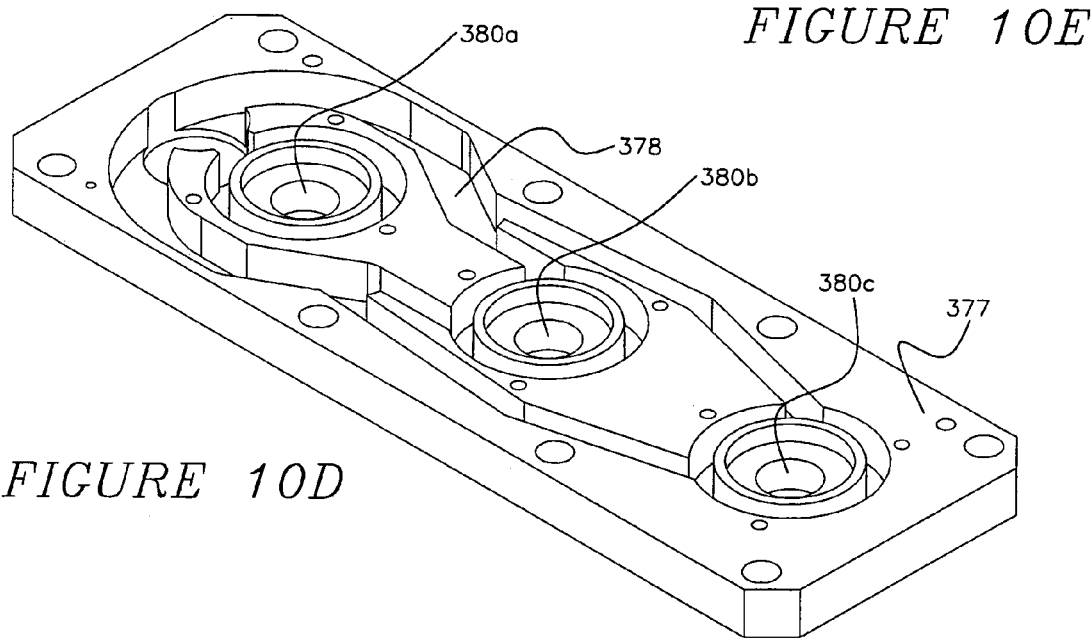
FIG. 10D is a detailed three-dimensional perspective view of a vacuum and cooling passage network of the convertible bottom mold carrier plate of the bottom mold plate of FIG. 10B.
Figure 11A:
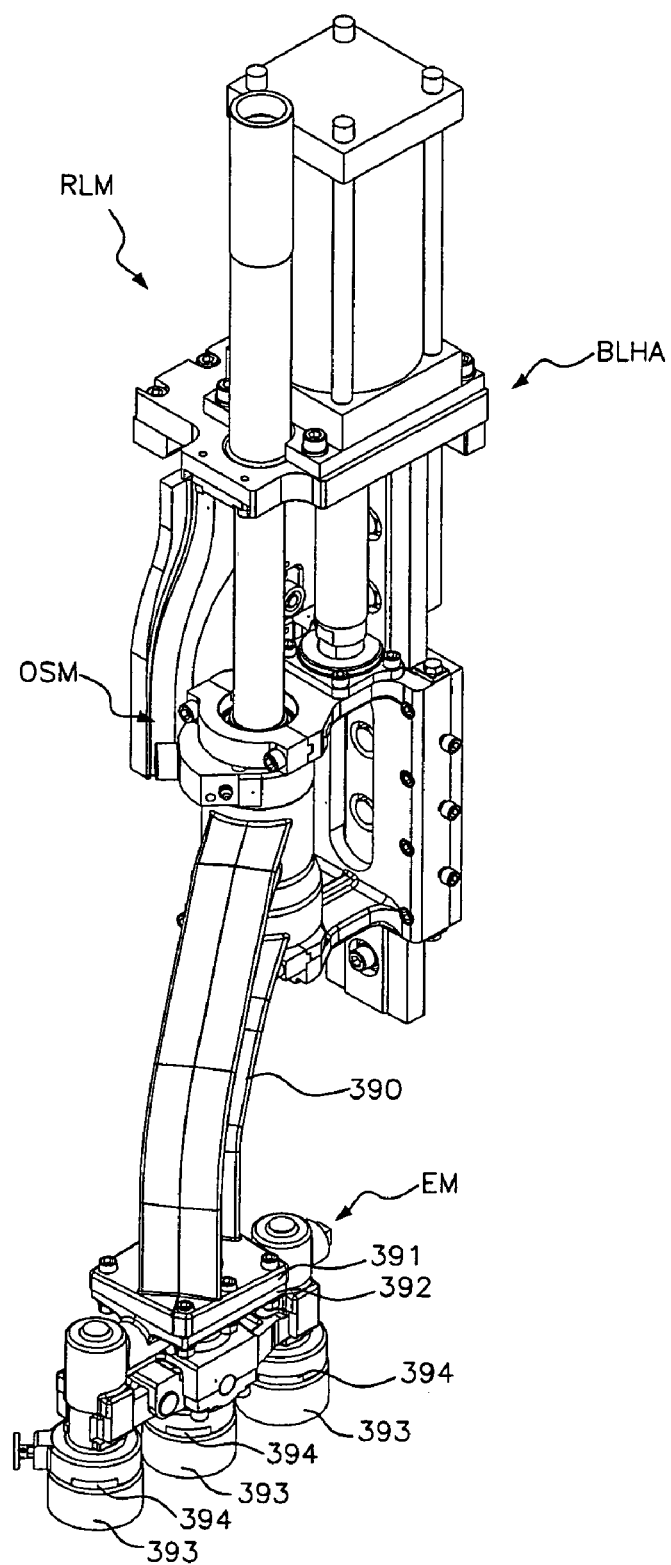
FIG. 11A is a perspective three-dimensional elevation view of a specific and preferred embodiment of the blow head apparatus for the blown mold apparatus of the glassware forming machine of the present invention, shown form the "cold side"
Figure 11B:
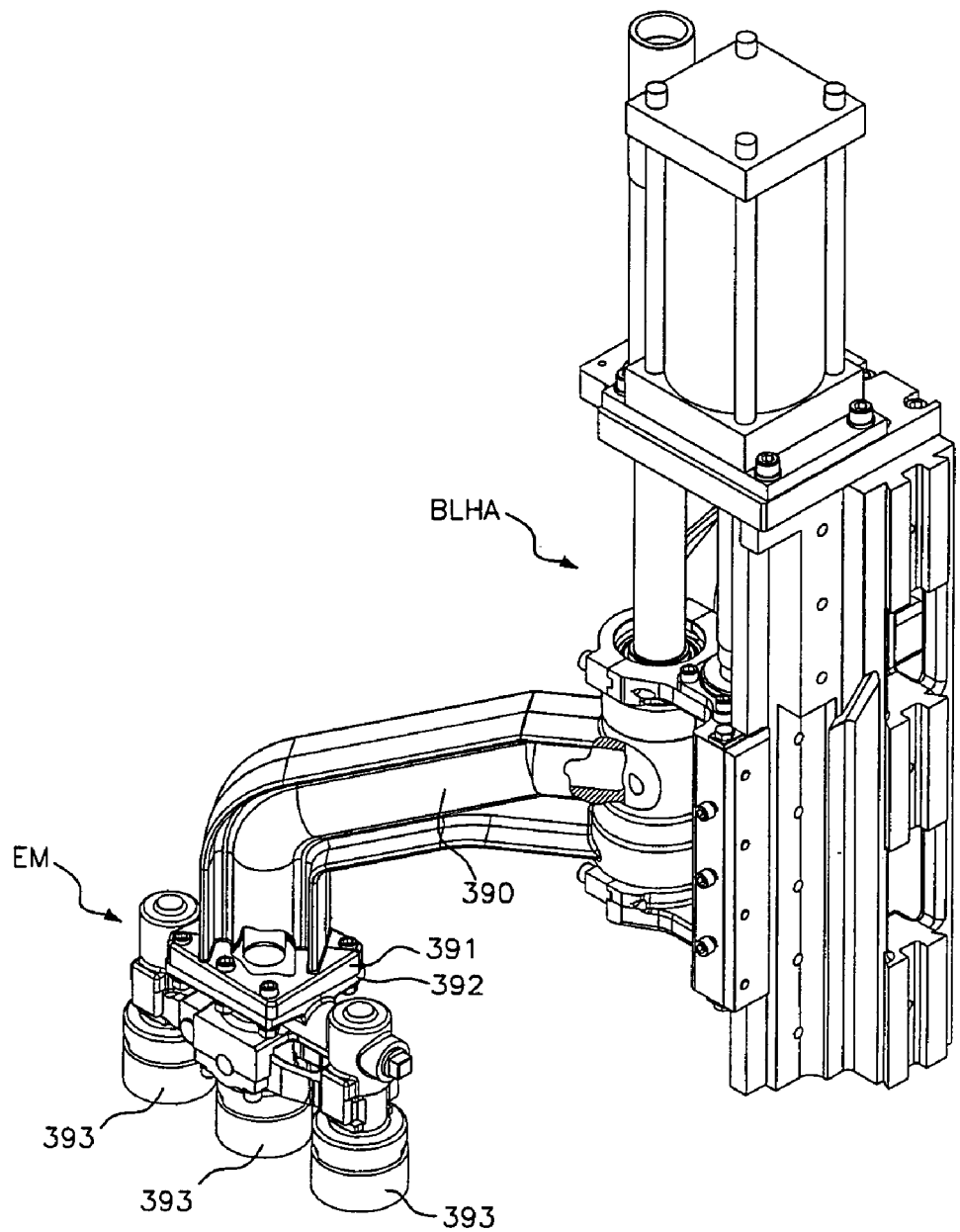
FIG. 11B is a perspective three-dimensional elevation view of the blow head apparatus, of FIG. 11A, shown from the "hot side"
Figure 12A:
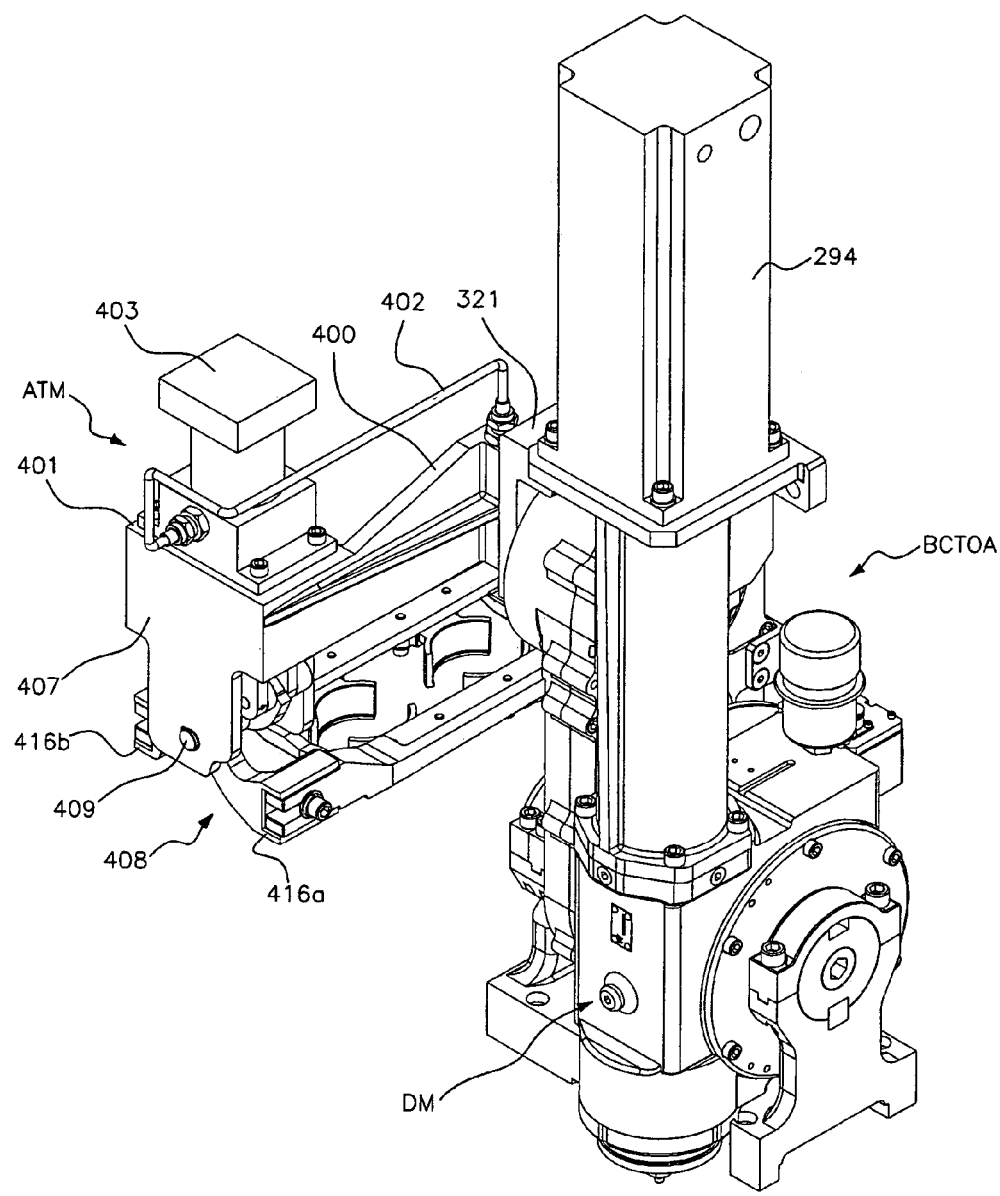
FIG. 12A, is a rear perspective three-dimensional elevation view, shown from the so namad "cold side", of a specific and preferred embodiment of the a servo-controlled bi-directional curvilinear take out apparatus, to take out a finished article from the blow mold apparatus to a cooling dead plate or a carrier conveyor.
Figure 12B:
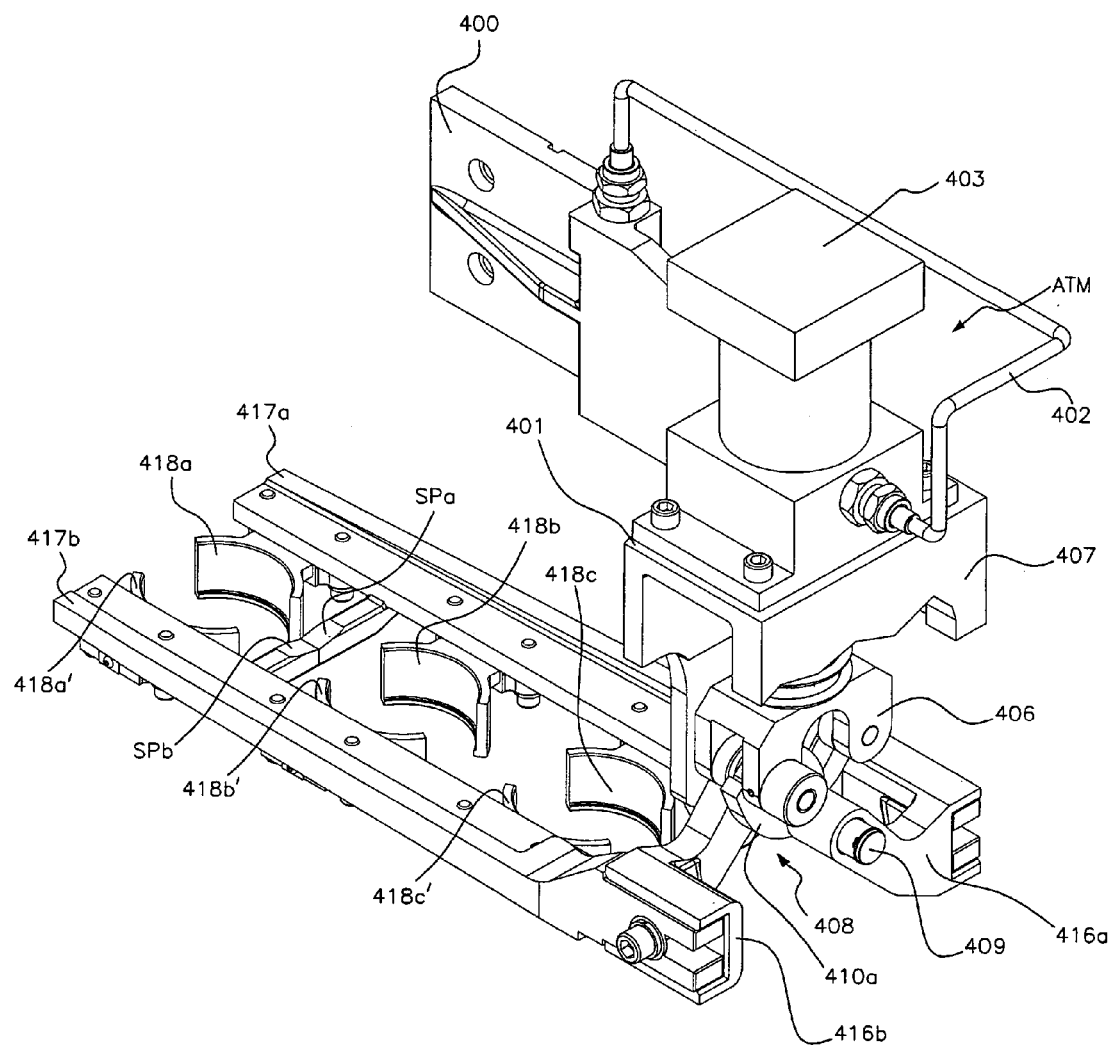
FIG. 12B, is a three-dimensional detailed elevation view of the take out section of the a servo-controlled bi-directional curvilinear take out apparatus of FIG. 12A, shown from another side of the so named "cold side"
Figures 12C, 12D:
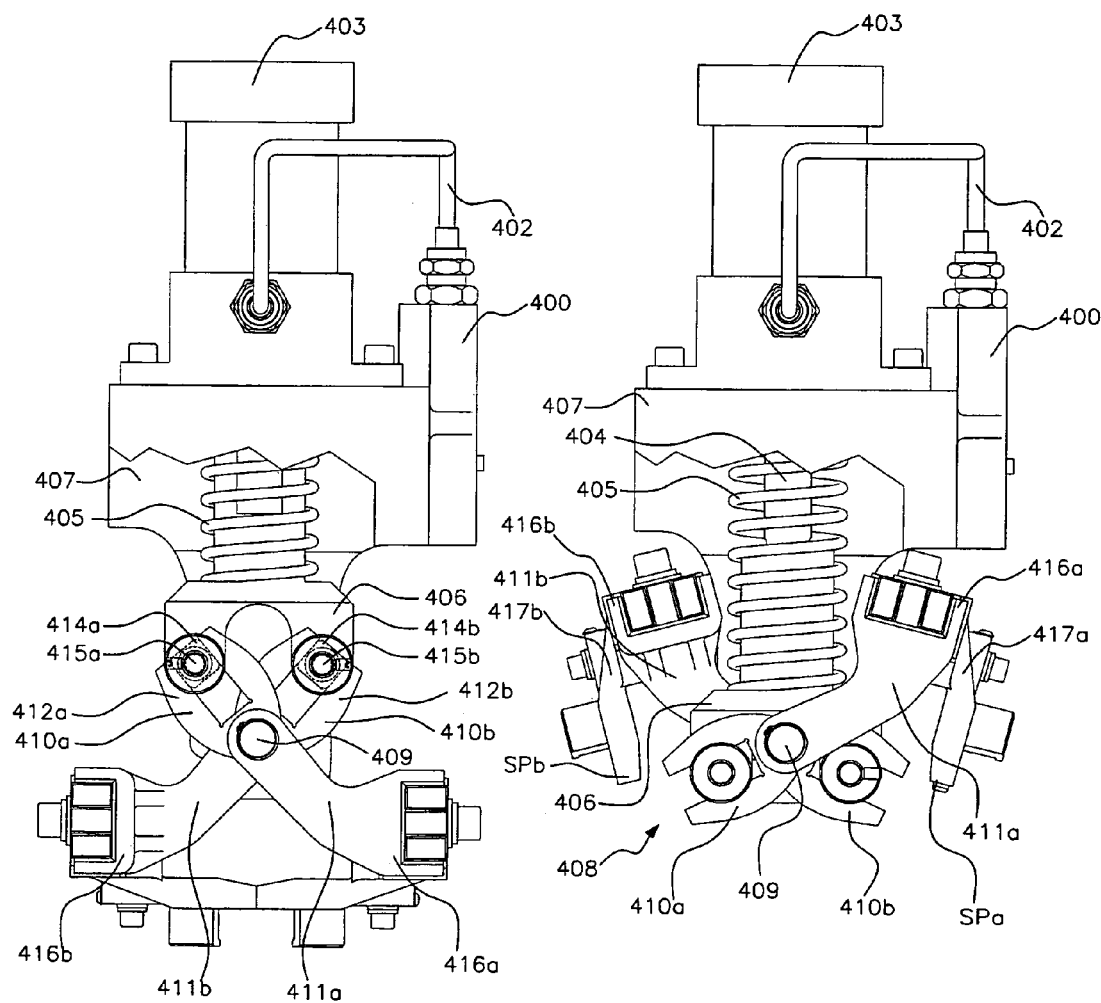
FIGS. 12C and 12D are enlarged and detailed partial cross-section front views of the gripping mechanism of the a servo-controlled bi-directional curvilinear take out apparatus of FIG. 12A, shown in a closed and opened positions respectively.
Figure 12E:
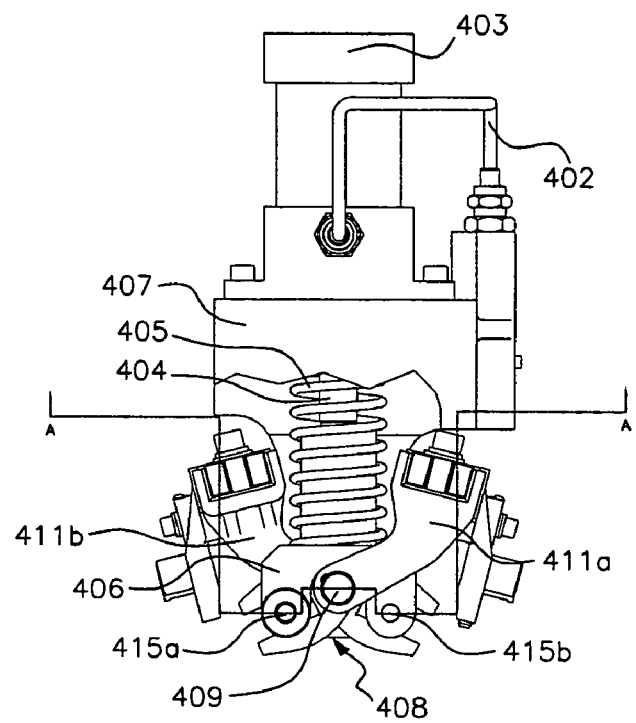
FIG. 12E is another detail of FIG. 12D to showing the cut position of lines A—A of the gripping mechanism of the a servo-controlled bi-directional curvilinear take out apparatus.
Figure 12F:
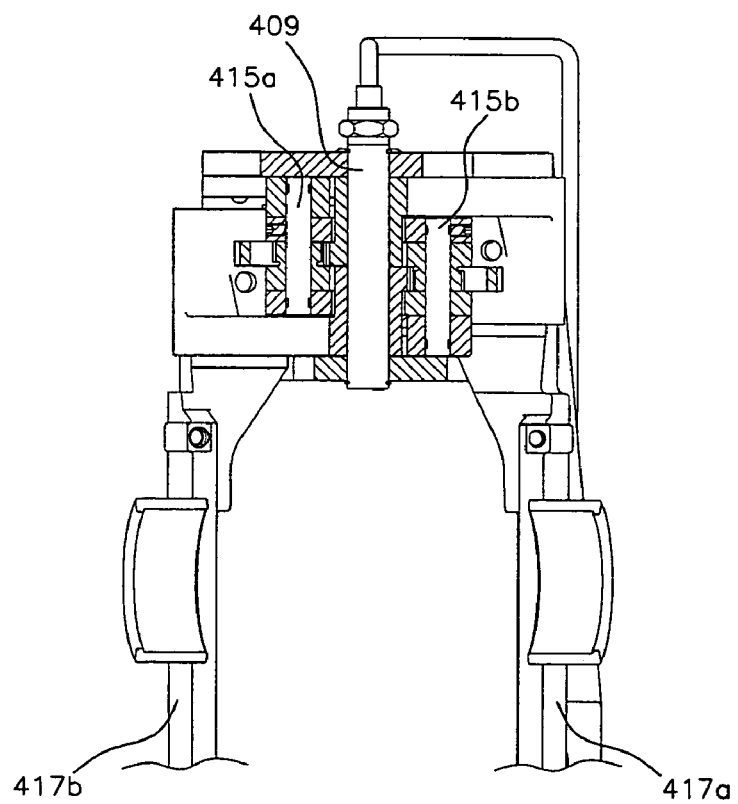
FIG. 12F is a cross-section plant view of the gripping mechanism of the a servo-controlled bi-directional curvilinear take out apparatus, shown the details at the cut section along lines A—A of FIG. 12E.

In its most complete and specific embodiment of the glassware forming machine, in accordance with the present invention, including all of the new concepts and advantages thereof, this machine comprising:

a) a machine section frame MSF;

b) an apparatus support frame ASF mounted on the machine section frame MSF, for mounting machine components;

c) a power and fluid feeding system in both the machine section frame MSF and apparatus support frame ASF, to provide electric energy, lubricants and cooling and operating fluid to the machine section, comprising: ducts for electrical cable and ducts for lubricants and cooling and operating fluid; two pairs of "T" shaped sliding valves SV, one pair for transmitting the cooling fluid to a blank mold apparatus BMA and another pair for transmitting the cooling fluid to a blow mold apparatus BLMA, each valve SV comprising a sliding platform SP (FIGS. 3J, 3K and 3L), for transmitting the cooling fluid throughout the opening and closing paths of the blank mold apparatus BMA and the blow mold apparatus BLMA, including a spring 19 supported by a shoulder screw SS for maintaining a seal at the sliding platform SP, and a tubular portion TP supported by the blank mold support frame BSF, and connected to a cooling fluid conduit 14 of a blank mold holding mechanism BMHM, in order to provide the cooling fluid and guaranteeing a continuous communication of the cooling fluid during the whole path of movements of the blank mold apparatus BMA and the blow mold apparatus BLMA;

d) a parison forming station PFS comprising, as illustrated in FIG. 1:

- i) a first transferable and open-able neck ring mold 1 per cavity and a second transferable and open-able neck ring mold 2 per cavity (FIG. 7A), each having: two neck ring mold halves 3, 3' (FIGS. 2A to 2E), assembled opposed face to face defining a neck ring forming cavity N, N'; holding means illustrated as external holding grooves G1, G1' and internal handling grooves G3, G3', to be held and handled by other components of the machine; assembling means, represented by external holding groove G4, G4', and an annular tension spring 4 placed into the external holding groove G4, G4' embracing the assembled neck ring mold halves 3, 3', normally maintaining them closed when they are transferring and positioning a parison P at other locations; and guiding means illustrated as guiding grooves G2,G2' and a flange F3, for maintaining the neck ring mold halves 3, 3' aligned to each other, said transferable and open-able neck ring mold 2 being placed stepped, opposed and inverted to the first transferable and open-able neck ring mold 1, and both transferable and open-able neck ring molds 1 and 2 are mounted on an unidirectional rotary inverting apparatus UIA, to be alternately and removable placed at a position under a blank mold BM to be embraced thereby, at a so named blank mold "zero-line" OB which is a constant position from an inverting center, independent of the size of the blank mold BM, the parison P and the finished article, all of which will be also described below, for forming a finished neck ring for a corresponding glassware article when a molten glass gob is fed into the blank mold filling also the transferable and open-able neck ring mold 1; said blank mold "zero-line" OB is a constant position for all kind of products to be produced, facilitating a quick change of tooling, avoiding that the position of the neck ring holder, the piston mechanism, the blank mold, blow mold and take out apparatuses, had to be adjusted in accordance with the size of the articles to be produced, by means of a number of calibrator instruments;
- ii) a blank mold apparatus BMA, generally illustrated in FIGS. 3A to 3L, comprising a blank mold BM per cavity, for forming a parison P (illustrated in FIG. 1), once a molten glass gob has been feed therein, said blank mold BM is formed by two similar blank mold halves 10, 10', each having a parison forming cavity PC, PC', and cooling means, represented by axial passages AP, AP' for cooling the blank mold halves; mounting means, represented by a holding flange 11, 11', to be mounted on a blank mold holding mechanism BMHM, mounted on a blank mold support frame BSF mounted in turn on the mechanism support frame MSF, at the above referred blank mold "zero-line" OB, which is operated by an opening and closing mechanism BO&C, to close the blank mold halves 10, 10' for receiving a glass gob and forming a parison P therein and opening said blank mold halves 10, 10' to release the formed parison P, said blank mold holding mechanism BMHM and said opening and closing mechanism BO&C will be disclosed specifically afterwards;
- iii) a guide-funnel apparatus GFA illustrated in FIGS. 4A to 4D of the drawings, mounted on the apparatus support frame ASF, comprising funnel-carrier means including a funnel-carrier arm 70 supported and operated by an oscillating mechanism OSM which will be similar as for a baffle apparatus BA and of a blow head apparatus BLHA, all of which will be described in the following, and a guide-funnel 73 per cavity, mounted on the funnel-carrier arm 70, so that the oscillating mechanism OSM will oscillate the funnel-carrier arm 70 for placing the guide-funnel 73 over the blank mold BM, in coincidence with the cavity PC or PC' for guiding a molten glass gob into the blank mold BM, and retire it once the glass gob has been fed;
- iv) a baffle apparatus BA, illustrated in FIGS. 5A to 5I of the drawings, comprising a hollow baffle-carrier arm 100 supported and operated by an oscillating mechanism OSM corresponding to this baffle apparatus BA, mounted on the apparatus support frame ASF, including holding means represented by a holder 101 for retaining a baffle holder 102, for holding an equalizing mechanism EM which is similar as for a blow head apparatus BLHA, and which will be described in the following, and baffle head means per cavity, including a baffle head 103 having a mounting flange 104 to be retained into the baffle holder 102 or mounted in the equalizing mechanism EM, so that the oscillating mechanism OSM will oscillate the hollow baffle-carrier arm 100 for placing the baffle head 103 either alone or into the equalizing mechanism EM over the blank mold BM, in order to form the bottom of the parison P in the press-and-blow process or provide a settle blow through said hollow baffle-carrier arm 100 connected to an external source of pressurized air, in the blow-and-blow process; and retire it once the parison P has been formed; and
- v) a pressing plunger apparatus PPA, illustrated in FIGS. 6A to 6L of the drawings, placed at a so named blank mold "zero-line" position OB which is a constant position independent of the size of the blank mold BM, the parison P and the finished article, said pressing plunger apparatus PPA can be configured for a press-and-blow forming process or for a blow-and blow-forming process, and comprising an arrangement of multiple cylinder and piston assemblies 160 per cavity, having a pressing plunger 209 driven by said cylinder and piston assemblies 160, either for forming the entire parison by introducing the pressing plunger 209 for a whole run through the transferable and open-able neck ring mold 1, and retiring it once the entire parison P has been formed by the press-and-blow process, or introducing the pressing plunger 209' for a short run through the transferable and open-able neck ring mold 1, to form the finished neck ring of the parison P and retiring it for providing a counter-blow for forming the entire parison P by the blow-and-blow process; and fluid passages represented by central conduit 165 at the cylinder and piston assemblies 160, for feeding cooling and operating fluid from an external source;

e) an unidirectional rotary inverting apparatus UIA, illustrated in FIGS. 7A to 7E, mounted on the apparatus support frame ASF, comprising a rotary support driving mechanism comprised by: a rotary carcass 240, coupled to a power output shaft 287 of a driving mechanism DM which will be described in detail in the following, to be unidirectional and indexed rotated thereby firstly 180° clockwise (moving the parison upwardly constricting it) or counterclockwise (moving the parison downwardly stretching it) and then additional 180° completing a 360° turn; a first pair of open-able horizontal neck ring holding arms 260, 261, and a second pair of open-able horizontal neck ring holding arms 260', 261', respectively coupled stepped and opposed to each other, to the rotary carcass 240, to respectively retain the transferable and open-able neck ring molds 1 and 2; and a neck ring mold holding and releasing mechanism NRHM and NRHM', for uniformly and simultaneously opening and closing the open-able horizontal neck ring holding arms 260, 261, 260', 261', mounted on the rotary support driving mechanism DM placed outside of the horizontal rotary axis, to release the transferable and open-able neck ring mold 1 or 2, remaining supported by it at an intermediate station IRS to be held by a transference apparatus BCTA; so that the first pair of open-able horizontal neck ring holding arms 260, 261 gripping a first transferable and open-able neck ring mold 1 holding a parison P, at the blank mold "zero-line" OB, is firstly rotated 180° clockwise (moving the parison upwardly constricting it) or counterclockwise (moving the parison downwardly stretching it), to place the parison P held by the first transferable and open-able neck ring mold 1 at the intermediate station IRS (illustrated in FIG. 1), at a blow mold "zero-line" position OM releasing the transferable and open-able neck ring mold 1, while the second pair of open-able horizontal neck ring holding arms 260', 261' with the second transferable and open-able neck ring mold 2 is simultaneously placed under the blank mold apparatus BMA to form a second parison P, and then, when the first pair of open-able horizontal neck ring holding arms 260, 261 receive back the first transferable and open-able neck ring mold 1, empty, it is able t6 turn back to the parison forming station PFS by unidirectional rotating them other 180°, completing a 360° turn, for another parison forming cycle;

f) a transference apparatus BCTA, generally illustrated in FIGS. 8A to 8F, mounted on the apparatus support frame ASF, operated by a driving mechanism DM which is similar to that of the unidirectional rotary inverting apparatus UIA, and to the take out apparatus BCTOA to transfer a parison held by a transferable and open-able neck ring mold 1 or 2, at the blow mold "zero-line" OM with a bi-directional and curvilinear translation movement from the intermediate station IRS to a blow forming station BFS (FIG. 1); said transference apparatus BCTA comprising: an oscillatory hollow arm 305, mounted on said driving mechanism DM and both mounted on the apparatus support frame ASF; a parison transference mechanism PTM, mounted on an inverted U-shaped oscillating support 321 which is in turn mounted on the oscillatory hollow arm 305, including carrier holders 327, 327', including holding finger arms 331, 331', normally maintained closed by springs 329, 329' and 330, 330' which will be later described, and gripping fingers 331a, 331b coupled to the holding finger arms 331, 331' for internally gripping the first transferable and open-able neck ring mold 1 or 2; and a two-positions actuating fluid motor 332 (FIG. 8E) for the carrier holders 327, 327', so that, at a first position of the two-positions actuating motor 332, the gripping fingers 331a, 331b are opened in order to grip the first transferable and open-able neck ring mold 1 gripping a parison P, while simultaneously the open-able horizontal neck ring holding arms 260, 261 of the unidirectional rotary inverting apparatus UIA are opened releasing said first transferable and open-able neck ring mold 1, to be retained by the gripping fingers 331a, 331b of this transference apparatus BCTA at the intermediate station IRS, and once the parison P held by the transferable and open-able neck ring mold 1 is transferred to the blow forming station BFS, at a second position of the two-positions actuating motor 332, the holding finger arms 331, 331' are additionally opened at a second position, in order to additionally open the gripping fingers 331a, 331b, opening the first transferable and open-able neck ring mold 1 releasing the parison P into a blow mold apparatus BLMA, but keeping the first transferable and open-able neck ring mold 1, empty and closed, held by the gripping fingers 331a and 331b; and in the inverse way, said gripping fingers 331a and 331b of the transference apparatus BCTA turn back the empty transferable and open-able neck ring mold 1 closed at the intermediate station IRS, and are further closed releasing the empty transferable and open-able neck ring mold 1 at the open-able horizontal neck ring holding arms 260, 261 of the unidirectional rotary inverting apparatus UIA to be held thereby for a following forming cycle, and lifting the empty gripping fingers 331a and 331b at a about 90°, position, waiting for a following cycle; and g) a blow forming station BFS comprising:

a blow mold apparatus BLMA, generally illustrated in FIGS. 9A to 9F, comprising:

i) a blow mold BLM, which is the same for each blow mold of a multiple-cavity machine, for forming a finished glassware article, once a finished parison has been feed thereto, and including: two similar blow mold halves 350a, 350b, each having a forming cavity MC, MC'; a blow mold holding mechanism MHM, illustrated in FIG. 9A, mounted on the machine section frame MSF, and which is entirely similar as the blank mold holding mechanism BMHM already described above, having specific dimensions, in which the opposed blow mold halves 350a, 350b are mounted; a mold opening and closing mechanism MO&C, which is similar as the blank mold opening and closing mechanism BO&C, and operates in the same way, mounted on the mold holding mechanism MHM, for closing the blow mold halves 350a, 350b enclosing a parison fed thereto to be blown therein for forming a finished article, and opening them releasing the forming article;

ii) a bottom mold plate mechanism BPM illustrated in FIGS. 10A to 10E, including a bottom plate 383a, 383b, 383c held on a bottom mold-carrier plate 379, mounted on amounting block 360, mounted in turn on the floor cover FC of machine section frame MSF, to form the bottom of a glass article when it is embraced by the blow mold halves 350a and 350b of the blow mold BLM at the blow forming station BFS; and iii) a blow head apparatus BLHA illustrated in FIGS. 11A and 11B, comprising: a hollow blow head-carrier arm 390 supported and operated by an oscillating mechanism OSM which is similar to the oscillating mechanism OSM or the "rotolinear oscillating mechanism" RLM of the guide-funnel apparatus GFA and the baffle apparatus BA, mounted on the apparatus support frame ASF, and including a holder 391 for retaining a blow head holder 392, for holding an equalizing mechanism EM which is entirely similar as that of the baffle apparatus BA; and a blow head 393 retained into a blow head holder 392 or mounted in the equalizing mechanism EM, so that the oscillating mechanism OSM will oscillate the hollow blow head-carrier arm 390 for placing the blow head 393 either alone or into the equalizing mechanism EM over the blow mold BLM, in order to provide a final blown through said hollow blow head-carrier arm 390, connected to an external source of pressurized air, to form a finishing glassware article and retire it once the finished glassware article has been formed; and h) a take out apparatus BCTOA, generally illustrated in FIGS. 12A to 12F, mounted on the take out support frame TOSF and the machine section frame MSF, to transfer a finished article from the blow forming station BFS at the blow mold "zero-line" OM, to a dead plate or a carrier conveyor which has an entirely similar configuration as the transference apparatus BCTA, which is operated by the driving mechanism DM which is also entirely similar as those of the transference apparatus BCTA, except for the parison transference mechanism PTM, and comprising instead:

an article transference mechanism ATM, generally illustrated in FIG. 12A, mounted on an inverted U-shaped oscillating support 321; a scissor mechanism 408 having a pair of parallel holding arms 417a, 417b, and including a holding finger 418 (not shown) for a single cavity machine, or three gripping fingers 418a, 418b and 418c illustrated in FIG. 12B for a triple cavity machine, in order to grip a finished article and take it out from the blow mold and translate it to a cooling dead plate or to a carrier conveyor; and i) a programmable electronic control, to control the movements, cycle time and sequence of steps, as well as the tooling and electric power, fluid and lubrication operation of all of the mechanisms of the machine, in accordance with the type of glassware articles to be produced and the amounts of glassware articles and velocity of production of the machine.

Finally, as previously mentioned, the very specific embodiments of each of the individual mechanisms forming the glassware forming machine in accordance with the most complete and specific embodiment of the machine including all of the inventive concepts and advantages thereof, will be described in the following.

Transferable and Open-Able Neck Ring Molds

Figure 2A:
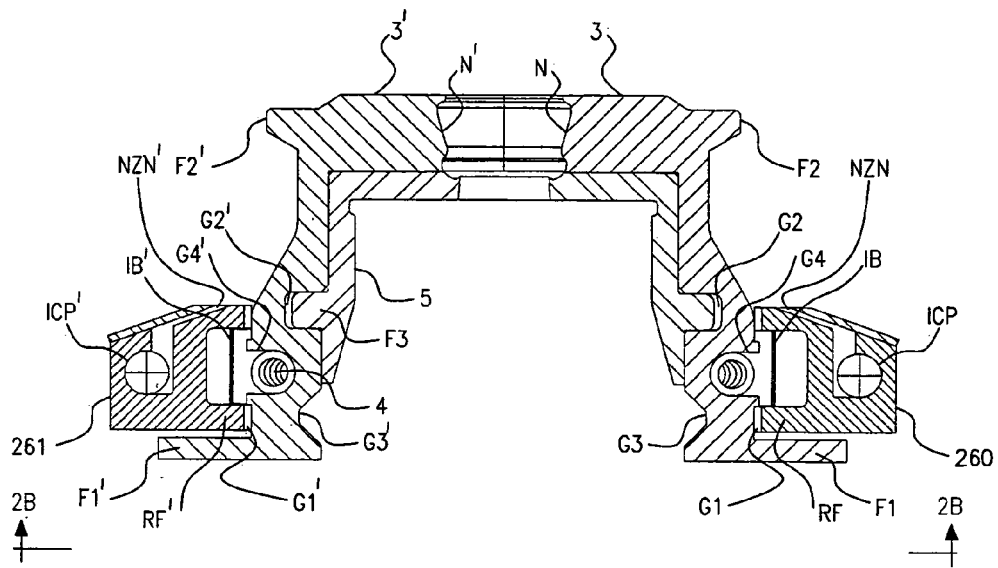
FIG. 2A is a cross-section front elevation view of a transferable and open-able neck ring mold, of the machine for the production of hollow glassware articles, showing all its components in a parison pre-forming position.
Figure 2B:
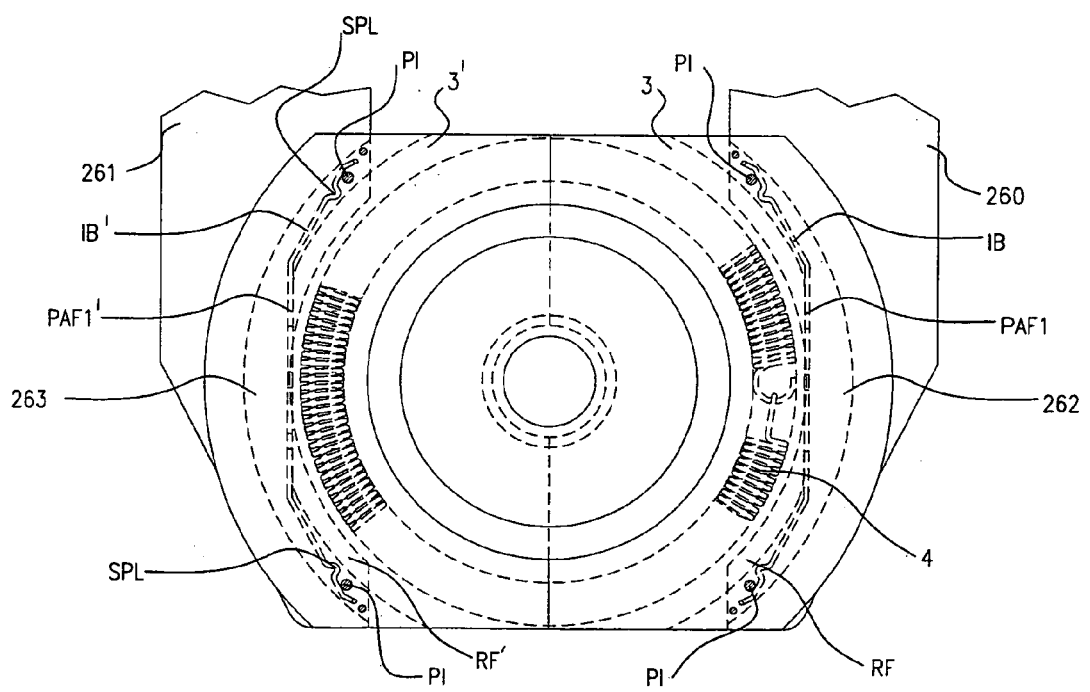
FIG. 2B is plant view of a transferable and open-able neck ring mold, partially showing a holding arm including a first embodiment of the flexible aligning component in a closed parison pre-forming position.
Figure 2C:
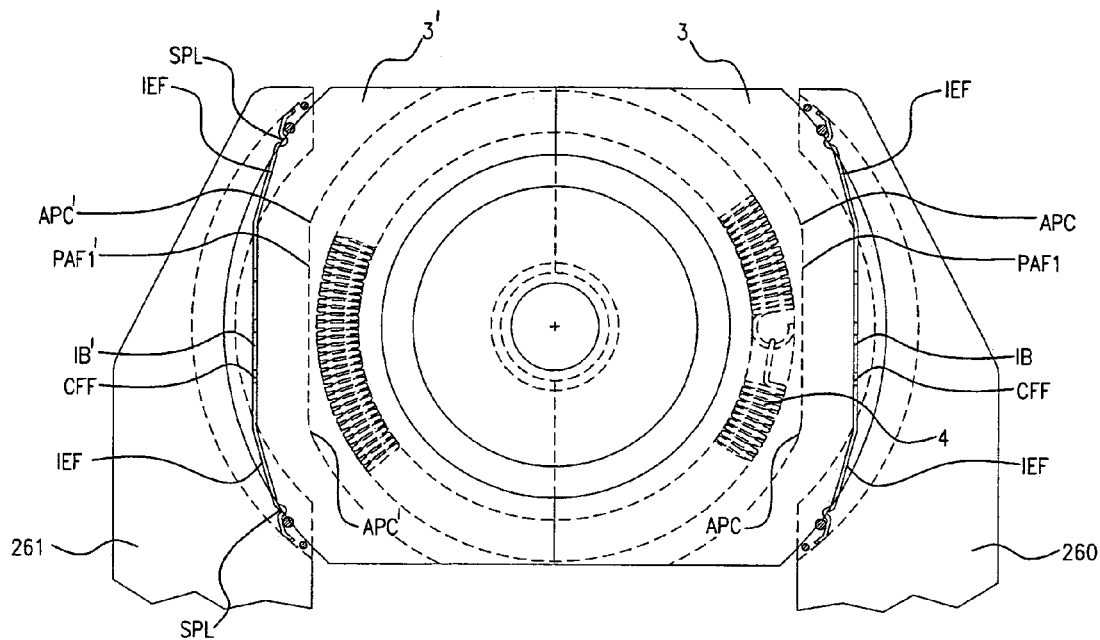
FIG. 2C is a plant view of a transferable and open-able neck ring mold, similar to FIG. 2B, partially showing the holding arm in an opened position at an intermediate station.
Figure 2D:
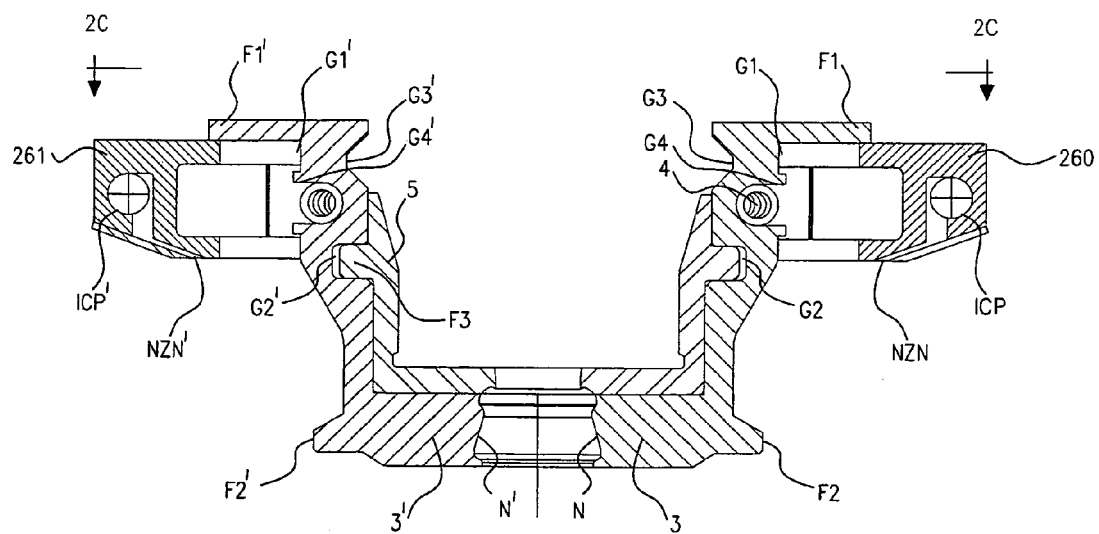
FIG. 2D is a cross-section front elevation view of a transferable and open-able neck ring mold, similar to FIG. 2A, showing all its components in an opened upright position at an intermediate station.
Figure 7A:
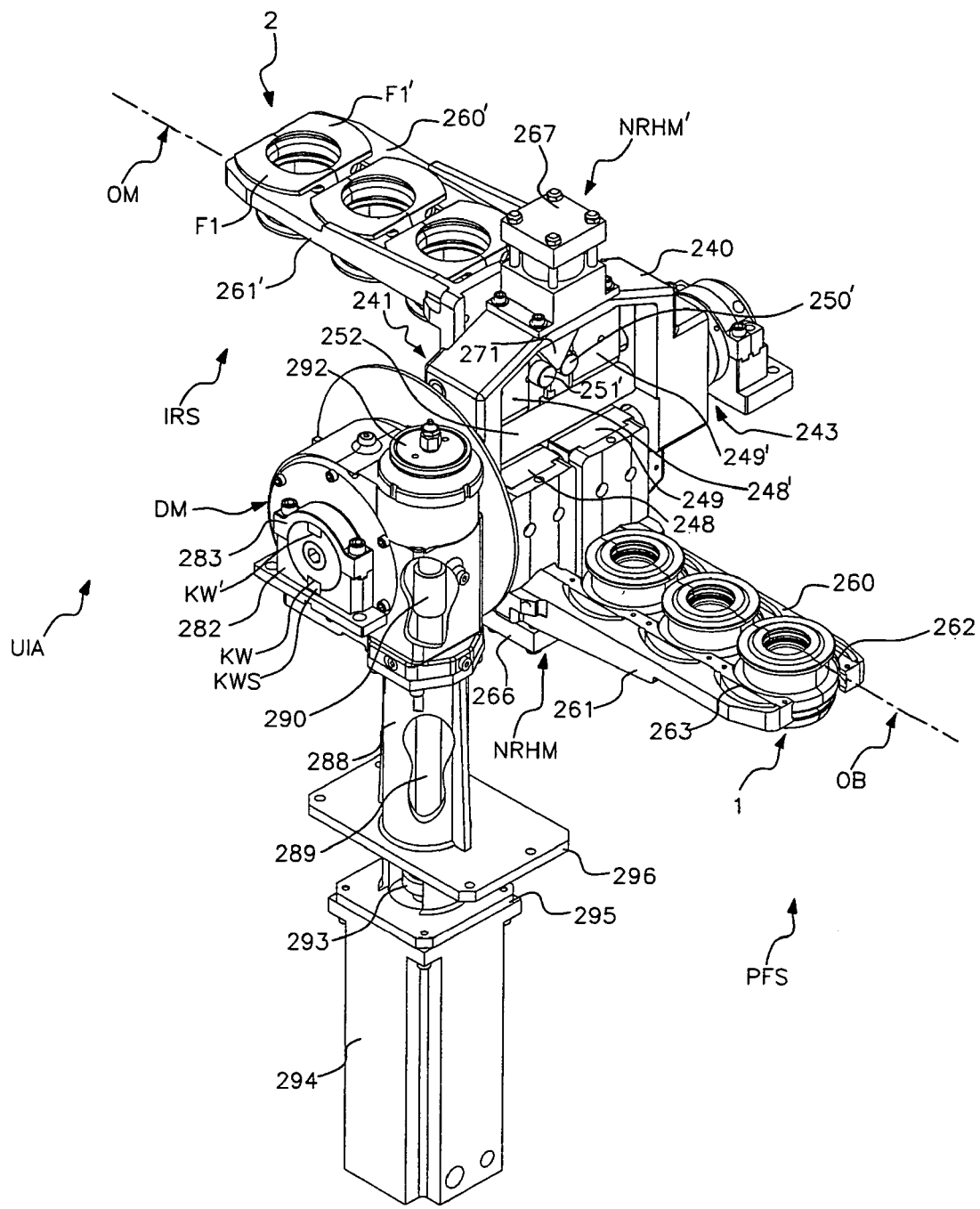
FIG. 7A, is a perspective three-dimensional elevation view of a specific and preferred embodiment of the unidirectional inverting apparatus for the machine for the production of hollow glassware articles, of the present invention, shown from the blank mold side or so named "hot side"
Figure 8A:
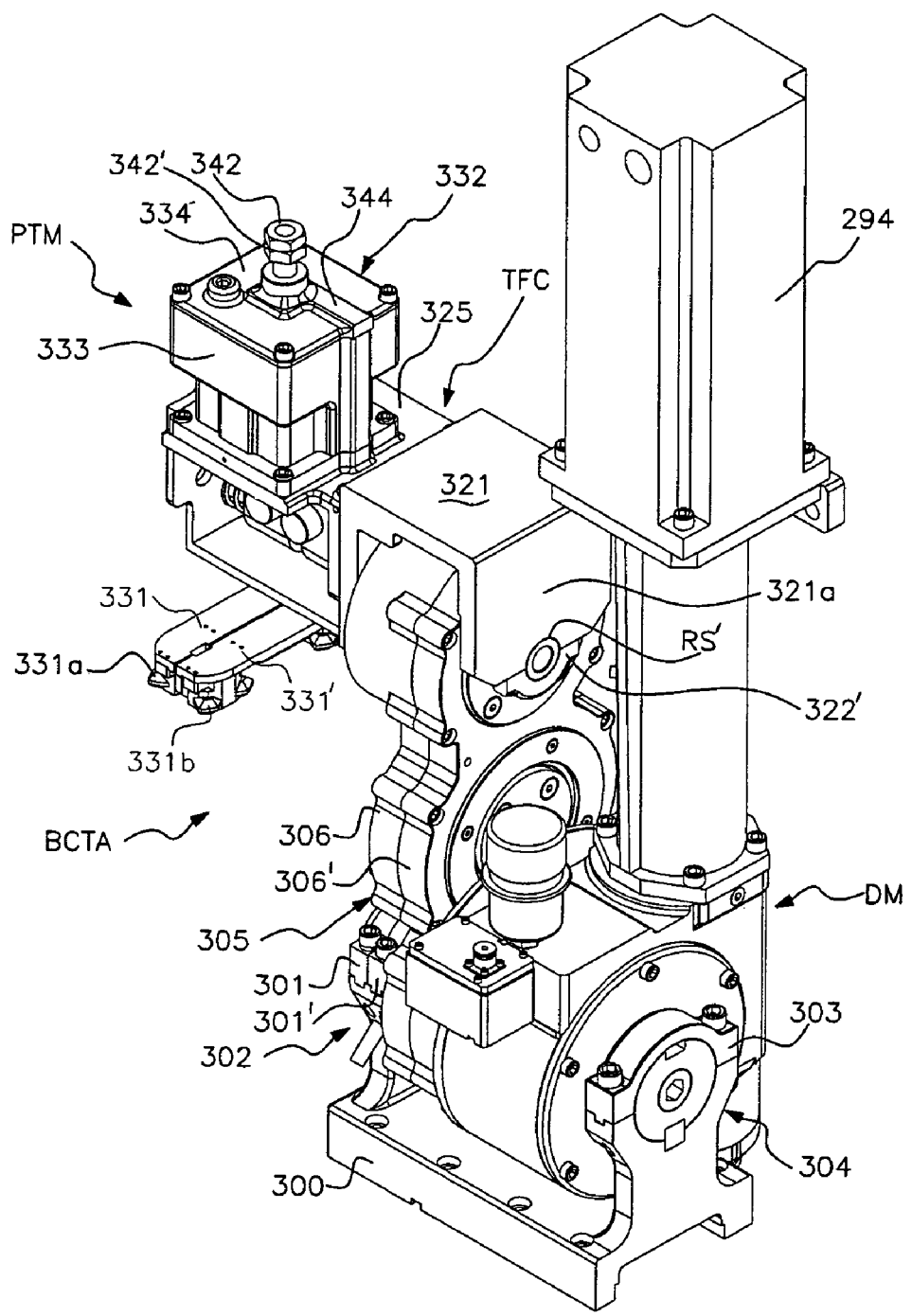
FIG. 8A is a perspective three-dimensional elevation view, shown from the so named "cold side", of a specific and preferred embodiment of the servo-controlled bi-directional curvilinear transference apparatus, for the glassware forming machine of the present invention, for transferring a parison held by a transferable and open-able neck ring mold from the intermediate station, to the blown mold apparatus.
Figure 8B:
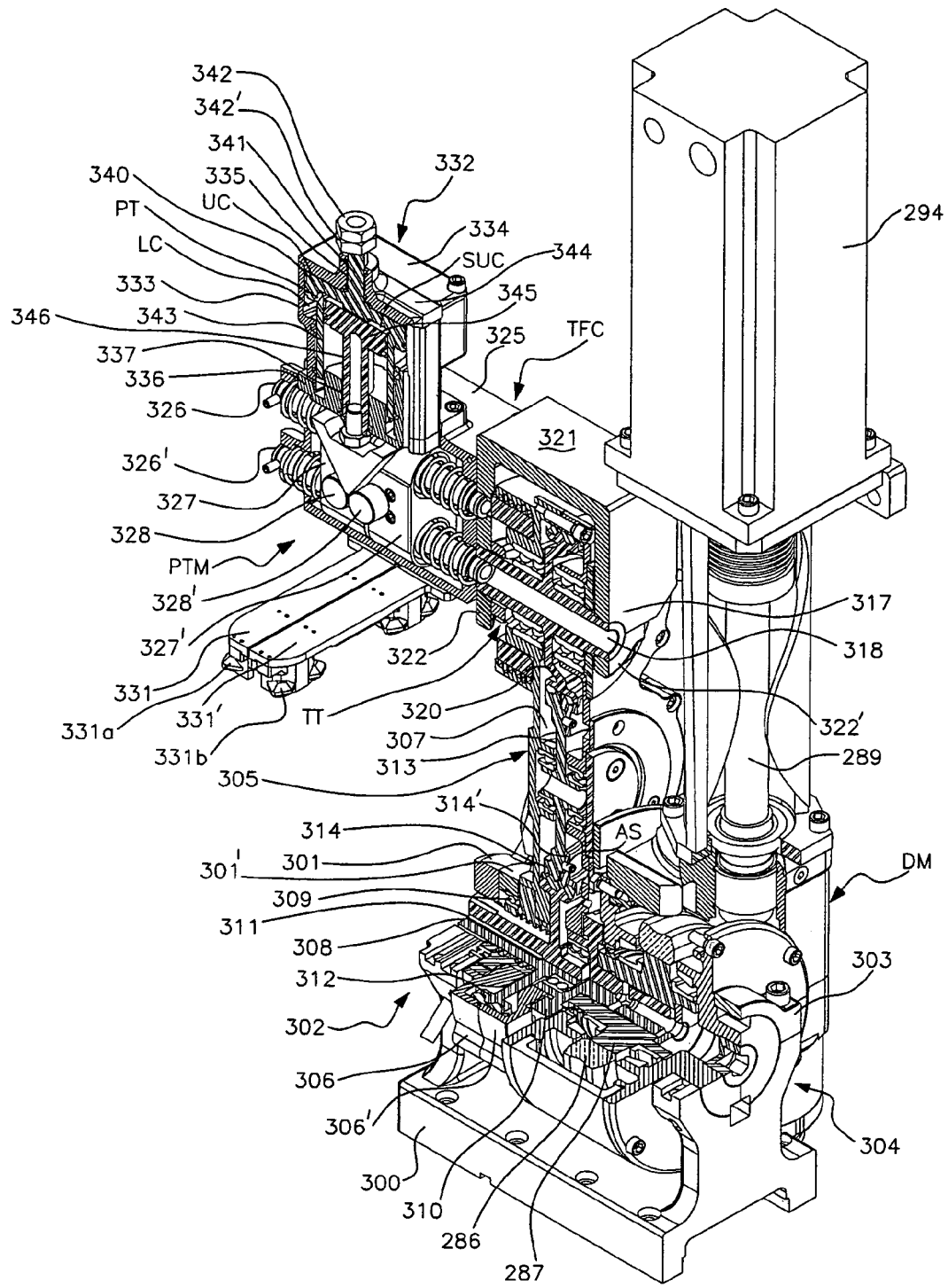
FIG. 8B is a partial cross-section perspective three-dimensional view of the servo-controlled bi-directional curvilinear transference apparatus shown in FIG. 8A.
Figure 8C:
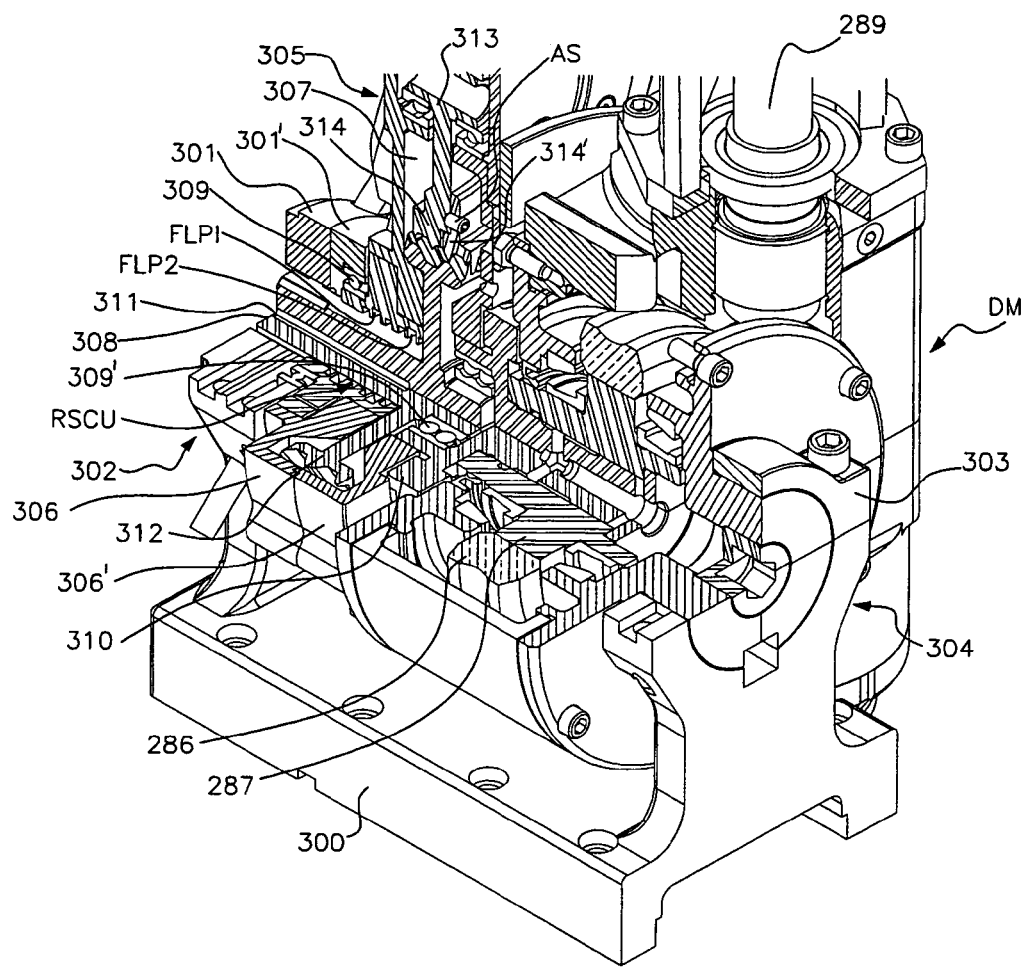
FIG. 8C is an enlarged and detailed cross-section perspective three-dimensional view of the lower end of the servo-controlled bi-directional curvilinear transference apparatus shown in FIG. 8B
Figure 8D:
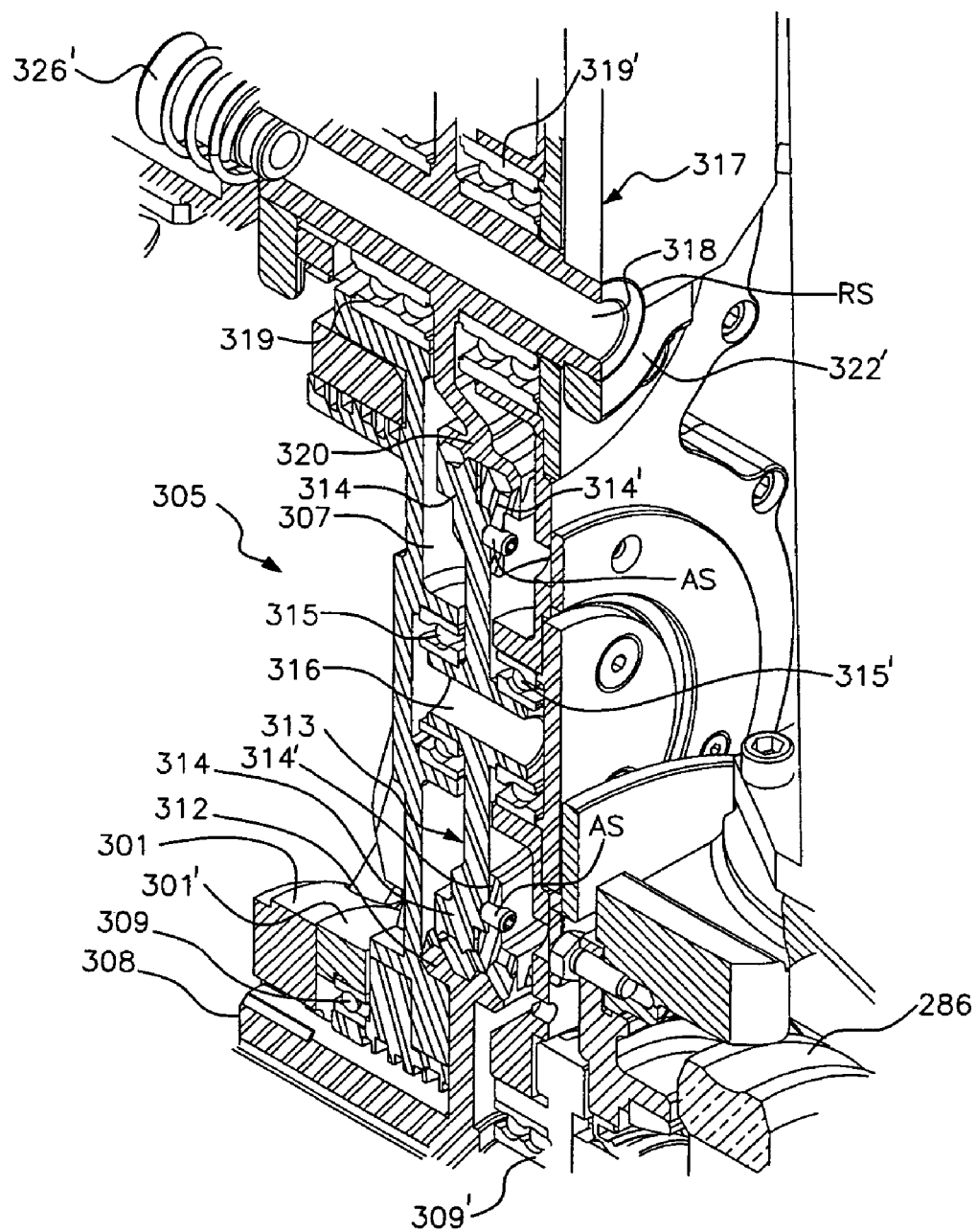
FIG. 8D is an enlarged and detailed cross-section perspective view of the intermediate portion of the servo-controlled bi-directional curvilinear transference apparatus shown in FIG. 8B.
Figure 8E:
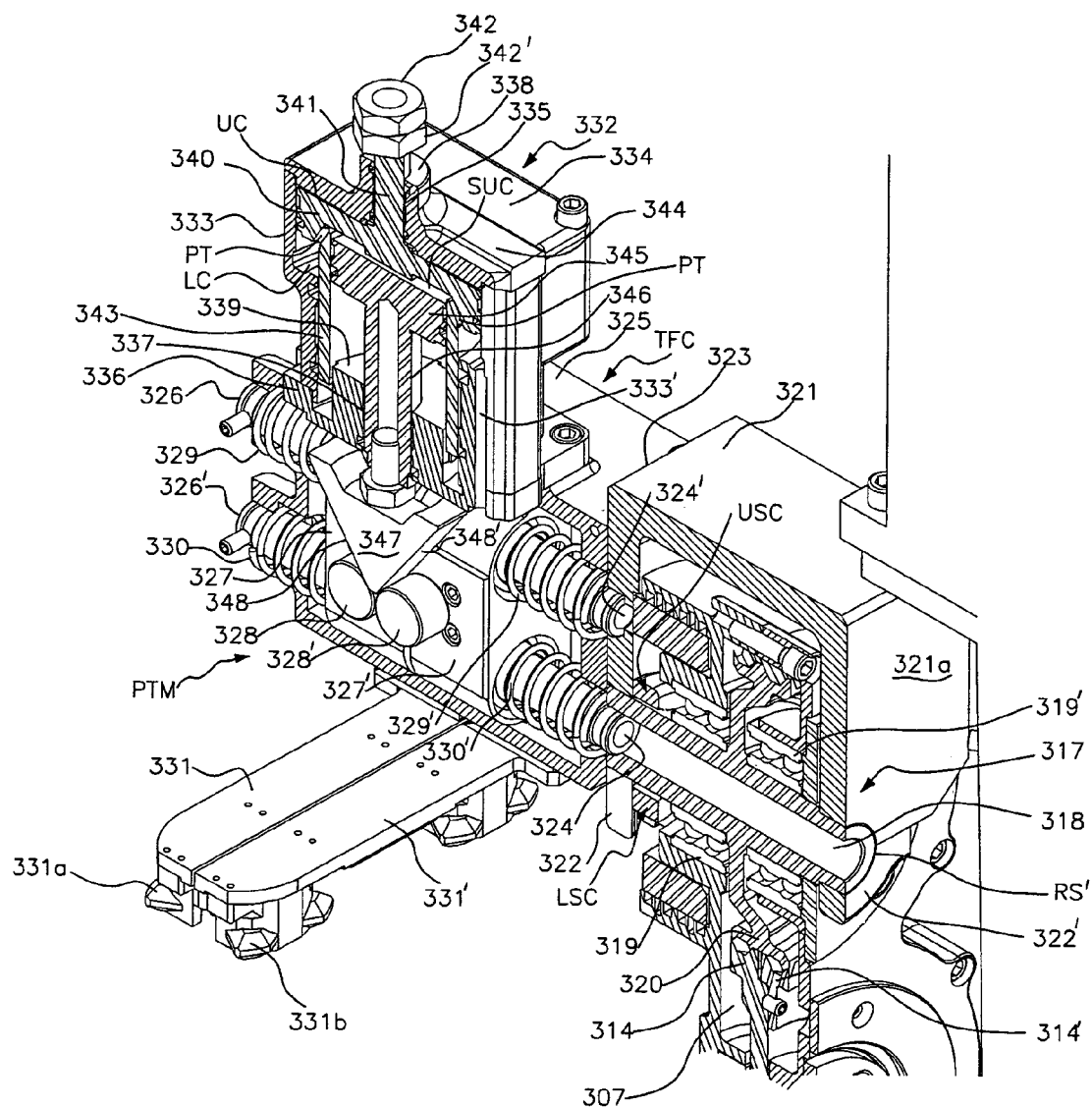
FIG. 8E is an enlarged and detailed cross-section perspective view of the upper end of the servo-controlled bi-directional curvilinear transference apparatus shown in FIG. 8B.
Figure 8F:
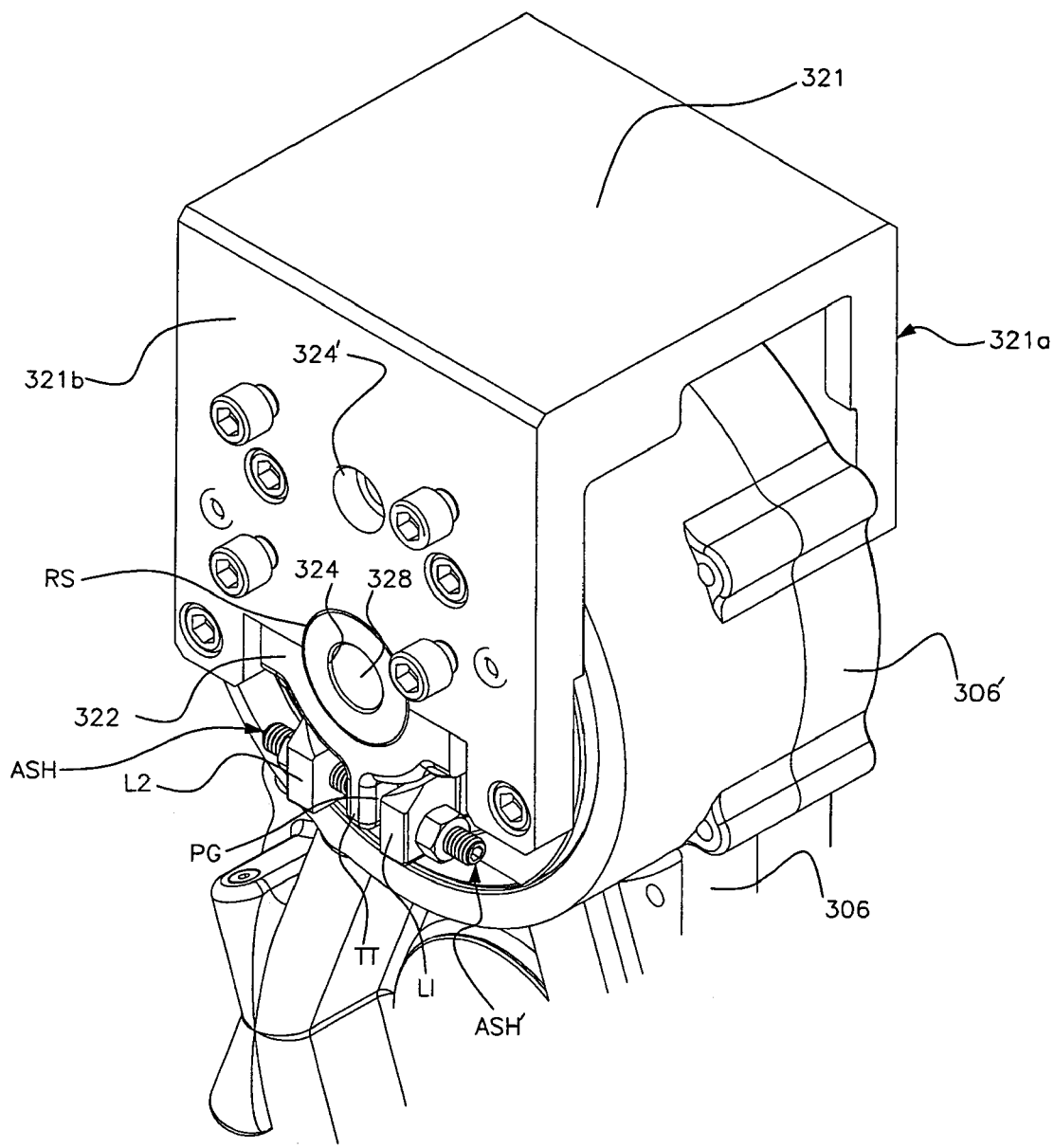
FIG. 8F is a perspective three-dimensional elongated and detailed view, shown from another side of the so named "cold side", of a portion of the upper end of the servo-controlled bi-directional curvilinear transference apparatus shown in FIG. 8A.

The specific configuration for a preferable embodiment of each of the first and second transferable and open-able neck ring molds 1 and 2, as shown in FIGS. 7A and 2A to 2E, is constituted by: two neck ring mold halves 3, 3', assembled opposed face to face, both forming a neck ring mold cavity N, N' for forming the finished neck ring of a parison P as shown in FIG. 1, which will be the same as the finished article; a first external groove G1, G1' to be held by the open-able horizontal holding arms 260, 261 and 260', 261', respectively, of the unidirectional rotary inverting apparatus UIA, at the above referred blank mold "zero-line" OB; a first enclosing flange F1, F1', by which the transferable and open-able neck ring mold 1 is to be held by open-able horizontal holding arms 260, 261 of the unidirectional rotary inverting apparatus UIA, as shown in FIG. 1, in a case in which it is in an intermediate station IRS holding a parison in an upright orientation, as shown in FIG. 2D, and even when the open-able horizontal holding arms 260, 261, are in an opened position, avoiding that the transferable and open-able neck ring mold 1 falls down when the unidirectional rotary inverting apparatus UIA releases the transferable and open-able neck ring mold 1 to be handled by the transference apparatus BCTA later described; and a second tapered aligning flange F2, F2' to keep the neck ring mold halves 3, 3', aligned with the center of the blank mold BM, as shown in FIG. 2A and tight them both against each other; a second internal guiding groove G2, G2', for a purpose disclosed hereunder; a third internal handling groove G3, G3', to hold the transferable and open-able neck ring mold 1 by the transference apparatus BCTA as will be also described when describing said apparatus; and a fourth external holding groove G4, G4', and an annular tension spring 4 placed into the fourth external holding groove G4, G4', embracing the assembled neck ring mold halves 3, 3', normally maintaining them closed when they are transferring and positioning a parison P at other locations, and which can be opened, by overcoming the tension force of the spring 4, from the third internal handling groove G3, G3' by means of gripping fingers 331a, 331b of the transference apparatus BCTA as shown in FIG. 8A, for releasing the parison P when it is transferred to a blow mold BLM; and a one-piece annular guide 5, having a flange F3 which is located into the second internal guide grooves G2, G2', for maintaining the neck ring mold halves 3, 3' aligned to each other and provide an upper compliment of the finished neck ring of the glass article, when desired for specific requirements, as shown in FIG. 2A.

Figure 2E:
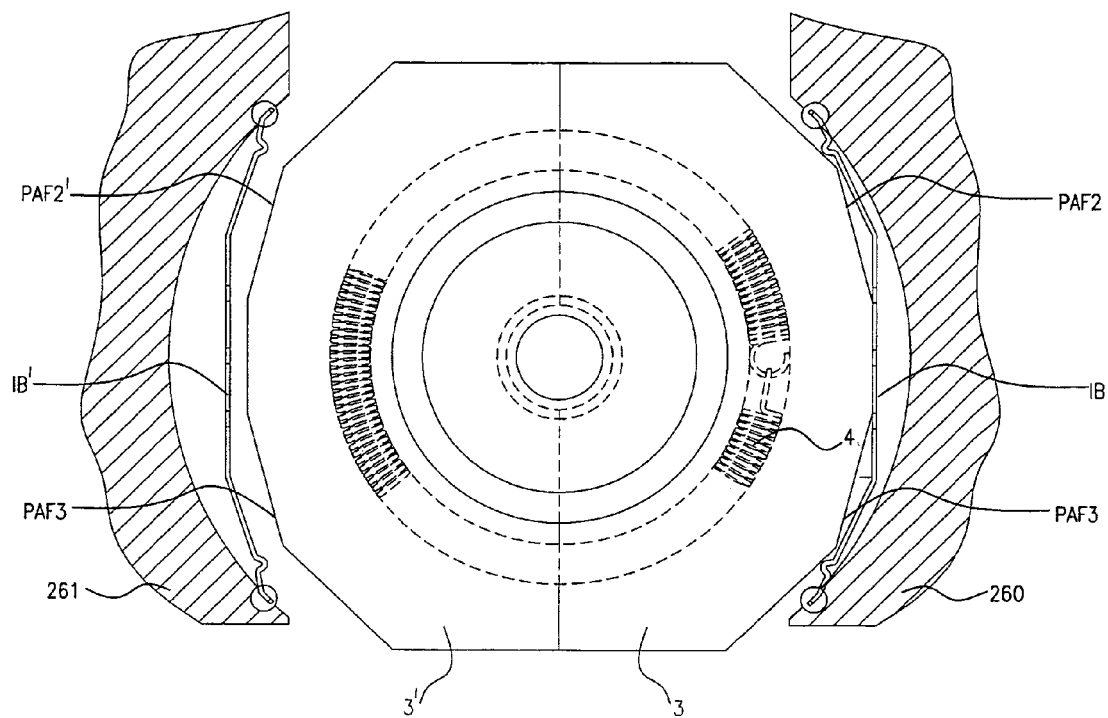
FIG. 2E is a cross-section plant view of a transferable and open-able neck ring mold, similar to FIG. 2B, partially showing a second embodiment of the holding arm showing a half of the drawing in an opened position and another halve in a closed position.

In a first embodiment of the transferable and open-able neck ring molds 1 and 2, each of the neck ring mold halves 3, 3', as illustrated in FIG. 2C, include a plane face PAF1, PAF1', defining four aligning point corners APC, APC' to be aligned by a flat spring iron band IB, IB' each having a central flat face CFF and two inclined end faces IEF each finishing in an end flexible "V" shaped position limiter SPL, each of said spring iron band IB, IB' being held by the open-able horizontal holding arms 260, 261 and 260' 261' of the unidirectional rotary inverting apparatus UIA, to avoid misalignment regarding the partition line of the blank mold BM and a to avoid rotary displacement during handling thereof;

In a second embodiment of the transferable and open-able neck ring molds 1 and 2, each of the neck ring mold halves 3, 3', as illustrated in FIG. 2E, include two pairs of plane angular faces PAF2, PAF2' and PAF3, PAF3', to be retained by the spring iron band IB, IB' held by the open-able horizontal holding arms 260, 261 and 260' 261' of the unidirectional rotary inverting apparatus UIA, to avoid misalignment regarding the partition line of the blank mold BM and a to avoid rotary displacement during handling thereof;

Blank Mold Apparatus

The blank mold apparatus BMA may be selected from an existing one in the commerce, however, to achieve the interchangeability characteristic both in the same section machine and as a machine section at the whole machine of multiple-section, as well as to achieve a high speed and smooth operation, and a high reliance on the closing force and heat dissipation abilities, in the following it is described a preferred embodiment of the blank mold apparatus BMA, as illustrated in FIGS. 3A to 3L, comprising: a blank mold BM for forming a parison P, once a molten glass gob has been feed therein, and including: two blank mold halves 10, 10' opposed face to face to each other, each including a blank mold wall BW and BW' (FIGS. 3B and 3C), a plurality of axial passages AP, AP' for cooling the blank mold halves 10, 10', a parison forming cavity PC, PC' and a holding flange 11, 11', to be mounted on a blank mold holding mechanism BMHM, mounted in turn on the blank mold support frame BSF mounted in turn on the mechanism support frame MSF, at the above referred blank mold "zero-line" OB, and which is operated by a blank mold opening and closing mechanism BO&C both of which disclosed specifically at paragraphs A and B in the following.

A. Blank Mold Holding Mechanism.

A specific blank mold holding mechanism BMHM, in accordance with a preferred embodiment of the blank mold apparatus BMA, as illustrated in FIGS. 3A to 3L, comprising: mounting means, represented by a mounting bracket 35 mounted on a blank mold support frame BSF mounted in turn on the mechanism support frame MSF which will be specifically described when a specific blank mold opening and closing mechanism BO&C be described; a first and a second arms 15, 15' pivotally mounted on the mounting bracket 35 in a hinged arrangement, including blank mold holders (not illustrated) in which the blank mold halves 10, 10' are held by means of their holding flanges 11, 11' (FIG. 3B); for a multiple (triple) cavity, said blank mold holders comprising equalizing means including an equalizing beam 12, 12' mounted on the first and second arms 15, 15' of the blank mold holding mechanism BMHM; a first single blank mold holder 16a, mounted in said equalizing beam 12, in which it is respectively mounted a blank mold halve 10; and a dual blank mold holder 16b also mounted in said equalizing beam 12, in which are also mounted two blank mold halves 10; and a first corresponding opposed single blank mold holder 16a' also mounted in said equalizing beam 12', in which is respectively mounted a blank mold halve 10' and a dual blank mold holder 16b' also mounted in said equalizing beam 12', in which are mounted two blank mold halves 10', so that the blank mold halves 10, 10' can be uniformly closed with a similar closing force; and an opening and closing mechanism BO&C Which, as previously mentioned, will be described below in full detail, mounted on the blank mold support frame BSF which is mounted in turn on the machine section frame MSF (FIG. 1A), for closing and opening the arms 15, 15', and consequently closing and opening the blank mold halves 10, 10', in order to receive a molten glass gob and form a parison P; and a blank mold cooling system BMCS comprising two two-halves cooling boxes 17, 17', including nozzles 18, 18' placed at a fixed height, for directing cooling fluid into axial passages AP, AP' practiced at the wall of each of the mold halves 10, 10'; the cooling boxes 17, 17' are slide coupled on the sliding platform SP of the "T" shaped sliding valve SV mounted on the blank mold support frame BSF (shown in FIGS. 3J to 3L), and maintained in sealed contact by the spring 19 of said valve SV, providing a communication of the cooling fluid through a conduit 14 from the floor cover FC of the machine support frame MSF during the whole path of the opening and closing operation of the blank mold BM.

The equalizing means have been described as including the single blank mold holders 16a, 16a' facing against each other, and the dual blank mold holders 16b, 16b' also facing against each other, both single and dual blank mold holders mounted in said equalizing beam 12, 12' in which it is respectively mounted a blank mold halve 10, 10' so that the blank mold halves 10, 10' can be uniformly closed with a similar closing force; however, a second embodiment for the arrangement of this equalizing means, as illustrated in FIG. 3DA, can be providing a single blank mold holder, say 16a, facing against a mold holder, say $16b'_1$ of a dual blow mold holder 16b', so that the other single blank mold holder 16a' will face against the blank mold holder $16b_1$ of the dual mold blank holder 16b and the blank mold holders $16b'_2$ and $16b_2$ of both dual blank mold holders 16b' and 16b are faced against each other.

In a third more economic embodiment, these equalizing means can include a single blank mold holder 16a' and a dual blank mold holder 16b', both facing against a trial blank mold holder 16c pivoted on the pin 12a', so that the effect that the mold halves 10, 10' be uniformly closed with a similar closing force, is achieved by the single and dual blank mold holders 16a', 16b' as illustrated in FIG. 3DB.

B. Blank Mold Opening and Closing Mechanism.

Figure 3A:
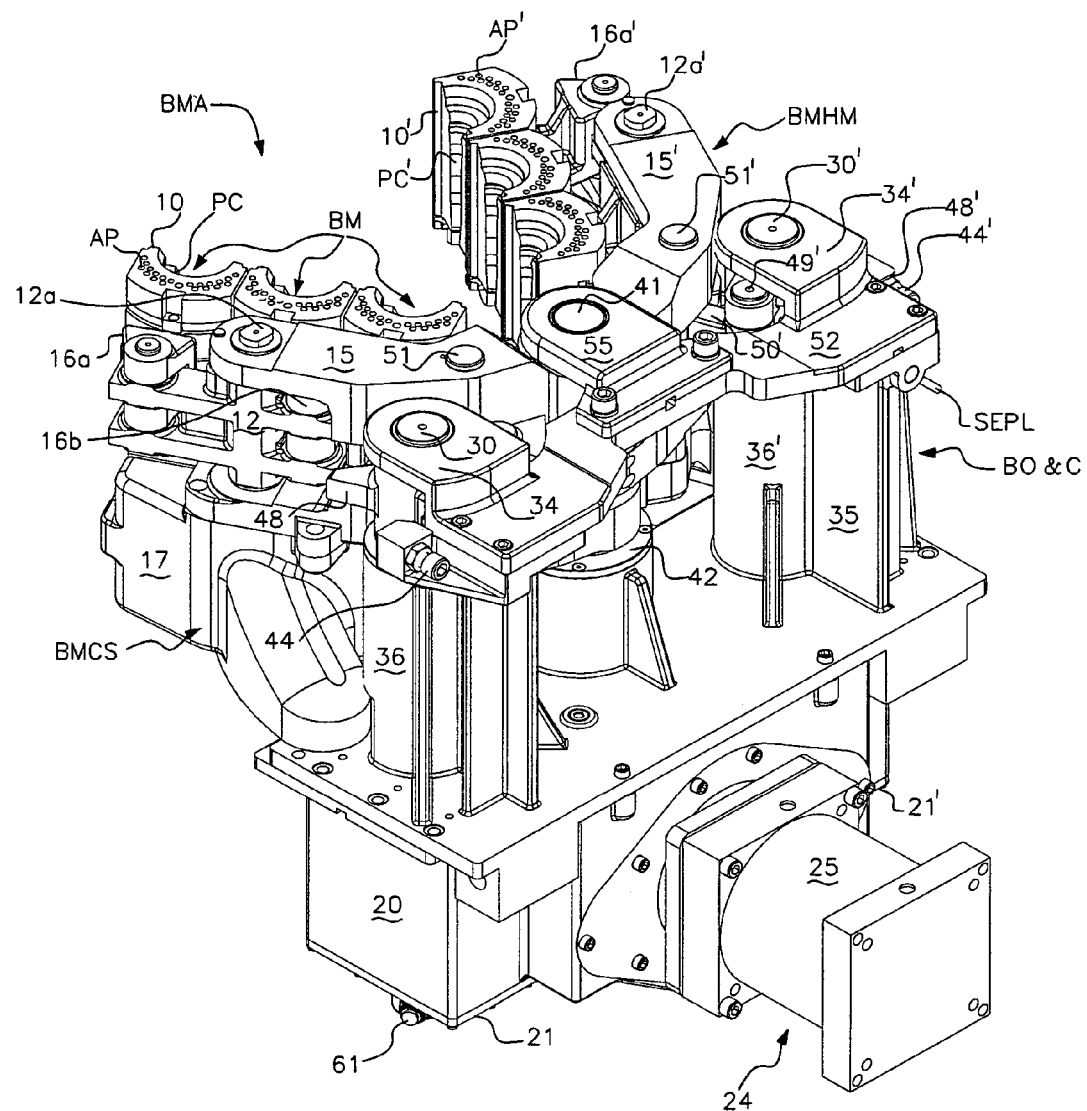
FIG. 3A is a perspective three-dimensional elevation view of the an specific and preferred embodiment of the blank mold apparatus, for a three cavity machine section, shown from the so named "hot side", including the blank mold, the blank mold holding mechanism and the opening and closing mechanism, constituting the same, for the glassware forming machine of the present invention.
Figure 3B:
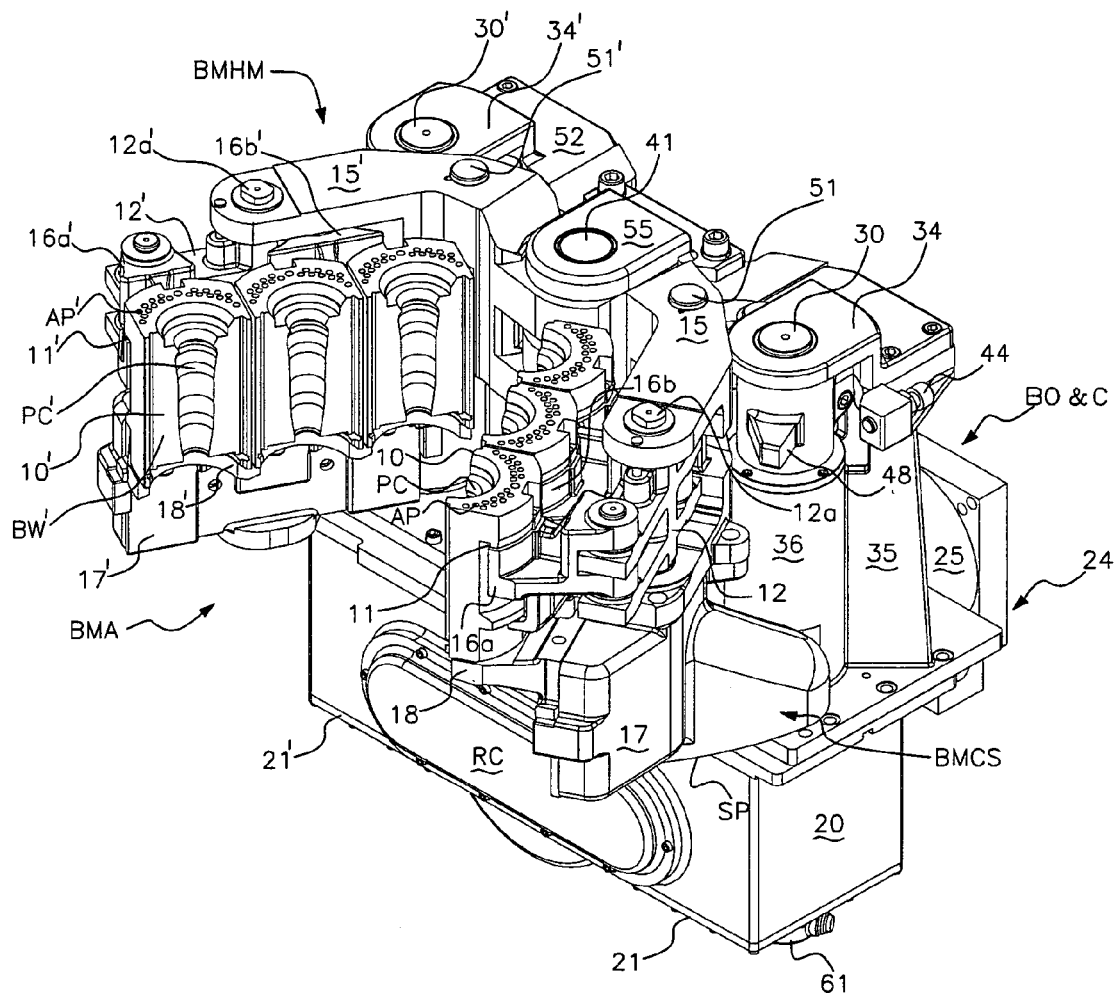
FIG. 3B is a perspective three-dimensional elevation view of the blank mold apparatus, similar to FIG. 3A, shown from the so named "cold side" oriented to the blow mold side.
Figure 3C:
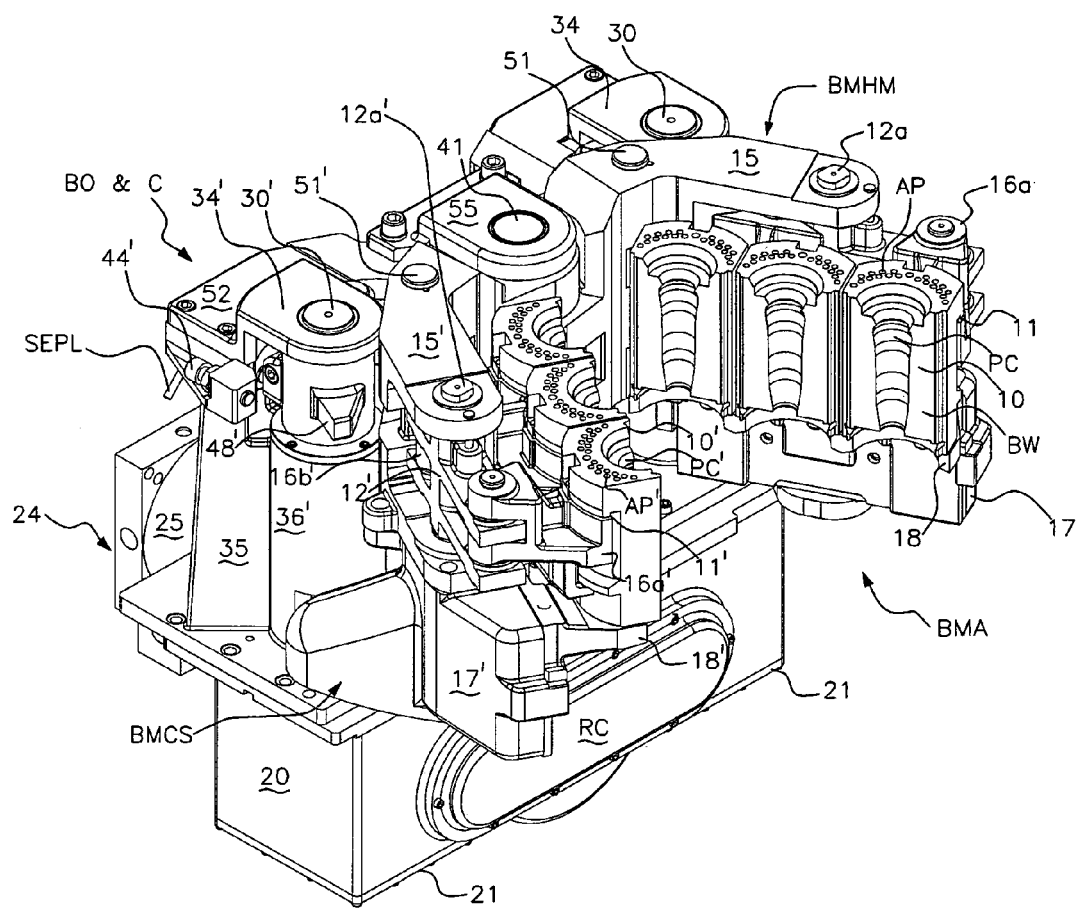
FIG. 3C is a perspective three-dimensional elevation view of the blank mold apparatus, similar to FIG. 3B, shown from other side of the so named "cold side"
Figure 3E:
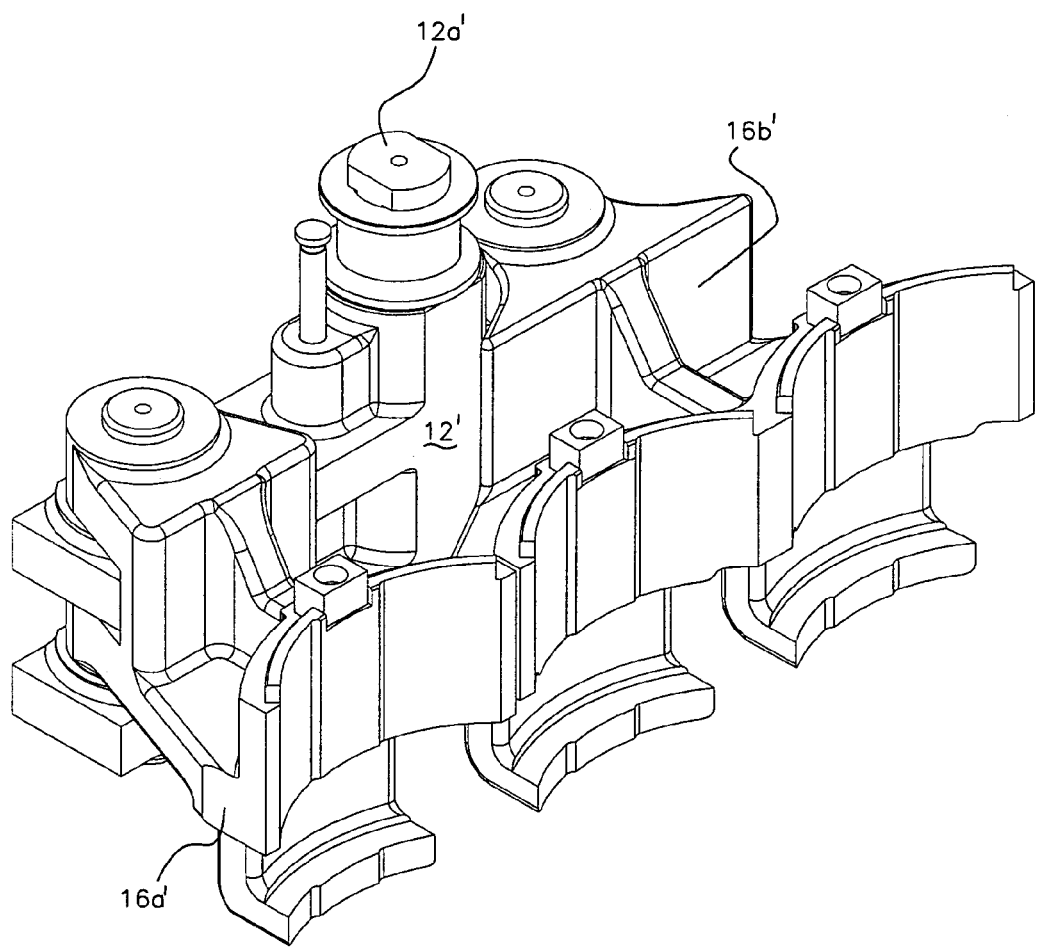
FIG. 3E is a frontal perspective three-dimensional elevation view of the blank mold holding mechanism of FIG. 3Dᴀ.
Figure 3F:
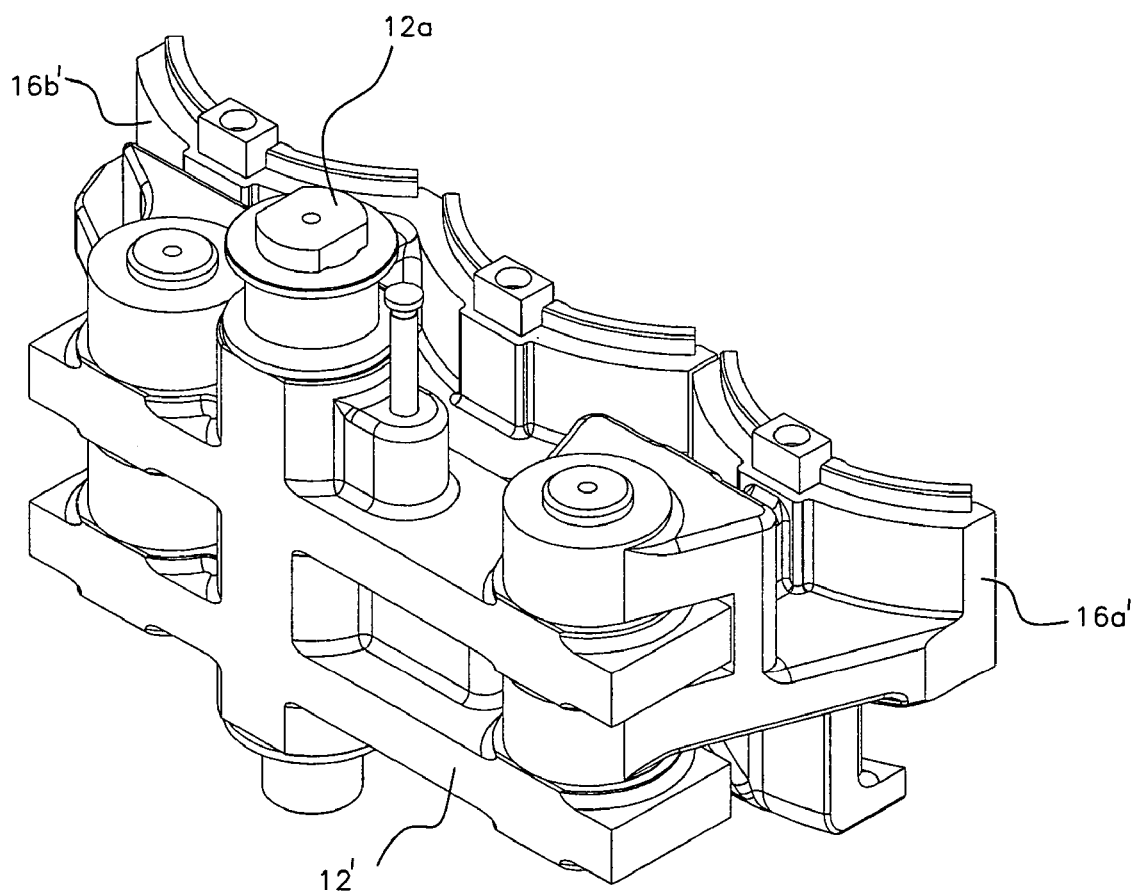
FIG. 3F is a rear perspective three-dimensional elevation view of the blank mold holding mechanism of FIG. 3Dᴀ.
Figure 3G:
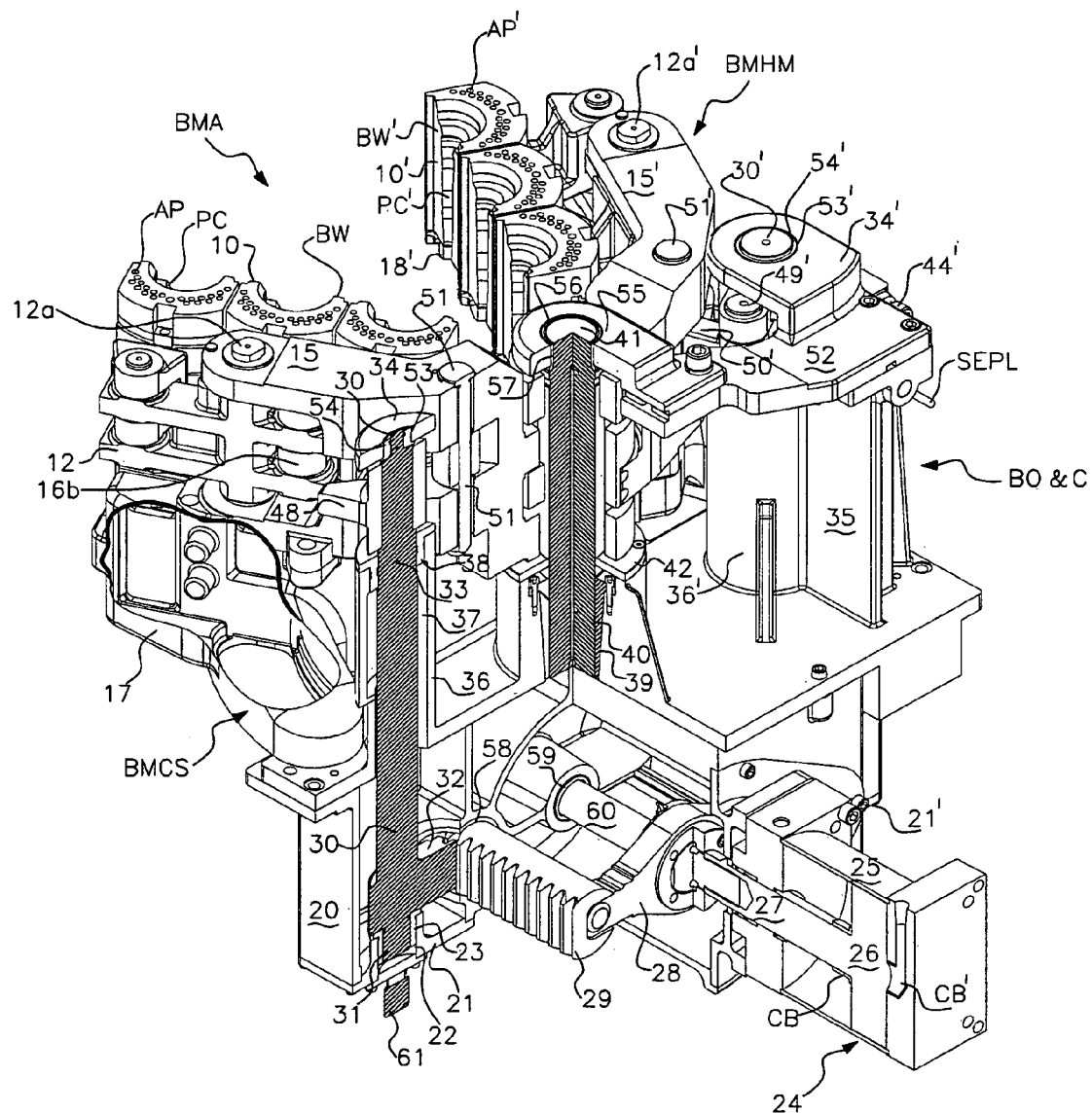
FIG. 3G is a perspective three-dimensional elevation view of the blank mold apparatus, similar to FIG. 3A, showing a partial 90° cross-section, showing the transmission components thereof.
Figure 3H:
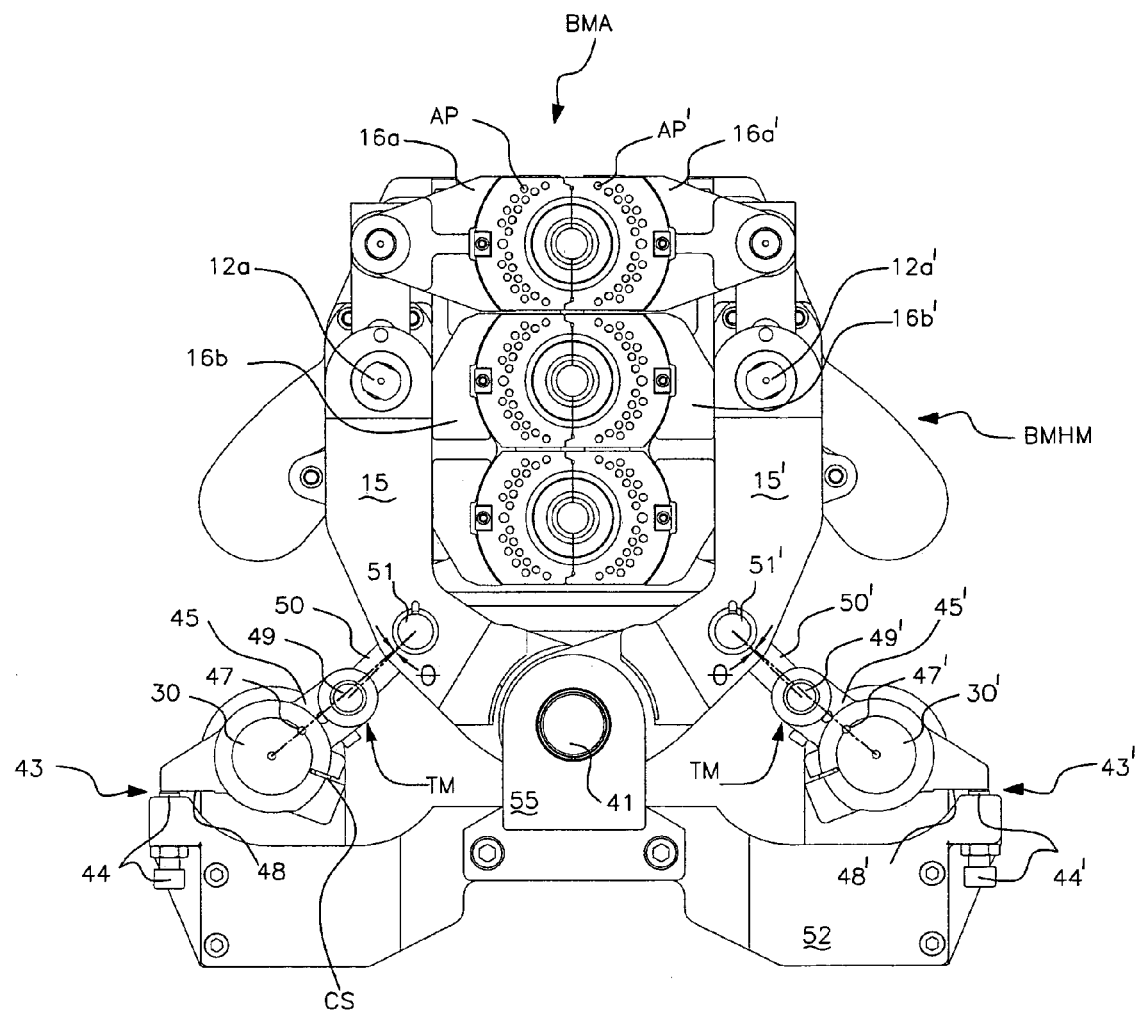
FIG. 3H is a plant view of the opening and closing mechanism for the blank mold apparatus, in a closed position, in accordance with an embodiment thereof.
Figure 3I:
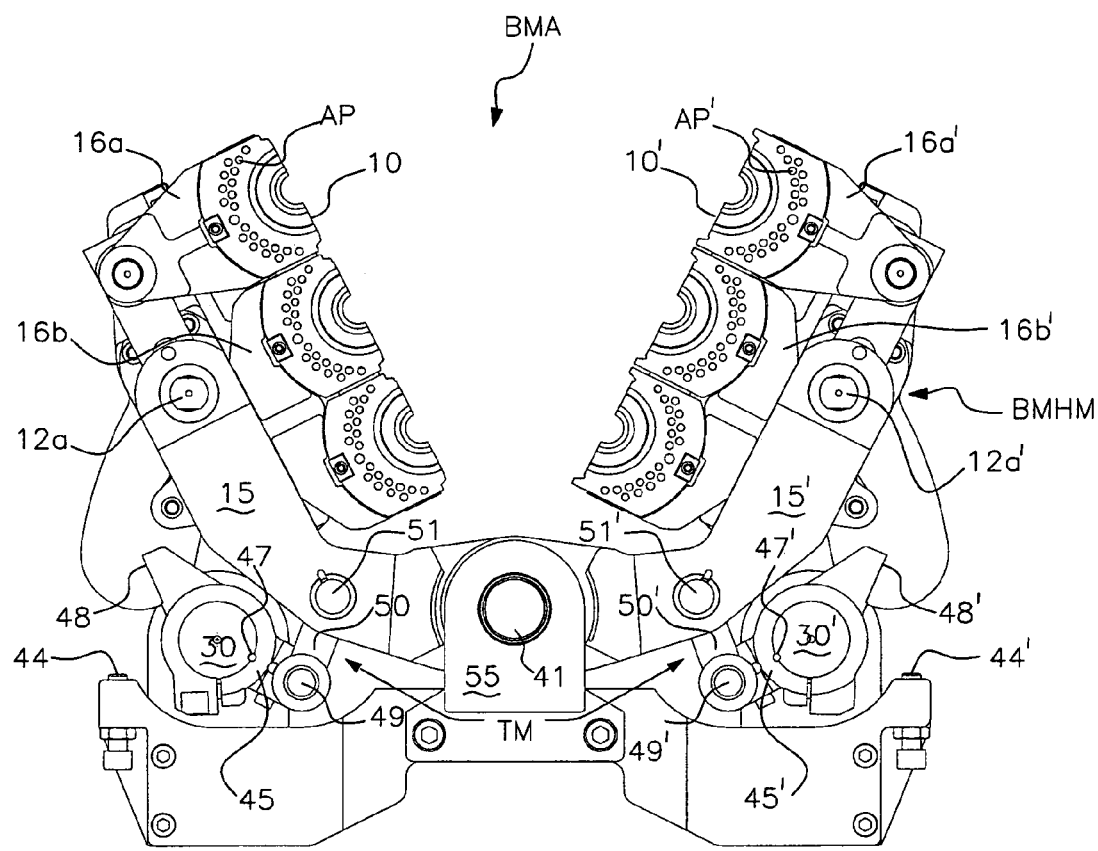
FIG. 3I is a plant view of the opening and closing mechanism for the blank mold apparatus, in an opened position, in accordance with the embodiment of FIG. 3H.
Figure 3J:
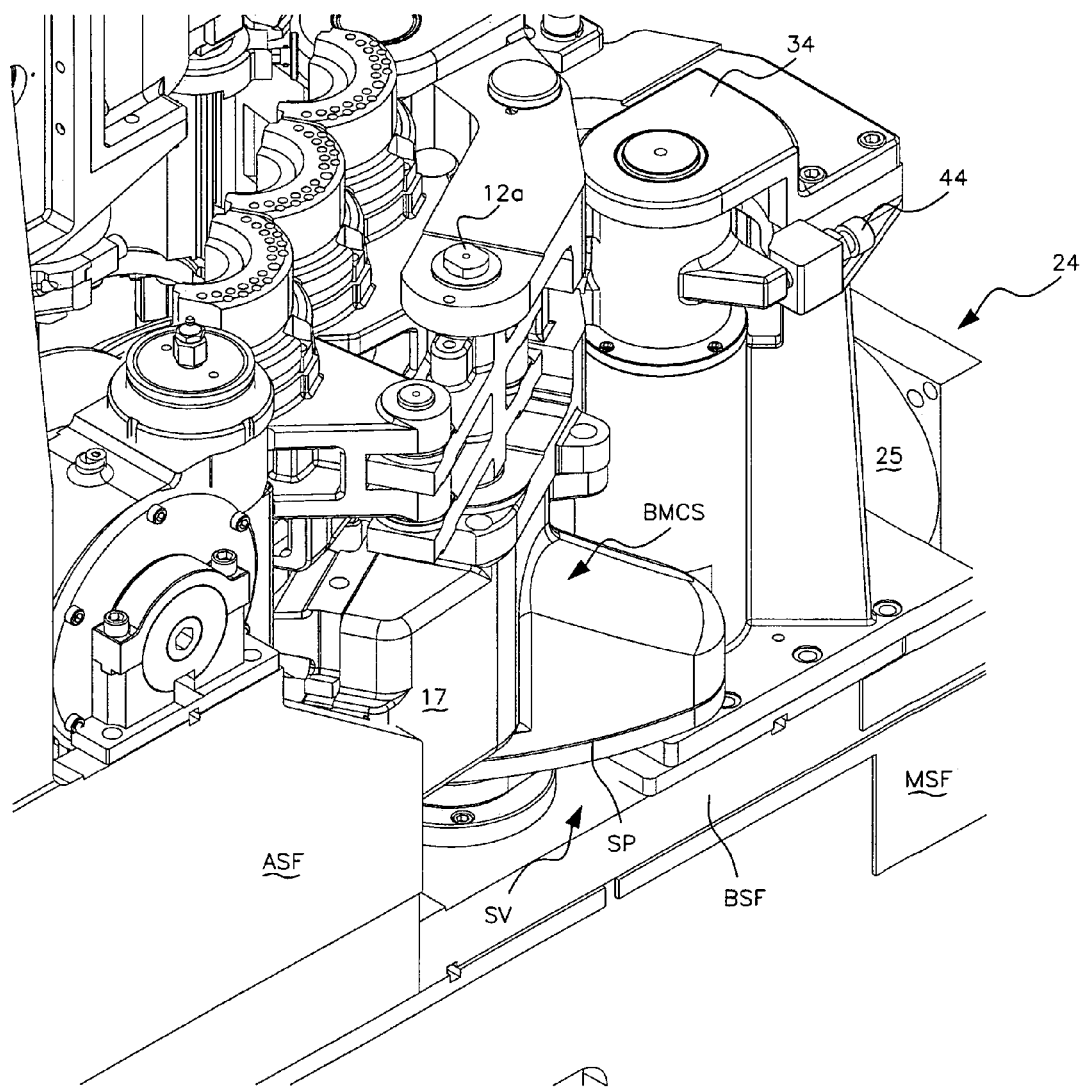
FIG. 3J is an enlarged partial view of FIG. 1B, partially showing the cooling fluid feeding system for the blank mold apparatus shown from the so named "cold side"
Figure 3K:
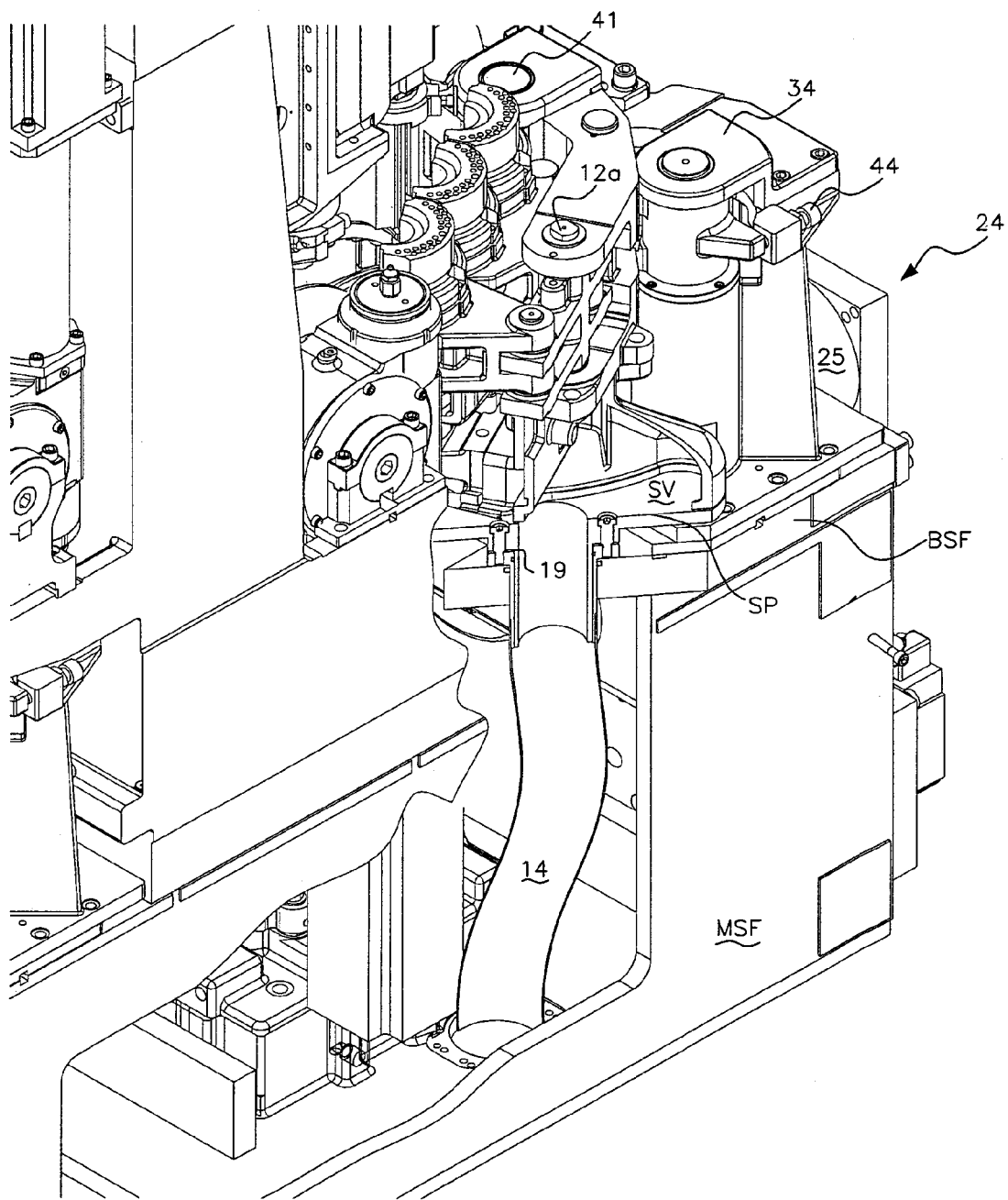
FIG. 3K is a view similar to FIG. 3J, in a partial cross-section thereof, showing a detail of the shown cooling fluid feeding system.
Figure 3L:
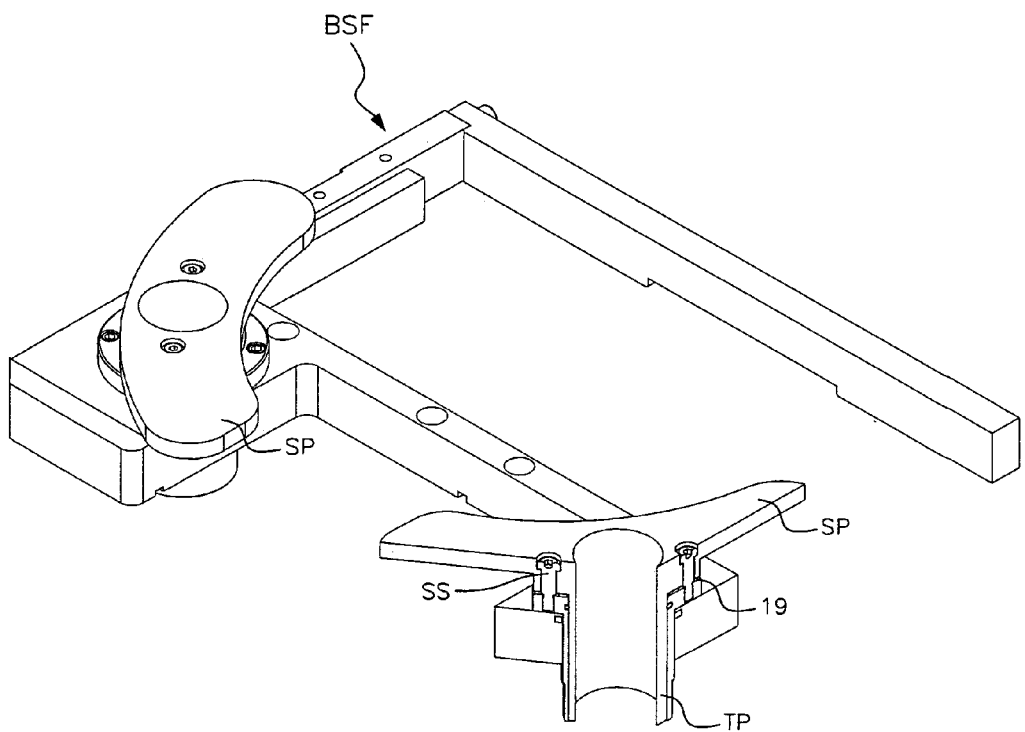
FIG. 3L is a detailed perspective three-dimensional elevation view of the cooling fluid feeding system, in partial cross-section.
Figure 4A:
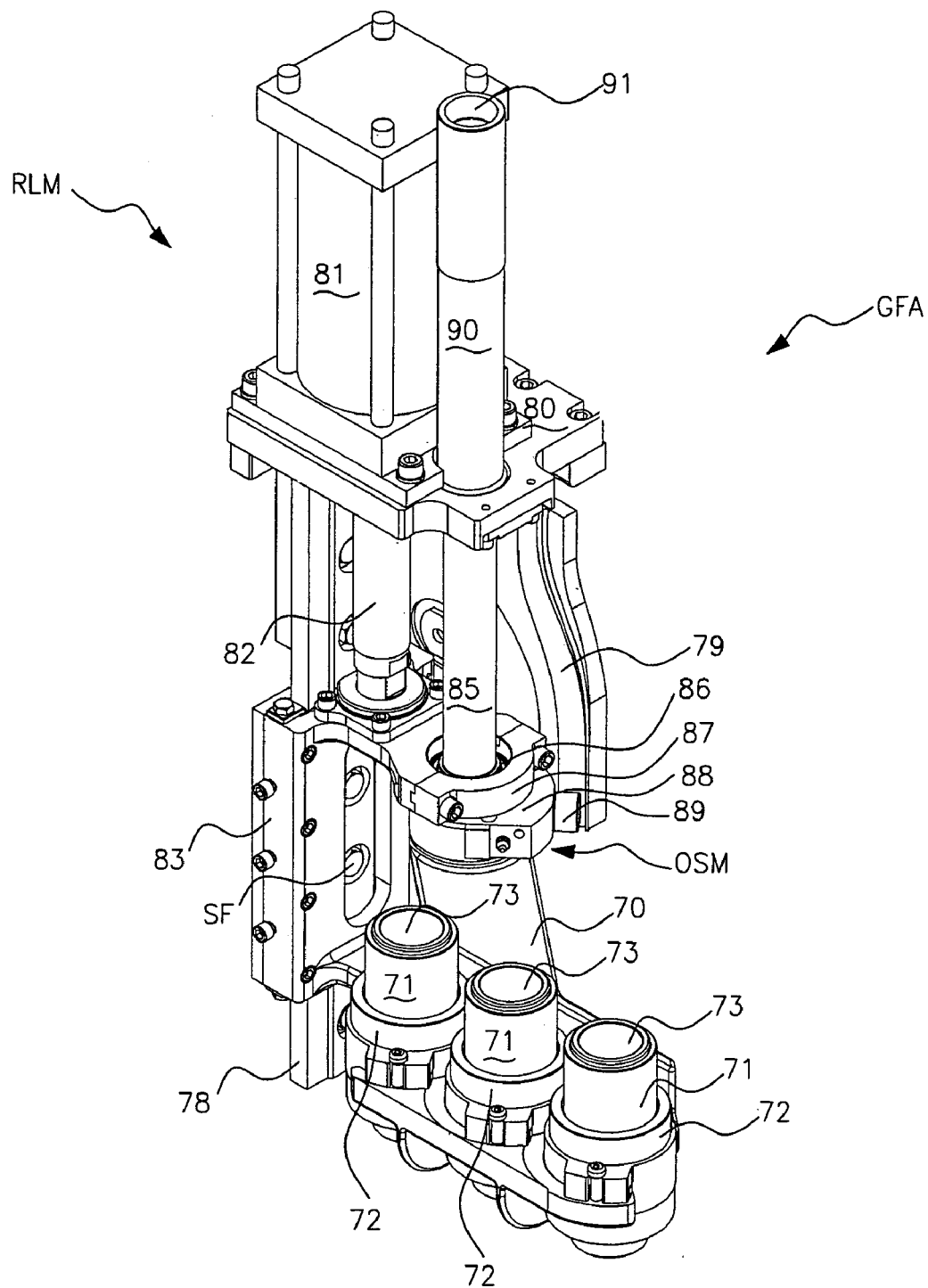
FIG. 4A is a front perspective three-dimensional elevation view, shown from the so named "hot side", of a specific and preferred embodiment of the guide-funnel apparatus for the glassware forming machine of the present invention, showing its components.
Figure 4B:
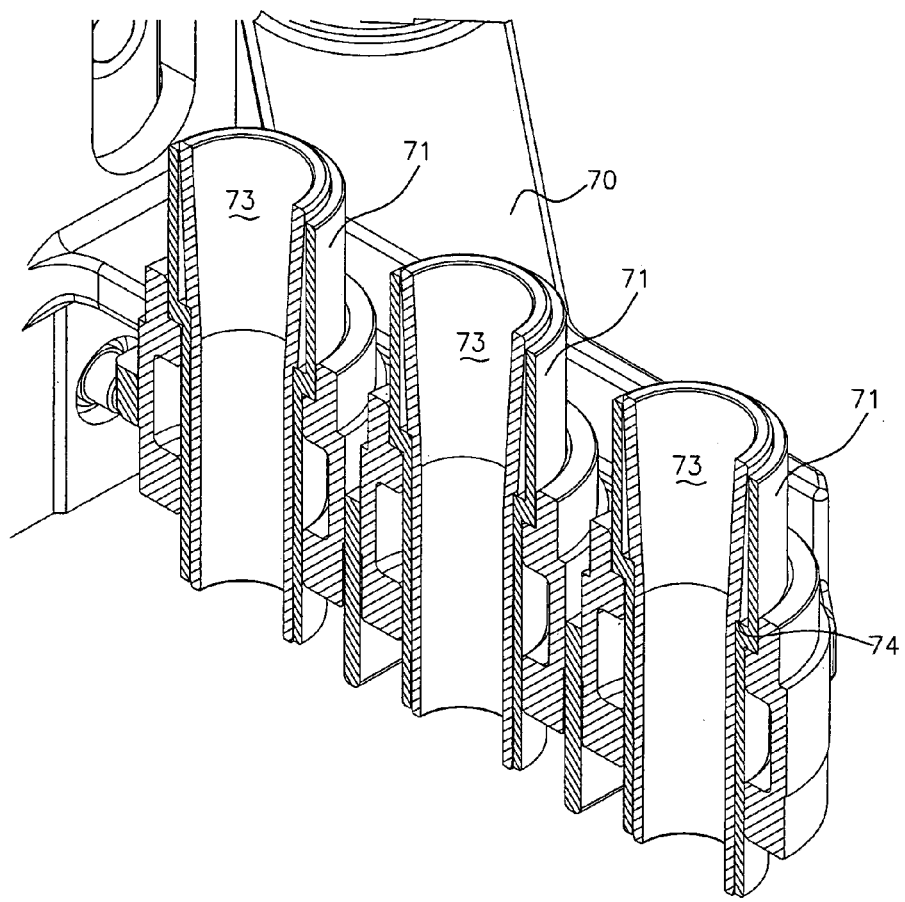
FIG. 4B is a cross-section perspective elevation of the mounting of the guide-funnels for the guide-funnel apparatus of FIG. 4A.
Figure 4C:
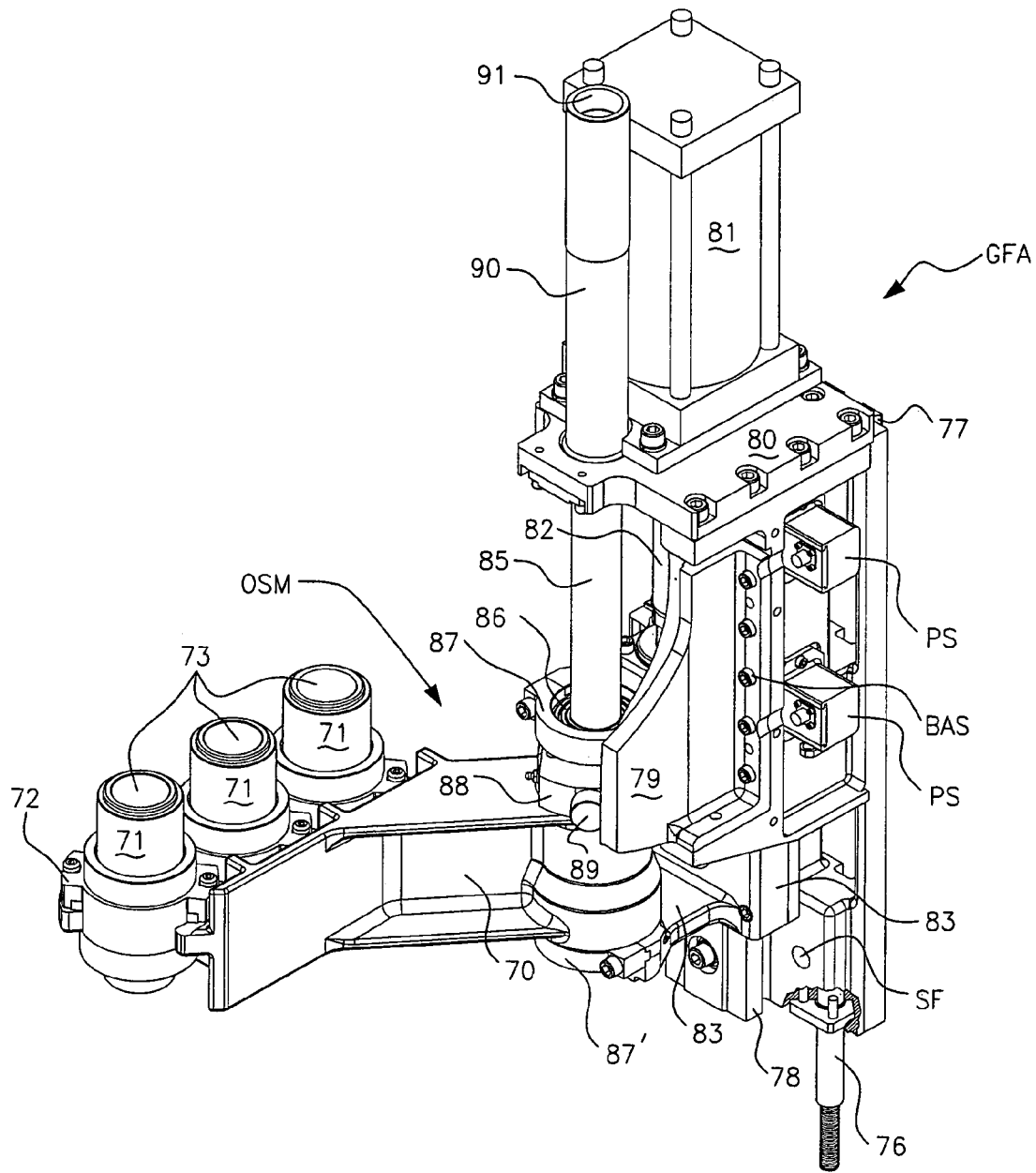
FIG. 4C is a lateral perspective three-dimension elevation view, shown from another side of the so named "hot side", of the guide-funnel apparatus of FIG. 4A.
Figure 4D:
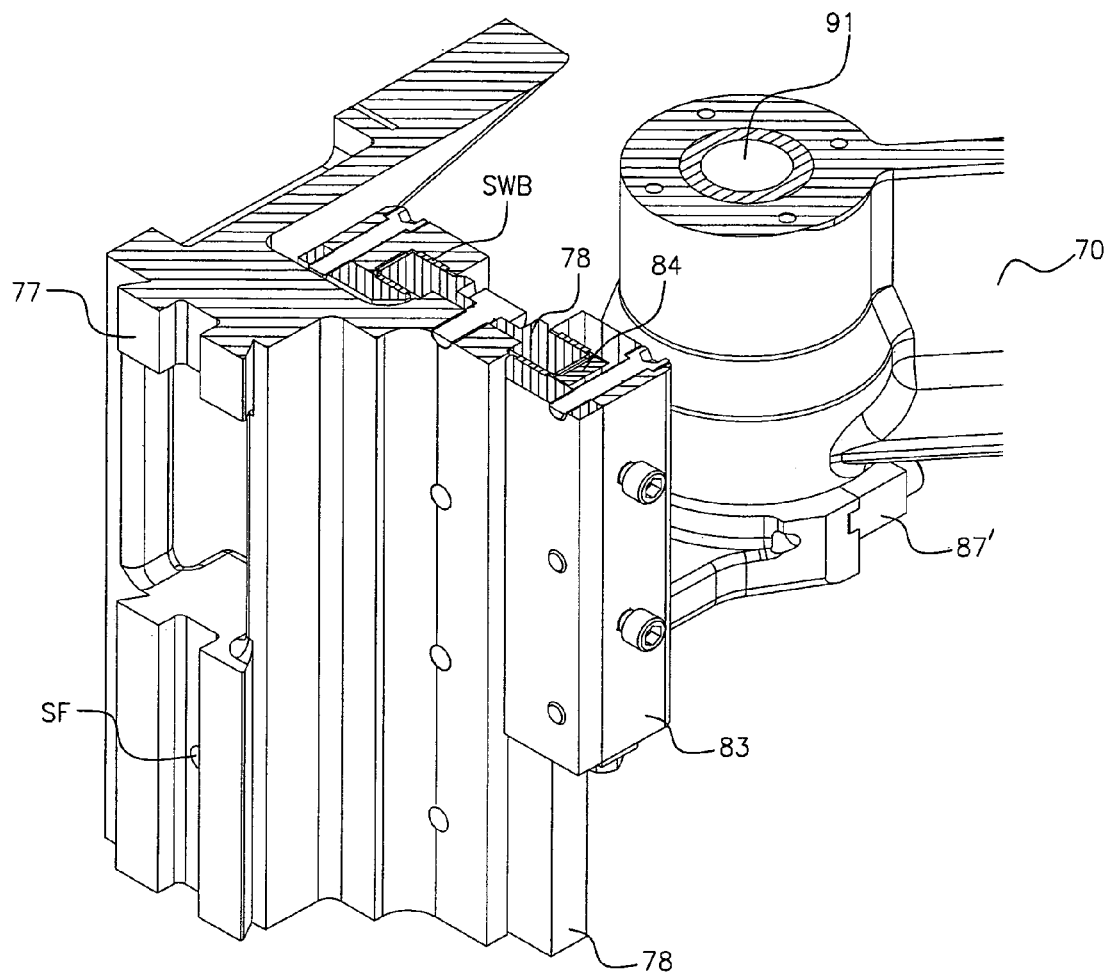
FIG. 4D is a perspective three-dimensional rear view in a detailed partial cross-section of the oscillating mechanism for the guide-funnel apparatus.
Figure 5A:
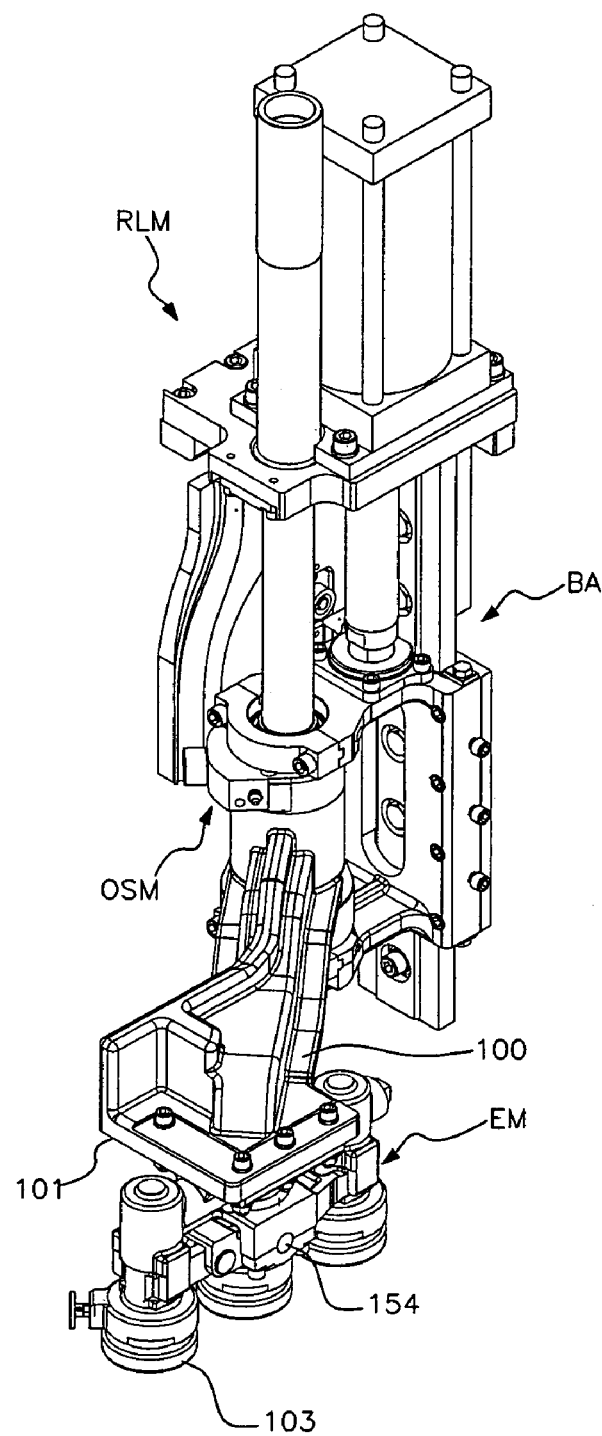
FIG. 5A is a perspective three-dimensional elevation view, shown from the so named "hot side", of a specific and preferred embodiment of the baffle apparatus for forming the bottom of a parison into the blank mold apparatus, for the glassware forming machine of the present invention, for a press-and-blow or blow-and-blow processes.
Figure 5B:
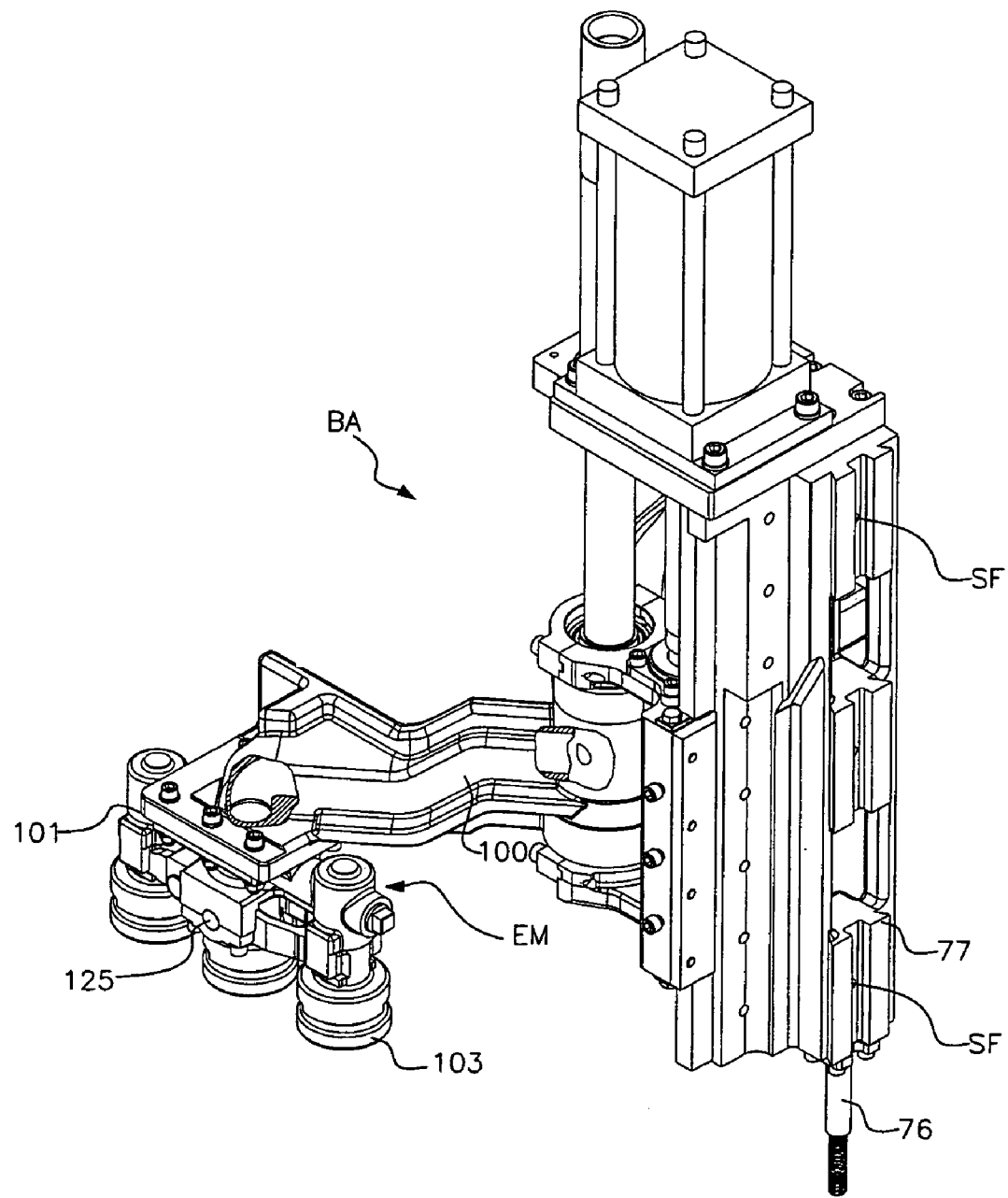
FIG. 5B is a rear perspective three-dimension elevation view, shown from the so named "cold side", of the baffle apparatus of FIG. 5A.
Figure 5C:
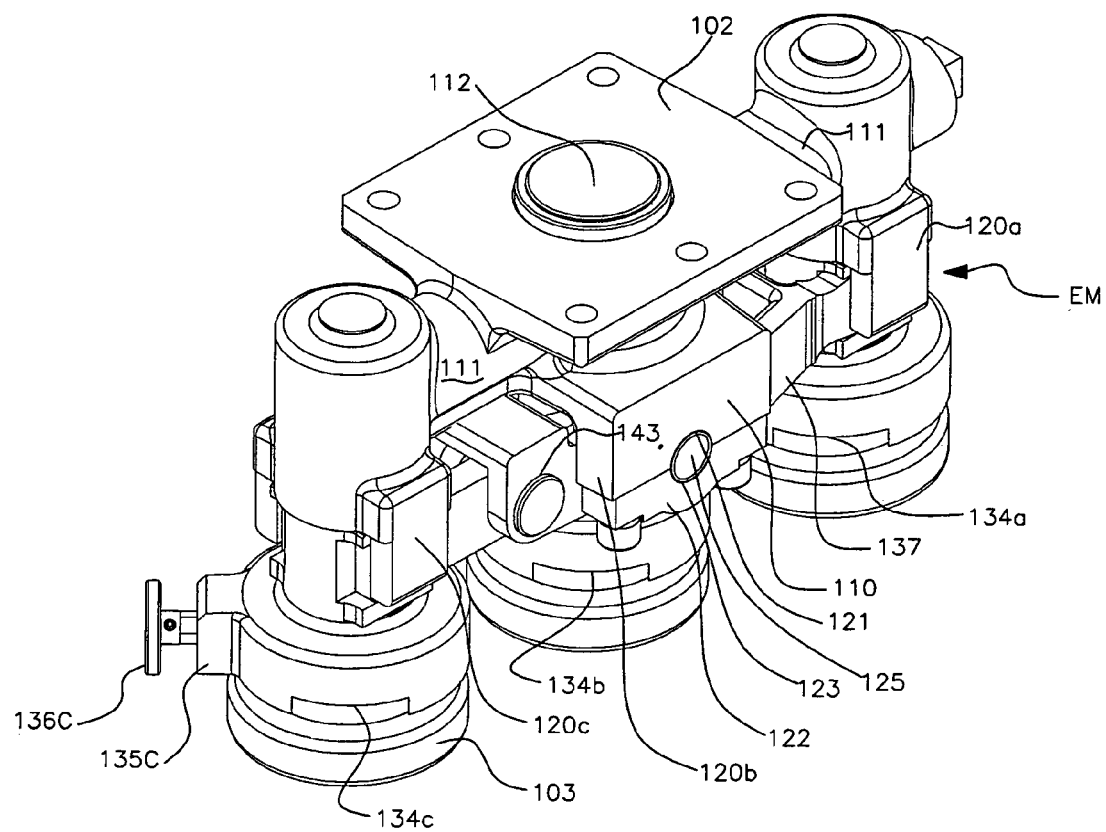
FIG. 5C is a perspective three-dimensional view of the equalizer mechanism for the baffle apparatus of FIG. 5A.
Figure 5D:
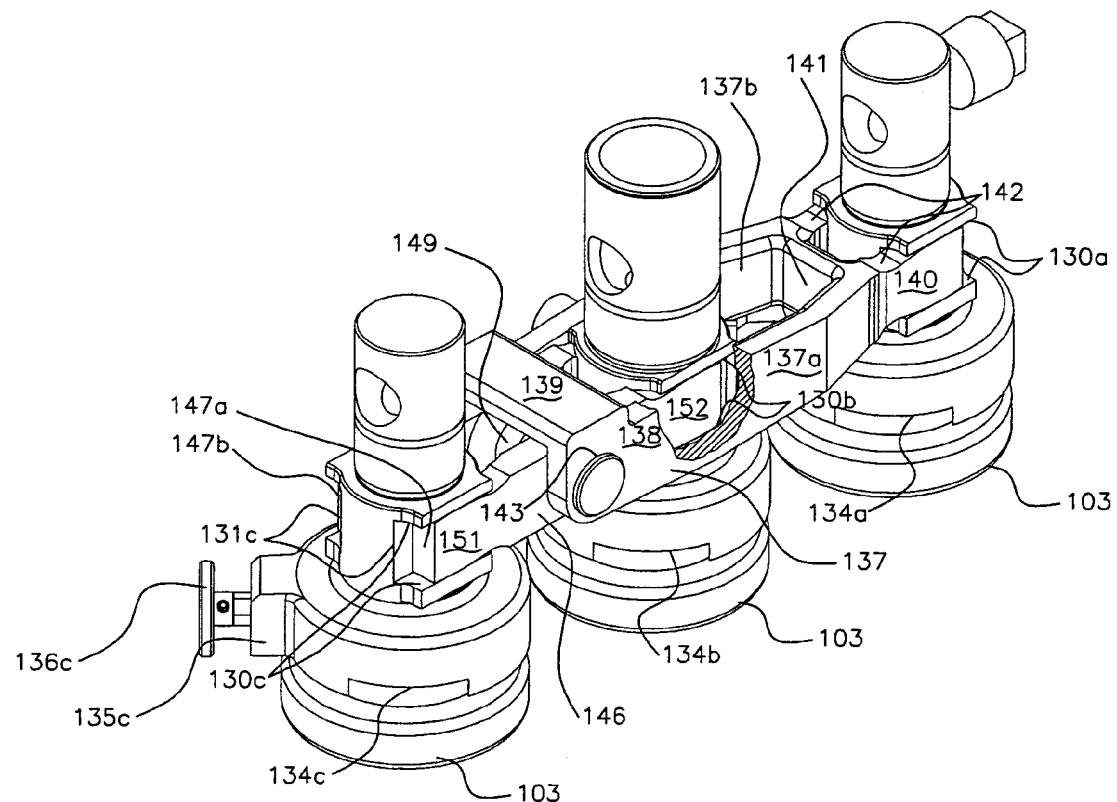
FIG. 5D is a perspective three-dimensional view of the internal pieces of the equalizer mechanism of the baffle apparatus of FIG. 5C.
Figure 5E:
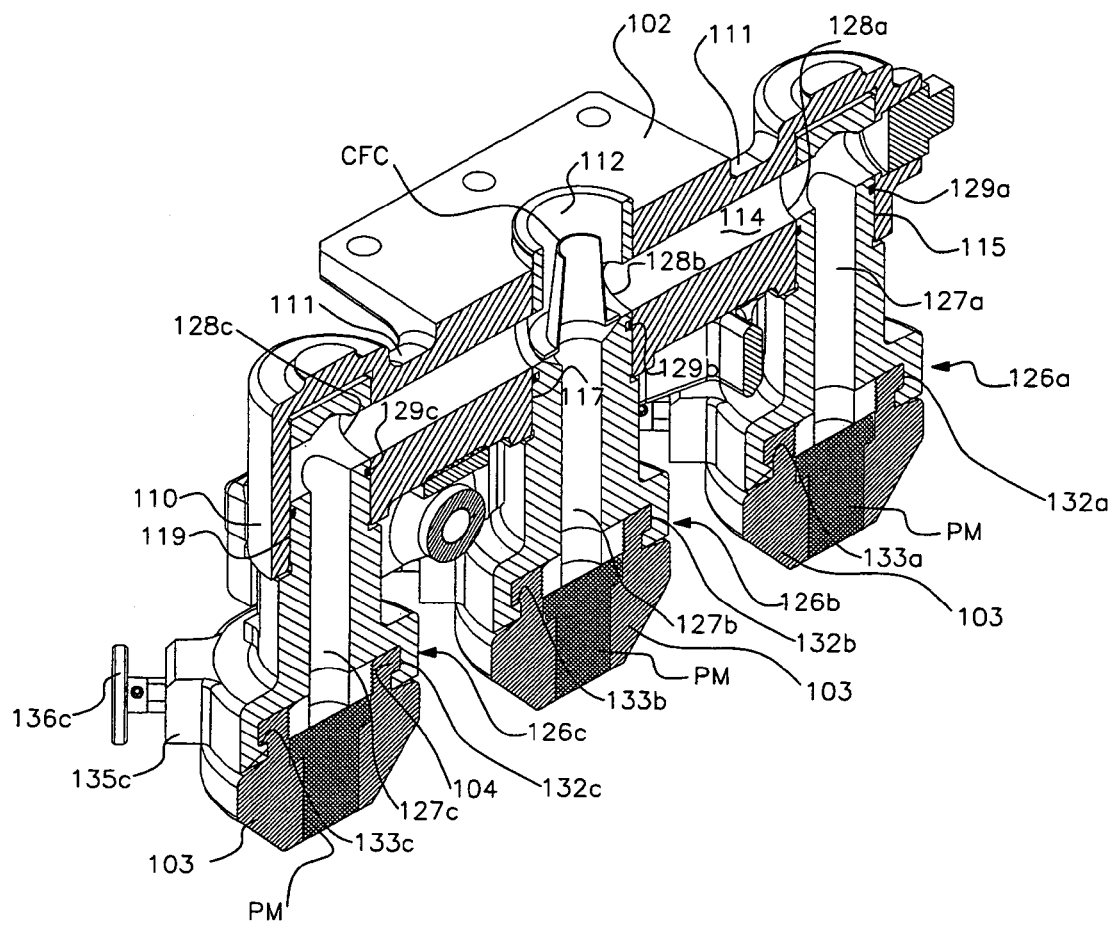
FIG. 5E is a cross-section perspective three-dimensional view of the equalizer mechanism for the baffle apparatus of FIG. 5C.
Figure 5F:
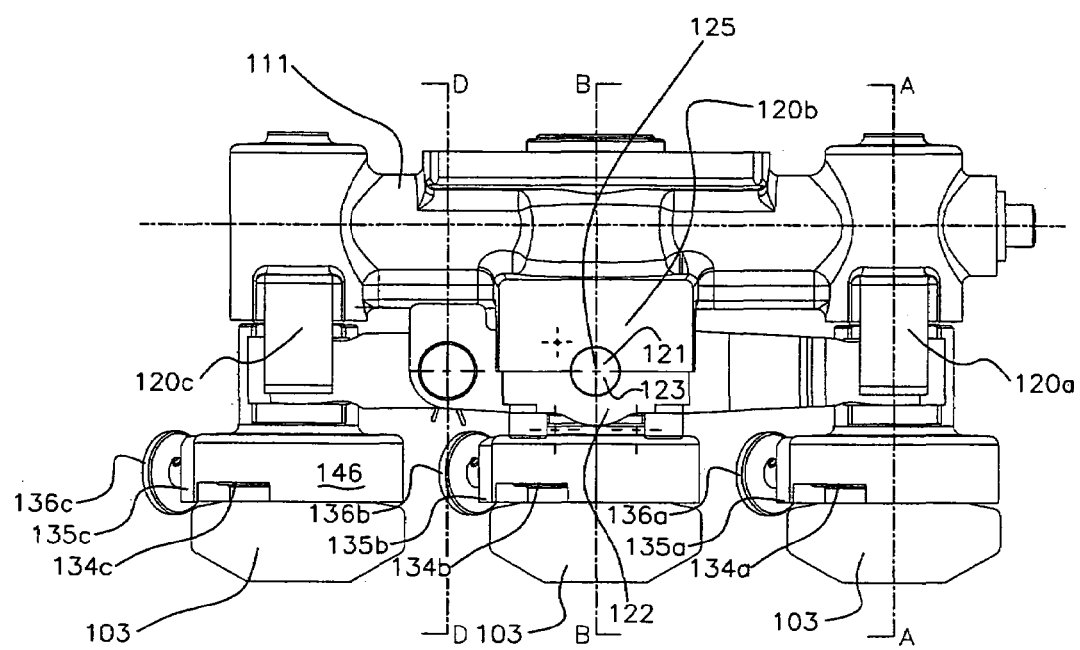
FIG. 5F is a lateral elevation view of the equalizer mechanism of FIG. 5C.
Figure 6A:
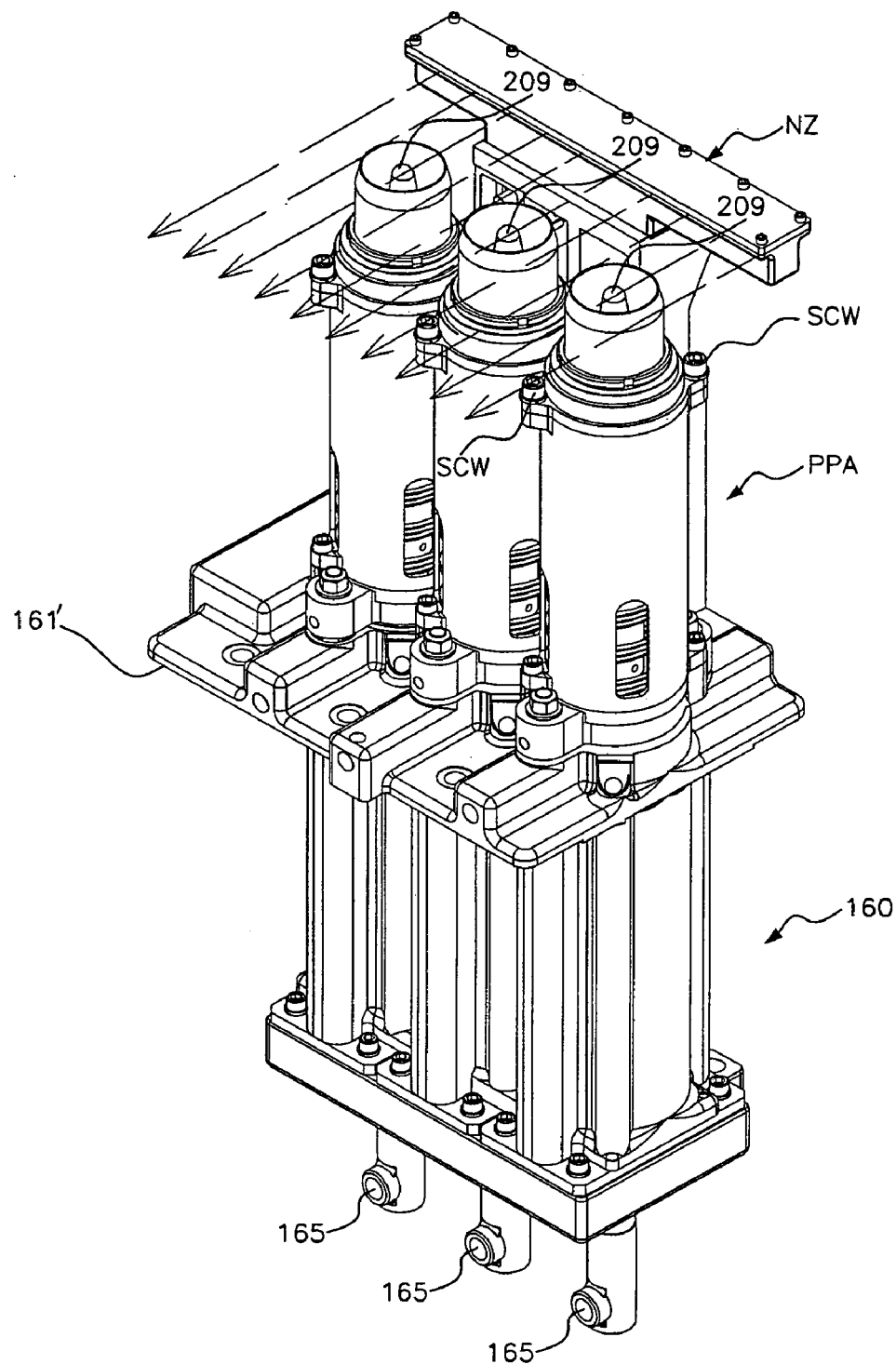
FIG. 6A is a perspective three-dimensional elevation view of a specific and preferred embodiment of the pressing plunger apparatus for forming a parison into the blank mold apparatus for the glassware forming machine of the present invention, for a press-and-blow process.
Figure 6B:
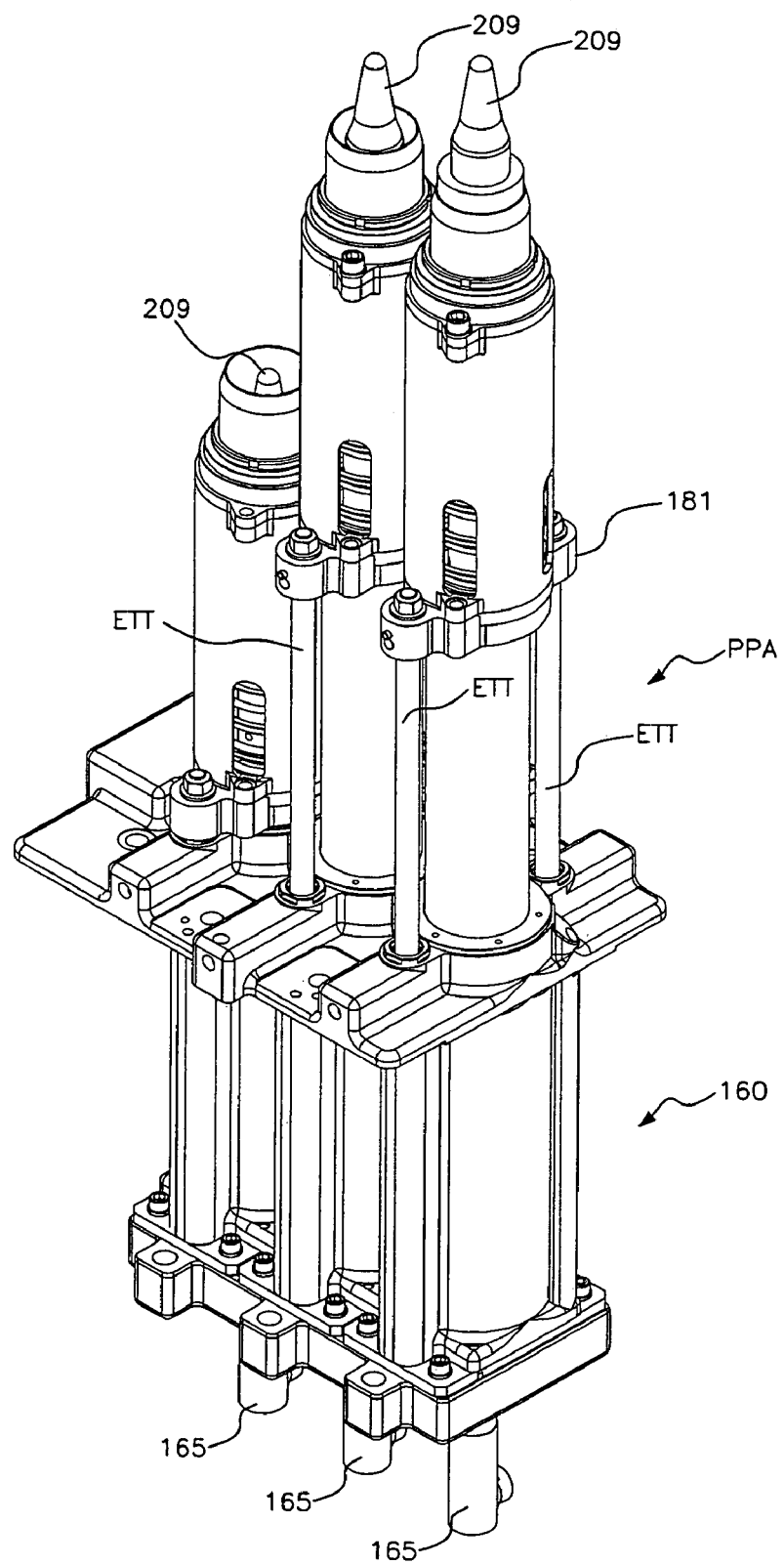
FIG. 6B is a perspective three-dimensional elevation view of the pressing plunger apparatus of FIG. 6A, in different positions.
Figure 6C:
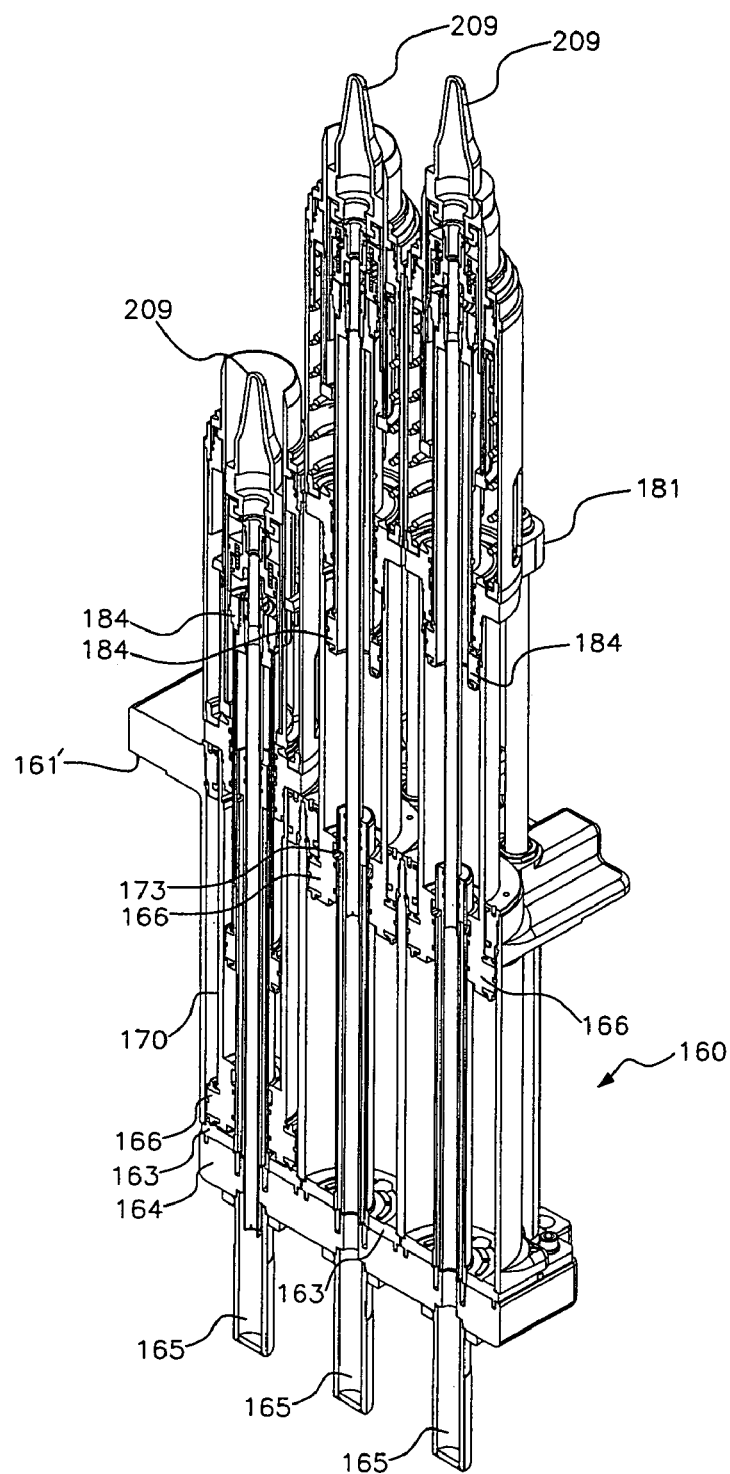
FIG. 6C is a cross-sectional perspective three-dimensional elevation view of the pressing plunger apparatus of FIG. 6B.
Figure 6D:
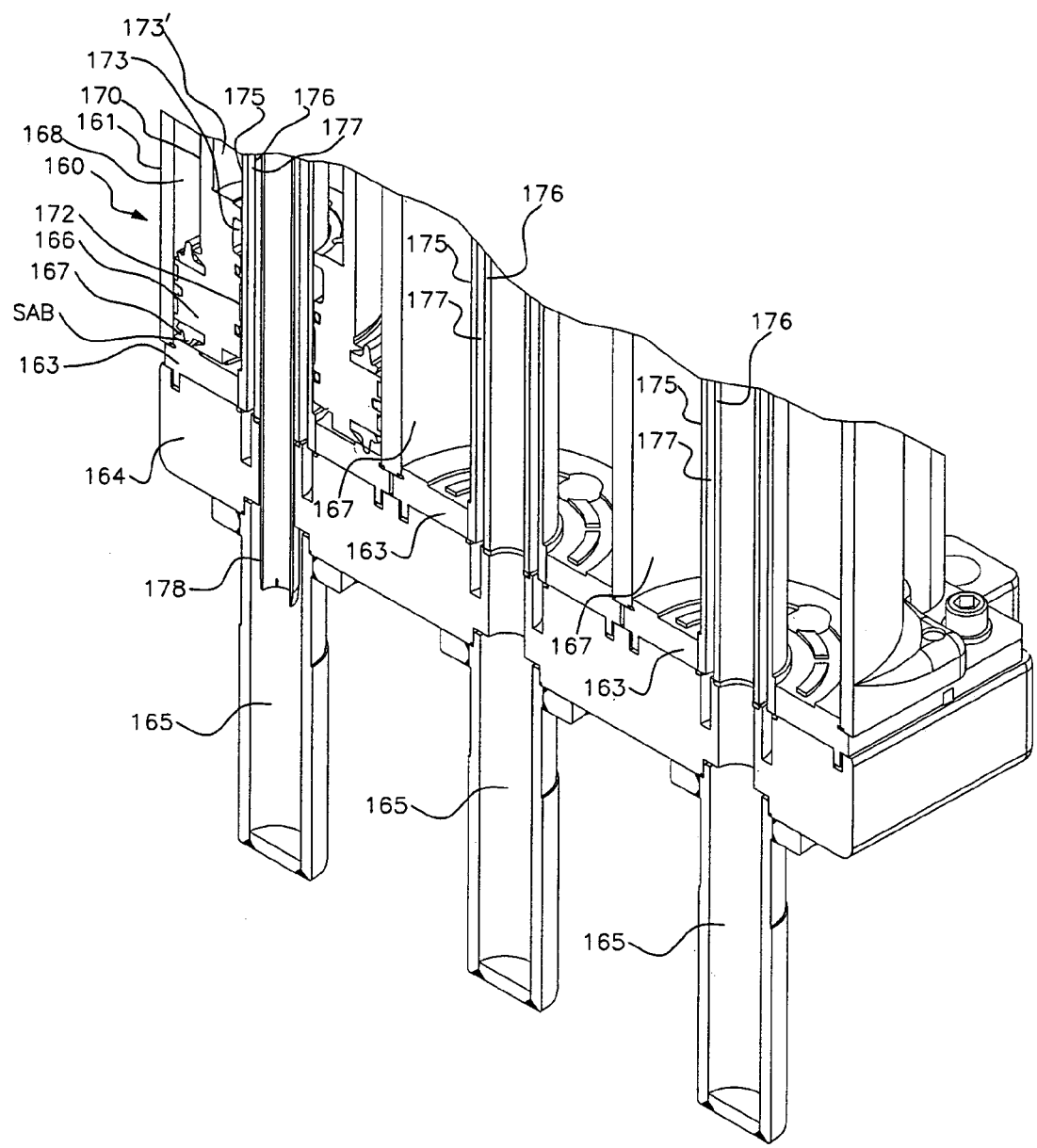
FIG. 6D is an enlarged detailed cross-sectional view of the lower part of the pressing plunger apparatus of FIG. 6C.
Figure 6E:
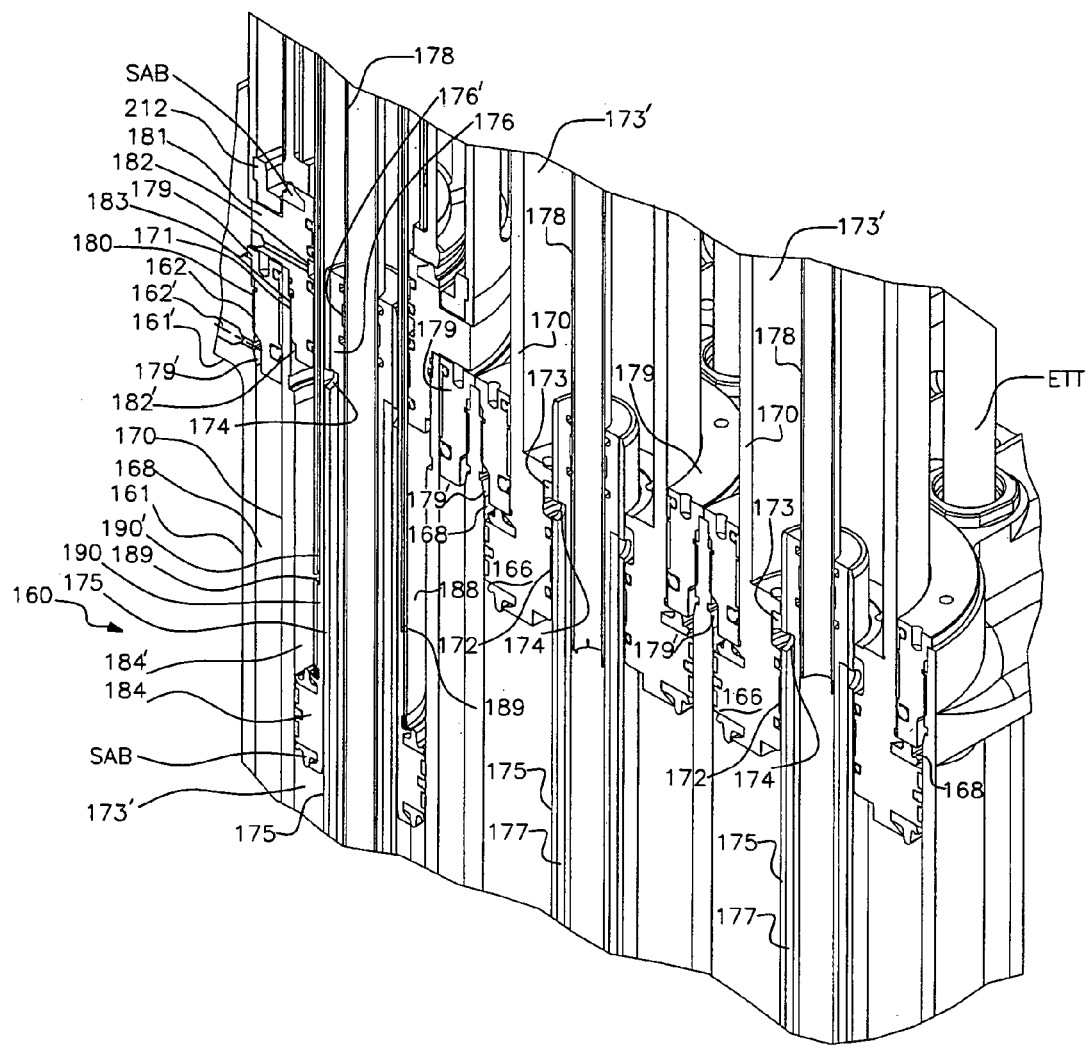
FIG. 6E is an enlarged and detailed cross-sectional view of an intermediate part of the pressing plunger apparatus of FIG. 6C.
Figure 6F:
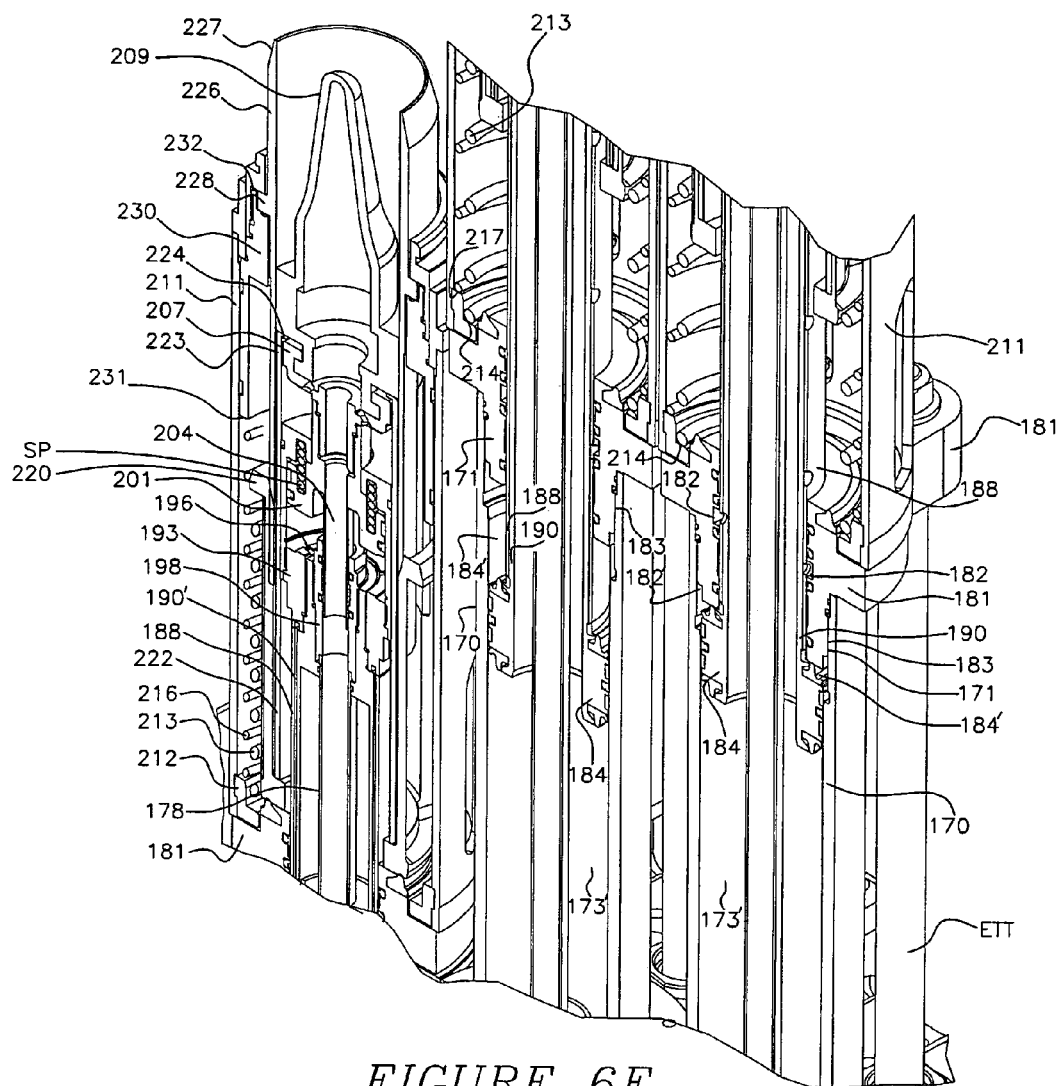
FIG. 6F is an enlarged and detailed cross-sectional view of the upper part of one position of the pressing plunger apparatus of FIG. 6C.
Figure 6G:
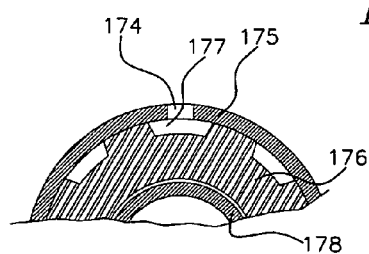
FIG. 6G is an enlarged and detailed cross-section partial plant view, of a sealing sleeve and fluid passages of the first cylinder and piston assembly of the pressing plunger apparatus of FIG. 6E.
Figure 6H:
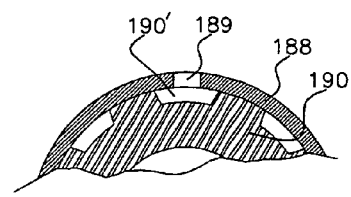
FIG. 6H is an enlarged and detailed cross-section partial plant view, of a hollow piston rod of the second cylinder and piston assembly of the pressing plunger apparatus of FIG. 6E.
Figure 61:
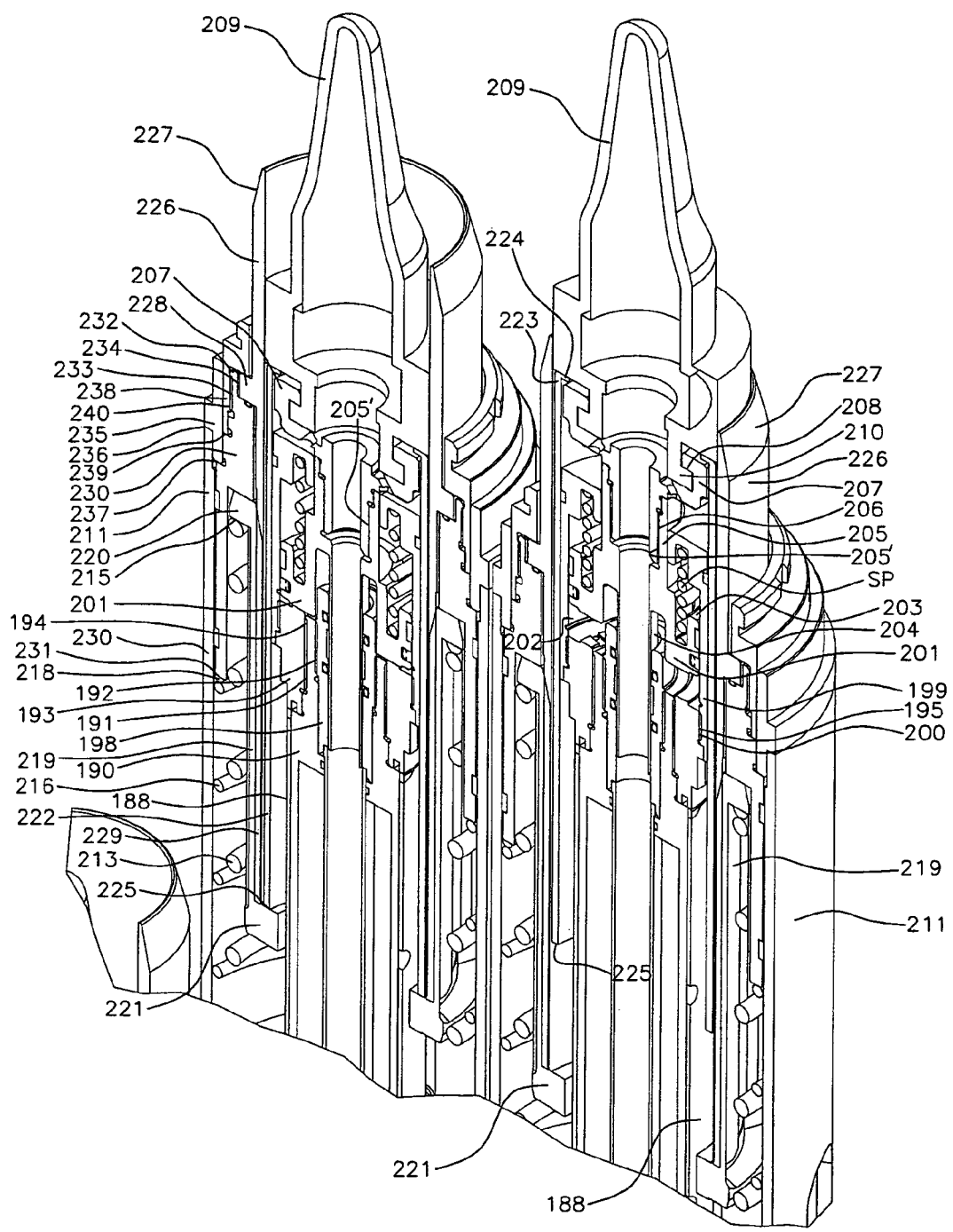
Figure 6J:
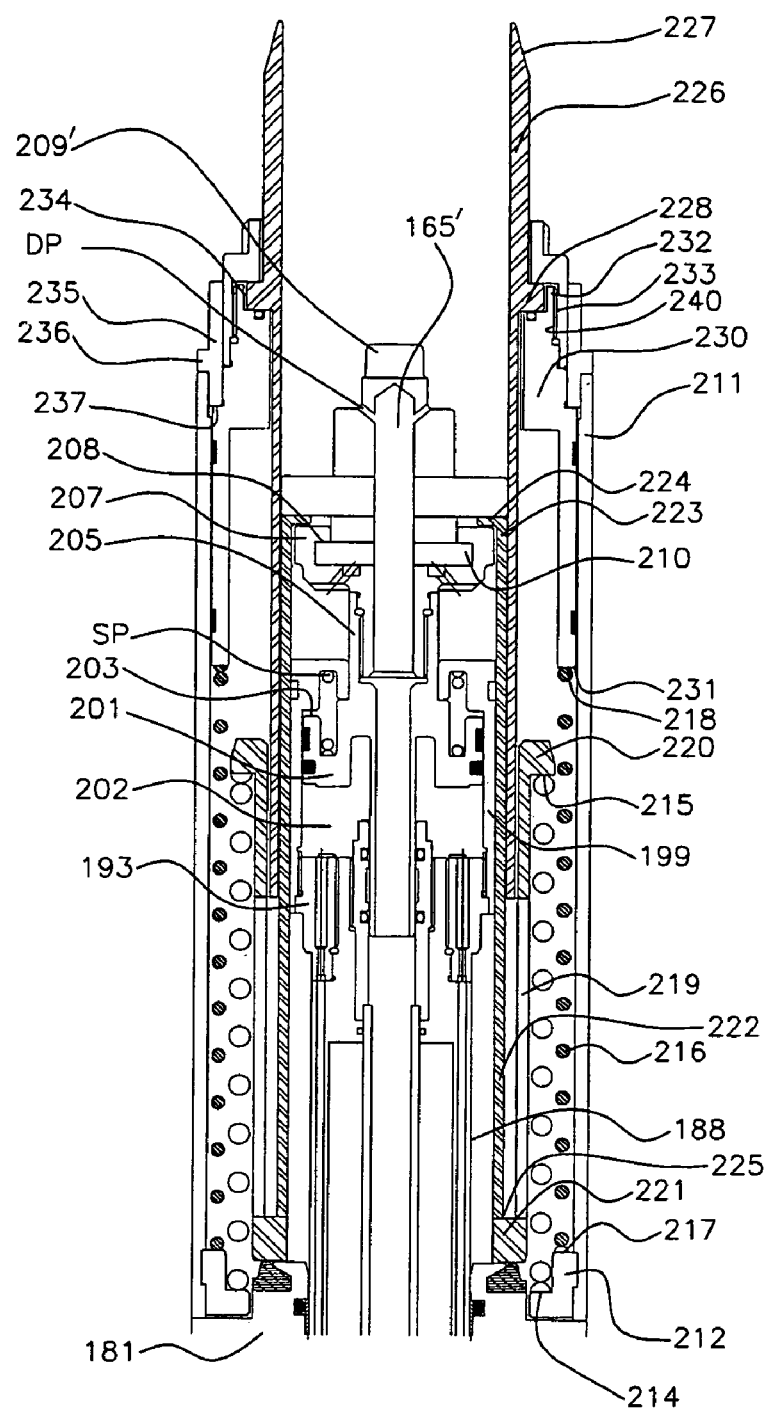
FIG. 6J is an enlarged cross-section lateral elevation view of the upper part of the pressing plunger apparatus of FIG. 6B, for a blow-and-blow process.
Figure 6L:
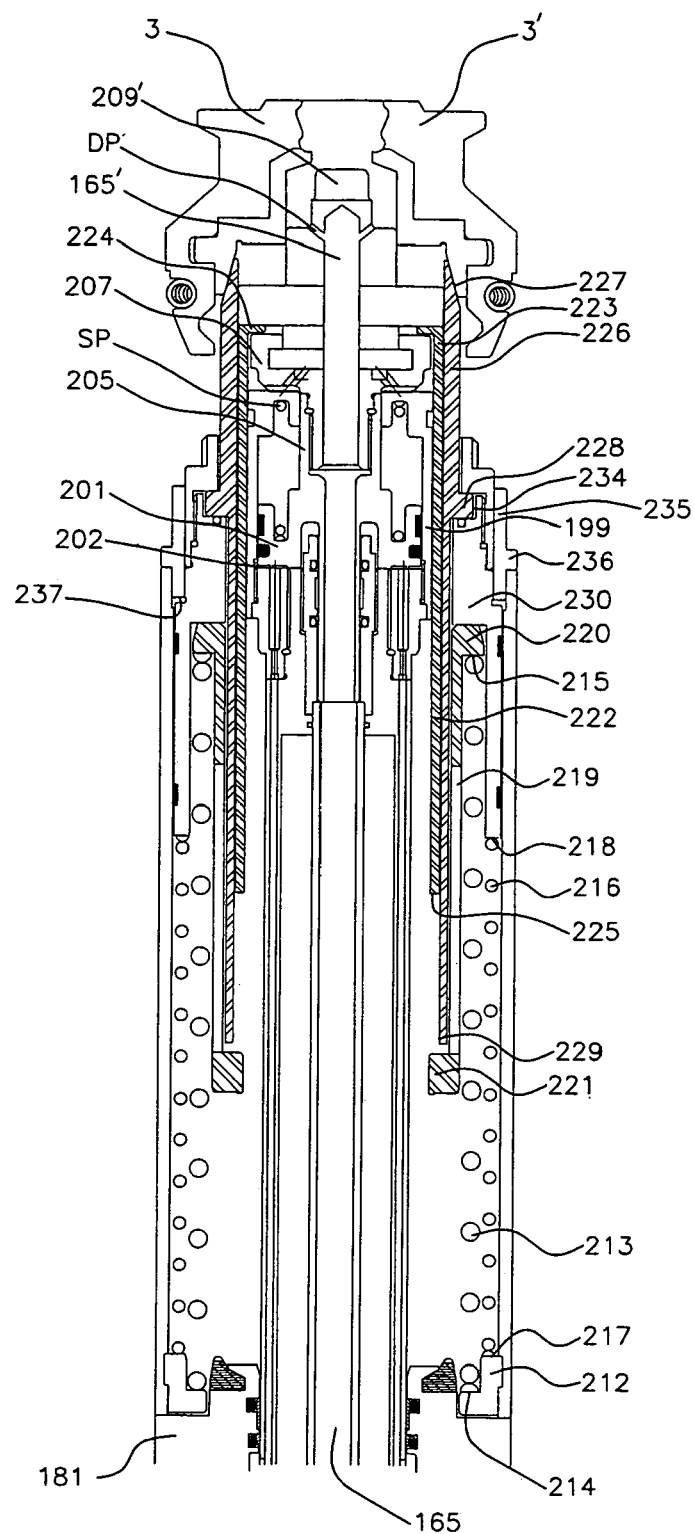
FIG. 6L is an enlarged and detailed cross-section lateral elevation view of the upper part of the pressing plunger apparatus of FIG. 6J, in a counter-blow position for a blow-and-blow process.

The blank mold opening and closing mechanism BO&C, as illustrated in FIGS. 3A to 3I, is common for both the blank mold and the blow mold, and comprising:

support frame means including a carter 20 mounted on the blank mold support frame BSF, for the case of the blank mold BM and, on the machine section frame MSF, in the case of the blow mold BLM, for placing transmission components, including: a removable bottom plate 21, 21' at each side of the bottom of the carter 20, each of which having a housing 22, 22' (only one shown at FIG. 3G) including a shouldered plain bearing 23, 23' (only one shown); and a removable cap RC (shown in FIGS. 3B and 3C) to allow assembling and maintenance of driving means and transmission means;

driving means including a fluid actuator 24 comprising a cylinder 25 horizontally retained at a side of the carter 20, including a piston 26 having a horizontal piston rod 27, to provide a back and forth movement, and a first floating cushion bushing CB surrounding the piston rod 27 at a forth stroke, and a second cushion bushing CB' coupled to the piston 26, in order to cushion the end of the back stroke of the piston 26;

first transmission means comprising a horizontal plate 28 gripped to the piston rod 27, including cylindrical rack portions 29, 29' (only one shown) at each end thereof, to be simultaneously moved back and forth by the fluid actuator 24;

second transmission means comprising a rotary operating shaft 30, 30', each of which including a lower support end 31, 31' (only one shown) mounted into the plain bearing 23, 23' of the bottom-plate 21, 21' and, near to said lower end, a pinion segment 32, 32' (only one shown), gearing the rack portions 29, 29', to provide a limited rotary movement to the shaft 30, 30', and an intermediate support portion 33, 33' (only one shown), and an upper anti-deflector support end 34, 34' to avoid deflection of the operating shaft 30, 30';

support pivoting means comprising a mounting bracket 35 mounted on the carter 20, including a hollow column 36, 36', at each side thereof, placed at the position of the shafts 30, 30' enclosing them, an intermediate internal housing 37, 37' (only one shown), lodging a plane bearing 38, 38' (only one shown) holding the intermediate portion 33, 33' (only one shown) of the shafts 30, 30', and a central conical housing 39, including an anti-sliding taper lock 40, retaining a lower end of a central post 41 in which the first and second arms 15, 15' of the blank mold holding mechanism BMHM are mounted on a wearing washer 42, to act as a pivot for said first and second arms 15, 15', and a positive stop member 43, 43' (shown in FIG. 3H) positioned by an adjustable nut and screw assembly 44, 44' to adjust the position of a toggle mechanism TM described in the following;

toggle means represented by a toggle mechanism TM comprising a connecting crank 45, 45' (shown in FIG. 3H) mounted on the upper end of the rotary operating shafts 30, 30' by means of a clamping screw CS, a pin key 47, 47' to avoid torsion displacement of the crank 45, 45', a stop member 48, 48', limiting the rotation of the crank 45, 45' by the adjustable nut and screw assembly 44, 44' of the mounting bracket 35, and a pin rod 49, 49', a connecting rod 50, 50' mounted on the pin 49, 49', and another pin 51, 51', mounted on the connecting rod 50, 50' which is in turn mounted on the arms 15, 15'; in this way, when the angle θ between the connecting rod 50, 50' and the line from the center of the rotary operating shaft 30, 30' to the center of the pin 51, 51' is near to 0°, the toggle mechanism TM provides the maximum closing force of the blank mold halves 10, 10', assured and limited by the positive stop member 43 and 43', the toggle effect can be additionally controlled by extending the longitude of the connecting rod 50, 50', in case of wearing of the first and second transmission means; and an anti-deflector plate 52 (as shown in FIG. 3G) held to the mounting bracket 35 and comprising a housing 53, 53' retaining a plain bearing 54, 54' at each end thereof, in order to avoid deflection of the upper end 34, 34' of the shaft 30, 30', and a central anti-deflector plate 55 held to the anti-deflector plate 52, including a housing 56 having a bushing 57 in order to retain the upper end of the central post 41 avoiding deflection thereof;

aligning means into said carter 20, comprising an alignment guide busing 58, 58' (only one shown) held by pressure by the carter 20, surrounding the cylindrical rack portions 29, 29' (only one shown), to align them, and a central bushing 59 surrounding an extension rod 60 of the piston rod 27, which is coupled to the plate 28, in order to guide and support the piston rod 27 during its back and forth movement; and position indicating means represented by a rotary-position indicator 61, connected at the lower end of one of the lower support end 31, to provide a feedback about the position of the shaft 30 to measure velocity, time and displacement of the opening and closing mechanism BO&C, and to synchronizing this opening and closing mechanism BO&C regarding the unidirectional indexed rotary inverting apparatus UIA.

For safety purposes, a security pin lever SEPL (shown in FIG. 3A, 3C and 3G) is introduced through a hole at the connecting crank 45' of the rotary operating shaft 30' of the opening and closing mechanism BO&C, in order to lock said blank mold halves 10, 10' avoiding that could be undesirably closed, for maintaining and tool change purposes.

Guide-Funnel Apparatus

A specific embodiment of the guide-funnel apparatus GFA illustrated in FIGS. 1A, 1B and 4A to 4D, mounted on the apparatus support frame ASF, comprising a funnel-carrier means including a funnel-carrier arm 70 supported and operated by an oscillating mechanism OSM which will be similar as for a baffle apparatus BA and of a blow head apparatus BLHA, including an annular funnel protector holder 71 to be retained, by means of clamping means represented by a clamp 72 on the funnel-carrier arm 70, and a guide-funnel 73 having mounting means represented by a mounting flange 74 (FIG. 4B) to be retained into the funnel protector holder 71, so that the oscillating mechanism OSM will oscillate the funnel-carrier arm 70 for placing the guide-funnel 73 over the blank mold BM, in coincidence with the parison forming cavities PC and PC' while the blank mold halves 10, 10' are still opened, to be ready when they are closed, for guiding a molten glass gob into the blank mold BM, and retire it once the glass gob has been fed.

Oscillating Mechanism

The oscillating mechanism OSM which, as formerly mentioned, will be similar as for the baffle apparatus BA and of a blow head apparatus BLHA by which the funnel-carrier arm 70 of the guide-funnel apparatus GFA including the guide-funnel 73, the hollow baffle-carrier arm 100 (FIG. 5A), including the baffle head 103 of the baffle apparatus BA or the hollow blow head carrier arm 390 (shown in FIG. 11A), including the blow head 393 of the blow head apparatus BLHA, is simultaneously oscillated and lowered from an upper retracted inactive position to a lower active position and, after a molten glass gob is fed, its is simultaneously lifted and oscillated to the retracted upper position; this oscillating mechanism is a "Rotolinear Oscillating Mechanism" RLM (FIG. 4A) comprising: fixed mounting means including a vertical fixed dovetail female guide 75 (FIGS. 1A and 1B) firmly held to the apparatus support frame ASF, having left hand height adjusting means (viewed from the mold side) represented by a jack mechanism 76 (FIG. 4C), retained at its lower end; and adjustable mounting means including a support dovetail male guide 77 (FIG. 4C) engaged to the dovetail female guide 75, supported by the jack mechanism 76 in order to adjust the height of this guide-funnel apparatus GFA, which is then firmly fixed to the dovetail female guide 75 by screws SF, a square male slide way 78, firmly coupled to the support dovetail male guide 77, an adjustable male cam 79 coupled to the support dovetail male guide 77, a horizontal mounting plate 80, coupled on the support dovetail male guide 77, drive means comprising a linear fluid motor 81, coupled to the horizontal mounting plate 80, having a piston rod 82, and lifting and lowering means, comprising a square "C" slide carriage 83, coupled at a lower free end of the piston rod 82, in order to be lifted and then lowered by the piston rod 82 when the linear fluid motor 81 is actuated; said square "C" slide carriage 83 including lateral, back and forth slide way bearings SWB (FIG. 4D), one of the lateral slide way bearings SWB including play adjusting means such as a bearing 84 for reducing the play of the carriage 83; oscillating means comprising said adjustable male cam 79 having a smoothly descendant curved track, adjustably coupled to the dovetail male guide 77, a vertical shaft 85 including bearings 86, 86' (only one illustrated at FIG. 4C) through which it is retained to the carriage 83 by means of semi-annular clamps 87, 87', and having a cam follower carrier 88 integrated thereto, including a pair of cam followers 89, 89' (only one illustrated) engaged to the adjustable male cam 79, which is adjusted by means of the backlash adjusting screws BAS to avoid backlash between this adjustable cam 79 and the cam followers 89, 89', to follow a combined linear and curved rotary profile; cooling means comprising a fluid sleeve 90, surrounding the upper end of the shaft 85, through which cooling air or blown air can be admitted and provided to the arm 70 of the guide-funnel apparatus GFA, or the hollow baffle-carrier arm 100 of the baffle apparatus BA, or the hollow blow mold carrier arm 390 of the blow head apparatus BLHA through a passage 91, at the vertical shaft 85, to which the arm 70 of the guide-funnel apparatus GFA, or the hollow baffle-carrier arm 100 of the baffle apparatus BA or the hollow blow mold carrier arm 390 of the blow head apparatus BLHA, is retained; and position sensor means represented by position sensors PS, PS', mounted on the support dovetail female guide 77, in order to provide positioning information for measuring and controlling of the times of the movements for mechanism synchronization.

In this way, when the linear fluid motor 81 is actuated, the piston rod 82 is simultaneously lowered and oscillated by the combination of the male cam 79, and the cam followers 89, 89' consequently lowering and oscillating the carriage 83 including the cam followers 89, 89', following the profile of the male cam 79, the funnel-carrier arm 70 of the guide-funnel apparatus GFA including the guide-funnel 73, or the hollow baffle-carrier arm 100 including the baffle head 103 or the hollow blow head carrier arm 390 of the blow head apparatus BLHA including the blow heads 393, from an upper retracted inactive position to a lower active position, and vice versa.

Baffle Apparatus

The baffle apparatus BA, as illustrated in FIG. 5A to 5I, comprising a hollow baffle-carrier arm 100 supported and operated by the oscillating mechanism OSM, mounted in turn on the apparatus support frame ASF (FIGS. 1A and 1B), and including: holding means comprised by a holder 101 for retaining a baffle holder 102, (FIGS. 5C and 5E) which is elongated for the case of a single cavity, or extended for holding an equalizing mechanism EM which is the same as for a blow head apparatus BLHA, and which will be described in the following, and a baffle head 103 having a mounting flange 104 (FIG. 5E) to be retained into the baffle holder 102 or mounted in the equalizing mechanism EM for a case of triple cavity, so that the oscillating mechanism OSM will oscillate the hollow baffle-carrier arm 100 for placing the baffle head 103 either alone or into the equalizing mechanism EM over the blank mold BM, in order to form the bottom of the parison P; and retire it once the parison P has been formed.

As in the case of the guide-funnel apparatus GFA, this baffle apparatus BA includes right hand fixed mounting means (viewed from the side mold) including a vertical fixed dovetail female guide 75 (shown in FIGS. 1A and 1B) firmly held to the apparatus support frame ASF, having height adjusting means represented by a jack mechanism 76 (FIG. 5B), retained at its lower end; and adjustable mounting means including a support dovetail male guide 77 (FIG. 5B) engaged to the dovetail female guide 75, supported by the jack mechanism 76 in order to adjust the height of this baffle apparatus BA, which is then firmly fixed to the dovetail female guide 75 by screws SF.

For a better performance of the baffle apparatus BA, a cartridge PM may be inserted in the baffle head 103 which will be in contact with the molten glass, and is manufactured by a porous material, preferably having a pore cross-section of about 0.004 in., allowing the passage of air through it, in order to provide a settlement blown, providing a static pressure to form the finished neck ring and avoid settle wave marks, in the case of a blow-and-blow process, for the molten glass gob feed to the blank mold BM, when the baffle apparatus BA is on a closed blank mold BM, and to allow the air at the space over the settled glass gob be displaced out of the blank mold BM, both in the blow-and-blow-process or the press-and-blow process, when a parison P is being formed, and allow cooling of the baffle head 103, the blank mold BM and the glass, and cleaning the baffle head 103 when it is in an upper inactive position, in this way, the porous material PM of the baffle head 103, avoids additional movements of the baffle apparatus and eliminates dead times, and allows quality improvements because the settle wave marks and baffle head marks in the bottom of the parison P is reduced.

In a further embodiment, a vacuum can be applied through the porous portion of baffle head 103 to help the parison P to be properly and faster formed into the blank mold BM. This vacuum can be provided by including a bi-directional valve (not illustrated) at the rotary shaft 103 of the rotolinear mechanism RLM of FIGS. 4A to 4D, in both blow-and-blow process and press-and-blow process.

Equalizing Mechanism

The equalizing mechanism EM which, as formerly mentioned, can be similar as for a blow head apparatus BLHA for the case of a multiple-cavity, specifically illustrated in FIGS. 5C to 5I for a triple cavity and, when it is provided for the baffle apparatus BA for a so named triple cavity machine, this equalizing mechanism EM comprising: holding means comprised by an equalizer carcass 110 including a horizontal holding body 111 coupled to the baffle holder 102 of the equalizing mechanism EM, having a central bore 112 for distributing a cooling or operating fluid; a horizontal conduit 114 (FIG. 5E) centrally integrated to the horizontal holding body 111, having a first end including a first housing 115, an intermediate portion having a central housing 117 and a second end opposed to the first end, including a second housing 119, said housings 115, 117 and 119 being positioned co-lineally to the center of each parison forming cavity PC, PC', and each housing 115, 117 and 119 including a pair of opposed depending holding skirts 120a, 120b and 120c (FIG. 5F) and the central depending holding skirt 120b including a hemi-bore 121, cooperating with a pair of clamps 122, to be coupled to the pair of holding skirts 120b, each having a hemi-bore 123 completing a holding bore for receiving a holding pin 125;

baffle-carrier means comprising a top opened central baffle-carrier 126b, and a first and a second top closed lateral baffle-carriers 126a, 126c (FIG. 5E), each baffle-carrier 126a, 126b and 126c to be placed at each housing 115, 117, 119, and comprising a vertical tubular conduit 127a, 127b and 127c each having a transversal bore 128a, 128b, 128c coinciding with the horizontal conduit 114, for fluid communication, the central vertical tubular conduit 127 including a conical flow compensator CFC to equalize the fluid regarding the other vertical tubular conduits 127a and 127c, a sealing metallic piston ring 129a, 129b, 129c sealing the housings 115, 117 and 119, to avoid leakage of cooling and/or operation fluid, and two pairs of opposed horizontal retention flanges 130a, 130b, and 130c (FIG. 5D), for providing scotch yoke-like up and down positive movements for equalizing forces and controlling the differences of height of the blank molds BM, and defining a flat retention portion 131a, 131b, and 131c between them, at each opposite side of the tubular conduit 127a, 127b and 127c to be retained by rocker arms which will be described in the following; and a perpendicular, horizontal baffle holding ring 132a, 132b, 132c (FIG. 5E) each having a peripheral "C" shaped flange 133a, 133b, 133c including cuttings 134a, 134b and 134c (FIG. 5F) for the introduction of a baffle head 103 which remains locked when turning on into the peripheral "C" shaped flange 133a, 133b, 133c, and a housing 135a, 135b and 135c for a retractable retaining piston 136a, 136b and 136c, to avoid unlocking of the baffle head 103; and rocker means comprising a first elongated rocker arm 137 (FIG. 5D) for holding the baffle-carrier 126a, comprised by a pair of similar opposed parallel elongated arms 137a, 137b integrally retained, by a first end 138, by a horizontal upper integral wall 139 and, at a second rounded fork end 140, by a vertical integral wall 141 defining a holding fork 142 for retaining the baffle-carrier 126a providing the up and down positive scotch yoke-like movement; a first bore 143 passing through both elongated arms 137a, 137b at the first end 138 and a second bore 144, 144' passing also through both elongated arms 137a, 137b, at an intermediate portion thereof, for mounting purposes;

a second short rocker arm 146 (FIG. 5D) retaining the baffle-carriers 126b and 126c, comprised by a pair of parallel arms 147a, 147b, integrally joined at an intermediate portion by an intermediate integral wall 149 (FIGS. 5D and 5I) having a bore 150 passing throughout the integral wall 149, defining a first rounded fork end 151 and a second rounded fork end 152 for retaining the baffle-carriers 126b and 126c and provide them an up and down positive scotch yoke-like movement;

this equalizing mechanism EM is assembled by firstly mounting the central top opened baffle-carrier 126b at the second rounded fork end 152 of the second short rocker arm 146; then introducing the first end 138 of the first elongated rocker arm 137 over the second short rocker arm 146; introducing the pin 153 through the first bore 143 of the first elongated rocker arm 137 and the bore 150 of the second short arm 146; loosely introducing the pins 154 and 154' through the second bore 144 and 144' of the first elongated rocker arm 137, without interfering the second rounded fork end 152 of the second short rocker arm 146; introducing the baffle-carrier 126c through the first rounded fork end 151 of the second short rocker arm 146, and the baffle-carrier 126a through the second rounded fork end 140 of the first elongated rocker arm 137; and then mounting the equalizer carcass 110 over the baffle-carriers 126a, 126b and 126c, seating the hemi-bore 121 over the pins 154, 154' to be tightened retained by the pair of clamps 122, in order to allow the first and second rocker arms 137 and 146 to be balanced on both pins 154 and 154' and pin 153.

In this way, the equalizing mechanism EM in the baffle apparatus BA, will cause that, when any of the blank molds BM or blow molds BLM (triple cavity) present an uneven (stepped) top contact surface, consequently causing that one of the baffle heads 103 or blow heads 393 will reach firstly to said uneven top contact surface, and will cause an equalizing effect which will force the remainder of the baffle heads 103 or blow heads 393 to reach to the other top contact surfaces of the remaining blank molds BM or blow molds BLM, balancing the forces, making the sum of all the forces of each baffle heads 103 or blow heads 393 equal to the total force applied by the baffle apparatus BA or the blow head apparatus BLHA, independently of the heights of the blank mold BM or the blow molds BLM.

Pressing Plunger Apparatus.

The specific and preferred embodiment of the pressing plunger apparatus PPA, as illustrated in FIGS. 6A to 6L which can be configured for a press-and-blow forming process or for a blow-and blow-forming process, in accordance with the present invention, comprising:

a first cylinder and piston assembly 160 for approaching the pressing plunger apparatus PPA to a charging position (illustrated for triple cavity), including a first cylinder 161 having a top support 161' (FIG. 6E), mounted at a fixed constant position on the floor cover FC of machine section frame MSF (FIGS. 1A and 1B), having an upper internal screwed portion 162; fluid passages 162' at the top support 161' of the upper end of the cylinder 161, for feeding operating fluid from an external source, for retracting the first annular piston 166; and a bottom end cap 163 (FIG. 6D) retained on a integral fluid network plate 164 for admission of operating fluid and cooling fluid for extending the stroke of the first annular piston 166, and a central conduit 165 for feeding cooling fluid, in the press-and-blow-process, or a counter-blow in the blow-and-blow process;

a first annular piston 166 (FIGS. 6C and 6D) having shock absorbers SAB both at its lower and upper ends, placed into the cylinder 161, defining a lower chamber 167 for extending the first annular piston 166 to a charging approaching position, and an upper chamber 168 for retracting the first piston 166 to a lower position, to allow inverting of the unidirectional rotary inverting apparatus UIA both in the a press-and-blow process or a blow-and-blow process, said first annular piston 166 having a hollow piston rod 170 acting as a second internal cylinder for a second fluid motor to be described in the following, an upper internal screwed portion 171 (FIG. 6E) and a lower integral internal bushing 172 including fluid passages 173 for feeding operating fluid;

a first fixed sealing sleeve 175 mounted on the bottom cap 163 (FIGS. 6D to 6H), for slide sealing the first piston 166 and its internal bushing 172, having a plurality of perforations 174 near to its upper end; a first fixed concentric grooved tube 176 having an internal bushing 176', and is welded to the first sealing sleeve 175 defining internal fluid axial passages 177 (FIG. 6G) communicating with perforations 174, for providing operating fluid for extending a second pressing piston 184 (described in the following) having shock absorbers SAB both at its lower and upper ends, for approaching the pressing plunger apparatus PPA to a pressing position, and a second concentric tube 178 into the first grooved tube 176, for feeding cooling air to a pressing plunger 209 (later described) in the press-and-blow process or to a short neck ring forming plunger 209' for providing a counter-blow or a vacuum in the blow-and-blow process (later described);

a first end cap rod bushing 179 (FIG. 6E) having an external screw portion 180 to be screwed to the upper internal screw portion 162 of the cylinder 161, for limiting the extended stroke of the first piston 166 and guiding the hollow piston rod 170, and passages 179' communicated with the passages 162' of the cylinder 161, for providing operating fluid for retracting the piston 166;

a second end cap rod bushing 181, (FIGS. 6E and 6F) having first fluid passages 182 for providing fluid for the extended stroke of a third final pressing piston 201 (described in the following), and second fluid passages 182', for providing operating fluid for retracting a second piston 184 (later described) at its retracted stroke at chamber 184', said fluid passages 182 and 182' being fluid fed through an external telescopic tubing ETT through said second end cap rod bushing 181, said second end cap rod bushing 181 having shock absorbers SAB at its upper end, and a lower external screw portion 183, screwed to the upper internal screwed portion 171 of the hollow piston rod 170, to be lifted by said hollow piston rod 170 when the first piston 166 is actuated to its extended stroke limited by the first end cap rod bushing 179;

a guiding sleeve 211 mounted on the second end rod bushing 181 by means of an annular bipartite retention flange 212, for guiding a release and guide member 230, and including a first internal spring 213 having a lower end 214 (FIG. 6J) abutting against the flange 212 over the second end rod bushing 181 and an upper end 215, connected with the upper external step 220, and a second external spring 216 having a lower end 217 abutting also against the flange 212 over the second end rod bushing 181 and an upper end 218 abutting against a lower end 231 of the release and guide member 230, for allowing a quick change of the piston 209 or short neck ring forming plunger 209', and cushioning and aligning a connection of a floating guide sleeve 226 with the transferable and open-able neck ring mold 1;

a pulling sleeve 219 including an upper external step 220 in which abuts the upper end 215 of the first internal spring 213, and a second internal lower step 221 for defining said charge position;

a floating guiding sleeve 226 having an external conical upper end 227 to be centered regarding the transferable and open-able neck ring mold 1, an intermediate external annular shoulder 228 and a lower end 229 which guides the plunger 209 throughout its stroke;

a release and guide member 230 having a lower end 231 abutting against the upper end 218 of the second external spring 216, and an upper end 232 having an external screw portion 233, retaining a floating housing 234 for the floating guiding sleeve 226, which can be moved in a horizontal plane but not in the vertical plane, to assure aligning with the transferable and open-able neck ring mold 1 or 2;

a retaining bushing 235 having an external annular shoulder 236 abutting against an upper end of the guiding sleeve 211 (FIGS. 6F and 6I), to be retained by screws SCW (FIG. 6A) and a annular step 237, in order to limit the stroke of the release and guide member 230; and a cap end 238 (FIG. 6I) having a first annular step 239 abutting against the release and guide member 230 defining the floating housing 234, and an internal screw portion 240 which is screwed to the external screw portion 233 of the release and guide member 230;

in this way, for mounting or demounting the pressing plunger 209 on the plunger carrier 207, and/or the variable adapting segment 222, the first, second and third pistons 166, 184 and 201 are placed at a fully extended position, and then the floating guiding sleeve 226 is fully retracted by compressing the springs 213 and 216, in order to allow access to the snap groove 208 of the plunger carrier 207;

a second cylinder and piston assembly comprising: a second charging and pre-pressing piston 184 (FIGS. 6E and 6F) slide placed into the hollow piston rod 170 of the first cylinder and piston assembly 161, having shock absorbers SAB both at its lower and upper ends of the second charging and pre-pressing piston 184, defining a lower chamber 173' and an upper chamber 184', and including a second hollow piston rod 188 having fluid perforations 189 near to its lower end, and including a second internal concentric grooved tube 190 defining fluid passages 190' connecting the fluid perforations 189 for passing operating fluid to a third final pressing piston 201 through a third end cap rod bushing 193 described in the following, when the second piston 184 is in its fully extended stroke, connecting in turn the passages 182 (FIG. 6F) of the second end cap rod bushing 181, of the first cylinder and piston assembly 161, with said fluid perforations 189 of the second hollow piston rod 188, said second hollow piston rod 188 including an upper external screw 191, to be screwed to an end cap rod bushing 193, and an upper internal screw portion 192, to be screwed to an internal bushing 198 also described in the following;

a second movable up and down concentric tube 178 sliding into the internal bushing 176' of the first cylinder and piston assembly 161, for feeding cooling air, counter-blow or vacuum to a pressing plunger 209 or short neck ring forming plunger 209' a third end cap rod bushing 193 (FIGS. 6F and 6I) at the upper end of the hollow piston rod 188 and the concentric grooved tube 190, for housing a third final pressing cylinder 199 (FIGS. 6I to 6L), and including an internal screw portion 194 (FIG. 6I) to be screwed to the upper external screw 191 of the concentric grooved tube 190, and an external screw portion 195 to be screwed to an internal screw portion 200 of a third final pressing cylinder 199 of the third final pressing piston 201 described in the following; a fluid passage 196, coinciding with the passages 190' defined by the concentric grooved tube 190 and the hollow piston rod 188, and an internal bushing 198 for guiding the lower piston rod 204 of a third final pressing piston 201 (both described in the following), so that when this second cylinder and piston assembly is fully extended, place the pressing plunger 209 at a partial pressing position; and a third final pressing cylinder 199 having a lower internal screw portion 200 to be screwed to the external screw portion 195 of the end cap rod bushing 193, which in turn defines a chamber 202; and a third cylinder and piston assembly, comprising: a cylinder 199 having a lower internal screw portion 200 to be screwed to the external screw portion 195 of the end cap rod bushing 193 of the second cylinder and piston assembly, which in turn defines a chamber 202;

a third final pressing piston 201 (FIGS. 6F to 6L) placed into the third final pressing cylinder 199, defining a lower chamber 202 under the piston 201, to be actuated by actuating fluid to the final pressing position, and an upper chamber 203 over the piston 201, and having a spring SP for retracting the final pressing piston 201, a first lower piston rod 204 guided by the internal bushing 198, and an upper hollow piston rod 205 including an internal screw portion 206 for a purpose letter described;

a plunger carrier 207 mounted on the upper hollow piston rod 205 having an internal screw portion 206 screwed to the external screw portion 205' of the third final pressing piston 201, comprising an inner snap groove 208 to retain a pressing plunger 209 for a press-and-blow process or short neck ring forming plunger 209' for the blow-and-blow process, and including a lower external screw portion 205', to be screwed to the internal screw portion 206 of the upper hollow piston rod 205;

a pressing plunger 209, for a press-and-blow process, having a holding flange 210 to be introduced through the snap groove 208 of the plunger carrier 207 in order to be retained thereby;

a variable adapting segment 222 (FIGS. 6I to 6L) having an upper end 223 including a semi-annular shoulder 224 having a recess 224' (shown at FIG. 6Ka), retained between the plunger carrier 207 and the pressing plunger 209 or short neck ring forming plunger 209', of this third cylinder and piston assembly, and a lower end 225 abutting against the second internal step 221 of the pulling sleeve 219 of this third cylinder and piston assembly, this variable adapting segment 222 pulls downwardly the pulling sleeve 219 of said cylinder and piston assembly when the piston rod 188 of the second cylinder and piston assembly is retracted, compressing the spring 213, of the first cylinder and' piston assembly, for preparing the inverting movement of the unidirectional rotary inverting apparatus UIA to take place; the recess 224' of the semi-annular shoulder 224, allows a rapid change of the pressing plunger 209 or short neck ring forming plunger 209', as well as the same variable adapting segment 222, by pushing down the floating guiding sleeve 226, to release the pressing plunger 209 or short neck ring forming plunger 209' for a charge position adjustment by varying the length of this variable adapting segment 222;

for a press-and-blow process, in an inactive position, this parison forming apparatus, is in a retracted position maintaining the pressing plunger 209 in a position allowing an inverting path of the unidirectional rotary inverting apparatus UIA and, by the effect of the operating fluid fed to the lower chamber 167 under the first piston 166, simultaneously releasing the fluid from the upper chamber 168 of the first piston rod 170, from the upper chamber 184' of the second piston rod 188, and from the chamber 202 of the third pressing piston 201, and therefore the first internal spring 213 is extended, pulling the variable adapting segment 222, and the spring SP is also expanded, in order to place the pressing plunger 209 at a charging position;

then, once the glass gob has been fed into the blank mold BM and the baffle apparatus BA is placed at the top of the blank mold BM, operating fluid is fed to the lower chamber 173' under the second piston 184, placing it at a fully extended position and automatically connecting the passage 182 of the second end cap rod bushing 181 with the perforations 189 of the hollow piston rod 188 and of internal concentric-grooved tube 190 for feeding operating fluid to the third final pressing piston 201, when decided, so that the pressing plunger 209 is placed at its parison forming position; and finally, once the parison P has been finished, the first, second and third pistons 165, 184 and 201 are simultaneously retracted to its initial position for a new parison forming cycle;

for a blow-and-blow process, the pressing plunger 209 is a short neck ring forming plunger 209' (FIGS. 6J to 6L), including a central passage 165' connecting with the central conduit 165, and a plurality of diagonal passages DP at about 45° regarding the central passage 165', leading to a side of the short neck ring forming plunger 209', so that once the first and second pistons 166, 184 are placed at a fully extended position, the short neck ring forming plunger 209' is placed at a charging and forming position, in sealed abutment against the transferable and open-able neck ring mold 1, due to the fluid pressure at the chamber 202 and third pressing piston 201, and introducing the short neck ring forming plunger 209' into the cavity of the transferable and open-able neck ring mold 1 for receiving a molten glass gob, and then by feeding operating fluid to the chamber 202, will cause that the flange piston FP of the short pressing plunger 209' will be in sealing contact with the neck ring mold halves 3,3' or the one-piece annular guide 5 in order to allow a vacuum be applied through the diagonal passages DP and through the passage 165 and 165' to fill the transferable and open-able neck ring mold 1 with the glass gob; and then the operating fluid is released from the lower chamber 202 under the third pressing piston 201, extending the spring SP and the short neck ring forming plunger 209' is retracted, allowing a counter-blow fluid passing through the diagonal passages DP, for finishing the parison P; and finally, once the parison P has been finished, the first, second and third pistons 166, 184 and 201 are simultaneously retracted to its initial position for a new parison forming cycle.

By using a three-positions directional valve (not illustrated), said central passage 165' may provide both a positive or negative pressure, so that, for a blow-and-blow process, the short neck ring forming plunger 209' at a charging position, may firstly provide a vacuum through the central passage 165' and diagonal passages DP, in order that the glass gob completely and rapidly fills the transferable and open-able neck ring mold 1, in addition to the settle blow provided by the baffle head 103 of the baffle apparatus BA, and then, when the piston 201 is retracted, the three-positions directional valve changes to positive pressure providing a counter-blow to form the parison P, and in a third position, said three-positions directional valve is under neutral inactive position.

For a convenience, an horizontal elongated nozzle NZ (shown at FIG. 6A), mounted on the top support 161' of the first cylinder 160, provides a horizontal compressed air curtain in order to avoid that contaminant dust particles, glass chips or grease fall down to the pressing plunger 209 or short neck ring forming plunger 209'.

Unidirectional Rotary Inverting Apparatus

Figure 7B:
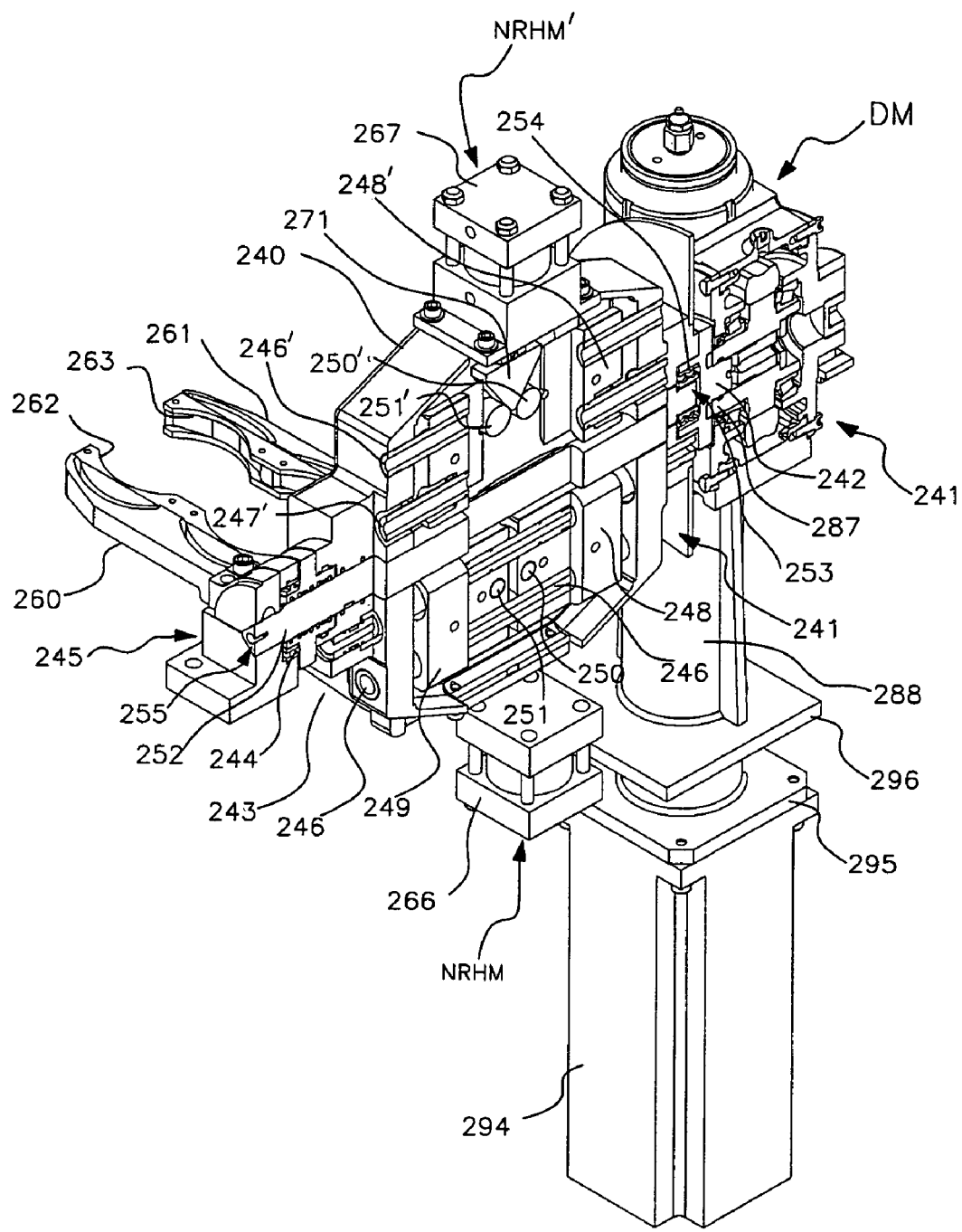
FIG. 7B, is a perspective three-dimensional elevation view, in partial cross-section, of the unidirectional inverting apparatus, showing its internal driving components, shown from the blow mold side or so named "cold side"
Figure 7C:
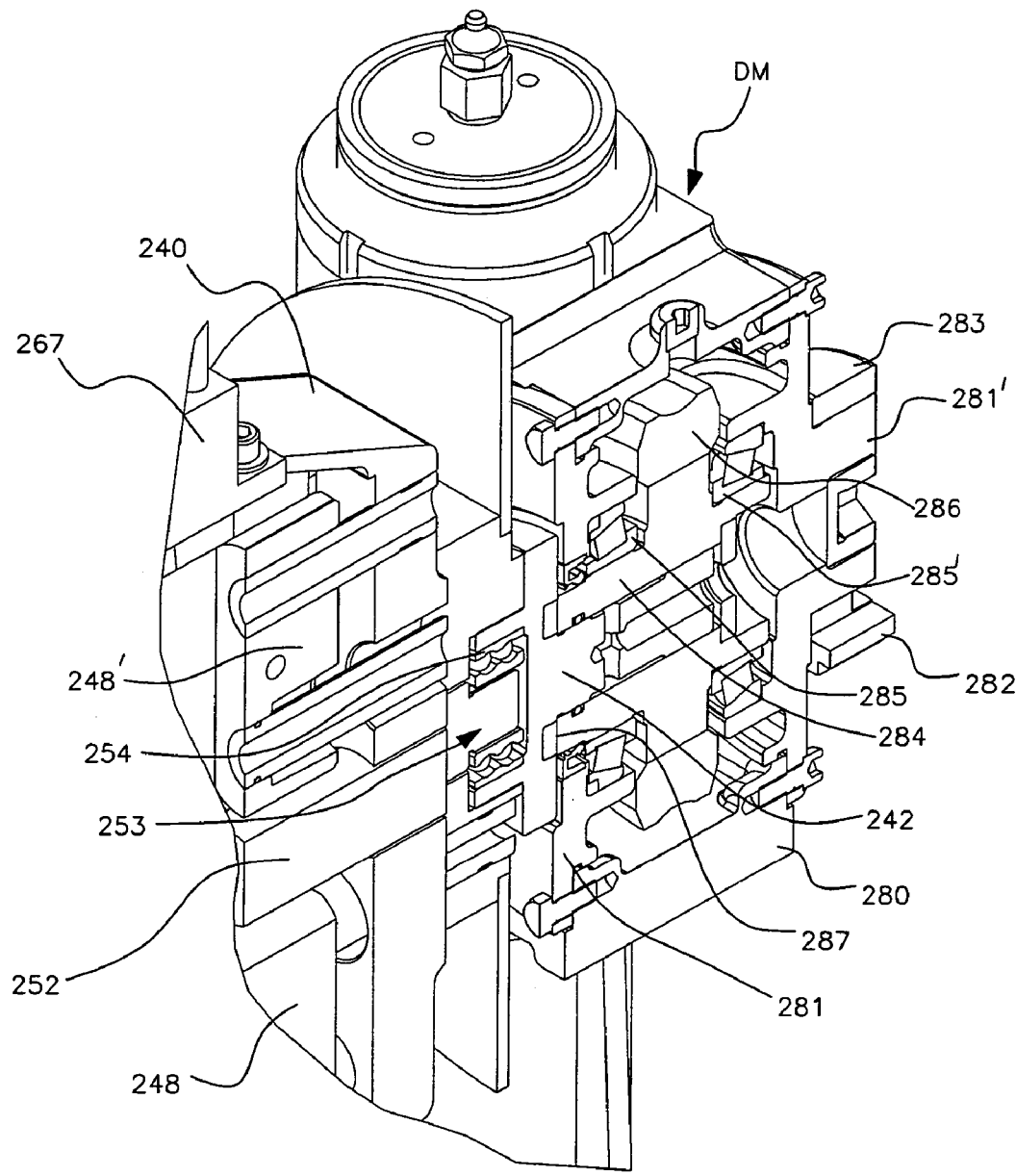
FIG. 7C is an enlarged and detailed cross-section perspective view of a right end of the unidirectional inverting apparatus of FIG. 7B.
Figure 7D:
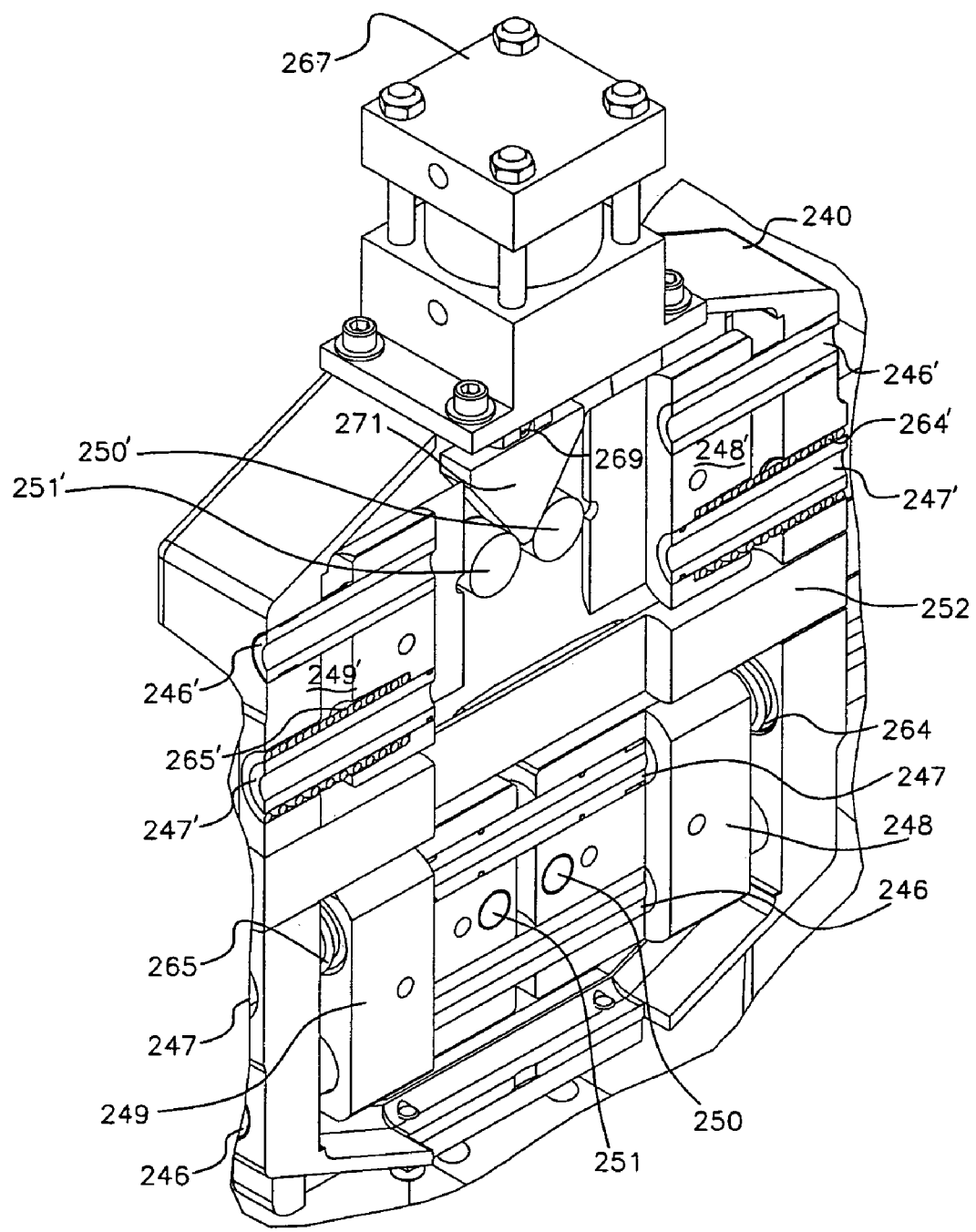
FIG. 7D is an enlarged and detailed cross-section perspective view of the central portion of the unidirectional inverting apparatus of FIG. 7B.
Figure 7E:
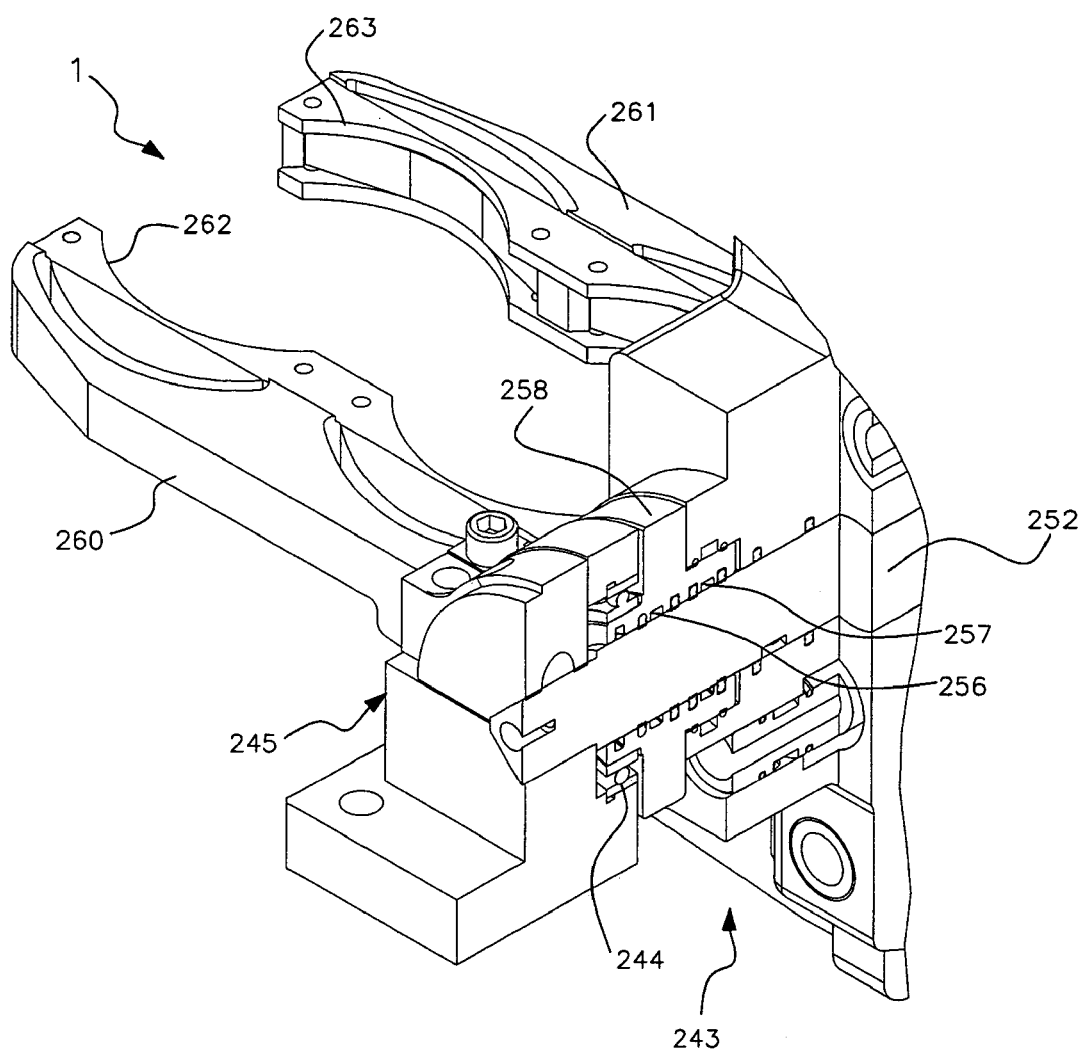
FIG. 7E is an enlarged and detailed cross-section view of the left end of the unidirectional inverting apparatus of FIG. 7B.

An specific and preferably unidirectional rotary inverting apparatus UIA, in accordance with a specific embodiment of the present invention, as illustrated in FIGS. 7A to 7E, is servo-controlled, is mounted on the apparatus support frame ASF, and comprising:

a rotary support driving mechanism comprised by rotary carcass 240, to contain and support, outside of the horizontal rotary axis, a neck ring mold holding and releasing mechanism NRHM, and NRHM' (described hereunder) for each of the neck ring holding arms 260,

261, 260', 261', having a first lateral end 241 including a power shaft 242 (FIG. 7B) coupled to a power output coupling 287 of a driving mechanism DM which will be described in detail in the following, to be unidirectional indexed rotated thereby firstly 180° clockwise (moving the parison upwardly constricting it) or counterclockwise (moving the parison downwardly stretching it) and then additional 180° completing a 360° turn, and a second opposed lateral end 243 supported by a bearing 244 which in turn is supported on a clamping support 245 supported on the apparatus support frame ASF to allow unidirectional indexed rotation of said rotary carcass 240; a first pair of mounting guides 246 and 247 and a second pair of mounting guides 246', 247' diametrically opposed at 180° to the first pair of mounting guides 246 and 247, each of which are horizontally retained, parallel to the rotation axis, by the rotary carcass 240, in order to parallel open and closing the neck ring holding arms 260, 261, 260', 261'; a first pair of sliding neck ring arm holders 248 and 249 assembled opposed face to face, slide mounted on the first pair of mounting guides 246, 247, and a second pair of sliding neck ring arm holders 248', 249' also assembled opposed face to face, slide mounted on the second pair of mounting guides 246', 247', which is placed-opposed 180° to the first pair of sliding neck ring arm holders 248, 249; each of the neck ring arm holders 248, 249 and 248' and 249' include a cam follower 250, 251, and 250' and 251' retained near to the opposite internal faces thereof for purposes later described; and a central fixed axis 252, axially passing through the rotary center of the carcass 240, for providing actuating fluid to single action fluid motors 266, 267, and having a first end 253 which is supported by the power shaft 242 by means of a bearing 254, and a second end 255, supported and clamped by the clamping support 245; and a pair of passages 256, 257 (FIG. 7E) connected to a source of actuating fluid, as a rotary union 258, to provide operating fluid to said single action fluid motors 266, 267;

a first pair of neck ring holding arms 260, 261, and a second pair of neck ring holding arms 260', 261', respectively coupled to the slide neck ring arm holders 248, 249 and 248' and 249'; each of the neck ring holding arms 260, 261 and 260', 261', including a semi-annular holding flange 262, 263, and 262', 263' (FIG. 7A), to retain the transferable and open-able neck ring molds 1 and 2 by its flange F1, F1' (shown at FIGS. 2A and 2B), a semi-annular retaining flange RF, RF' (also shown at FIGS. 2A and 2B) under the semi-annular holding flanges 262, 263 and 262', 263', in order that the neck ring holding arms 260, 261 retain the transferable and open-able neck ring mold 1 when they are closed, during the inverting action; an elongated spring iron band IB, IB' each having a central flat face CFF and two inclined end faces IEF, each finishing in an end flexible "V" shaped position limiter SPL and are retained by pins PI (shown at FIGS. 2A and 2B) between the annular holding flanges 262, 263 and 262', 263' and the semi-annular retaining flange RF, RF', in order to align the neck ring mold halves 3, 3', retained assembled by the annular spring 4 (FIG. 2B), by their two plane angular faces PAF1, PAF1', to avoid misalignment regarding the partition line of the blank mold BM; the first pair of neck ring holding arm, 260, 261 retain the first transferable and open-able neck ring mold 1 at a so called fixed blank mold "zero-line" OB (FIG. 7A) while the second pair of neck ring holding arms 260', 261' retains the second transferable and open-able neck ring mold 2, placed at the so called fixed blow mold "zero-line" OM, both displaced downwardly and upwardly from the central axis of said arms, so that as shown in FIG. 7A, said stepped fashion allows to include blank molds BM having different lengths, without the necessity to adjust the location of the blank mold apparatus BMA and maintaining a gravity center of a formed parison P with a controlled centrifugal force during the inverting action; and a neck ring mold holding and releasing mechanism NRHM, and NRHM' (FIGS. 7A, 7B and 7D) comprising a first pair of springs 264, 265 each of which is mounted around an end of the mounting guides 247 abutting against each end of the rotary carcass 240 and against an external face of each of the sliding neck ring arm holders 248 and 249, and a second pair of springs 264' and 265', each of which is similarly mounted around an end of the mounting guide 247' abutting against each end of the rotary carcass 240, and against an external face of the second pair of sliding neck ring arm holders 248', 249', in order to keep said first and second pairs of neck ring arm holders 248, 249 and 248', 249' and, consequently, said first and second pairs of neck ring holding arms 260, 261, and 260', 261', normally closed by the pushing force of said springs 264, 265 and 264', 265', in a position wherein the transferable and open-able neck ring mold 1 is retained at the parison forming station PFS (as shown in FIG. 1); and a pair of single action fluid motors 266, 267, each of which is respectively mounted at an upper and a lower end of the carcass 240, and each including a piston rod 268 (not shown) and 269 respectively having a two-tapered-face cam 270 (not 20 shown) and 271 maintaining in contact said normally closed cam followers 250, 251 (not shown) and 250' and 251', aligned regarding the central union line of the blank mold BM or the blow mold BLM, to be introduced between each pair of cam followers 250, 251 (not shown) and 250' and 251', in order to uniformly and simultaneously open the neck ring holding arms 260, 261, and 260', 261', overcoming the pushing force of the springs 264, 265, and 264', 265', which, by the action of the single action fluid motors 266, 267, release the transferable and open-able neck ring mold 1 or 2 at the intermediate station IRS (shown in FIG. 1), and, when the fluid is released from the single action fluid motors 266, 267, the neck ring holding arms 260, 261, and 260', 261', are closed by the action of the springs 264, 265 and 264', 265';

in this way, the first pair of neck ring holding arms 260, 261 gripping a first transferable and open-able neck ring mold 1 holding a parison P, is firstly rotated 180° clockwise (moving the parison upwardly constricting it) or counterclockwise (moving the parison downwardly stretching it), to place the parison P held by the first transferable and open-able neck ring mold 1 or 2 at the intermediate reheat station IRS, releasing the transferable and open-able neck ring mold 1 by opening said neck ring holding arms 260, 261, and 260', 261' by means of the two-tapered-face cam 270, while the second pair of neck ring holding arms 260', 261' with the second transferable and open-able neck ring mold 2 is simultaneously placed under the blank mold BM to form a second parison P, and then, when the first pair of neck ring holding arms 260, 261 receive back the empty transferable and open-able neck ring mold 1, it is able to be turned back to the parison forming station PFS by unidirectional rotating said first pair of neck ring holding arms 260, 261 other 180°, completing a 360° turn, for another parison forming cycle; and a driving mechanism DM, illustrated in FIGS. 7A to 7C which, as previously mentioned, it is similar in configuration as the driving mechanism for the transference apparatus BCTA, and for the take out apparatus BCTOA and will be described in the following.

Furthermore, to allow the feasibility to provide cooling for the transferable and open-able neck ring molds 1 or 2, for single or multiple cavities, the neck ring holding arms 260, 261 and 260', 261' include internal cooling passages ICP and ICP' (FIGS. 2A and 2D) having a nozzle NZN and NZN' to provide a courting of cooling fluid directed to the external surrounding wall of the neck ring mold halves 3, 3'.

Driving Mechanism

The above referred driving mechanism DM (FIGS. 7B and 7C), which can be selected from an existing one, such as that patented and manufactured by Winsmith Inc., and which, in a preferred embodiment which includes some novel features in accordance with the glassware forming machine of the present invention, as illustrated in FIG. 7C, allows to be standardized for the transference apparatus BCTA and for the take out apparatus BCTOA, and comprising: a carcass 280 including two lateral caps 281, 281', one at each side thereof; said lateral cap 281' having a double keyway KW, KW' (shown in FIG. 7A) opposed 180° one another, and a support plate 282 having a keyway KWS which will be placed at a position depending on the mechanism in which this driving mechanism is mounted, said support plate 282 is mounted on the apparatus support frame ASF by means of a semi-annular clamp 283; a horizontal axis 284 supported by bearings 285 and 285' to the lateral caps 281, 281', and including a slow speed gear 286, having a power output coupling 287, which is to be coupled to the power shaft 242 for transmission of the output power of this driving mechanism DM; a sleeve 288 (FIG. 7A) coupled on the carcass 280, including a high speed extension shaft 289 (FIG. 7A) into said sleeve 288, having a worm gear 290 at its lower end, gearing with the slow speed gear 286, which is provided with an anti-backlash mechanism 292 (patented and manufactured by Winsmith Inc), for reducing velocity and transmit power to said unidirectional rotary inverting apparatus UIA, or to said transference apparatus BCTA, or to said take out apparatus BCTOA; a flexible couple 293 at the lower end of the high speed extension shaft 289 for retiring the servomotor 294 from the heat zone of the parison P; and a rotary servomotor 294 (FIG. 7A) for rotating the shaft 289, by means of the flexible couple 293, and supported by a frame 295 at the lower end of the sleeve 288; and a flange 296 at an intermediate position of the sleeve 288, to avoid vibration of the whole structure.

In this way, the double keyway of the lateral cap 281', allows this driving mechanism DM to be placed on a 180° opposed position to be mounted at the transference apparatus BCTA or the take out apparatus BCTOA without internally disassembling the driving mechanism DM.

Transference Apparatus

The preferred and specific embodiment of a transference apparatus BCTA, to transfer a parison P held by a transferable and open-able neck ring mold 1 or 2, describing a curvilinear translation path, from the unidirectional rotary inverting apparatus UIA at the blow mold "zero-line" OM at the intermediate station IRS to the blow forming station BFS, in accordance with the present invention, is represented by a servo-controlled bi-directional curvilinear transference apparatus BCTA, generally illustrated in FIGS. 8A to 8F, comprising:

a support bench 300 mounted in turn on the apparatus support frame ASF, including a pair of semi-annular clamps 301, 301' in an end 302 of the support bench 300, and a further semi-annular clamp 303, in a second end 304 of the support bench 300, in order to hold both the bi-directional curvilinear transference apparatus BCTA and the driving mechanism DM which has a configuration similar to that of the unidirectional rotary inverting apparatus UIA already described, for the actuation of said bi-directional curvilinear transference apparatus BCTA;

an oscillatory hollow arm 305, comprised by two arm halves 306, 306' assembled opposed face to face, defining an internal chamber 307 (FIGS. 8B, and 8C), and interconnected fluid passages FLP1, FLP2 (FIG. 8C), and having a first end 308 retained by a rotary seal carrier union RSCU which in turn is supported, by means of a bearing 309, by the support bench 300 and clamped by the semi-annular clamp 301', and having a power shaft 310 identical to the power shaft 242 of the unilateral rotary inverting apparatus UIA, coupled to the arm halve 306', to be coupled to the power output coupling 287 of the driving mechanism DM for this transference apparatus BCTA, defining the rotary axis for the oscillatory hollow arm 305, in order to be oscillated 180° for a servo-controlled path from the intermediate station IRS, to the blow forming station BFS, return to the intermediate station, and then it is lifted at a position of about 90° awaiting for a next cycle, and a fixed axis 311, supported and clamped by the semi-annular clamp 301 and by the power shaft 310 by means of a bearing 309', and including a fixed gear 312; an idle gear 313, gearing the fixed gear 312, and which is comprised by two gear halves 314, 314' assembled opposed face to face shifted from each other, by means of adjusting screws AS, to adjust backlash, retained into the internal chamber 307 by means of bearings 315, 315' (FIG. 8D), defining an intermediate idle axis 316; and a second end 317, including an axis 318 retained by a bearings 319, 319', into said second end 317 of the oscillatory hollow arm 305 including a synchronizing gear 320, gearing with the idle gear 313, which is clamped to the axis 318; an inverted U-shaped oscillating support 321 (FIGS. 8E and 8F), having two lateral walls 321a and 321b, each having a semi annular sliding recess RS, RS' to be freely mounted at both ends of the axis 318, and retained by means of corresponding semi-annular clamp 322, 322', so as to freely oscillate on the axis 318, the wall 321b of said U-shaped oscillating support 321 has an external mounting face 323 including shaft housings 324, 324' for the purpose explained in the following, said U-shaped oscillating support 321, when the hollow arm 305 rotates on the fixed axis 311, this U-shaped oscillating support 321 is maintained at the same horizontal orientation during the whole rotation of the oscillatory hollow arm 305, describing a curvilinear translation path due to the idle gear 313 and the synchronizing gear 320; said semi annular clamp 322 having a transmission tong TT including two opposite conical pilot guides PG, and cooperates with an upper semi annular clamp USC and a lower semi-annular clamp LSC both clamped on the axis 311, said lower semi-annular clamp LSC having two spaced legs L1, L2 defining a space between them in which the transmission tong TT of the clamp 322, is placed and held by adjusting conical-ended screws ASH, ASH' in sad space legs L1, L2 introduced into the conical pilot guides PG of the transmission tong TT, in order to allow adjusting of the horizontal position of said U-shaped oscillating support 321, firstly by loosing and then tighten the semi annular clamp 322', to be parallel to the upper surface of the blow mold BLM, by means of said adjusting screws ASH, ASH', and avoid lateral displacement thereof by means of the conical ends of the screws ASH, AS' and the conical pilot guides PG;

a parison transference mechanism PTM (FIGS. 8A, 8B and 8E), comprising a two-positions opening mechanism TFC coupled to the face 323 of the oscillating support 321, comprising a carcass 325, having a pair of parallel mounting guides 326 and 326', horizontally retained into the carcass 325, having the same orientation as the axis 318, and by the housings 324, 324' of the oscillating support 321; a pair of carrier holders 327, 327', slide mounted on the pair of mounting guides 326, 326'; each of the carrier holders 327, 327' include a cam follower 328, 328', retained near to the opposite internal faces thereof;

two pairs of springs 329, 329', 330, 330' each pair mounted around an end of each of the mounting guides 326, 326', abutting against the rotary carcass 325 and against an external face of each of the carrier holders 327, 327' in order to keep said carrier holders 327, 327' normally closed by the pushing force of said springs 329, 329' and 330, 330'; and a pair of holding finger arms 331, 331' coupled to the carrier holders 327, 327', including a pair of gripping fingers 331a and 331b, which consequently are in a position normally closed;

a two-positions actuating fluid motor 332, mounted on the carcass 325, comprising: a cylinder 333, including an upper cap 334 having a guiding hole 335, a fluid passage 333' and a lower cap 336 also having a guiding hole 337; a first limiter step 338 at the upper cap 334, and a second limiter step 339, in the lower cap 336; a first piston 340 into the cylinder 333 defining an upper chamber UC between the upper cap 334 and the piston 340, and a lower chamber LC under the cylinder 333, and having a first upper piston rod 341 passing through the guiding hole 335 of the upper cap 334, having adjusting nuts 342, 342', for adjusting the stroke of the first piston 340; and a second hollow piston rod 343 having a plurality of fluid transference passages PT in order to communicate the actuating fluid form the lower chamber LC to an upper chamber SUC over a second piston 345, placed into the hollow piston rod 343; a second piston 345, placed into the hollow piston rod 343, having a piston rod 346 including a connecting rod 347 having two-tapered-face cams 348, 348'.

In this way, when the first piston 340 is firstly actuated by feeding actuating fluid through a fluid passage 344 at the upper chamber UC of the cylinder 333, runs downwardly to a stroke limited by the adjusting nuts 342, 342' abutting against the first limiter step 338, and pushes downwardly the second piston 345 at a first stroke maintained by the force of the springs 329, 330 and 329' and 330' and by the fluid pressure on the upper chamber UC to uniformly and simultaneously open the holding finger arms 331, 331' for holding and handling a transferable and open-able neck ring mold 1 or 2; then when fluid is admitted through to the passage 333' to the lower chamber LC, this in turn is communicated through the fluid transference passages PT to the second upper chamber SUC so that the second piston 345 reaches to its fully extended stroke to uniformly and simultaneously open the transferable and open-able neck ring mold 1 or 2 retained by the holding finger arms 331, 331', releasing the parison P to vertically fall flat at a blow mold BLM; and finally when the fluid from the chamber SUC is released, the springs 329, 330 and 329', 330' return the piston 345 holding the transferable and open-able neck ring mold 1 or 2 closed, by an annular tension spring 4 (shown in FIGS. 2A to 2E) to be turned by this servo-controlled bi-directional curvilinear transference apparatus BCTA, back to the intermediate station, and lifting the empty gripping fingers 331a and 331b at a about 90°, position, waiting for a following cycle.

Blow Mold Apparatus.

The blow mold apparatus BLMA, may also be selected from an existing one in the commerce, however, to achieve the interchangeability characteristic both in the same section machine and as a machine section at the whole machine of multiple-sections, as well as to achieve a high speed and smooth operation, and a high reliance on the closing and heat dissipation abilities, in the following it is described a preferred embodiment of the blow mold apparatus BLMA, in accordance with the present invention, for triple cavity, generally illustrated in FIGS. 9A to 9F.

Furthermore, as this mechanism is similar as the blank mold apparatus BMA in all its component pieces, in the following, only the specific characteristics will be described, by referring to their specific reference symbols shown in the enclosed drawings, and comprising: a blow mold BLM, for forming a finished glassware article, once a finished parison P has been feed thereto, and including: two similar blow mold halves 350a, 350b assembled opposed face to face, each including a mold wall BLW, BLW', a plurality of axial passages APM, APM' for cooling the blow mold halves 350a, 350b, a forming mold cavity MC, MC' and a holding flange 351a, 351b (FIG. 9B), to be mounted in a mold holding mechanism MHM; and a "T" shaped sliding valve SV, in a similar disposition as the blank molding apparatus BMA, but, in this case, it is mounted on the machine support frame MSF, for providing cooling fluid to the blow mold halves 350a, 350b by means of the ducts 358 and 358' (only one shown), from the floor cover FC of the machine support frame MSF during the whole path of the opening and closing operation of the blow mold BLM.

A. Mold Holding Mechanism.

In the same way as above, the mold holding mechanism MHM, illustrated in FIGS. 9A to 9F mounted on the machine section frame MSF, is entirely similar as the blank mold holding mechanism BMHM already described at FIGS. 3A to 3L above, having the same dimensions and geometry, except for, in a triple cavity machine, in the first single blow mold holder 356a and 356a' it is respectively mounted a blow mold halve 350a and 350b and in a dual blow mold holder 356b and 356b' there are respectively mounted two blow mold halves 350a and 350b, so that the blow mold halves 350a and 350b can be uniformly closed with a similar closing force; as well as the cooling nozzles 357, 357' placed at a variable height, for directing cooling fluid into axial passages APM, APM' practiced at the wall of each of the blow mold halves 350a, 350b which is interchangeably in accordance with the dimensions of the glassware article to be produced.

Similarly the equalizing means of the blank mold holding mechanism BMHM, a second embodiment for the arrangement of these equalizing means, can be providing a single blow mold holder, say 356a, facing against a mold holder of a dual blow mold holder, say 356b', and vice-versa.

In the same way, a third more economic embodiment, these equalizing means can include a single blow mold holder 356a and a dual blow mold holder 356b, both facing against a trial blow mold holder (not shown), so that the effect that the blow mold halves 350a, 350b be uniformly closed with a similar closing force, is achieved by the single and dual blow mold holders 356a, 356b and vice-versa.

B. Mold Opening and Closing Mechanism.

The mold opening and closing mechanism MO&C, for opening and closing the blow mold halves 350a, 350b, shown in the same FIGS. 9A to 9F, mounted on the mold holding mechanism MHM, has entirely the same configuration as the blank mold opening and closing mechanism BO&C illustrated in FIGS. 3A to 3L already described above, and operates in the same way.

For safety purposes, a security pin lever SEPL is introduced through a hole at the connecting crank 45' of the rotary operating shaft 30' of the opening and closing mechanism MO&C, when the blow mold halves 350a and 350b are open, in order to lock said blow mold halves 350a and 350b avoiding that they could be undesirably closed, when they are handled for maintaining and tool change purposes.

C. Bottom Mold Plate Mechanism

The bottom mold plate mechanism, may also be selected from an existing one in the commerce, however, to similarly achieve the interchangeability characteristic both in the same section machine and as a machine section at the whole machine of multiple-section, as well as for providing the feasibility for using vacuum in order to reduce the blow time of the blow head, in the following it is described a preferred embodiment of the bottom mold plate mechanism BPM, in accordance with the present invention, for a triple cavity machine, illustrated in FIGS. 10A to 10E, and comprising: a mounting block 360, mounted on a floor cover FC (FIG. 1B) of the machine section frame MSF, including a first vertical passage 361 (FIG. 10C) passing throughout the block 360, for providing a vacuum pressure; a central passage 362 for the purpose below described; and a vertical cooling fluid passage 363a 363b at each side of the passage 362, each of said passages 361, 363a and 363b including sealing rings 364c, 364a and 364b; and a housing 365 centered at the top of the passage 362 for housing a mechanical jack 366; a mechanical jack 366, placed into the housing 365, including a protection sleeve 367 which is contained into the central passage 362, containing the jack actuating mechanism (not shown) and a lifting plate 368 for lifting and lowering the whole bottom mold plate mechanism BPM; a second up and down movable block 369 supported by the lifting plate 368 of the jack 366, in such a way as to adjust the height of the entire bottom mold plate mechanism BPM at an article forming position, and including a connecting vacuum passage 370, in communication with the first vertical passage 361 of the first block 360 for providing a vacuum at the blow mold in order to help the blown of a glass article; two shortened connecting passages 372a, 372b in communication with the vertical cooling passages 363a, 363b, finishing at a plenum chamber 371; each of said passages 370 and 372a, and 372b, having a telescopic pipe 373c, 373a and 373b, screwed to the same, and introduced into the passages. 361, 363a and 363b, to avoid fluid leaks when the second up and down movable block 369 is lifted by the mechanical jack 366; a spacing block 374 coupled on the second up and down movable block 369, in order to adjust the height of a distribution plate 377 and the bottom plate mold 383a, 383b and 383c for whatever family of articles, having a connecting vacuum passage 375, and a plenum chamber 376 communicated with the plenum chamber 371; a distribution plate 377 coupled on the spacing block 374, comprising a passage network 378 for communicating the vacuum to help the article formation; a bottom mold-carrier plate 379 coupled on the distribution plate 377, having three central passages 380a, 380b, 380c, (FIGS. 10C to 10E) for providing the cooling fluid, each surrounded by a plurality of orifices 381a, 381b, 381c for applying vacuum, and three pads 382a, 382b and 382c, screwed to the bottom mold-carrier plate 379, centered in communication with the passages 380a, 380b and 380c; and three floating bottom molds 383a, 383b and 383c, releasable auto-adjusted coupled on a corresponding pads 382a, 382b, 382c, each coinciding with the center of the corresponding cavity of each blow mold BLM, so that when the blow molds BLM are closed around the floating bottom molds 383a, 383b and 383c, they are auto-aligned with the center of each cavity, forming the bottom of the glassware articles.

D. Blow Head Apparatus.

The blow head apparatus BLHA illustrated in FIGS. 11A and 11B for a triple cavity, comprising: a hollow blow head-carrier arm 390 supported and operated by an oscillating mechanism OSM which is entirely similar to the oscillating mechanism OSM or the "rotolinear oscillating mechanism" RLM of the guide-funnel apparatus GFA and the baffle apparatus BA, mounted on the apparatus support frame ASF, and including a holder 391 for retaining a blow head holder 392 for holding an equalizing mechanism EM which is also similar as that of the baffle apparatus BA; and a blow head 393 having a mounting flange 394 to be retained by the equalizing mechanism EM, so that the oscillating mechanism OSM will oscillate the hollow blow head-carrier arm 390 for placing the blow head 393 over the blow mold BLM, provide a finishing blown to a parison feed thereto, in order to form a finishing glassware article, and retire it once the finished glassware article has been formed;

Bi-Directional Curvilinear Take Out Apparatus

The servo-controlled bi-directional curvilinear take out apparatus BCTOA, generally illustrated in FIGS. 12A to 12F, mounted on a support frame TOSF (FIG. 1A, 1B) which is mounted in turn in the machine section frame MSF, to take out a finished article, describing a curvilinear translation path, from the blow forming station BFS, at the blow mold "zero-line" OM, to the dead plate or directly to the carrier conveyor, in accordance with the present invention, is represented and have an entirely similar configuration as the servo-controlled bi-directional curvilinear transference apparatus BCTA, generally illustrated in FIGS. 8A to 8F, including the driving mechanism DM and its aligning system, which are also entirely similar as that of said bi-directional curvilinear transference apparatus BCTA, except for the parison transference mechanism PTM, and comprising instead: an article transference mechanism ATM comprising a support arm 400, mounted on the support 321, and comprising a support plate 401 including a fluid connection 402 for the operating fluid; a reciprocate fluid motor 403 coupled to the support plate 401, to which the fluid connection 402 is also coupled, and comprising an elongated piston rod 404 surrounded by a spring 405 retained by a double eyed female end rod 406 at the free end of the piston rod 404 (FIGS. 12C, 12D and 12F) for actuating the holding arms 417a, 417b as it will be described in the following; and a holding frame 407 lodging the elongated piston rod 404 and spring 405; a scissor mechanism 408 to open and close the holding arms 417a, 417b, comprising a central support pin 409 supported by the holding frame 407, and a pair of yokes 410a, 410b, similar to the known scotch yokes, each having an intermediate portion 411a, 411b, coupled to the central support pin 409, a first end 412a, 412b in the form of a yoke portion, embracing a free sliding block 414a, 414b, each retained by the pivot pin 415a, 415b, retained in turn by the double eyed female rod 406, and a second end 416a, 416b; and a pair of parallel holding arms 417a, 417b, each having a positive stop member SPa, SPb and coupled perpendicularly to the second end 416a, 416b of the yokes 410a, 410b, and including three gripping fingers 418a, 418b and 418c and 418a', 418b' and 418c'; in this way, in an opened condition of the holding arms 417a and 417b including their gripping fingers 418a, 418b, and 418c and 418a', 418b', 418c' the piston rod 404 is extended in its full stroke and the spring 405 remains uncompressed, then, when actuating fluid is fed to the fluid motor 403, the piston rod is retracted upwardly compressing the spring 405, lifting the double eyed female end rod 406 and consequently closing the yokes 410a, 410b and the holding arms 417a, 417b and its gripping fingers 418a, 418b, 418c, and 418a', 418b' and 418c' at a wide position limited by the stop members avoiding vibrations, to grip a finished article from an opened blow mold BM and transfer it at a dead plate (not shown) at about 180° or at different heights, to be finally cooled therein, or placed directly at a carrier conveyor, and taking it out of the forming machine.

A particular characteristic of this servo-controlled bi-directional curvilinear take out apparatus BCTOA, is that, as the pair of parallel holding arms 417a and 417b are "gull-wing type" opened in cantilever, they can be placed in its take out position when the blow head apparatus BLHA is still in its blown position over the blow mold BLM and will begin its closing stroke when the blow head apparatus BLHA begins its output stroke and the blow mold is closed; or else, they will begin its closing stroke when the blow head apparatus BLHA begins its output stroke and the blow mold begins its opening stroke.

Electronic Control

An specific and preferably embodiment of the programmable control for this specific glassware forming machine, in accordance with the present invention, is a programmable electronic control (not shown) to electronically control the movements, cycle time and sequence of steps of all of the mechanisms of the machine, as well as the tooling and electric power, fluid and lubrication operation of all of the mechanisms of the machine, in accordance with the type of glassware articles to be produced and the amounts of glassware articles and velocity of production of the machine, which usually includes a plurality valves, preferably electronically controlled solenoid valves or servo-controlled valves, controlling the operating and cooling fluids through the fluid feeding system; an electronic processor including the programs for programming the whole range of performance of the machine, a performance monitoring system and a control board to introduce the production data of the machine.

It is to be finally understood that the blank molding apparatus BMA including the blank mold apparatus BMA, the blank mold holding mechanism BMHM, the blank mold opening and closing mechanism BO&C; as well as the guide-funnel apparatus GFA, including the oscillating mechanism OSM; the baffle apparatus BA, including the equalizing mechanism EM; the blow mold apparatus BLMA, including the blow mold BLM, mold holding mechanism MHM, the mold opening and closing mecha- nism MO&C the bottom mold plate mechanism BPM, and the blow head apparatus BLHA; and the bi-directional curvilinear take out apparatus BCTOA, including the article transference mechanism ATM, and the electronic control, all of them can be similar to the conventional ones, under the intelligence that they will be in detriment of the velocities, functionality, standardizing and adaptability to the new method which will be described below.

Referring now to the method for the production of hollow glassware articles, such as bottles, jars, tumblers and other glassware articles, by the blow-and-blow, press-and-blow or direct press processes, all of them in hot mold or paste mold, in the above described glassware forming machine including multiple individual forming sections, this will be firstly described in its most general way including only the steps which affords the new concepts of the forming process, comprised by the new steps and steps which can be selected from the known ones in the field, and then describing all the steps of the method in a full detail including their new characteristics and advantages, as illustrated in FIG. 1 of the drawings, which also affords the new concept of the forming process, and finally describing very specific steps which advantageously can be performed by the already described specific method.

Additionally, for the sake of simplicity of description, the machine will be described referring to a single cavity, under the prevision that, as illustrated in the shown drawings, the preferred embodiments of the machine and of the method is referred to a so named "multiple (triple) cavity" machine.

Considering the former clarifications, the method for the production of hollow glassware articles, such as bottles, jars, tumblers and other glassware articles, by the press-and-blow, both hot mold and paste mold, blow-and-blow process, and direct press, in its most general way, comprising, in combination:

forming a parison in an inverted orientation, at a parison forming station PFS into a blank mold BM and into a transferable and open-able neck ring mold 1 held by a pair of horizontal holding arms 260, 261 of an inverting apparatus UIA;

inverting the parison held by the transferable and open-able neck ring mold 1, by rotating the pair of horizontal holding arms 260, 261 of the inverting apparatus UIA 180° clockwise, moving the parison upwardly constricting it, or counterclockwise, moving the parison downwardly stretching it, to an upright orientation at an intermediate station IRS to be held by a transference apparatus BCTA;

transferring the transferable and open-able neck ring mold 1 holding the parison in an upright orientation, from the intermediate station IRS, to a blow forming station BFS including a blow mold apparatus BLMA, by means of the transference apparatus BCTA;

releasing the parison from the transferable and open-able neck ring mold 1, into the blow mold apparatus BLMA, but keeping the transferable and open-able neck ring mold 1 held by said transference apparatus BCTA;

turn the transference apparatus BCTA holding the empty transferable and open-able neck ring mold 1 back from the blow forming station BFS to the horizontal arm 260 of the inverting apparatus UIA, at the intermediate station IRS, to be held again by said horizontal holding arm 260 of the inverting apparatus UIA to be placed again at the parison forming station PFS by rotating the pair of holding arms 260, 261 of the inverting apparatus UIA additional 180°, completing a 360°turn;

blowing the parison into the blow mold apparatus BLMA to form a finished article; and transferring the finished article in an upright orientation, by a take out apparatus BCTOA, to place it at a dead plate or at a carrying conveyor.

In accordance with a most advanced embodiment of the method for the production of glassware articles, of the present invention, as illustrated in FIG. 1 of the drawings, allowing an increase of velocity of production and a reduction in the forming cycle time, this comprising:

forming a parison at a parison forming station PFS in an inverted orientation, into a blank mold BM and a first transferable and open-able neck ring mold 1 held by a first pair of horizontal arms 260, 261 of a inverting apparatus UIA having said first pair of horizontal arms 260, 261 and a second diametrically opposed pair of horizontal arms 260', 261' holding a second transferable and open-able neck ring mold 2;

inverting the parison held by the first transferable and open-able neck ring mold 1, by rotating the first pair of horizontal holding arms 260, 261, 180° clockwise, moving the parison upwardly constricting it, or counterclockwise, moving the parison downwardly stretching it, to an upright orientation at an intermediate station IRS, while the second pair of arms 260', 261' with the second transferable and open-able neck ring mold 2 is simultaneously placed at the parison forming station PFS, to carry out another parison forming cycle;

transferring the first transferable and open-able neck ring mold 1 holding the parison in an upright orientation, from the intermediate station IRS, to a blow forming station BFS including a blow mold apparatus BLMA, by a transference apparatus BCTA;

releasing the first parison into the blow mold apparatus BLMA, and turn the empty first transferable and open-able neck ring mold 1 back to the first horizontal arm 260 of the inverting apparatus UIA, at the intermediate station IRS to be placed again at the parison forming station by rotating the first pair of arms 260, 261 additional 180°, completing a 360° turn, while the second pair of arms 260', 261' reache to the intermediate station IRS holding a second parison held thereby;

blowing the parison into a blow mold BLMA to form a finished article; and transferring the finished article in an upright orientation, once the blow mold is opened, by a take out apparatus BCTOA, to place it at a dead plate or at a carrying conveyor.

Finally, the method for the production of glassware articles in accordance with an specific embodiment of the present invention, including all of the advantages thereof, and as illustrated similarly in FIG. 1 and in combination with all of the Figures of the drawings, comprising:

placing a first transferable and open-able neck ring mold 1 held closed by a first pair of horizontal arms 260, 261 of an unidirectional rotary inverting apparatus UIA, at a blank mold "zero-line" position OB which is a constant position independent of the size of the blank mold BM of a parison and of a finished article, and closing blank mold halves 10, 10' of the blank mold BM embracing and aligning the first transferable and open-able neck ring mold 1 at a said blank mold "zero-line" position OB;

lifting a pressing plunger 209 or 209' by a pressing plunger apparatus 160, at a glass gob charging and neck forming position aligned into the first transferable and open-able neck ring mold 1, at said blank mold "zero-line" position OB;

simultaneously oscillating and lowering a guide-funnel apparatus GFA to place it on the closed blank mold BM;

feeding a molten glass gob, trough said guide-funnel apparatus GFA into the blank mold BM and the first transferable and open-able neck ring mold 1, both placed at the blank mold "zero-line" position OB, at a parison forming station PFS, holding said first transferable and open-able neck ring mold 1 by a first horizontal arm 260 of an unidirectional rotary inverting apparatus UIA including said first horizontal arm 260 initially holding the first transferable and open-able neck ring mold 1 at said parison forming station and a second horizontal arm 261 diametrically opposed to the first arm 260, including a second transferable and open-able neck ring mold 2, initially placed at the intermediate station IRS and then lifting and oscillating the guide-funnel apparatus GFA to an outer upper position once the molten glass gob has fall into the blank mold BM;

forming a first parison in an inverted orientation, into the blank mold BM and first transferable and open-able neck ring mold 1 at said parison forming station PFS, by simultaneously oscillating and lowering the baffle apparatus BA placing its baffle head 103 over the cavity of a blank mold BM providing a settle blow for the glass gob at the blank mold BM filling the transferable and open-able neck ring mold 1, in the blow-and-blow process, or just closing the blank moild halves 10, 10' of the blank mold BM in the press-and-blow process, and counter-blowing or pressing the glass gob into said blank mold BM and first transferable and open-able neck ring mold 1 at said blank mold "zero-line" position OB, by means of a pressing plunger apparatus PPA, allowing exhausting of trapped air over the glass gob, through a porous baffle head 103 of the baffle apparatus BA;

retiring the pressing plunger apparatus PPA, simultaneously lifting the baffle head and opening the blank mold BM allowing reheating of the parison to begin;

transferring the first formed parison held by the first transferable and open-able neck ring mold 1 held in turn by the first horizontal arm 260 of the unidirectional rotary inverting apparatus UIA, to an intermediate station IRS at a blow mold "zero-line" position OM by rotating it in a servo-controlled curvilinear indexed and unidirectional path at 180°, rotating indexed and unidirectional at 180° clockwise (moving the parison upwardly constricting it) or counterclockwise (moving the parison downwardly stretching it), continuing the reheating and stretching of the parison during its transference and inversion at an upright orientation to the intermediate station IRS, additionally continuing the reheating and stretching of the parison therein, while rotating 180° the empty second arm 261 with the second transferable and open-able neck ring mold 2, to place it at the parison forming station PFS for a new a parison forming cycle;

picking up the first transferable and open-able neck ring mold 1 holding the first parison, from the first horizontal arm 260 of the unidirectional rotary inverting apparatus UIA, at said intermediate station IRS, by means of a transference apparatus BCTA, by simultaneously releasing the transferable and open-able neck ring mold 1 from the unidirectional rotary inverting apparatus UIA;

transferring the first transferable and open-able neck ring mold 1 horizontally holding the first parison in an upright orientation, by means of said transference apparatus BCTA, rotating it at 180°, through a servo-controlled bi-directional curvilinear translation path, maintaining the parison in its upright orientation and continuing a major reheating and stretching operation of the parison throughout the translation path, from the intermediate reheat station IRS, to an open blow mold BLM;

closing the blow mold BML around the parison held by the first transferable and open-able neck ring mold 1 held in turn by the transference apparatus BCTA and around a bottom plate 383a, 383b and 383c and opening the first transferable and open-able neck ring mold 1, maintaining held said empty transferable and open-able neck ring mold 1 by the transference apparatus BCTA, releasing the first parison into the closed blow mold BLM to be held thereby at said blow forming station, continuing a short final reheating and stretching operation of the parison for temperature homogenization, and applying a vacuum through the bottom plate 383a, 383b and 383c, for helping the blow operation, immediately turning back the empty first transferable and open-able neck ring mold 1 closing it during the turning back path, to the intermediate station IRS, and releasing it at the first arm 260 of the unidirectional rotary inverting apparatus UIA to be held thereby;

lifting the empty transference apparatus BCTA at an intermediate 90° position, waiting for a new forming cycle, once it has turned back the first transferable and open-able neck ring mold 1, turning back the first horizontal arm 260 of the unidirectional rotary inverting apparatus UIA with the empty, first transferable and open-able neck ring mold 1 to the parison forming station PFS by rotating it at additional 180°, in a sense opposed to the second arm 261, completing a 360° turn, and the second arm 261 reaches to the intermediate station IRS for a new parison transferring cycle;

oscillating and lowering the blow head apparatus BLHA placing the blow head 393 on the blow mold BLM;

blowing the parison into the blow mold BLM to form a finished article, by means of a blow head 393, continuing applying vacuum through the bottom mold plate 383a, 383b and 383c so that, while the blow head 393 is starting the final blown, the reheating and stretching of the parison is finished, and a take out apparatus BCTOA including an arm 400 rotating at 180° around a horizontal axis, having gripping fingers 418 418a, 418b, 418c, 418a' 418b', 418c', reaches opened on the blow mold BLM maintaining the gripping fingers 418b, 418c, 418a' 418b', 418c' opened and, after the final blown has been provided by the blow head 393, turning back the blow head 393 to its upper position, and the vacuum has been interrupted, and lifted the blow head 393, the gripping fingers 418b, 418c, 418a' 418b', 418c' of the take out apparatus BCTOA are closed around the finished neck ring of a formed article when the blow mold BLM is still closed or it has been opened;

opening the blow mold BLM simultaneously picking up the finished article, from the blow mold BLM by means of said take out apparatus BCTOA; and transferring the finished article in an upright orientation, through a curvilinear and servo-controlled translation path, maintaining the finished article in a vertical position, once the blow mold BLM is opened, by means of the take out apparatus BCTOA, to place it at a dead plate to cool the finished article and transfer it to a carrier conveyor, or else, placing the finished article directly to the carrier conveyor, and lifting the empty gripping fingers 418b, 418c, 418a' 418b', 418c' of the take out apparatus BCTOA at an intermediate lifted position to begin a following blowing and take out cycle waiting for a next cycle.

The parison forming step is specifically carried out by: simultaneously oscillating and lowering the baffle apparatus BA placing its baffle head 103 over the cavity of a blank mold BM; then for the blow-and-blow process, providing a vacuum through the pressing plunger 209' and simultaneously providing the settle blow through the baffle apparatus BA into the blank mold BM, to settle the glass gob at the bottom of the blank mold BM, filling the transferable and open-able neck ring mold 1, and then retracting the pressing plunger 209' and providing a counter-blow through the pressing plunger 209', allowing the air trapped over the glass gob to be released through the porous baffle head 103 of the baffle apparatus BA, to form a finished parison, or else, for the press-and-blow process, introducing the pressing plunger 209 through the transferable and open-able neck ring 1 and blank mold BLM, allowing the air trapped over the glass gob to be released through the porous baffle head 103 of baffle apparatus BA, forming the finished parison; and then retiring the pressing plunger 209 and opening the blank mold BM, holding the formed parison by the transferable and open-able neck ring mold 1, allowing an initial reheating of the formed parison.

The gob pressing step is specifically carried out by maintaining constant strokes at the pressing plunger apparatus at the blank mold "zero-line" position OB, and compensate variations in the glass gob weight and volume of the parison by forming a press cushion at the pressing plunger apparatus, to carry out the press-and-blow process or the blow-and-blow process with the same mechanism, without changing or adjusting the pressing plunger apparatus.

The specific inverting transference of the finished parison held by the transferable and open-able neck ring mold 1 and by the unidirectional rotary inverting apparatus UIA, at the blank mold "zero-line" OB to the intermediate station IRS at the blow mold "zero-line" OM comprising: rotating 180°, clockwise (moving the parison upwardly constricting it) or counterclockwise (moving the parison downwardly stretching it), the first holding arm 260, 261 of the unidirectional rotary inverting apparatus UIA from the inverted orientation to an upright orientation allowing a continuing reheating and an initial stretching, to the intermediate reheat station IRS, through a rotary path, while simultaneously rotating 180° the second holding arm 260', 261' holding the second transferable and open-able neck ring mold 2, empty, of the unidirectional rotary inverting apparatus UIA, from the intermediate reheat station IRS at said blank mold "zero-line" position OM to a position under the blank mold BM at the blank mold "zero-line" position OB, at the same rotary path, while closing blank mold halves 10, 10' of the blank mold BM embracing the second empty transferable and open-able neck ring mold 2, placing the pressing plunger 209 at a neck forming position, and then placing a glass gob guide-funnel apparatus GFA, over the closed blank mold BM, and then feeding the glass gob into the blank mold BM and second transferable and open-able neck ring mold 2; and on the other side, opening the first pair holding arm halves 260, 261 of the unidirectional rotary inverting apparatus UIA, releasing the transferable and open-able neck ring mold 1 at said intermediate reheat position IRS at said blow mold "zero-line" OM.

The specific servo-controlled bi-directional curvilinear transference step from the intermediate station IRS at the blow mold "zero-line" OM to the blow mold BLM comprising: picking up the first transferable and open-able neck ring mold 1 at said intermediate station IRS, by opening the gripping fingers 331*a*, 331*b* of the servo-controlled bi-directional curvilinear transference apparatus BCTA, in order to hold said first transferable and open-able neck ring mold 1 by its grooves G3, G3', and immediately opening the first pair of horizontal arms 260, 261 of the servo-controlled unidirectional rotary inverting apparatus UIA, releasing said first transferable and open-able neck ring mold 1; then translating, through a curvilinear path the transferable and open-able neck ring mold 1 holding the parison, from the intermediate station IRS, to the blow mold BLM in an upright orientation; closing the blow mold halves 350*a*, 350*b* of the blown mold BLM, around the bottom plate 383*a*, 383*b* 383*c* and the parison held by the transferable and open-able neck ring mold 1; opening the neck ring mold halves by additionally opening the gripping fingers 331*a*, 331*b* of the servo-controlled bi-directional curvilinear transference apparatus BCTA, to release the parison into the closed blow BLM, but still retaining the opened transferable and open-able neck ring mold 1 which is afterwards closed; turning the bi-directional curvilinear transference apparatus BCTA holding the empty and closed transferable and open-able neck ring mold 1, back to the first pair of arm halves 260, 261 of the unidirectional rotary inverting apparatus UIA at the intermediate station IRS; placing the empty transferable and open-able neck ring mold 1 still held by the gripping fingers 331*a*, 331*b* of bi-directional curvilinear transference apparatus BCTA, at a position between the opened pair of holding arm halves 260, 261 of the unidirectional rotary inverting apparatus UIA which are then closed retaining the transferable and open-able neck ring mold 1 by its grooves G1, G1' and flanges F1, F1'; finally closing the gripping fingers 331*a*, 331*b* of the bi-directional curvilinear transference apparatus BCTA releasing the transferable and open-able neck ring mold 1 remaining held by the first pair of arm halves 260, 261 of the unidirectional rotary inverting apparatus UIA; and lifting the griping fingers 331*a*, 331*b* of the bi-directional curvilinear transference apparatus BCTA at an upper intermediate position at about 90° of its path.

The step of blowing the parison into the blow mold BLM to form a finished article, specifically comprising: placing a blow head 393 of the blow head apparatus BLHA on the blow mold BLM, in coincidence with the cavity MC, MC' thereof, and providing a finishing blow into the finished reheated and elongated parison through the blow head 393, forming a finished glassware article into the blow mold BLM; before finishing of the blown, placing the take out fingers 417*a*, 417*b* of the servo-controlled bi-directional curvilinear take out apparatus BCTOA opened at a take out position; once the blow has finished and the blow head 393 has started its lifting path, closing the take out fingers 417*a*, 417*b* of the bi-directional curvilinear take out apparatus BCTOA, holding the neck of the finished glassware article, either when the blow mold BLM is still closed or else when holding the lower neck potion, of the finished article when the blow mold BLM is opened.

And finally, the take out step of the finished glassware article is specifically carried out by: servo-controlling and curvilinear transferring the finished glassware article held by the closed holding arms 417*a*, 417*b* of the bi-directional curvilinear take out apparatus BCTOA, to the cooling dead plate, or directly to a carrier conveyor or at a annealing furnace, and opening the holding arms 417*a*, 417*b* releasing the finished glassware article therein, and lifting the opened holding arms 417*a*, 417*b* of the bi-directional curvilinear take out apparatus BCTOA to an upper intermediate position, for a new forming cycle.

What is claimed is:

1. A machine for the production of hollow glassware articles by the blow-and-blow process, press-and-blow wide mouth or narrow neck process, press-and-blow paste mold process and direct press process in a glassware forming machine including single or multiple machine sections, each section having single or multiple cavities, comprising:
   a) a machine section frame;
   b) an apparatus support frame mounted on the machine section frame;
   c) power and fluid feeding means in both of said machine section frame and apparatus support frame, to provide electric energy, lubricants and cooling and operating fluid to the machine section;
   d) a parison forming station PFS, comprising
      i) a first and a second transferable and open-able neck ring molds, per cavity, each to be alternately and removable placed under the blank mold;
      ii) a blank mold apparatus, mounted on a blank mold support frame mounted in turn on the mechanism support frame, including a blank mold per cavity, for forming a parison;
      iii) a guide-funnel apparatus mounted on the apparatus support frame and comprising a guide-funnel per cavity, for guiding a glass gob into the blank mold;
      iv) a baffle apparatus mounted on the apparatus support frame, comprising: baffle head means per cavity, for forming the bottom of the parison;
      v) a pressing plunger apparatus, mounted on a floor cover of the machine section frame, for forming a parison, comprising: an arrangement of multiple telescopic cylinder and piston assemblies per cavity;
   e) an indexed unidirectional rotary inverting apparatus including: a rotary support driving mechanism mounted on the apparatus support frame; a driving mechanism to be unidirectional indexed rotated therby firstly 180°, clockwise, moving the parison upwardly constricting it, or counterclockwise moving the parison downwardly stretching it, and then additional 180° completing a 360° turn; a first open-able horizontal holding arm holding the first transferable and open-able neck ring mold, initially retained under the blank mold when it is closed to form the parison, and a second open-able horizontal holding arm placed stepped, inverted and diametrically opposed to the first open-able horizontal holding arm, holding a second transferable and open-able neck ring mold, said first and second open-able horizontal holding arms are mounted on a rotary support driving mechanism, to indexed unidirectional and simultaneously rotate firstly 180° clockwise moving the parison upwardly constricting it or counterclockwise moving the parison downwardly stretching it around an horizontal rotary axis, to invert a first formed parison held by the first transferable and open-able neck ring mold, to an intermediate station, at an upright orientation, simultaneously placing the second transferable and open-able neck ring mold under the blank mold for another parison forming cycle, and then rotates additional 180°, completing a 360° turn, to place again the first open-able horizontal holding arm with the first transferable and open-able neck ring mold, empty, under the blank mold; and a neck ring holding and releasing mechanism for uniformly and simultaneously opening and closing the neck ring holding arms mounted on the rotary support driving mechanism placed outside of the horizontal rotary axis, to release the transferable and open-able neck ring molds remaining supported by it at an intermediate station to be held by a transference apparatus;

f) a transference apparatus, mounted on the apparatus support frame, to transfer a parison held by an transferable and open-able neck ring mold from the indexed unidirectional rotary inverting apparatus at the intermediate station to the blow forming station, comprising: mounting means, mounted on the apparatus support frame; a driving mechanism mounted on said mounting means; an oscillatory hollow arm, mounted on said driving mechanism to provide it an oscillatory movement; a parison transference mechanism, mounted on said oscillatory hollow arm, including sliding carrier holders, mounted on said oscillatory hollow arm, including holding arms normally maintained closed, and gripping fingers coupled to the holding arms for internally gripping the transferable and open-able neck ring mold; and a two-positions opening mechanism coupled to the carrier holders, so that, at a first position of the two-positions opening mechanism, the gripping fingers are partially opened in order to grip the transferable and open-able neck ring mold gripping a parison, while simultaneously the open-able horizontal neck ring holding arms of the indexed unidirectional rotary inverting apparatus are opened releasing said transferable and open-able neck ring mold, and be retained by the gripping fingers of this transference apparatus at the intermediate station, and at a second position, the holding arms are additionally opened, in order to additionally open the gripping fingers, opening the transferable and open-able neck ring mold releasing the parison to vertically fall flat into a blow mold apparatus, but keeping the transferable and open-able neck ring mold held by the gripping fingers; and in the inverse way, said gripping fingers of the transference apparatus return the empty transferable and open-able neck ring mold closed at the intermediate station, and are further closed, releasing the empty transferable and open-able neck ring mold at the open-able horizontal holding arms of the indexed unidirectional rotary inverting apparatus to be held thereby for a following forming cycle;

g) a blow forming station including:
  i) a blow mold apparatus mounted on the machine support frame;
  ii) a bottom mold plate mechanism for forming the bottom of the article when it is embraced by the blow mold halves of the blow mold at the blow forming station; and
  iii) a blow head appartus, for providing a blow for finishing the glassware article;

h) a take out apparatus, mounted on the apparatus support frame, to transfer a finished article from the blow mold station to a cooling dead plate or to a carrier conveyor; and i) programmable control means, to control the movements, cycle time and sequence of steps of all of the mechanisms of the machine, as well as the tooling and electric power, fluid and lubrication operation of all of the mechanisms of the machine, in accordance with the type of glassware articles to be produced and the amounts of glassware articles and velocity of production of the machine.

2. The machine of claim 1, wherein the machine section frame and the apparatus support frame comprising power and fluid feeding means including: ducts for electrical cable and ducts for lubricants and cooling and operating fluid; two pairs of "T" shaped sliding valves, a first pair for transmitting cooling fluid to a blank mold apparatus and a second pair for transmitting cooling fluid to a blow mold apparatus; each valve comprising a sliding platform, including a spring supported by a shoulder screw for maintaining a seal at the sliding platform and a tubular portion supported by the apparatus support frame, and connected to a cooling fluid conduit of a blank mold holding mechanism, in order to provide a continuous communication of cooling fluid during the whole path of the opening and closing operation of the blank mold apparatus and the blow mold apparatus.

3. The machine of claim 1, wherein the first and a second transferable and open-able neck ring molds, are alternately and removable placed under the blank mold at a blank mold "zero-line" which is a constant position for any size of parison and article to be produced.

4. The machine of claim 1, wherein the first and a second transferable and open-able neck ring molds, are respectively mounted stepped and opposed to each other at the first and a second open-able horizontal holding arms of the indexed unidirectional rotary inverting apparatus.

5. The machine of claim 1, wherein each of the first and second transferable open-able neck ring molds, comprising: at least two neck ring mold halves assembled opposed face to face, each neck ring mold half including a neck ring forming cavity; holding means, to be held by other components of the machine; assembling means, to embrace the assembled neck ring mold halves, normally maintaining them closed when they are transferring and positioning a parison at other locations; and guiding means for maintaining the neck ring mold halves aligned to each other.

6. The machine of claim 5, wherein each of the first and second transferable and open-able neck ring molds comprising two neck ring mold halves each having holding means, assembling means and guiding means, and wherein the holding means including a first external groove to be held by one open-able horizontal holding arm of the indexed unidirectional rotary inverting apparatus, at the blank mold "zero-line"; a first enclosing flange, to be held by the open-able horizontal holding arm of the indexed unidirectional rotary inverting apparatus when it is in an intermediate station holding a parison in an upright orientation, and retain it even when the open-able horizontal holding arm is in an opened position, avoiding that the transferable and open-able neck ring mold falls down when the open-able horizontal holding arm releases said transferable and open-able neck ring mold; a second tapered aligning flange to keep the neck ring mold halves aligned with a center of the blank mold and tight both against each other; a second internal guiding groove receiving the guiding means for maintaining the neck ring mold halves aligned to each other; and a third internal handling groove to be held by the transference apparatus.

7. The machine of claim 5, wherein each of the first and second transferable and open-able neck ring molds, comprising two neck ring mold halves each having holding means, assembling means and guiding means and wherein the assembling means including a fourth external holding groove; an annular tension spring placed into the fourth external holding groove, surrounding the neck ring mold halves, normally maintaining them closed when they are transferring and positioning a parison at other locations, and which can be opened, by overcoming the tension force of the tension spring, by the transference aparatus, for releasing the parison when it is transferred to a blow mold.

8. The machine of claim 5, wherein each of the first and a second transferable and open-able neck ring molds, comprising two neck ring mold halves each having holding means, assembling means and guiding means, wherein the guiding means including an internal guiding groove and an internal one-piece annular guide having a flange which is located into the second internal guide groove, for maintaining the neck ring mold halves aligned to each other.

9. The machine of claim 5, wherein each of the first and a second transferable and open-able neck ring molds, comprising two neck ring mold halves each having holding means, assembling means and guiding means, wherein the guiding means including an internal guiding groove and an internal one-piece annular guide having a flange located into the second internal guide groove, and an upper compliment for a finish neck ring of a glassware article for specific requirements of the finished neck ring.

10. The machine of claim 5, wherein each of the first and a second transferable and open-able neck ring molds, comprising two neck ring mold halves each having holding means, assembling means and guiding means, wherein the guiding means additionally including: a plane face defining four aligning point corners to be aligned by a spring iron band having a central flat face and two inclined end faces each finishing in an end flexible "V" shaped position limiter, held by the open-able horizontal holding arms of the indexed unidirectional rotary inverting apparatus, to avoid misalignment regarding the partition line of the blank mold and the partition line of the blow mold, and to avoid rotary displacement during handling thereof.

11. The machine of claim 5, wherein each of the first and a second transferable and open-able neck ring molds, comprising two neck ring mold halves each having holding means, assembling means and guiding means, wherein the guiding means additionally including: two pairs of plane angular faces to be retained by a spring iron band having a central flat face and two inclined end faces each finishing in an end flexible "V" shaped position limiter, held by the open-able horizontal holding arms of the idexed unidirectional rotary inverting apparatus, to avoid misalignment regarding the partition line of the blank mold and to avoid rotary displacement during handling thereof.

12. The machine of claim 1, wherein the blank mold apparatus includes: a blank mold per cavity, each blank mold comprised by two blank mold halves to be assembled opposed face to face, both forming a cavity for forming a parison, each blank mold half having mounting means and cooling means for directly cooling the blank mold halves; a blank mold holding mechanism mounted on a blank mold support frame mounted in turn on the mechanism support frame, at the blank mold "zero-line", holding the blank mold halves by its mounting means; and an opening and closing mechanism in which to the blank mold holding mechanism is mounted, for closing the blank mold halves, for receiving a molten glass gob to form a parison, and open it once the parison has been formed.

13. The machine of claim 12, wherein the blank mold apparatus, comprising a blank mold per cavity, a blank mold holding mechanism and an opening and closing mechanism; said blank mold is comprised by two blank mold halves, each having mounting means and cooling means, and said mounting means including a holding flange, to be mounted on the blank mold holding mechanism mounted in turn on the apparatus support frame, at the blank mold "zero-line", and which is operated by the blank mold opening and closing mechanism.

14. The machine of claim 12, wherein the blank mold apparatus, comprising: a blank mold per cavity, a blank mold holding mechanism, and an opening and closing mechanism; said blank mold is comprised by two blank mold halves, each having mounting means and cooling means, and said cooling means including a plurality of axial passages axially passing through said blank mold half for internally cooling it.

15. The machine of claim 12, wherein the blank mold apparatus, comprising a blank mold per cavity, a blank mold holding mechanism, and an opening and closing mechanism; said blank mold holding mechanism including: mounting means to be mounted on the opening and closing mechanism; a first and a second arms pivotally mounted on the mounting means in a hinged arrangement; blank mold holders held by the first and second arms in which the blank mold halves are held by their holding means; and cooling means connected in fluid communication to the cooling means of the blank mold halves for cooling the blank mold holding mechanism.

16. The machine of claim 15, wherein the blank mold apparatus, comprising a blank mold per cavity, a blank mold holding mechanism, and an opening and closing mechanism; said blank mold holding mechanism having mounting means including a mounting bracket.

17. The machine of claim 12, wherein, for a triple cavity, said blank mold apparatus comprising a blank mold per cavity, a blank mold holding mechanism, and an opening and closing mechanism; said blank mold holding mechanism including, for a multiple-cavity, blank mold holders comprising equalizing means in which are mounted the blank mold halves so that the blank mold halves can be uniformly closed with a similar closing force.

18. The machine of claim 17, wherein the blank mold apparatus comprising a blank mold per cavity, a blank mold holding mechanism, and an opening and closing mechanism; said blank mold holding mechanism including, for a triple cavity, blank mold holders having equalizing means comprising: a first equalizing beam, mounted on the first arm of the blank mold holding mechanism; a first single blank mold holder mounted in said first equalizing beam, in which it is respectively mounted a blank mold half, and a dual blank mold holder also mounted in said first equalizing beam, in which are mounted two blank mold halves; and a first corresponding opposed single blank mold holder mounted in a second equalizing beam mounted on the second arm of the blank mold holding mechanism, in which is respectively mounted a blank mold half and a dual blank mold holder also mounted in said second equalizing beam, in which are mounted two blank mold halves, so that the blank mold halves can be uniformly closed with a similar closing force.

19. The machine of claim 17, wherein the blank mold apparatus comprising a blank mold per cavity, a blank mold holding mechanism, and an opening and closing mechanism; said blank mold holding mechanism including, for a triple cavity, blank mold holders having equalizing means comprising: a first equalizing beam, mounted on a first arm of the blank mold holding mechanism, having a first single blank mold holder mounted in said first equalizing beam, in which it is respectively mounted a blank mold half, and a first dual blank mold holder including a first holder and a second holder, which is also mounted in said first equalizing beam and in which are mounted two blank mold halves; and a second equalizing beam mounted on a second arm of the blank mold holding mechanism, having a second single blank mold holder mounted in said second equalizing beam, in which is respectively mounted a blank mold halve, facing against the first holder of the first dual blank mold holder, and a second dual blank mold holder including a first holder and a second holder, which is also mounted in said second equalizing beam and in which are mounted two blank mold halves, facing the first holder of its second blank mold holders against the first single bank mold holder of the first equalizing beam, and facing the second holders of the first and second dual blank mold holders to each other, so that the blank mold halves can be uniformly closed with a similar closing force.

20. The machine of claim 17, wherein the blank mold apparatus comprising a blank mold per cavity, a blank mold holding mechanism, and an opening and closing mechanism; said blank mold holding mechanism including, for a triple cavity, blank mold holders having equalizing means comprising: a first equalizing beam, mounted on a first arm of the blank mold holding mechanism, having a single blank mold holder mounted in said first equalizing beam, in which it is respectively mounted a blank mold half, and a dual blank mold holder also mounted in said first equalizing beam, in which are mounted two blank mold halves; and a second equalizing beam mounted on a second arm of the blank mold holding mechanism, having a trial blank mold holder facing the single and dual blank mold holders of the first equalizing beam, so that the effect that the blank mold halves be uniformly closed with a similar closing force, is achieved by the single and dual blank mold holders.

21. The machine of claim 2, wherein the blank mold apparatus comprising a blank mold per cavity, a blank mold holding mechanism; and an opening and closing mechanism; said blank mold holding mechanism, including cooling means comprising a two-halves cooling box including nozzles placed at a fixed height, for directing cooling fluid into the axial passages of the blank mold halves, said cooling box is slide coupled on the sliding platform of the "T" shaped sliding valve of the power and fluid feeding system, mounted on the blank mold support frame, and maintained in sealed contact by the spring of said "T" shaped sliding valve, providing a communication of the cooling fluid during the whole path of the opening and closing operation of the blank mold.

22. The machine of claim 12, wherein the blank mold apparatus comprising a blank mold per cavity, a blank mold holding mechanism and an opening and closing mechanism comprising:
support frame means mounted on the blank mold support frame, for supporting and retaining internal components;
driving means to provide a back and forth movement;
first transmission means coupled to the driving means, to transmit the back and forth movement second transmission means coupled to said first transmission means, to transform the back and forth movement into a limited rotary movement;
support pivoting means mounted on the support frame means, on which the first and second arms of the blank mold holding mechanism are mounted;
toggle means mounted on the upper end of rotary operating shafts, in which the first and second arms of the blank mold holding mechanism are mounted in order to open and closing them;
anti deflector means, mounted on the support frame means, to reduce flexion of the shafts and the pivoting means;
aligning means mounted on support frame means, for aligning the first transmission means in its back and forth movement; and
position indicator means connected to the transmission means, to provide a feedback about the position of the first transmission means to measure velocity, time and displacement of the closing and opening mechanism.

23. The machine of claim 22, wherein the blank mold apparatus comprising a blank mold per cavity, a blank mold holding mechanism, and an opening and closing mechanism including support frame means comprised by a carter mounted on a blank mold support frame of the machine support frame, including a removable bottom plate at each side of the carter, each of the sides of the carter having a housing including a shouldered plain bearing and a removable cap to allow assembling and maintenance of internal components.

24. The machine of claim 22, wherein the blank mold apparatus comprising a blank mold per cavity, a blank mold holding mechanism, and an opening and closing mechanism including driving means comprised by a fluid cylinder and piston assembly horizontally retained by a carter, including a horizontal piston rod and a horizontal plate gripped to the piston rod, to impart back and forth movements; a first floating cushion bushing surrounding the piston at a forth stroke, and a second cushion bushing coupled to the piston in order to cushion the back and forth strokes of the piston.

25. The machine of claim 22, wherein the blank mold apparatus comprising a blank mold per cavity, a blank mold holding mechanism, and an opening and closing mechanism including first transmission means comprised by a rack portion at each end of the horizontal plate of the driving means, to be simultaneously moved back and forth by said driving means.

26. The machine of claim 22, wherein the blank mold apparatus comprising a blank mold per cavity, a blank mold holding mechanism and an opening and closing mechanism including second transmission means comprised by two rotary operating shafts each mounted on a side of the support frame means, each including a lower support end mounted into a plain bearing of the bottom plate of the support frame means, an intermediate support portion and an upper anti-deflector support to avoid deflection of the rotary operating shafts, and a pinion segment at a lower end of said rotary operating shafts, gearing rack portions of the first transmission means, to transform the back and forth movement into a limited rotary movement to the shafts.

27. The machine of claim 26, wherein the blank mold apparatus comprising a blank mold per cavity, a blank mold holding mechanism and an opening and closing mechanism including support pivoting means comprised by a mounting bracket mounted on a carter of the support frame means, including a hollow column at each side thereof, placed at the position of the rotary operating shafts of the second transmission means enclosing them; an intermediate internal housing, lodging a plane bearing holding the intermediate portion of the rotary operating shafts, and a central conical housing, including an anti-sliding taper lock, retaining a lower end of a central post in which the first and second arms of the blank mold holding mechanism are mounted on a wearing washer, to act as a pivot for the first and second arms of the blank mold holding mechanism and a positive stop member positioned by an adjustable nut and screw assembly, to adjust the position of the toggle means.

28. The machine of claim 26, wherein the blank mold apparatus comprising a blank mold per cavity, a blank mold holding mechanism and an opening and closing mechanism including toggle means comprising a connecting crank mounted on the upper end of the rotary operating shafts of the second transmission means, by means of a clamping screw, a pin key to avoid torsion displacement of the crank, a stop member, limiting the rotation of the crank by the adjustable nut and screw assembly of the mounting bracket of the support pivoting means, and a pin rod, a connecting rod mounted on the pin rod, and a pin mounted on the connecting rod, in which are mounted the arms of the blank mold holding mechanism, so that, when the angle between the connecting rod and a line from the center of the rotary operating shaft of the second transmission means to the center of the pin of the connecting rod is near to 0°, the toggle means provides the maximum closing force or opening force of the blank mold halves, the toggle effect can also be controlled by extending the longitude of the connecting rod, in case of wearing of the first and second transmission means.

29. The machine of claim 26, wherein the blank mold apparatus comprising a blank mold per cavity, a blank mold holding mechanism and an opening and closing mechanism including anti-deflector means comprising: an anti-deflector plate held to the mounting bracket of the support pivoting means and comprising a housing retaining a plain bearing at each end thereof, in order to avoid deflection of the upper end of the rotary operating shafts of the second transmission means, and a central anti-deflector plate held to the anti-deflector plate, including a housing having a bushing in order to retain the upper end of the central post of the support pivoting means, avoiding deflection thereof.

30. The machine of claim 24, wherein the blank mold apparatus comprising a blank mold per cavity, a blank mold holding mechanism and an opening and closing mechanism including aligning means comprising an alignment guide bushing held by pressure by a carter of the support frame means, surrounding the cylindrical rack portions of the first transmission means, to align them, and a central bushing surrounding an extension rod of the piston rod of the driving means, which is coupled to the horizontal plate gripped to the piston rod of said drive means, in order to guide and support the piston rod during its movement back and forth.

31. The machine of claim 22, wherein the blank mold apparatus comprising a blank mold per cavity, a blank mold holding mechanism and an opening and closing mechanism including position indicator means comprising a rotary position indicator, connected at the lower end of one of the lower support ends of the rotary operating shafts of the first transmission means, to provide a feedback about the position of said rotary operating shafts to measure velocity, time and displacement of the closing and opening mechanism and to synchronizing this opening and closing mechanism regarding the unidirectional indexed rotary inverting apparatus.

32. The machine of claim 1, wherein the guide-funnel apparatus mounted on the apparatus support frame comprising funnel-carrier means, supported and operated by an oscillating mechanism by which the funnel-carrier means, are simultaneously oscillated and lowered from an upper retracted inactive position to a lower active position and, after a molten glass gob is fed, its is simultaneously lifted and oscillated to the retracted position, and a guide-funnel carried by the funnel-carrier means, for guiding a glass gob into the blank mold.

33. The machine of claim 32, wherein the guide-funnel apparatus comprising funnel-carrier means, an oscillating mechanism and a guide-funnel, said funnel-carrier means comprising a funnel-carrier arm supported and operated by the oscillating mechanism, including an annular funnel protector holder to be retained, by clamping means on the funnel-carrier arm.

34. The machine of claim 32, wherein the guide-funnel apparatus comprising funnel-carrier means, an oscillating mechanism and a guide-funnel, said funnel-carrier means having clamping means comprising a clamp.

35. The machine of claim 33, wherein the guide-funnel apparatus comprising funnel-carrier means, an oscillating mechanism and a guide-funnel including mounting means to be retained into the funnel protector holder of the funnel-carrier means.

36. The machine of claim 32, wherein the guide-funnel apparatus comprising funnel-carrier means, an oscillating mechanism and a guide-funnel having mounting means including a flange to mount the guide-funnel on the funnel-carrier means.

37. The machine of claim 33, wherein the guide-funnel apparatus comprising funnel-carrier means, an oscillating mechanism and a guide-funnel, said oscillating mechanism is a rotolinear oscillating mechanism by which the funnel-carrier arm including the guide-funnel, is simultaneously oscillated and lowered from an upper retracted inactive position to a lower active position and, after a molten glass gob is fed, its is simultaneously lifted and oscillated to the retracted position, and comprising:

fixed mounting means firmly held to the apparatus support frame, having height adjusting means for adjusting the height thereof;

adjustable mounting means supported by the height adjusting means of the fixed mounting means, to adjust the height of the entire guide-funnel apparatus;

drive means mounted on the adjustable mounting means, for imparting a lifting and lowering movement;

lifting and lowering means, coupled to the driving means to be lifted and lowered thereby, and which is also slide coupled to the adjustable mounting means, to be guided thereby in its lifting and lowering movement;

oscilating means coupled to the adjustable mounting means and to the lifting and lowering means to be lifted and lowered thereby, and to which is coupled the arm of the guide-funnel apparatus to be simultaneously lowered and oscillated from an upper retracted inactive position to a lower active position and, after a molten glass gob is fed, its is simultaneously lifted and oscillated to the retracted position;

cooling means to provide cooling fluid to the guide-funnel apparatus; and position sensors means mounted on the adjustable mounting means, in order to provide positioning information for measuring and controlling times of movements for mechanism synchronization.

38. The machine of claim 37, wherein the guide-funnel apparatus comprising funnel-carrier means, an oscillating mechanism and a guide-funnel; said oscillating mechanism is a rotolinear oscillating mechanism having fixed mounting means comprising a vertical fixed dovetail female guide firmly held to the apparatus support frame and height adjusting means comprising a jack mechanism retained at the lower end of the support dovetail female guide, to adjust the height of the entire guide-funnel apparatus, which is then firmly fixed to said support dovetail female guide by screws.

39. The machine of claim 38, wherein the guide-funnel apparatus comprising funnel-carrier means, an oscillating mechanism and a guide-funnel; said oscillating mechanism is a rotolinear oscillating mechanism having adjustable mounting means comprising a support dovetail male guide, engaged to the dovetail female guide of the fixed mounting means and supported by the jack mechanism of the fixed mounting means, to adjust the height of the entire guide-funnel apparatus, which is firmly fixed to said dovetail female guide by screws once its height regarding the vertical fixed dovetail female guide has been adjusted; a square male slide rail, firmly coupled to the dovetail male guide, an adjustable male cam coupled to the support dovetail male guide, and an horizontal mounting plate coupled to the support dovetail male guide, for mounting the drive means.

40. The machine of claim 37, wherein the guide-funnel apparatus including comprising funnel-carrier means, an oscillating mechanism and a guide-funnel; said oscillating mechanism is a rotolinear oscillating mechanism having drive means comprising a linear fluid motor, coupled to the horizontal mounting plate of the adjustable mounting means, having a piston rod to provide lifting and lowering movement to the funnel-carrier means.

41. The machine of claim 37, wherein the guide-funnel apparatus comprising funnel-carrier means, an oscillating mechanism and a guide-funnel; said oscillating mechanism is a rotolinear oscillating mechanism having lifting and lowering means comprising: a square "C" slide carriage at a lower free end of the piston rod of the linear fluid motor of said drive means, to be lifted and then lowered by the piston rod when the linear fluid motor is actuated, said square "C" slide carriage including lateral, back and forth slide way bearings, one of which including play adjusting means for reducing the play of the carriage regarding the adjustable mounting means.

42. The machine of claim 41, wherein the guide-funnel apparatus comprising funnel-carrier means, an oscillating mechanism and a guide-funnel; said oscillating mechanism is a rotolinear oscillating mechanism having oscillating means comprising: an adjustable male cam having a smoothly descendant curved track, adjustable coupled to the support dovetail male guide of the adjustable mounting means; a vertical shaft including bearings through which it is retained to the square "C" slide carriage of the lifting and lowering means, by means of semi-annular clamps, and having a cam follower carrier integrated thereto, including a pair of cam followers engaged to the adjustable male cam, which is adjusted by backlash adjusting screws to avoid backlash between this adjustable cam and the cam followers, to follow a combined linear and curved rotary profile of said fixed male cam.

43. The machine of claim 37, wherein the guide-funnel apparatus comprising funnel-carrier means, an oscillating mechanism and a guide-funnel; said oscillating mechanism is a rotolinear oscillating mechanism having cooling means comprising: a fluid sleeve, surrounding the upper end of the vertical shaft of the oscillating means, through which cooling air can be admitted and provided to the arm of the guide-funnel apparatus, to which the arm of the funnel apparatus, is retained.

44. The machine of claim 37, wherein the guide-funnel apparatus comprising funnel-carrier means, an oscillating mechanism and a guide-funnel; said oscillating mechanism is a rotolinear oscillating mechanism having position sensors means comprising: positioning sensors mounted on the support dovetail female guide of the adjustable mounting means, in order to provide positioning information for measuring and controlling of the times of the movements for mechanism synchronization.

45. The machine of claim 1, wherein the baffle apparatus comprising baffle-carrier means; an oscillating mechanism mounted on the apparatus support frame, in which said baffle-carrier means are mounted to simultaneously oscillating and lowering them from an upper retracted position to a lower active position; and baffle head means per cavity, carried by the baffle-carrier means, to be placed over the blank mold, for forming the bottom of the parison, and retiring it once the parison has been formed.

46. The machine of claim 45, wherein the baffle apparatus comprising baffle-carrier means, an oscillating mechanism and a baffle head means, said baffle-carrier means comprising a hollow baffle-carrier arm supported and operated by the oscillating mechanism, including holding means to retain the baffle head means.

47. The machine of claim 45, wherein the baffle apparatus comprising baffle-carrier means, an oscillating mechanism and a baffle head means, said baffle-carrier means having holding means comprising a holder and a baffle holder which is shortened for the case of a single cavity.

48. The machine of claim 46, wherein the baffle apparatus comprising baffle-carrier means, an oscillating mechanism and a baffle head means, said baffle-carrier means having holding means comprising a holder, a baffle holder which is an elongated baffle plate for multiple-cavity, and an equalizing mechanism carried by the elongated baffle plate, in which said baffle head means are mounted, so that the oscillating mechanism will oscillate the hollow baffle-carrier arm for placing the baffle head means including three baffle heads held by the equalizing mechanism, over the blank molds, with a balanced force equivalent to a force applied over the surface of the blank mold.

49. The machine of claim 48, wherein the baffle apparatus comprising baffle-carrier means, an oscillating mechanism and a baffle head means, said baffle-carrier means having an equalizing mechanism held to the elongated baffle plate, said equalizing means including: holding means coupled to the elongated baffle plate; baffle-carrier means, mounted on the holding means; and rocker means in which the baffle head means are mounted, to provide an up and down positive movement to said baffle-carrier means and said baffle head means.

50. The machine of claim 49, wherein the baffle apparatus comprising baffle-carrier means, an oscillating mechanism and a baffle head means, said baffle-carrier means having an equalizing mechanism including holding means, baffle-carrier means and rocker means, said holding means comprising an equalizer carcass including a horizontal holding body coupled to the baffle plate, having a central bore for distributing cooling and operating fluid or allow a vacuum to be applied; a horizontal conduit centrally integrated to the horizontal holding body, having a first end including a first housing, an intermediate portion having a central housing and a second end opposed to the first end, including a second housing, said first housing, central housing and second housing being positioned co-lineally to the center of each parison forming cavity, and each housing including a pair of opposed depending holding skirts, a central one of said depending holding skirts including a hemi-bore, cooperating with a pair of clamps, each having a hemi-bore, completing a holding bore for receiving a holding pin.

51. The machine of claim 49, wherein the baffle apparatus comprising baffle-carrier means, an oscillating mechanism and a baffle head means, said baffle-carrier means having an equalizing mechanism comprised by holding means, baffle-carrier means and rocker means, said baffle-carrier means comprising a top opened central baffle-carrier, and a first and a second top closed lateral baffle-carriers, each baffle-carrier to be placed at each housing of the holding means, and comprising a vertical tubular conduit, each having a transversal bore coinciding with the horizontal conduit of the holding means, for fluid communication, the central vertical tubular conduit including a flow compensator to equalize the fluid regarding the other vertical tubular conduits, a sealing metallic piston ring for sealing the housings of the holding means, to avoid leakage of cooling or operation fluid, and two pairs of opposed horizontal retention flanges, for providing up and down positive movements for equalizing forces and controlling differences of height of the blank molds, and defining a flat retention portion between them, at each opposite side of the tubular conduit to be retained by the rocker means; and a perpendicular, horizontal baffle holding ring each having a peripheral "C" shaped flange including cuttings for the introduction of a respective baffle head which remains locked when turning into the peripheral "C" shaped flange, and a housing for a retractable retaining piston, to avoid unlocking of the baffle head means.

52. The machine of claim 49, wherein the baffle apparatus comprising baffle-carrier means, an oscillating mechanism and a baffle head means, said baffle-carrier means having an equalizing mechanism comprised by holding means, baffle-carrier means and rocker means, said rocker means comprising: a first elongated rocker arm for holding a first baffle-carrier, comprised by a pair of similar opposed parallel elongated arms integrally retained, by a first end, by a horizontal upper integral wall and, at a second rounded fork end, by a vertical integral wall defining a holding fork for retaining the first baffle-carrier providing the up and down positive movement; a first bore passing through both first elongated arm and second elongated arm at the first end, and a second bore passing also through both first elongated arm and second elongated arm, at an intermediate portion thereof, for mounting said first baffle-carrier; and a second short rocker arm retaining a central baffle-carrier and a second baffle-carrier, comprised by a pair of parallel arms, integrally joined at an intermediate portion by an intermediate integral wall, having a bore passing throughout the integral wall, defining a first rounded fork end and a second rounded fork end, for retaining a central baffle-carrier and second baffle-carrier and provide them a up and down positive movement.

53. The machine of claim 45, wherein the baffle apparatus comprising baffle-carrier means, an oscillating mechanism and a baffle head means, said oscillating mechanism being a rotolinear oscillating mechanism by which the baffle-carrier means including the baffle head means, are simultaneously oscillated and lowered from an upper retracted inactive position to a lower active position and, after a parison has been formed, its is simultaneously lifted and oscillated to the retracted position, and comprising:
right hand fixed mounting means firmly held to the apparatus support frame, having height adjusting means for adjusting the height thereof;
adjustable mounting means supported by the height adjusting means of the fixed mounting means, to adjust the height of the entire baffle apparatus;
drive means mounted on the adjustable mounting means, for imparting a lifting and lowering movement;
lifting and lowering means, coupled to the driving means to be lifted and lowered thereby, and which is also slide coupled to the adjustable mounting means, to be guided thereby in its lifting and lowering movement;
oscilating means coupled to the adjustable mounting means and to the lifting and lowering means to be lifted and lowered thereby, and to which is coupled the arm of the baffle apparatus to be simultaneously lowered and oscillated from an upper retracted inactive position to a lower active position and, after a parison has been formed, its is simultaneously lifted and oscillated to the retracted position;
cooling means to provide cooling fluid to the baffle apparatus; and position sensors means mounted on the adjustable mounting means, in order to provide positioning information for measuring and controlling times of movements for mechanism synchronization.

54. The machine of claim 53, wherein the baffle apparatus comprising baffle-carrier means, an oscillating mechanism and a baffle head means, said oscillating mechanism is a rotolinear oscillating mechanism having fixed mounting means comprising a vertical fixed dovetail female guide firmly held to the apparatus support frame and height adjusting means comprising a jack mechanism retained at the lower end of the support dovetail female guide, to adjust the height of the entire baffle apparatus, which is then firmly fixed to said support dovetail female guide by screws.

55. The machine of claim 54, wherein the baffle apparatus comprising baffle-carrier means, an oscillating mechanism and a baffle head means, said oscillating mechanism is a rotolinear oscillating mechanism having adjustable mounting means comprising a support dovetail male guide, engaged to the dovetail female guide of the fixed mounting means and supported by the jack mechanism of the fixed mounting means, to adjust the height of the entire baffle apparatus, which is firmly fixed to said dovetail female guide by screws once its height regarding the vertical fixed dovetail female guide has been adjusted; a square male slide rail, firmly coupled to the dovetail male guide, an adjustable male cam coupled to the support dovetail male guide, and an horizontal mounting plate coupled to the support dovetail male guide, for mounting the drive means.

56. The machine of claim 55, wherein the baffle apparatus comprising baffle-carrier means, an oscillating mechanism and a baffle head means, said oscillating mechanism is a rotolinear oscillating mechanism having drive means comprising a linear fluid motor, coupled to the horizontal mounting plate of the adjustable mounting means, having a piston rod to provide lifting and lowering movement to the baffle-carrier means.

57. The machine of claim 56, wherein the baffle apparatus comprising baffle-carrier means, an oscillating mechanism and baffle head means, said oscillating mechanism is a rotolinear oscillating mechanism having lifting and lowering means comprising:
a square "C" slide carriage at a lower free end of the piston rod of the linear fluid motor of said drive means, to be lifted and then lowered by the piston rod when the linear fluid motor is actuated, said square "C" slide carriage including lateral, back and forth slide way bearings, one of which including play adjusting means such as a bearing, for reducing the play of the carriage regarding the adjustable mounting means.

58. The machine of claim 57, wherein the baffle apparatus comprising baffle-carrier means, an oscillating mechanism and baffle head means, said oscillating mechanism is a rotolinear oscillating mechanism having oscillating means comprising: an adjustable male cam having a smoothly descendant curved track, adjustable coupled to the support dovetail male guide of the adjustable mounting means; a vertical shaft including bearings through which it is retained to the square "C" slide carriage of the lifting and lowering means, by means of semi-annular clamps, and having a cam follower carrier integrated thereto, including a pair of cam followers engaged to the adjustable male cam, which is adjusted by backlash adjusting screws to avoid backlash between this adjustable cam and the cam followers, to follow a combined linear and curved rotary profile of said fixed male cam.

59. The machine of claim 58, wherein the baffle apparatus comprising baffle-carrier means, an oscillating mechanism and baffle head means, said oscillating mechanism is a rotolinear oscillating mechanism having cooling means comprising: a fluid sleeve, surrounding the upper end of the vertical shaft of the oscillating means, through which cooling air can be admitted and provided to the arm of the baffle-carrier means, to which the baffle head means are retained.

60. The machine of claim 54, wherein the baffle apparatus comprising baffle-carrier means, an oscillating mechanism and baffle head means, said oscillating mechanism is a rotolinear oscillating mechanism having position sensors means comprising: positioning sensors mounted on the support dovetail female guide of the adjustable mounting means, in order to provide positioning information for measuring and controlling of the times of the movements for mechanism synchronization.

61. The machine of claim 45, wherein the baffle apparatus comprising baffle-carrier means, an oscillating mechanism and baffle head means, said baffle head means comprising mounting means to be mounted on the baffle-carrier means.

62. The machine of claim 46, wherein the baffle apparatus comprising baffle-carrier means, an oscillating mechanism and a baffle head means, said baffle head means comprising mounting means consisting of a holding flange to be mounted on the baffle-carrier arm of the baffle-carrier means.

63. The machine of claim 45, wherein the baffle apparatus comprising baffle-carrier means, an oscillating mechanism and a baffle head means, said baffle head means comprising a cartridge made of a porous material, to provide a settle blow to the blank mold, providing a static pressure to form the glass finish and avoid settle wave marks, once a molten glass gob has been charged to the blank mold, a vacuum allowing that any air over the glass gob be released when a parison is being formed, and cooling fluid to cool the baffle head means, allowing quality improvements because the settle wave marks and baffle head marks in the bottom of the parison are reduced.

64. The machine of claim 45, wherein the baffle apparatus comprising baffle-carrier means, an oscillating mechanism and a baffle head means, said baffle head means comprising a single baffle head.

65. The machine of claim 45, wherein the baffle apparatus comprising baffle-carrier means, an oscillating mechanism and a baffle head means, said baffle head means comprising a plurality of baffle heads.

66. The machine of claim 45, wherein the baffle apparatus comprising baffle-carrier means, an oscillating mechanism and a baffle head means, said baffle head means comprising three baffle heads.

67. The machine of claim 1, wherein the pressing plunger apparatus, for forming a parison, comprising: an arrangement of multiple telescopic cylinder and piston assemblies for each cavity, placed at a blank mold "zero-line" position which is a constant position independent of the size of the blank mold, a parison and a finished article; a pressing plunger driven by said arrangement of cylinder and piston assemblies, for forming an entire parison by introducing the pressing plunger for a whole run through a transferable and open-able neck ring mold, and retiring it once the entire parison has been formed by the press-and-blow process, or introducing the pressing plunger for a short run through a transferable and open-able neck ring mold, to form a finished neck ring of the parison and retiring it for providing a counter-blow for forming the entire parison by the blow-and-blow process; and fluid feeding means at the arrangement of multiple telescopic cylinder and piston assemblies, for feeding cooling and operating fluid from an external source.

68. The machine of claim 67, wherein the pressing plunger apparatus comprising: an arrangement of multiple telescopic cylinder and piston assemblies a pressing plunger and fluid feeding means, said arrangement of multiple telescopic cylinder and piston assemblies including, per each cavity: a first cylinder and piston assembly mounted at said a fixed constant position on a floor cover of the machine section frame, including a hollow piston rod, providing a charging position; a second cylinder and piston assembly, mounted into the hollow piston rod of the first cylinder and piston assembly, providing a partial pressing position; a third cylinder and piston assembly, mounted on the hollow piston rod of the second cylinder and piston assembly, having a hollow piston rod, to provide, together with the first cylinder and piston assembly and the second cylinder and piston assembly, a neck ring forming position.

69. The machine of claim 68, wherein the pressing plunger apparatus comprising: an arrangement of multiple telescopic cylinder and piston assemblies a pressing plunger and fluid feeding means, said arrangement of multiple telescopic cylinder and piston assemblies including, per each cavity: a first, a second and a third cylinder and piston assembly, said first cylinder and piston assembly comprising:

a first cylinder having a first annular piston into the same and a top support, mounted at a fixed constant position on the floor cover of machine section frame, having an upper internal screwed portion; fluid passages at the top support of the upper end of the cylinder, for feeding operating fluid from an external source for retracting the first annular piston; and a bottom end cap retained on an integral fluid network plate for admission of operating fluid and cooling fluid for extending the stroke of the first annular piston, and a central conduit for feeding cooling fluid;

the first annular piston into the first cylinder, defining a lower chamber for extending this first annular piston, in combination with a releasing of the retraction of the second cylinder and piston assembly, at a charging position, in a press-and-blow process or a neck ring forming position in a blow-and-blow process, defining an upper chamber for retracting the first piston, said first annular piston having a hollow piston rod acting as a second internal cylinder for a second cylinder and piston assembly, an upper internal screwed portion and a lower integral internal bushing including fluid passages for feeding operating fluid, and a shock absorber both at its lower and upper ends of said first annular piston;

a first fixed sealing sleeve mounted on the bottom cap, for slide sealing the first piston and its internal bushing, having a plurality of perforations near to its upper end;

a first fixed concentric grooved tube having integral internal bushing, and is welded to the first sealing sleeve defining internal axial fluid passages communicating with perforations, for providing operating fluid for extending a second pressing piston;

a first end cap rod bushing having an external screw portion to be screwed to the upper internal screw portion of the first cylinder, for limiting the extended stroke of the first piston and guiding the hollow piston rod, and passages communicated with the passages of the cylinder, for providing operating fluid for retracting the piston;

a second end cap rod bushing having first fluid passages for providing fluid for the extended stroke of a third final pressing piston, and second fluid passages, for providing operating fluid for a second piston at its retracted stroke at a chamber of the second cylinder and piston assembly, said fluid passages being fluid fed through external telescopic tubing through said second end cap rod bushing, said second end cap rod bushing having shock absorbers, at its upper end, and a lower external screw portion, screwed to the upper internal screwed portion of the hollow piston rod, to be lifted by said hollow piston rod when the first piston is actuated to its extended stroke limited by the first end cap rod bushing;

a guiding sleeve mounted on the second end rod bushing by means of an annular bipartite retention flange, for guiding a release and guide member, and including a first internal spring having a lower end abutting against the flange over the second end rod bushing and an upper end connected with the upper external step, and a second external spring having a lower end abutting also against the flange over the second end rod bushing and an upper end abutting against a lower end of the a release and guide member for allowing a quick change of the piston and cushioning a connection of a floating guide sleeve with the transferable and open-able neck ring mold;

a pulling sleeve including an upper external step in which abuts the upper end of the first internal spring, and a second internal lower step for defining said charge position;

a floating guiding sleeve having an external conical upper end to be centered regarding the transferable and open-able neck ring mold, an intermediate external annular shoulder and a lower end which guides the pressing plunger throughout its stroke;

a release and guide member having a lower end abutting against the upper end of the second external spring, and an upper end having an external screw portion, defining a floating housing for the floating guiding sleeve, which can be moved in a horizontal plane but not in the vertical plane, to assure aligning with the transferable and open-able neck ring mold;

a retaining bushing having an external annular shoulder abutting against an upper end of the guiding sleeve, to be retained by screws and an annular step, in order to limit the stroke of the release and guide member; and a cap end having a first annular step abutting against the release and guide member defining the floating housing, and an internal screw portion which is screwed to the external screw portion of the release and guide member;

in this way, for mounting or demounting the pressing plunger on the plunger carrier, or the variable adapting segment, the first, second and third pistons are placed at a fully extended position, and then the floating guiding sleeve is fully retracted by compressing the springs, in order to allow access to a snap groove of the plunger carrier.

70. The machine of claim 68, wherein the pressing plunger apparatus comprising an arrangement of multiple telescopic cylinder and piston assemblies a pressing plunger and fluid feeding means, said arrangement of multiple telescopic cylinder and piston assemblies including, per each cavity: a first, a second and a third cylinder and piston assembly; said second cylinder and piston assembly comprising:

a second charging and pre-pressing piston slide placed into the hollow piston rod of the first cylinder and piston assembly, having shock absorbers both at its lower and upper ends of second charging and pre-pressing piston, defining a lower chamber for extending the piston and an upper chamber for retracting the piston, and including a second hollow piston rod having fluid perforations near to its lower end, and including a second internal concentric grooved tube defining fluid passages connecting the fluid perforations of the second hollow piston rod, for passing operating fluid to a third final pressing piston through a third end cap rod bushing, when the second piston is in its fully extended stroke, connecting in turn the passages of the second end cap rod bushing of the first cylinder and piston assembly, with said fluid perforations of the second hollow piston rod, said second hollow piston rod including an upper external screw, to be screwed to said third end cap rod bushing, and an upper internal screw portion, to be screwed to an internal bushing;

a second movable up and down concentric tube sliding into the integral internal bushing of the first cylinder and piston assembly, for feeding cooling air, counterblow or a vacuum to a pressing plunger or short neck ring forming plunger; and a third end cap rod bushing at the upper end of the hollow piston rod and the concentric grooved tube, for housing a third cylinder, and including an internal screw portion to be screwed to the upper external screw of the concentric grooved tube, and an external screw portion to be screwed to an internal screw portion of a third final pressing cylinder of the third cylinder and piston assembly; a fluid passage, coinciding with the passages defined by the concentric grooved tube and the hollow piston rod, and an internal bushing for guiding a lower piston rod of a third final pressing piston, so that when this second cylinder and piston assembly is fully extended, place the pressing plunger at a partial pressing position.

71. The machine of claim 68, wherein the pressing plunger apparatus comprising: an arrangement of multiple telescopic cylinder and piston assemblies a pressing plunger and fluid feeding means, said arrangement of multiple telescopic cylinder and piston assemblies including, per each cavity, a first, a second and a third cylinder and piston assembly; said third cylinder and piston assembly comprising a cylinder having a lower internal screw portion to be screwed to the external screw portion of the third end cap rod bushing of the second cylinder and piston assembly, which in turn defines a chamber;

a third final pressing piston placed into the third final pressing cylinder, defining a lower chamber under the third final pressing piston, to be actuated by actuating fluid to the final pressing position, and an upper chamber over the third final pressing piston, and having a first spring for retracting the third final pressing piston, a first lower piston rod guided by the internal bushing, and a third upper hollow piston rod including an internal screw portion;

a plunger carrier mounted on the third upper hollow piston rod having an internal screw portion to be screwed to the external screw portion of the third final pressing piston, comprising an inner snap groove to retain a pressing plunger;

a pressing plunger, for a press-and-blow process, having a holding flange to be introduced through the snap groove of the plunger carrier in order to be retained thereby;

a variable adapting segment having an upper end including a semi-annular shoulder having a recess, retained between the plunger carrier and the pressing plunger of this third cylinder and piston assembly, and a lower end abutting against the second internal step of the pulling sleeve of this third cylinder and piston assembly, this variable adapting segment pulls downwardly the pulling sleeve of said cylinder and piston assembly when the piston rod of the second cylinder and piston assembly is retracted, compressing the spring of the first cylinder and piston assembly, for preparing the inverting movement of the unidirectional rotary inverting apparatus to take place; the recess of the semi-annular shoulder, allows a rapid change of the pressing plunger, as well as the same variable adapting segment, by pushing down the floating guiding sleeve to release the pressing plunger for a charge position adjustment by varying the length of this variable adapting segment.

72. The machine of claim 67, wherein the pressing plunger apparatus comprising: an arrangement of multiple telescopic cylinder and piston assemblies, a parison forming plunger and fluid feeding means, said parison forming plunger being a pressing plunger mounted on the hollow piston rod of the third cylinder and piston assembly, to introduce the parison forming plunger into the transferable and open-able neck ring mold in a charging position ready to receive a molten glass gob fed to the blank mold, by actuation of the first cylinder and piston assembly and a releasing of the retraction of the second cylinder and piston assembly, then partially pressing the glass gob into de blank mold and transferable and open-able neck ring mold, to partially form the parison by actuation of the second cylinder and piston assembly, and then finally pressing the glass gob into the blank mold, by actuation of the third cylinder and piston assembly, to form a parison, by the press-and-blow process.

73. The machine of claim 72, wherein the pressing plunger apparatus comprising: an arrangement of multiple telescopic cylinder and piston assemblies, a parison forming plunger and fluid feeding means, said parison forming plunger being a short neck ring forming plunger mounted on the hollow piston rod of the third cylinder and piston assembly, to introduce the short neck ring forming plunger into the transferable and open-able neck ring mold in a neck ring forming position ready to receive a molten glass gob fed to the blank mold, and form the neck ring of the parison by the action of the first cylinder and piston assembly, the second cylinder and piston assembly and third cylinder and piston assembly, simultaneously applying a vacuum through a central conduit passing through the first, second and third cylinder and pressing plungers for aiding neck ring finishing in combination with a settle blow provided by the baffle apparatus, and then retracting the third cylinder and piston assembly to retire the short neck ring forming plunger, to provide a counter-blow for finishing the parison by the blow-and-blow process.

74. The machine of claim 67, wherein the pressing plunger apparatus comprising an arrangement of multiple telescopic cylinder and piston assemblies, a parison forming plunger and fluid feeding means, including fluid passages and valve means to provide positive or negative pressure to the whole pressing plunger apparatus.

75. The machine of claim 74, wherein the pressing plunger apparatus comprising an arrangement of multiple telescopic cylinder and piston assemblies, a parison forming plunger and fluid feeding means, including fluid passages comprising a central passage passing throughout said arrangement of telescopic cylinder and piston assemblies and a three-positions directional valve to provide positive or negative pressure to the whole pressing plunger apparatus so that for a blow-and-blow process the short neck ring forming plunger being at a charging position firstly provide a vacuum through said central passage and diagonal passages at the short neck ring forming plunger in order that a molten glass gob fed to the blank mold and a transferable and open-able neck ring mold, completely and rapidly fills said transferable and open-able neck ring mold, in addition to a settle blow provided by the baffle apparatus, and then, when the piston of the third cylinder and pressing piston is retracted, the three-positions directional valve changes to positive pressure providing a counter-blow to form a parison, and in a third position, said three-positions directional valve is under inactive position.

76. The machine of claim 75, wherein the pressing plunger apparatus comprising plane nozzles placed independently over the pressing plunger or short neck ring forming plunger, providing an air curtain to avoid foreign matter to enter into the pressing plunger apparatus.

77. The machine of claim 1, wherein the indexed unidirectional rotary inverting apparatus, is a servo-controlled indexed unidirectional rotary inverting apparatus for providing an optimum path of inversion of the parison, avoiding deformation thereof.

78. The machine of claim 1, wherein the indexed unidirectional rotary inverting apparatus including a rotary support driving mechanism, a driving mechanism, a first and a second open-able horizontal holding arms, and a neck ring mold holding and releasing mechanism, said rotary support driving mechanism comprising: a rotary carcass, to contain and support the first and second open-able horizontal holding arms and the neck ring mold holding and releasing mechanism, having a first lateral end including a power shaft coupled to a power output coupling of the driving mechanism, to be unidirectional indexed rotated thereby firstly 180° clockwise moving the parison upwardly constricting it or counterclockwise moving the parison downwardly stretching it, and then additional 180° completing a 360° turn, and a second opposed lateral end supported by a bearing which in turn is supported on a clamping support supported on the apparatus support frame to allow unidirectional indexed rotation of said rotary carcass; a first pair of mounting guides and a second pair of mounting guides diametrically opposed at 180° to the first pair of mounting guides, each of which are horizontally retained, parallel to the rotation axis, by the rotary carcass; a first pair of sliding neck ring arm holders assembled opposed face to face, slide mounted on the first pair of mounting guides, and a second pair of sliding neck ring arm holders also assembled opposed face to face, slide mounted on the second pair of mounting guides, which is placed opposed 180° to the first pair of sliding neck ring arm holders; each of the neck ring arm holders include a cam follower retained near to the opposite internal faces thereof; and a central fixed axis, axially passing through the rotary center of the carcass, for providing actuating fluid, and having a first end which is supported by the power shaft by means of a bearing, and a second end supported and clamped by the clamping support; and a pair of passages to be connected to a source of actuating fluid, as a rotary union, to provide actuating fluid to motors of the neck ring holding and releasing mechanism.

79. The machine of claim 1, wherein the indexed unidirectional rotary inverting apparatus including a rotary support driving mechanism, a driving mechanism, a first and a second open-able horizontal holding arms, and a neck ring mold holding and releasing mechanism, said driving mechanism comprising: a carcass including a first lateral cap and a second lateral cap, each at each side of the carcass; said second lateral cap having a double keyway opposed 180° one another, and a support plate having a keyway which will be placed at a position depending on the mechanism in which the driving mechanism is mounted, said support plate is mounted on the apparatus support frame by means of a semi-annular clamp; a horizontal axis supported by bearings to the first and second lateral caps, and including a slow speed gear having a power output coupling, which is to be coupled to the power shaft of the rotary support driving mechanism, for transmission of the output power; a sleeve coupled on the carcass, including a high speed extension shaft into said sleeve, having a worm gear at its lower end, gearing with the slow speed gear, which is provided with an anti-backlash mechanism, for reducing velocity and transmit power to said unidirectional inverting apparatus; a flexible couple at the lower end of the high speed extension shaft, for retiring the servomotor from the heat zone of the parison; and a rotary servomotor for rotating the high speed extension shaft, by means of the flexible couple, and supported by a frame at the lower end of the sleeve; and a flange at an intermediate position of the sleeve, to be supported on the apparatus support frame, avoiding vibration of the whole structure, so that, the double keyway of the lateral cap, allows this driving mechanism to be placed on a 180° opposed position to be mounted at the bi-directional curvilinear take out apparatus without disassembling the driving mechanism.

80. The machine of claim 1, wherein the indexed unidirectional rotary inverting apparatus including a rotary support driving mechanism, a driving mechanism, a first and a second open-able horizontal holding arms, and a neck ring mold holding and releasing mechanism, each of said first and second open-able horizontal holding arms comprising: a first pair of neck ring mold holding arms, and a second pair of neck ring mold holding arms, respectively coupled to slide neck ring arm holders of the rotary support driving mechanism; each of the neck ring mold holding arms, including a semi-annular holding flange, to retain a transferable and open-able neck ring mold by its flange, a semi-annular retaining flange under the semi-annular holding flanges, in order that the neck ring holding arms retain the transferable and open-able neck ring mold when they are closed, during the inverting action; an elongated spring iron band each having a central flat face and two inclined end faces, each finishing in an end flexible "V" shaped position limiter and retained by pins between the annular holding flanges and the semi-annular retaining flange, in order to align the neck ring mold halves, retained assembled by the annular spring, by their two plane angular faces, to avoid misalignment regarding the partition line of the blank mold; the first pair of neck ring mold holding arm, retain the first transferable and open-able neck ring mold at a so called fixed blank mold "zero-line" while the a second pair of neck ring mold holding arms retains the second transferable and open-able neck ring mold, placed at the so called fixed blow mold "zero-line", both displaced downwardly and upwardly from the central axis of said arms, so that said stepped fashion allows to include blank molds having different lengths, without the necessity to adjust the location of the blank mold apparatus.

81. The machine of claim 78, wherein the indexed unidirectional rotary inverting apparatus including a rotary support driving mechanism, a driving mechanism, a first and a second open-able horizontal holding arms, and a neck ring mold holding and releasing mechanism comprising: a first pair of springs each of which is mounted around an end of the mounting guides of the rotary support driving mechanism, abutting against each end of the rotary carcass and against an external face of each of the sliding neck ring arm holders of said rotary support driving mechanism, and a second pair of springs, each of which is similarly mounted around an end of one of the second pair of the mounting guides abutting against each end of the rotary carcass, and against an external face of the second pair of sliding neck ring arm holders, in order to keep said first and second pairs of neck ring arm holders and, consequently, said first and second pairs of neck ring holding arms, normally closed by the pushing force of said springs, in a position wherein the transferable and open-able neck ring mold is retained at the parison forming station; and a pair of fluid motors, each of which is respectively mounted at an upper and a lower end of the carcass, and each including a piston rod respectively having a two-tapered-face cam maintained in contact with said normally closed cam followers, aligned regarding the central union line of the blank mold or the blow mold, to be introduced between each pair of cam followers, in order to uniformly and simultaneously open the neck ring mold holding arms, overcoming the pushing force of the springs, which, by the action of the fluid motors, in order to release the transferable and open-able neck ring mold at the intermediate station, and, when the fluid is released from the fluid motors, the neck ring mold holding arms, are closed by the action of the springs.

82. The machine of claim 1, wherein the transference apparatus is a servo-controlled bi-directional curvilinear transference apparatus for providing an optimum path of translation of the parison, avoiding deformation thereof.

83. The machine of claim 82, wherein the bi-directional curvilinear transference apparatus including mounting means, a driving mechanism, an oscillatory hollow arm a parison transference mechanism and a two-positions opening mechanism; said mounting means comprising: a support bench mounted on the apparatus support frame, including a pair of semi-annular clamps in an end of the support bench, and a further semi-annular clamp, in a second end of the support bench, in order to hold both the bi-directional curvilinear transference apparatus and the driving mechanism therefore.

84. The machine of claim 83, wherein the bi-directional curvilinear transference apparatus including mounting means, a driving mechanism, an oscillatory hollow arm a parison transference mechanism and a two-positions opening mechanism; said driving mechanism comprising: a carcass including a first lateral cap and a second lateral cap, each at each side of the carcass; said second lateral cap having a double keyway opposed 180° one another, and a support plate having a keyway which will be placed at a position depending on the mechanism in which the driving mechanism is mounted, said support plate is mounted on the apparatus support frame by means of a semi-annular clamp; a horizontal axis supported by bearings to the first and second lateral caps, and including a slow speed gear having a power output coupling, for transmission of the output power; a sleeve coupled on the carcass, including a high speed extension shaft into said sleeve, having a worm gear at its lower end, gearing with the slow speed gear, which is provided with an anti-backlash mechanism, for reducing velocity and transmit power to said unidirectional inverting apparatus; a flexible couple at the lower end of the high speed extension shaft, for retiring a servomotor from the heat zone of the parison; and a rotary servomotor for rotating the high speed extension shaft, by means of the flexible couple, and supported by a frame at the lower end of the sleeve; and a flange at an intermediate position of the sleeve, to be supported on the apparatus support frame, avoiding vibration of the whole structure, so that, the double keyway of the lateral cap, allows this driving mechanism to be placed on a 180° opposed position to be mounted at the bi-directional curvilinear transference apparatus without disassembling the driving mechanism.

85. The machine of claim 83, wherein the bi-directional curvilinear transference apparatus including mounting means, a driving mechanism, an oscillatory hollow arm a parison transference mechanism and a two-positions opening mechanism; said oscillatory hollow arm comprising: a first arm half and a second arm half, both assembled opposed face to face, defining an internal chamber and interconnected fluid passages, and having a first end retained by a rotary seal carrier union which in turn is supported, by means of a bearing, by the support bench of the mounting means and clamped by the semi-annular clamp, a power shaft coupled to the second arm half, to be coupled to a power output coupling of the driving mechanism, defining a rotary axis for the oscillatory hollow arm, in order to be oscillated 180° for a servo-controlled path from the intermediate reheating station at the blow mold "zero-line", to the blow forming station, return to the intermediate station, and then it is lifted at a position of about 90° waiting for a next cycle, and a fixed axis, supported and clamped by the semi-annular clamp and by the power shaft by means of a bearing, and including a fixed gear; an idle gear, gearing the fixed gear, and which is comprised by two gear halves assembled opposed face to face shifted from each other, by adjusting screws, to adjust backlash, retained into the internal chamber by means of bearings, defining an intermediate idle axis; and a second end, including an axis retained by a bearings, into said second end of the oscillatory arm including a synchronizing gear, gearing with the idle gear, which is clamped to the axis; an inverted U-shaped oscillating support, having two lateral walls, each having a semi annular sliding recess to be freely mounted at both ends of the axis, and retained by means of corresponding semi-annular clamp, so as to freely oscillate on the axis, the wall of said U-shaped oscillating support has an external mounting face including shaft housings, said U-shaped oscillating support, when the hollow arm rotates on the fixed axis, this U-shaped oscillating support is maintained at the same horizontal orientation during the whole rotation of the arm, describing a curvilinear translation path due to the idle gear and synchronizing gear; said semi annular clamp having a transmission tong including two opposite conical pilot guides, and cooperates with an upper semi annular clamp and a lower semi-annular clamp both clamped on the axis, said lower semi-annular clamp having two spaced legs defining a space between them in which the transmission tong of the clamp, is placed and held by adjusting conical-ended screws in sad space legs introduced into the conical pilot guides of the transmission tong, in order to allow adjusting of the horizontal position of said U-shaped oscillating support, to be parallel to the upper surface of the blow mold, by means of said adjusting screws, and avoid lateral displacement thereof by means of the conical ends of the screws and the pilot guides.

86. The machine of claim 83, wherein the bi-directional curvilinear transference apparatus including mounting means, a driving mechanism, an oscillatory hollow arm a parison transference mechanism and a two-positions opening mechanism; said parison transference mechanism comprising a transference finger carrier coupled to the face of the oscillating support of the oscillatory hollow arm, comprising a carcass, having a pair of parallel mounting guides, horizontally retained into the carcass, having the same orientation as the axis, and by the housings of the oscillating support; a pair of carrier holders, slide mounted on the pair of mounting guides; each of the carrier holders include a cam follower, retained near to the opposite internal faces thereof; two pairs of springs each pair mounted around an end of each of the mounting guides, abutting against the rotary carcass and against an external face of each of the sliding carrier holders in order to keep said carrier holders normally closed by the pushing force of said springs; and a pair of holding finger arms coupled to the carrier holders, including a pair gripping fingers, which consequently are in a position normally closed.

87. The machine of claim 83, wherein the bi-directional curvilinear transference apparatus including mounting means, a driving mechanism, an oscillatory hollow arm a parison transference mechanism and a two-positions opening mechanism; said two-positions opening mechanism comprising: a two-positions actuating fluid motor, mounted on the carcass, comprising a cylinder, including an upper cap having a guiding hole, a fluid passage and a lower cap also having a guiding hole; a first limiter step at the upper cap, and a second limiter step, in the lower cap; a first piston into the cylinder defining an upper chamber between the upper cap and the piston, and a lower chamber under the piston, and having a first upper piston rod passing through the guiding hole of the upper cap, having adjusting nuts, for adjusting the stroke of the first piston; and a second hollow piston rod having a plurality of fluid transference passages in order to communicate the actuating fluid form the lower chamber to an upper chamber over a second piston, placed into the hollow piston rod; a second piston, placed into the hollow piston rod, having a piston rod including a connecting rod having two-tapered-face cams, so that, when the first piston is firstly actuated by feeding actuating fluid through a fluid passage at the upper chamber of the cylinder, runs downwardly to a stroke limited by the adjusting nuts abutting against the first limiter step, and pushes downwardly the second piston at a first stroke maintained by the force of the springs and by the fluid pressure on the upper chamber to open the holding finger arms for holding and handling a transferable and open-able neck ring mold; then when fluid is admitted through to the passage to the lower chamber, this in turn is communicated through the fluid transference passages to the second upper chamber so that the second piston reaches to its fully extended stroke to uniformly and simultaneously open the transferable and open-able neck ring mold retained by the holding finger arm, releasing the parison to vertically fall flat at a blow mold; and finally when the fluid from the chamber is released, the springs return the piston holding the transferable and open-able neck ring mold closed by an annular tension spring to be turned by this servo-controlled bi-directional curvilinear translation apparatus, back to the intermediate station and lifting the empty gripping fingers about a 90° position, waiting for a following cycle.

88. The machine of claim 1, wherein the blow mold apparatus comprising:
a blow mold per cavity, each blow mold comprising two similar blow mold halves to be assembled opposed face to face, both forming a cavity for forming a finished glassware article, once a finished parison has been feed thereto, each blow mold half having an article forming cavity, mounting means for mounting the blow mold halves and cooling means for directly cooling the blow mold halves;
a blow mold holding mechanism mounted on the apparatus support frame at a fixed blow mold "zero-line", holding the blow mold halves by their mounting means; and
an opening and closing mechanism mounted on the machine support frame, coupled to the blow mold holding mechanism for closing the blow mold halves enclosing a parison fed thereto to be blown therein for forming a finished article, and opening them releasing the forming article.

89. The machine of claim 88, wherein the blow mold apparatus including a blow mold per cavity, a blow mold holding mechanism, an opening and closing mechanism, a bottom mold plate mechanism and a blow head apparatus; said blow mold including two blow mold halves, each having mounting means including a holding flange, to be mounted on the blow mold holding mechanism mounted in turn on the apparatus support frame, at the fixed blow mold "zero-line".

90. The machine of claim 88, wherein the blow mold apparatus including a blow mold per cavity; a blow mold holding mechanism; an opening and closing mechanism, a bottom mold plate mechanism and a blow head apparatus; said blow mold including two blow mold halves, each having cooling means comprising a plurality of axial passages axially passing through said blow mold half for internally cooling it.

91. The machine of claim 88, wherein the blow mold apparatus, including a blow mold per cavity, a blow mold holding mechanism, an opening and closing mechanism, a bottom mold plate mechanism and a blow head apparatus; said blow mold holding mechanism including: mounting means to be mounted on the opening and closing mechanism; a first and a second arms pivotally mounted on the mounting means in a hinged arrangement; blow mold holders held by the first and second arms in which the blow mold halves are held by their holding means; and cooling means connected in fluid communication to the cooling means of the blow mold halves for cooling the blow mold holding mechanism.

92. The machine of claim 88, wherein the blow mold apparatus, including a blow mold per cavity, a blow mold holding mechanism, an opening and closing mechanism, a bottom mold plate mechanism and a blow head apparatus; said blow mold holding mechanism having mounting means including a mounting bracket.

93. The machine of claim 88, wherein, the blow mold apparatus, including a blow mold per cavity, a blow mold holding mechanism, an opening and closing mechanism, a bottom mold plate mechanism and a blow head apparatus; said blow mold holding mechanism including, for a multiple-cavity, blow mold holders comprising equalizing means in which are mounted the blow mold halves so that the blow mold halves can be uniformly closed with a similar closing force.

94. The machine of claim 93, wherein the blow mold apparatus comprising a blow mold per cavity, a blow mold holding mechanism, and an opening and closing mechanism; said blow mold holding mechanism including, for a triple cavity, blow mold holders having equalizing means comprising: a first equalizing beam, mounted on the first arm of the blow mold holding mechanism; a first single blow mold holder mounted in said first equalizing beam, in which it is respectively mounted a blow mold half, and a dual blow mold holder also mounted in said first equalizing beam, in which are mounted two blow mold halves; and a first corresponding opposed single blow mold holder mounted in a second equalizing beam mounted on the second arm of the blow mold holding mechanism, in which is respectively mounted a blow mold half and a dual blow mold holder also mounted in said second equalizing beam, in which are mounted two blow mold halves, so that the blow mold halves can be uniformly closed with a similar closing force.

95. The machine of claim 93, wherein the blow mold apparatus comprising a blow mold per cavity, a blow mold holding mechanism, and an opening and closing mechanism; said blow mold holding mechanism including, for a triple cavity, blow mold holders having equalizing means comprising: a first equalizing beam, mounted on a first arm of the blow mold holding mechanism, having a first single blow mold holder mounted in said first equalizing beam, in which it is respectively mounted a blow mold half, and a first dual blow mold holder including a first holder and a second holder, which is also mounted in said first equalizing beam and in which are mounted two blow mold halves; and a second equalizing beam mounted on a second arm of the blow mold holding mechanism, having a second single blow mold holder mounted in said second equalizing beam, in which is respectively mounted a blow mold half, facing against the first holder of the first dual blow mold holder, and a second dual blow mold holder including a first holder and a second holder, which is also mounted in said second equalizing beam and in which are mounted two blow mold halves, facing the first holder of its second blow mold holder against the first single bank mold holder of the first equalizing beam, and facing the second holders of the first and second dual blow mold holders to each other, so that the blow mold halves can be uniformly closed with a similar closing force.

96. The machine of claim 93, wherein the blow mold apparatus comprising a blow mold per cavity, a blow mold holding mechanism, and an opening and closing mechanism; said blow mold holding mechanism including, for a triple cavity, blow mold holders having equalizing means comprising: a first equalizing beam, mounted on a first arm of the blow mold holding mechanism, having a single blow mold holder mounted in said first equalizing beam, in which it is respectively mounted a blow mold half, and a dual blow mold holder also mounted in said first equalizing beam, in which are mounted two blow mold halves; and a second equalizing beam mounted on a second arm of the blow mold holding mechanism, having a trial blow mold holder facing the single and dual blow mold holders of the first equalizing beam, so that the effect that the blow mold halves be uniformly closed with a similar closing force, is achieved by the single and dual blow mold holders.

97. The machine of claim 88, wherein the blow mold apparatus, including a blow mold per cavity, a blow mold holding mechanism, an opening and closing mechanism, a bottom mold plate mechanism and a blow head apparatus; said blow mold holding mechanism, including cooling means comprising a two-halves cooling box including nozzles placed at a height depending on the height of a family of articles, for directing cooling fluid into the axial passages of the blow mold halves, said cooling box is slide coupled on the sliding platform of the "T" shaped sliding valve of the power and fluid feeding system, mounted on the apparatus support frame, and maintained in sealed contact by the spring of said "T" shaped sliding valve, providing a communication of the cooling fluid during the whole path of the opening and closing operation of the blow mold.

98. The machine of claim 88, wherein the blow mold apparatus, including a blow mold per cavity, a blow mold holding mechanism, an opening and closing mechanism, a bottom mold plate mechanism and a blow head apparatus; said blow mold opening and closing mechanism comprising:

support frame means mounted on the apparatus support frame, for supporting and retaining internal components;

driving means to provide a back and forth movement;

first transmission means coupled to the driving means, to transmit the back and forth movement;

second transmission means coupled to said first transmission means, to transform the back and forth movement into a limited rotary movement;

support pivoting means mounted on the support frame means, on which the first and second arms of the blow mold holding mechanism are mounted;

toggle means mounted on the upper end of the rotary operating shafts, in which the first and second arms of the blow mold holding mechanism are mounted in order to open and closing them;

anti-deflector means, mounted on the support frame means, to reduce flexion of the shafts and the pivoting means;

aligning means mounted on support frame means, for aligning the first transmission means in its back and forth movement; and position indicator means connected to the transmission means, to provide a feedback about the position of the first transmission means to measure velocity, time and displacement of the closing and opening mechanism and synchronizing of mechanisms.

99. The machine of claim 98, wherein the blow mold apparatus, including a blow mold per cavity, a blow mold holding mechanism and an opening and closing mechanism, said blow mold opening and closing mechanism having support frame means comprising a carter mounted on the apparatus support frame, including a removable bottom plate at each side of the carter, each of the sides of the carter having a housing including a shouldered plain bearing, and a removable cap to allow assembling and maintenance of internal components.

100. The machine of claim 98, wherein the blow mold apparatus including a blow mold per cavity, a blow mold holding mechanism, and an opening and closing mechanism; said blow mold opening and closing mechanism having driving means comprising a fluid cylinder and piston assemblies horizontally retained by a carter, including a horizontal piston rod and a horizontal plate gripped to the piston rod, to impart back and forth movements; a first floating cushion bushing surrounding the piston at a forth stroke, and a second cushion bushing coupled to the piston in order to cushion the back and forth strokes of the piston rod.

101. The machine of claim 100, wherein the blow mold apparatus including a blow mold per cavity, a blow mold holding mechanism, and an opening and closing mechanism; said blow mold opening and closing mechanism having first transmission means comprising a rack portion at each end of the horizontal plate of the driving means, to be simultaneously moved back and forth by said driving means.

102. The machine of claim 101, wherein the blow mold apparatus including a blow mold per cavity, a blow mold holding mechanism, and an opening and closing mechanism, said blow mold opening and closing mechanism having second transmission means comprising two rotary operating shafts each mounted on a side of the support frame means, each including a lower support end mounted into a plain bearing of the bottom plate of the support frame means, an intermediate support portion and an upper anti-deflector support, and a pinion segment at a lower end of said shafts, gearing said rack portions of the first transmission means, to transform the back and forth movement into a limited rotary movement to the shafts.

103. The machine of claim 102, wherein blow mold apparatus including a blow mold per cavity, a blow mold holding mechanism, and an opening and closing mechanism, said blow mold opening and closing mechanism having support pivoting means comprising a mounting bracket mounted on a carter of the support frame means, including a hollow column at each side thereof, placed at the position of the shafts of the second transmission means enclosing them; an intermediate internal housing, lodging a plane bearing holding the intermediate portion of the shafts, and a central conical housing, including an anti-sliding taper lock, retaining a lower end of a central post in which the first and second arms of the blow mold holding mechanism are mounted on a wearing washer, to act as a pivot for said first and second arms of the blow mold holding mechanism and a positive stop member positioned by an adjustable nut and screw assembly, to adjust the position of the toggle means.

104. The machine of claim 103, wherein the blow mold apparatus including a blow mold per cavity, a blow mold holding mechanism, and an opening and closing mechanism, said blow mold opening and closing mechanism having toggle means comprising a connecting crank mounted on the upper end of the rotary operating shafts of the second transmission means, by means of a clamping screw, a pin key to avoid torsion displacement of the crank, a stop member, limiting the rotation of the crank by the adjustable nut and screw assembly of the mounting bracket of the support pivoting means, and a pin rod, a connecting rod mounted on the pin rod, and a pin mounted on the connecting rod, in which are mounted the arms of the blow mold holding mechanism, so that, when the angle between the connecting rod and a line from the center of the rotary operating shaft of the second transmission means to the center of the pin of the connecting rod is near to 0°, the toggle means provides the maximum closing force or opening force of the blow mold halves, the toggle effect can also be controlled by extending the longitude of the connecting rod, in case of wearing of the first and second transmission means.

105. The machine of claim 98, wherein the blow mold apparatus including a blow mold per cavity, a blow mold holding mechanism, and an opening and closing mechanism, said blow mold opening and closing mechanism having anti-deflector means comprising: an anti-deflector plate held to the mounting bracket of the support pivoting means and comprising a housing retaining a plain bearing at each end thereof, in order to avoid deflection of the upper end of the shafts of the second transmission means, and a central anti-deflector plate held to the anti-deflector plate, including a housing having a bushing in order to retain the upper end of the central post of the support pivoting means, avoiding deflection thereof.

106. The machine of claim 100, wherein the blow mold apparatus including a blow mold per cavity, a blow mold holding mechanism, and an opening and closing mechanism, said blow mold opening and closing mechanism having aligning means comprising an alignment guide busing held by pressure by the carter of the support frame means, surrounding the cylindrical rack portions of the first transmission means, to align them, and a central bushing surrounding an extension rod of the piston rod of the driving means, which is coupled to the horizontal plate gripped to the piston rod of said drive means, in order to guide and support the piston rod during its movement back and forth.

107. The machine of claim 102, wherein the blow mold apparatus including a blow mold per cavity, a blow mold holding mechanism, and an opening and closing mechanism, said blow mold opening and closing mechanism having position indicator means comprising a rotary position indicator, connected at the lower end of one of the lower support ends of the rotary operating shafts of the first transmission means, to provide a feedback about the position of said rotary operating shafts to measure velocity, time and displacement of the closing and opening mechanism and to synchronizing this opening and closing mechanism regarding the transference apparatus and take out apparatus.

108. The machine of claim 1, wherein the bottom mold plate mechanism for forming the bottom of a glassware article, comprising: a bottom mold plate forming the bottom of a glassware article; mounting means mounted on a floor cover of the machine section frame, for mounting the bottom mold plate, cooling and vacuum means at said mounting means, for providing a vacuum pressure at the blow mold in order to help the blown of a glass article, and for providing the cooling fluid to cool said bottom mold plate; and height adjusting means placed at the mounting means, for lifting and lowering the whole bottom mold plate mechanism.

109. The machine of claim 108, wherein the bottom mold plate mechanism comprising a bottom mold plate, mounting means, cooling and vacuum means and height adjusting means, said bottom mold plate comprising three floating bottom mold plates, for a triple cavity machine, releasable and auto-adjusted coupled on corresponding pads of a bottom mold carrier plate, each coinciding with the center of the corresponding cavity of each blow mold, so that when the blow molds are closed around the floating bottom molds, they are auto-aligned with the center of each cavity, forming the bottom of the glassware articles.

110. The machine of claim 108, wherein the bottom mold plate mechanism comprising a bottom mold plate, mounting means, cooling and vacuum means and height adjusting means, said mounting means for a triple cavity machine, including:
  a first fixed mounting block, mounted on a floor cover of the machine section frame, including a central housing for height adjustment;
  a second up and down movable block mounted on the height adjusting means over the first fixed mounting block in order to support and adjust the height of the bottom mold plates at an article forming position;
  a spacing block coupled on the second movable block, in order to adjust the height of the bottom mold plates at whatever height of family of glassware articles;
  a distribution plate coupled on the spacing block, for applying vacuum and cooling;
  a bottom mold-carrier plate coupled on the distribution plate, for mounting the bottom mold plates, having three pads screwed thereto; and
  three floating bottom molds, releasable auto-adjusted coupled on a corresponding pads, each coinciding with the center of the corresponding cavity of each blow mold, so that when the blow molds are closed around the floating bottom molds, they are auto-aligned with the center of each cavity, forming the bottom of the glassware articles.

111. The machine of claim 110, wherein the bottom mold plate mechanism comprising a bottom mold plate, mounting means, cooling and vacuum means and height adjusting means, said cooling and vacuum means for a triple cavity machine, including:
  a first vertical passage passing throughout the first fixed block, of the mounting means, for providing a vacuum pressure, a second central passage, and a third and a fourth vertical cooling fluid passages, each at each side of the second central passage, said third and fourth vertical passages providing cooling fluid and said first, third and fourth vertical passages including sealing rings at the first fixed block of the mounting means to avoid fluid leaks;
  a connecting vacuum passage in communication with the first vertical passage of the first block at the second movable block of said mounting means, for providing a vacuum at the blow mold plates in order to help the blown of a glassware article;
  two shortened connecting passages at the second movable block of the mounting means, in communication with the vertical cooling passages, of the first fixed block of the mounting means, finishing at a plenum chamber;
  a first telescopic pipe, coupled to the second movable block of the mounting means, to be slide placed into the passage of the first fixed block, and a second and third telescopic pipes coupled to the second movable block in coincidence with the shortened connecting passages thereof, and introduced into the passages of the first fixed block, to avoid fluid leaks when the second block is lifted for height adjustment by the height adjusting means;
  a connecting vacuum passage, at the spacing block, for communication of the vacuum from the first and second blocks;
  a plenum chamber at spacing block communicated with the plenum chamber of the second movable block, for cooling fluid;
  a passage network at the distribution plate for communicating the vacuum communicated through the passage of the spacing block to help the article formation;
  three central passages at the bottom mold-carrier plate for providing the cooling fluid, to the bottom mold plates, each surrounded by a plurality of orifices for applying vacuum through the distribution plate.

112. The machine of claim 110, wherein the bottom mold plate mechanism comprising a bottom mold plate, mounting means, cooling and vacuum means and height adjusting means having, for a triple cavity machine: a mechanical jack, placed into the central housing, of the first mounting block of the mounting means including a screw placed into a protection sleeve, which is contained into the central passage of said first mounting block, and a lifting plate at the mechanical jack for lifting and lowering the second up and down movable block and the bottom mold plates.

113. The machine of claim 1, wherein the blow head apparatus mounted on the apparatus support frame, including blow head means for forming the glassware article; blow head-carrier means holding said blow head means; and an oscillating mechanism mounted on the apparatus support frame, in which said blow mold carrier means are mounted for placing the blow head means over the blow mold, for forming a finished glassware article, and retiring it once the finished article has been formed.

114. The machine of claim 113, wherein the blow head apparatus having blow head means per cavity comprising mounting means to be mounted on the blow head carrier means.

115. The machine of claim 114, wherein the blow head apparatus having blow head means per cavity comprising mounting means consisting of a holding flange to be mounted on the blow head carrier means.

116. The machine of claim 113, wherein the blow head apparatus having blow head means comprising a single blow head.

117. The machine of claim 113, wherein the blow head apparatus having blow head means comprising a plurality of blow heads.

118. The machine of claim 1, wherein the blow head apparatus having blow head means comprising three blow heads.

119. The machine of claim 113, wherein the blow head apparatus including blow head-carrier means being a hollow blow head-carrier arm comprising holding means for retaining an elongated holding plate in which a blow head is mounted.

120. The machine of claim 119, wherein the blow head apparatus having a blow head-carrier means being a hollow blow head-carrier arm comprising a holding means including a flange for retaining an elongated holding plate in which a blow head is mounted.

121. The machine of claim 1, wherein the blow head apparatus having blow head carrier means comprising, for a triple cavity, a hollow blow head-carrier arm having a flange for retaining an elongated holding plate; an equalizing mechanism held to the elongated holding plate; and three blow heads mounted in the equalizing mechanism, so that the oscillating mechanism will oscillate the hollow blow head-carrier arm for placing the three blow heads held by the equalizing mechanism, over the blow molds, with a balanced force equivalent to a force applied to the whole blow apparatus.

122. The machine of claim 121, wherein the blow head apparatus having blow head carrier means comprising, for a triple cavity, a hollow blow head-carrier arm having a flange for retaining an elongated holding plate, an equalizing mechanism held to the elongated holding plate, and three baffle heads mounted in the equalizing mechanism; said equalizing mechanism comprising: holding means for housing and holding equalizing components, coupled to the elongated holding plate; blow head carrier means, mounted on the holding means, carrying the blow heads; rocker means in which the blow head-carrier means are mounted, to provide an up and down positive movement to said blow carrier means and said blow heads.

123. The machine of claim 122, wherein the blow head apparatus having blow head means comprising, for a triple cavity, a hollow blow head-carrier arm having a flange for retaining an elongated holding plate, and an equalizing mechanism held to the elongated holding plate; and three blow heads mounted in the equalizing mechanism; said equalizing mechanism including holding means comprising an equalizer carcass including a horizontal holding body coupled to the holding plate, having a central bore for distributing cooling and operating fluid; a horizontal conduit centrally integrated to the horizontal holding body, having a first end including a first housing, an intermediate portion having a central housing and a second end opposed to the first end, including a second housing, said first housing, central housing and second housing being positioned co-lineally to the center of each article forming cavity, and each housing including a pair of opposed depending holding skirts, a central one of said depending holding skirts including a hemi-bore, cooperating with a pair of clamps, each having a hemi-bore, completing a holding bore for receiving a holding pin.

124. The machine of claim 122, wherein the blow head apparatus having blow head means comprising, for a triple cavity, a hollow blow mold-carrier arm having a flange for retaining an elongated holding plate, an equalizing mechanism held to the elongated holding plate; and three blow heads mounted in the equalizing mechanism; said equalizing mechanism having blow head-carrier means comprising: a top opened central blow head-carrier, and a first and a second top closed lateral blow head carriers, each blow head carrier to be placed at each housing of the holding means, and comprising a vertical tubular conduit, each conduit of each of the blow head carrier having a transversal bore coinciding with the horizontal conduit of the holding means, for fluid communication, the central vertical tubular conduit including a flow compensator to equalize the fluid regarding the other vertical tubular conduits, a sealing metallic piston ring for sealing the housings of the holding means, to avoid leakage of cooling and/or operation fluid, and two pairs of opposed horizontal retention flanges, for providing up and down positive movements for equalizing forces and controlling differences of height of blow molds, and defining a flat retention portion between them, at each opposite side of the tubular conduit to be retained by the rocker means; and a perpendicular, horizontal blow head holding ring each having a peripheral "C" shaped flange including cuttings for the introduction of a respective blow head which remains locked when turning into the peripheral "C" shaped flange, and a housing for a retractable retaining piston, to avoid unlocking of the blow heads.

125. The machine of claim 122, wherein the blow head apparatus having blow head means comprising, for a triple cavity, a hollow blow head-carrier arm having a flange for retaining an elongated holding plate; an equalizing mechanism held to the elongated holding plate; and three blow heads mounted in the equalizing mechanism; said equalizing mechanism having rocker means comprising: a first elongated rocker arm for holding a first blow head carrier, comprised by a pair of similar opposed parallel elongated arms integrally retained, by a first rounded end, by a horizontal upper integral wall and, at a second rounded fork end, by a vertical integral wall defining a holding fork for retaining the first blow head carrier providing the up and down positive movement; a first bore passing through both first elongated arm and second elongated arm at the first end, and a second bore passing also through both first elongated arm and second elongated arm, at an intermediate portion thereof, for mounting said first blow mold carrier; and a second short rocker arm retaining a central blow mold carrier and a second blow mold carrier, comprised by a pair of parallel arms, integrally joined at an intermediate portion by an intermediate integral wall, having a bore passing throughout the integral wall, defining a first rounded fork end and a second rounded fork end, for retaining a central blow head carrier and second blow mold carrier and provide them an up and down positive movement.

126. The machine of claim 113, wherein the blow head apparatus having an oscillating mechanism being a rotolinear oscillating mechanism by which the blow mold carrier means including the blow head means, are simultaneously oscillated and lowered from an upper retracted inactive position to a lower active position to blown a parison into the blow mold, for finishing a glassware article, and its is simultaneously lifted and oscillated to the retracted position, and comprising:
  right hand fixed mounting means firmly held to the apparatus support frame, having height adjusting means for adjusting the height thereof;
  adjustable mounting means supported by the height adjusting means of the fixed mounting means, for micrometrical adjustments of the height of the entire blow head apparatus at a blow mold "zero-line";
  drive means mounted on the adjustable mounting means, for imparting a lifting and lowering movement;
  lifting and lowering means, coupled to the driving means to be lifted and lowered thereby, and which is also slide coupled to the adjustable mounting means, to be guided thereby in its lifting and lowering movement;
  osicating means coupled to the adjustable mounting means and to the lifting and lowering means to be lifted and lowered thereby, and to which is coupled the arm of the blow mold apparatus to be simultaneously lowered and oscillated from an upper retracted inactive position to a lower active position and, after a finished article has been formed, it is simultaneously lifted and oscillated to the retracted position;
  cooling means to provide cooling fluid to the blow head apparatus; and position sensors means mounted on the adjustable mounting means, in order to provide positioning information for measuring and controlling times of movements for mechanism synchronization.

127. The machine of claim 126, wherein the blow head apparatus having an oscillating mechanism which is a rotolinear oscillating mechanism having fixed mounting means comprising a vertical fixed dovetail female guide firmly held to the apparatus support frame and height adjusting means comprising a jack mechanism retained at the lower end of the support dovetail female guide, to micrometrically adjust the height of the entire baffle apparatus, which is then firmly fixed to said support dovetail female guide by screws.

128. The machine of claim 127, wherein the a blow head apparatus having an oscillating mechanism which is a rotolinear oscillating mechanism having adjustable mounting means comprising a support dovetail male guide, engaged to the dovetail female guide of the fixed mounting means and supported by the jack mechanism of the fixed mounting means, to micrometrically adjust the height of the entire blow head apparatus, which is firmly fixed to said dovetail female guide by screws once its height regarding the vertical fixed dovetail female guide has been adjusted; a square male slide rail, firmly coupled to the dovetail male guide, an adjustable male cam coupled to the support dovetail male guide, and an horizontal mounting plate coupled to the support dovetail male guide, for mounting the drive means.

129. The machine of claim 128, wherein the blow head apparatus having an oscillating mechanism which is a rotolinear oscillating mechanism having drive means comprising a linear fluid motor, coupled to the horizontal mounting plate of the adjustable mounting means, having a piston rod to provide lifting and lowering movement to the blow carrier means.

130. The machine of claim 129, wherein the blow head apparatus having an oscillating mechanism which is a rotolinear oscillating mechanism having lifting and lowering means comprising: a square "C" slide carriage at a lower free end of the piston rod of the linear fluid motor of said drive means, to be lifted and then lowered by the piston rod when the linear fluid motor is actuated, said square "C" slide carriage including lateral, back and forth slide way bearings, one of which including play adjusting means, for reducing the play of the carriage regarding the adjustable mounting means.

131. The machine of claim 130, wherein the blow head apparatus having an oscillating mechanism which is a rotolinear oscillating mechanism having oscillating means comprising: an adjustable male cam having a smoothly descendant curved track, adjustably coupled to the support dovetail male guide of the adjustable mounting means; a vertical shaft including bearings through which it is retained to the square "C" slide carriage of the lifting and lowering means, by means of semi-annular clamps, and having a cam follower carrier integrated thereto, including a pair of cam followers engaged to the adjustable male cam, which is adjusted by backlash adjusting screws to avoid backlash between this adjustable cam and the cam followers, to follow a combined linear and curved rotary profile of said fixed male cam.

132. The machine of claim 131, wherein the blow head apparatus having oscillating mechanism which is a rotolinear oscillating mechanism having cooling means comprising: a fluid sleeve, surrounding the upper end of the vertical shaft of the oscillating means, through which cooling air can be admitted and provided to the blow carrier means, to which the blow head means are retained.

133. The machine of claim 128, wherein the blow head apparatus having an oscillating mechanism which is a rotolinear oscillating mechanism having position sensors means comprising: positioning sensors mounted on the support dovetail female guide of the adjustable mounting means, in order to provide positioning information for measuring and controlling of the times of the movements for mechanism synchronization.

134. The machine of claim 1, wherein the take out apparatus is a servo-controlled bi-directional curvilinear take out apparatus.

135. The machine of claim 134, wherein the bi-directional curvilinear take out apparatus, comprising: mounting means, mounted on the take out support frame, mounted in turn on the apparatus support frame; a driving mechanism similar to that of the unidirectional inverting apparatus, mounted on said support means; an oscillatory hollow arm, mounted on said driving mechanism to provide it an oscillatory movement; and a finished article transference mechanism, mounted on said oscillatory hollow arm, including sliding carrier holders, mounted on said oscillatory hollow arm, including gripping fingers for gripping the finished articles and take the out from the blow molds and translate the to a cooling dead plate or to a carrier conveyor.

136. The machine of claim 135, wherein the bi-directional curvilinear take out apparatus including mounting means, a driving mechanism, an oscillatory hollow arm, and a finished article transference mechanism; said mounting means comprising: a support bench mounted on the take out support frame, mounted in turn on the apparatus support frame, including a pair of semi-annular clamps in an end of the support bench, and a further semi-annular clamp, in a second end of the support bench, in order to hold both the bi-directional curvilinear translation take out apparatus and the driving mechanism.

137. The machine of claim 135, wherein the bi-directional curvilinear take out apparatus including mounting means, a driving mechanism, an oscillatory hollow arm, and a finished article take out mechanism; said driving mechanism comprising: a carcass including a first lateral cap and a second lateral cap, each at each side of the carcass; said second lateral cap having a double keyway opposed 180° one another, and a support bench having a keyway which will be placed at a take out position, said support bench is mounted on the take out support frame, mounted in turn on the apparatus support frame by means of a semi-annular clamp; a horizontal axis supported by bearings to the first and second lateral caps, and including a slow speed gear having a power output coupling, for transmission of the output power; a sleeve coupled on the carcass, including a high speed extension shaft into said sleeve, having a worm gear at its lower end, gearing with the slow speed gear, which is provided with an anti-backlash mechanism, for reducing velocity and transmit power to said bi-directional curvilinear take out apparatus; a flexible couple at the lower end of the high speed extension shaft, for retiring a servo-motor from the heat zone of the glassware article; and a rotary servomotor for rotating the high speed extension shaft, by means of the flexible couple, and supported by a frame at the lower end of the sleeve; and a flange at an intermediate position of the sleeve, to be supported on the apparatus support frame, avoiding vibration of the whole structure, so that, the double keyway of the lateral cap, allows this driving mechanism to be placed on a 180° opposed position to be mounted at the bi-directional curvilinear take out apparatus without disassembling the driving mechanism.

138. The machine of claim 135, wherein the bi-directional curvilinear take out apparatus including mounting means, a driving mechanism, an oscillatory hollow arm, and a finished article transference mechanism; said oscillatory hollow arm comprising a first arm half and a second arm half, both assembled opposed face to face, defining an internal chamber and interconnected fluid passages, and having a first end retained by a rotary seal carrier union which in turn is supported, by means of a bearing, by the mounting means and clamped by the semi-annular clamp, a power shaft, coupled to the second arm half, to be coupled to a power output coupling of the driving mechanism, defining a rotary axis for the oscillatory hollow arm, in order to be oscillated 180° for a servo-controlled path from the blow mold station, to a cooling dead plate or carrier conveyor, and then it is lifted at a position of about 90° waiting for a next cycle, and a fixed axis, supported and clamped by the semi-annular clamp and by the power shaft by means of a bearing, and including a fixed gear; an idle gear, gearing the fixed gear, and which is comprised by two gear halves assembled opposed face to face shifted from each other, by adjusting screws, to adjust backlash, retained into the internal chamber by means of bearings, defining an intermediate idle axis; and a second end, including an axis retained by a bearings, into said second end of the oscillatory arm including a synchronizing gear, gearing with the idle gear, which is clamped to the axis; an inverted U-shaped oscillating support, having two lateral walls, each having a semi annular sliding recess, to be freely mounted at both ends of the axis, and retained by means of corresponding semi-annular clamp, so as to freely oscillate on the axis, the wall of said U-shaped oscillating support has an external mounting face including shaft housings, said U-shaped oscillating support, when the hollow arm rotates on the fixed axis, this U-shaped oscillating support is maintained at the same horizontal orientation during the whole rotation of the arm, describing a curvilinear translation path due to the idle gear and synchronizing gear; said semi annular clamp having a transmission tong including two opposite conical pilot guides, and cooperates with an upper semi annular clamp and a lower semi-annular clamp both clamped on the axis, said lower semi-annular clamp having two spaced legs defining a space between them in which the transmission tong of the clamp is placed and held by adjusting conical-ended screws in sad space legs introduced into the conical pilot guides of the transmission tong, in order to allow adjusting of the horizontal position of said U-shaped oscillating support, to be parallel to the upper surface of the blow mold, by means of said adjusting screws, and avoid lateral displacement thereof by means of the conical ends of the screws and the pilot guides.

139. The machine of claim 138, wherein the bi-directional curvilinear take out apparatus including mounting means, a driving mechanism, an oscillatory hollow arm, and a finished article take out mechanism; said finished article take out mechanism comprising a support arm, mounted on the U-shaped oscillating support mounted in turn on the synchronizing gear of the oscillating hollow arm, and comprising a support plate including a fluid connection for the operating fluid; a reciprocate fluid motor coupled to the support plate, to which the fluid connection is also coupled, and comprising an elongated piston rod surrounded by a spring retained by a double eyed female end rod at the free end of the piston rod for actuating the holding arms as it will be described in the following; and a holding frame lodging the elongated piston rod and spring; a scissor mechanism to open and close the holding arms, comprising a central support pin supported by the holding frame, and a pair of yokes, similar to the known scotch yokes, each having an intermediate portion, coupled to the central support pin, a first end in the form of a yoke portion, embracing a free sliding block, each retained by the pivot pin, retained in turn by the double eyed female rod, and a second end; and a pair of parallel holding arms, each having a positive stop member and coupled perpendicularly to the second end of the yokes, and including three gripping fingers; in this way, in an opened condition of the holding arms including their gripping fingers the piston rod is extended in its full stroke and the spring remains uncompressed, then, when actuating fluid is fed to the fluid motor, the piston rod is retracted upwardly compressing the spring, lifting the double eyed female end rod and consequently harmonically closing the yokes and the holding arms and its gripping fingers at a wide position limited by the stop members avoiding vibrations, to grip a finished article from an opened blow mold and transfer it at a dead plate at different heights to be finally cooled therein and taking it out of the forming machine.

140. The machine of claim 135, wherein the bi-directional curvilinear take out apparatus is a servo-controlled bi-directional curvilinear translation take out apparatus, allowing a servo-controlled path to avoid neck deformation of the finished article, and includes mounting means, a driving mechanism, an oscillatory hollow arm, and a finished article transference mechanism including a pair of parallel holding arms which are opened in cantilever, so that they can be placed in its take out position when the blow head apparatus is still in its blown position over the blow mold and will begin its closing stroke when the blow head apparatus begins its output stroke and the blow mold is closed; or else, they will begin its closing stroke when the blow head apparatus begins its output stroke and the blow mold begins its opening stroke, allowing reduction of dead times.

141. The machine of claim 1, wherein the programmable control means for the glassware forming machine, is a programmable electronic control to electronically control the movements, cycle time and sequence of steps of all of the mechanisms of the machine, as well as the tooling and electric power, fluid and lubrication operation of all of the mechanism of the machine, in accordance with the type of glassware articles to be produced and the amounts of glassware articles and velocity of production of the machine, which includes a plurality of valves, controlling the operating and cooling fluids through the fluid feeding system; an electronic processor including the programs for programming the whole range of performance of the machine, a performance monitoring system and a control boar to introduce the production data of the machine.

142. The machine of claim 141, wherein the programmable control means including a plurality of valves which are electronically controlled solenoid valves.

143. The machine of claim 141, wherein the programmable control means including a plurality of valves which are servo-controlled valves.

144. A glassware forming machine for the production of hollow glassware articles by the blow-and-blow or press-and-blow, press-and-blow paste mold and direct press processes in a glassware forming machine including multiple machine sections, in accordance with claim 1, wherein a single section can be quickly interchanged at a multiple-section machine, by another ready-for-operation one, without retiring said multiple-section machine from the working area, for maintenance, repairing or actualizing.

145. The machine of claim 1, wherein the transferable and open-able neck ring molds are placed at a constant blank mold "zero-line" height for the different height of articles to be produced, or processes, so that height adjustments are unnecessary.

146. The machine of claim 1, wherein the unidirectional inverting apparatus are placed at a constant blank mold "zero-line" height for the different height of articles to be produced or processes, so that height adjustments are unnecessary.

147. The machine of claim 1, wherein the pressing plunger apparatus is placed at a constant blank mold "zero-line" height for the different height of articles to be produced or processes, so that height adjustments are unnecessary.

148. The machine of claim 71, wherein a variable compensator of the pressing plunger apparatus, allows to change the height of the parison.

149. The machine of claim 1, wherein the pressing plunger apparatus is placed at a constant blank mold "zero-line" height for the different height of articles to be produced, requiring only a rapid change of the pressing plunger or neck ring plunger, so that height adjustments are unnecessary.

150. The machine of claim 82, wherein the servo-controlled bi-directional curvilinear transference apparatus is placed at a constant blow mold "zero-line" height for the different height of articles to be produced, so that height adjustments are unnecessary.

151. The machine of claim 1, wherein the height of the blow head apparatus is placed at a constant blow mold "zero-line" height, for the different height of articles to be produced, so that height adjustments are unnecessary.

152. The machine of claim 134, wherein the bi-directional curvilinear take out apparatus is placed at a constant blow mold "zero-line" height, for the different height of articles to be produced, so that height adjustments are unnecessary.

153. The machine of claim 77, wherein the neck ring holding arms of servo-controlled unidirectional inverting apparatus, are mounted in an inversion radius which allow a reduction of inertial forces for the inversion servo-controlled path of the parison.

154. The machine of claim 1, wherein the oscillating mechanism is the same for guide-funnel apparatus, the baffle apparatus and the blow head apparatus, but arranged in a left or right arrangement only for the guide-funnel apparatus.

155. The machine of claim 1, wherein the opening and closing mechanism, is the same for the blank mold apparatus and the blow mold apparatus.

156. The machine of claim 3, wherein driving mechanisms are the same for the inverting apparatus, the transference apparatus, and the take out apparatus, but arranged in a left or right arrangement only for the transference apparatus.

157. The machine of claim 3, wherein the baffle apparatus and the blow head apparatus use identical equalizing mechanisms.

158. The machine of claim 1, wherein said machine is able to change from a blow-and-blow process to a press-and-blow process or direct press, and vice versa, changing only the mold tooling, without changing any mechanism, kits or position adjustments.

159. Transferable and open-able neck ring molds, for glassware forming machines having single or multiple forming cavities, including a blank mold forming station, an intermediate station, and a blow forming station and a take out station, by the blow-and-blow process, press-and-blow wide mouth or narrow neck process, press-and-blow paste mold process and direct press, to be alternately and removable placed under a blank mold at a blank mold "zero-line" which is a constant position for any size of parisons and articles to be produced, comprising: two neck ring mold halves each including a neck ring forming cavity; holding means, to hold the open-able neck ring mold halves and handling the transferable and open-able neck ring mold by other components of the machine; assembling means, embracing the assembled neck ring mold halves, normally maintaining them closed when they are transferring and positioning a parison at other locations; and guiding means for maintaining the neck ring halves aligned to each other, so that this transferable and open-able neck ring mold allows to be handled with absolute independence, handling the parison by the finished neck ring at a uniform temperature avoiding that the parison had to be handeld by other components at different temperatures which could cause checks, efforts or deformations in the parison, thus allowing an improvement in quality of the finished glassware articles to be produced.

160. The transferable and open-able neck ring molds of claim 159, wherein the holding means comprising a first external groove to be held by a unidirectional rotary inverting apparatus, at the blank mold "zero-line"; a first enclosing flange, to be held by an unidirectional rotary inverting apparatus when it is in an intermediate station holding a parison in an upright orientation, and retain it even when the unidirectional rotary inverting apparatus is in an opened position, avoiding that the transferable and open-able neck ring mold falls down when the inverting apparatus releases said transferable and open-able neck ring mold; a second tapered aligning flange to keep the neck ring mold halves aligned with a center of the blank mold and tight both against each other; a second internal guiding groove receiving the guiding means for maintaining the neck ring halves aligned to each other; a third internal handling groove to be held by a bi-directional curvilinear translation apparatus; and a fourth external holding groove, receiving the assembling means to keep the neck ring mold halves normally closed.

161. The transferable and open-able neck ring molds of claim 160, wherein the assembling means comprising an annular tension spring placed into the fourth external holding groove, surrounding the neck ring mold halves, normally maintaining them closed when they are transferring and positioning a parison at other locations, and which can be opened, by overcoming the tension force of the tension spring, from the third internal handling groove by gripping fingers of the bi-directional curvilinear translation apparatus, for releasing the parison when it is transferred to a blow mold.

162. The transferable and open-able neck ring molds of claim 161, wherein the guiding means including a one-piece annular guide, having a flange which is located into the second internal guide grooves of the neck ring mold halves, for maintaining the neck ring mold halves aligned to each other.

163. The transferable and open-able neck ring molds of claim 162, wherein the guiding means additionally including: a plane face defining four aligning point corners to be aligned by a spring iron band held by the holding arms of the unidirectional rotary inverting apparatus, to avoid misalignment regarding the partition line of the blank mold and a to avoid rotary displacement during handling thereof.

164. The transferable and open-able neck ring molds of claim 163, wherein the guiding means additionally including: two pairs of plane angular faces to be retained by a spring iron band held by the holding arms of the unidirectional rotary inverting apparatus, to avoid misalignment regarding the partition line of the blank mold and to avoid rotary displacement during handling thereof.

* * * * *